United States Patent [19]

Shinbashi et al.

[11] Patent Number: 5,754,545
[45] Date of Patent: May 19, 1998

[54] ADD-DROP MULTIPLEXER WITH ENHANCEMENT OF ACCESSIBILITY TO SIGNALS IN DIFFERENT HIERARCHICAL LEVELS AND FLEXIBILITY IN VARIOUS SERVICES AND CIRCUIT SETTING OPERATIONS

[75] Inventors: Masahiro Shinbashi; Akihiko Oka; Kazuo Takatsu; Hideaki Mochizuki; Junichi Ishiwatari; Koji Iwamoto, all of Kawasaki, Japan

[73] Assignee: Fujitsu Limited, Kanagawa, Japan

[21] Appl. No.: 606,078

[22] Filed: Feb. 23, 1996

[30] Foreign Application Priority Data

Feb. 23, 1995 [JP] Japan ................. 7-035660

[51] Int. Cl.⁶ .................. H04J 3/00; H04J 14/08
[52] U.S. Cl. .................. 370/360; 370/535
[58] Field of Search .................. 370/360, 375, 370/376, 388, 389, 470, 532, 535, 536, 537, 539, 541, 542, 907, 916, 357, 358, 359; 340/825, 825.03, 826, 827

[56] References Cited

U.S. PATENT DOCUMENTS

| | | | |
|---|---|---|---|
| 4,506,357 | 3/1985 | Nakayashiki et al. | 370/227 |
| 4,716,561 | 12/1987 | Angell et al. | 370/376 |
| 4,835,763 | 5/1989 | Lau | 370/223 |
| 5,018,135 | 5/1991 | Ashi et al. | 370/535 |
| 5,159,595 | 10/1992 | Flanagan et al. | 370/227 |
| 5,265,096 | 11/1993 | Parruck | 370/216 |
| 5,278,824 | 1/1994 | Kremer | 370/223 |
| 5,282,200 | 1/1994 | Dempsey et al. | 370/245 |
| 5,307,353 | 4/1994 | Yamashita et al. | 395/182.02 |
| 5,311,501 | 5/1994 | Takatsu | 370/357 |
| 5,343,464 | 8/1994 | Iino et al. | 370/227 |
| 5,416,768 | 5/1995 | Jahromi | 370/360 |
| 5,517,489 | 5/1996 | Ogura | 370/223 |
| 5,528,580 | 6/1996 | Lee et al. | 370/224 |
| 5,572,513 | 11/1996 | Yamamoto et al. | 370/217 |
| 5,583,855 | 12/1996 | Ball | 370/376 |
| 5,586,115 | 12/1996 | Nakano et al. | 370/376 |

FOREIGN PATENT DOCUMENTS

| | | |
|---|---|---|
| 0 081 304 | 6/1983 | European Pat. Off. . |
| 0 214 783 | 3/1987 | European Pat. Off. . |
| 0214783 | 3/1987 | European Pat. Off. . |
| 0503474 | 9/1992 | European Pat. Off. . |
| 0615367 | 9/1994 | European Pat. Off. . |
| 2 145 608 | 3/1985 | United Kingdom . |
| 2 283 884 | 5/1995 | United Kingdom . |
| 2286097 | 8/1995 | United Kingdom . |
| 2287616 | 9/1995 | United Kingdom . |
| 83/0393 | 11/1983 | WIPO . |
| 83/03937 | 11/1983 | WIPO . |
| 9300756 | 1/1993 | WIPO . |

*Primary Examiner*—Alpus H. Hsu
*Assistant Examiner*—Kwang Bin Yao
*Attorney, Agent, or Firm*—Helfgott & Karas

[57] ABSTRACT

An add-drop multiplexer contains a partial drop unit and a partial add unit. The partial drop unit selects a number n of first signal(s) of n channel(s) among a number N of first signals of N channels, which are received from a first transmission line, and transmits the n first signal(s) of n channel(s) on at least one second transmission line, where N and n are integers satisfying N>n>0. The partial add unit receives n second signal(s) of n channel(s) from at least one third transmission line, and a number (N-n) of first signal(s) of (N-n) channel(s) among the N first signals of the N channels, which are not selected by the partial drop unit, and transmits on the first transmission line the n second signal(s) of n channel(s) and the (N-n) first signal(s) of (N-n) channel (s) as N third signals of N channels.

39 Claims, 69 Drawing Sheets

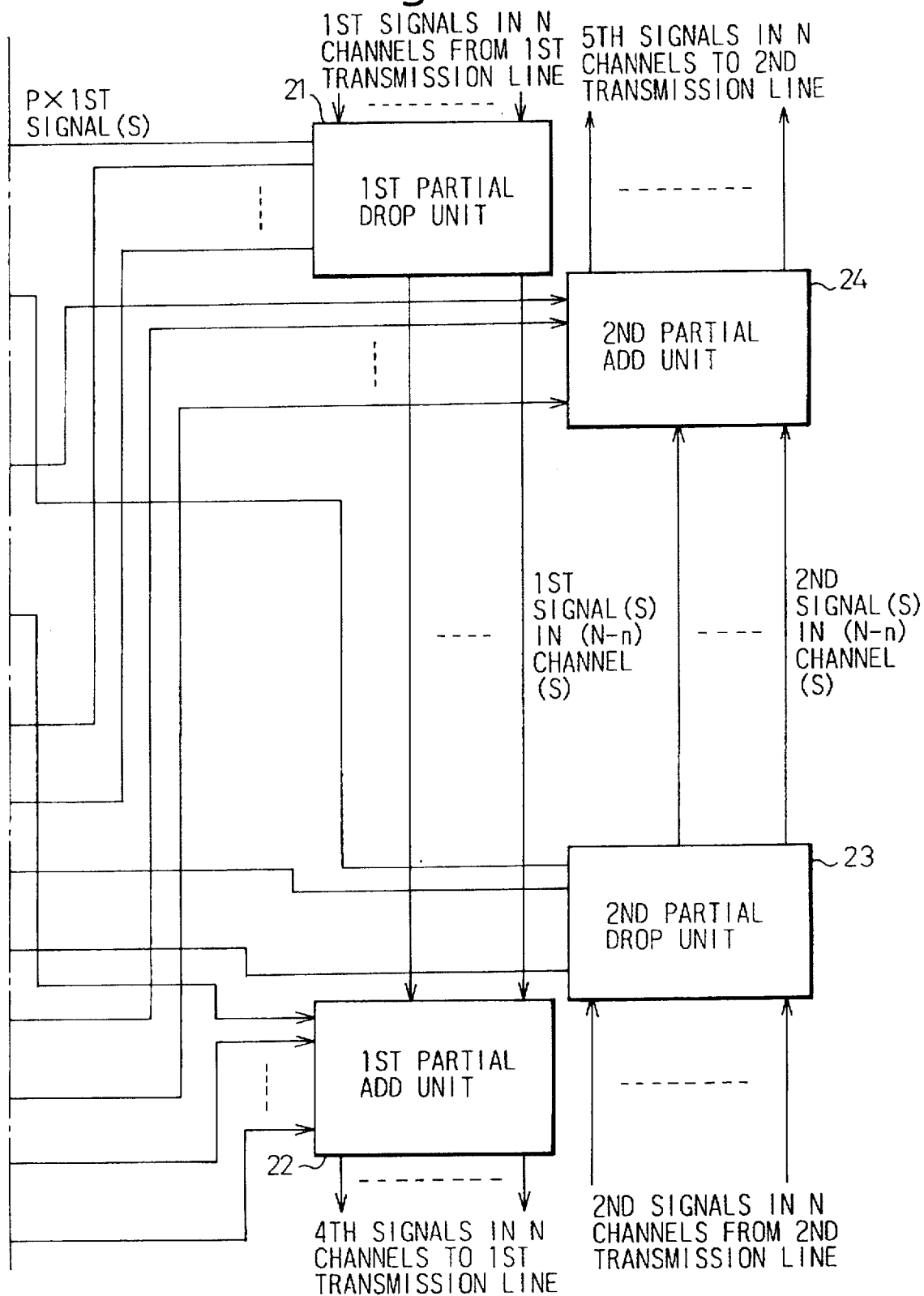

Fig. 28

S1: CONTROL DROP SIGNAL SELECTION UNIT 25 IN FIG.27 TO SELECT SIGNAL(S) FROM 2ND INPUT UNIT 93 AND OUTPUT THE SIGNAL(S) ONTO 3RD TRANSMISSION LINE, AND CONTROL ADD SIGNAL SUPPLY UNIT 26 IN FIG.27 TO SUPPLY 3RD SIGNAL(S) TO 1ST OUTPUT UNIT 92

S2: REPLACE 1ST INPUT UNIT 91 IN FIG.27 WITH 1ST PARTIAL DROP UNIT 21 IN FIG.17, 2ND OUTPUT UNIT 94 IN FIG.27 WITH 2ND PARTIAL ADD UNIT 24 IN FIG.17, AND 1ST BIDIRECTIONAL TRANSMISSION LINE 81 IN FIG.27 WITH 1ST AND 2ND TRANSMISSION LINE, RESPECTIVELY

S3: CONTROL DROP SIGNAL SELECTION UNIT 25 IN FIG.27 TO SELECT 1ST SIGNAL(S) FROM 1ST PARTIAL DROP UNIT 21 IN FIG.17 AND OUTPUT THE 1ST SIGNAL(S) ONTO 3RD TRANSMISSION LINE, AND CONTROL ADD SIGNAL SUPPLY UNIT 26 TO SUPPLY 3RD SIGNAL(S) TO 1ST PARTIAL ADD UNIT 24 IN FIG.17

S4: REPLACE 2ND INPUT UNIT 93 IN FIG.27 WITH 2ND PARTIAL DROP UNIT 23 IN FIG.17, 1ST OUTPUT UNIT 92 IN FIG.27 WITH 1ST PARTIAL ADD UNIT 22 IN FIG.17, AND 2ND BIDIRECTIONAL TRANSMISSION LINE 82 IN FIG.17 WITH 1ST AND 2ND TRANSMISSION LINES IN FIG.17, RESPECTIVELY

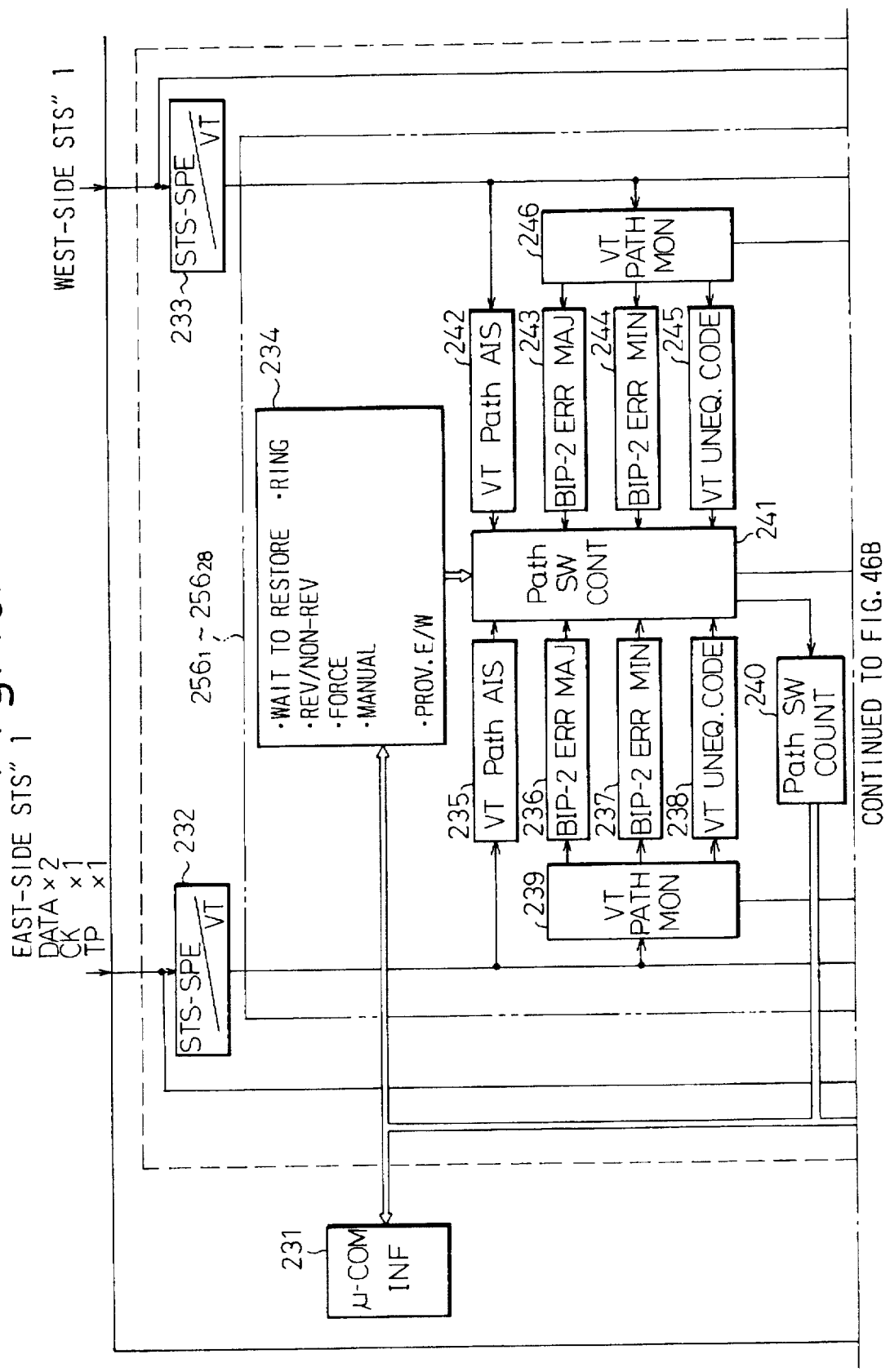

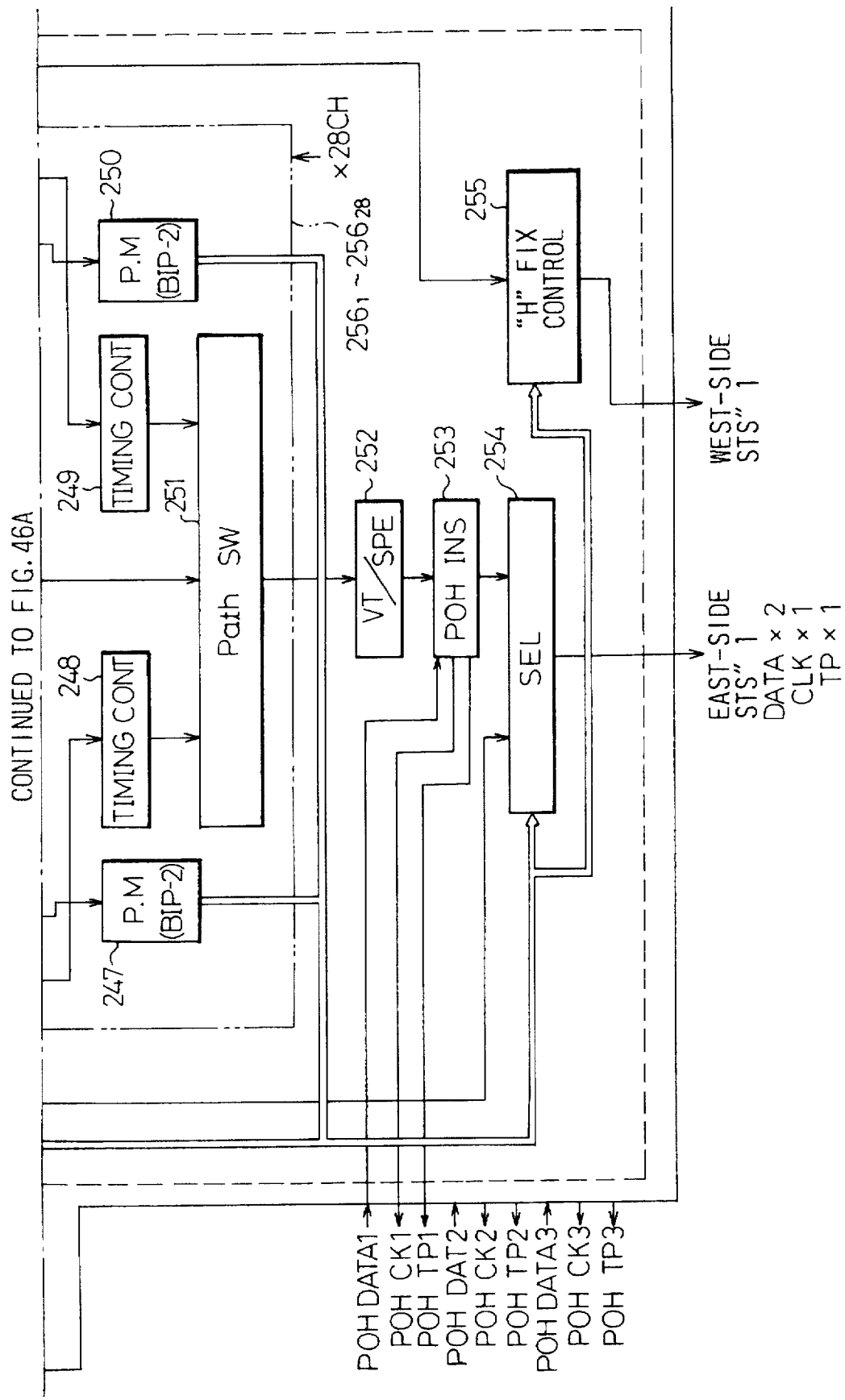

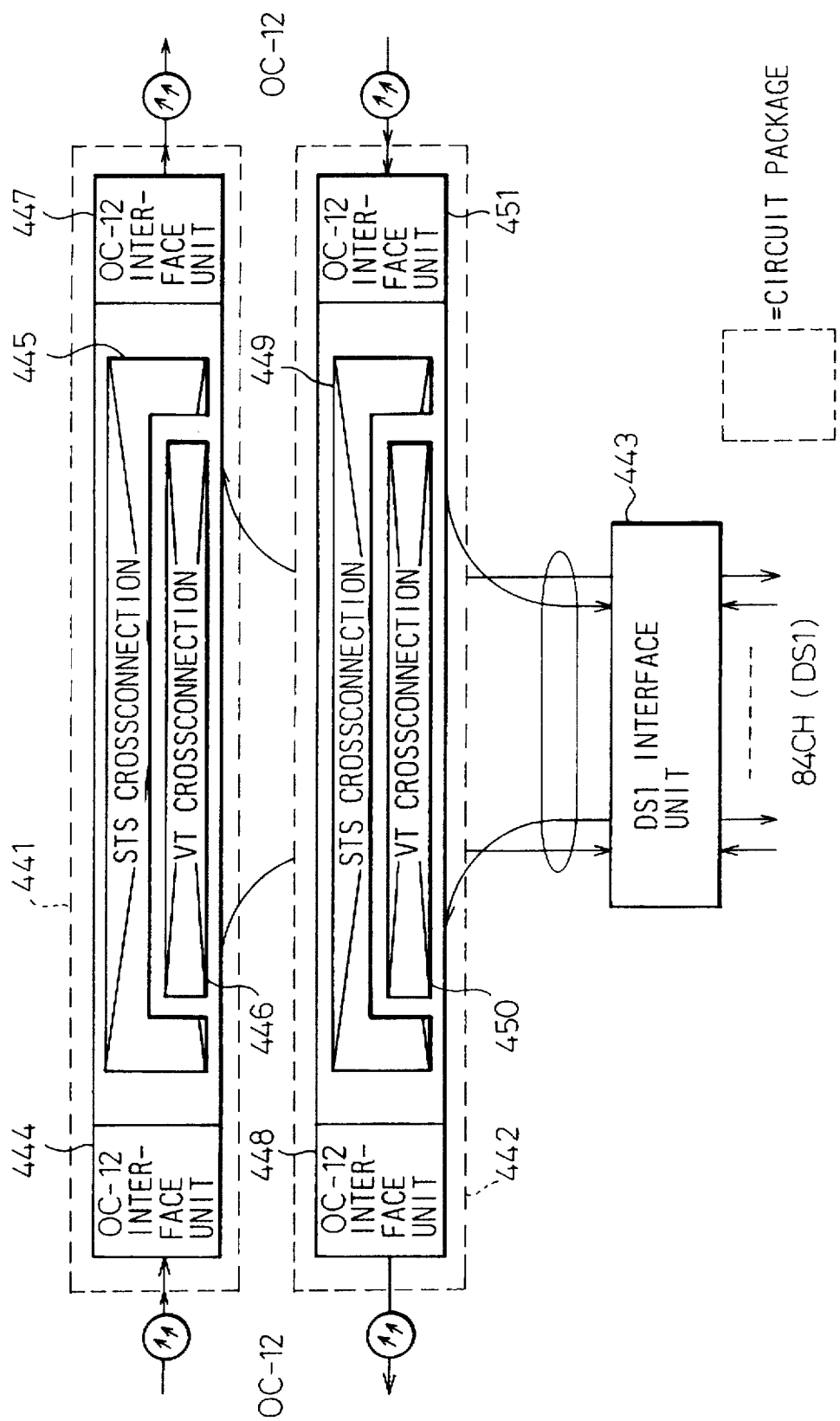

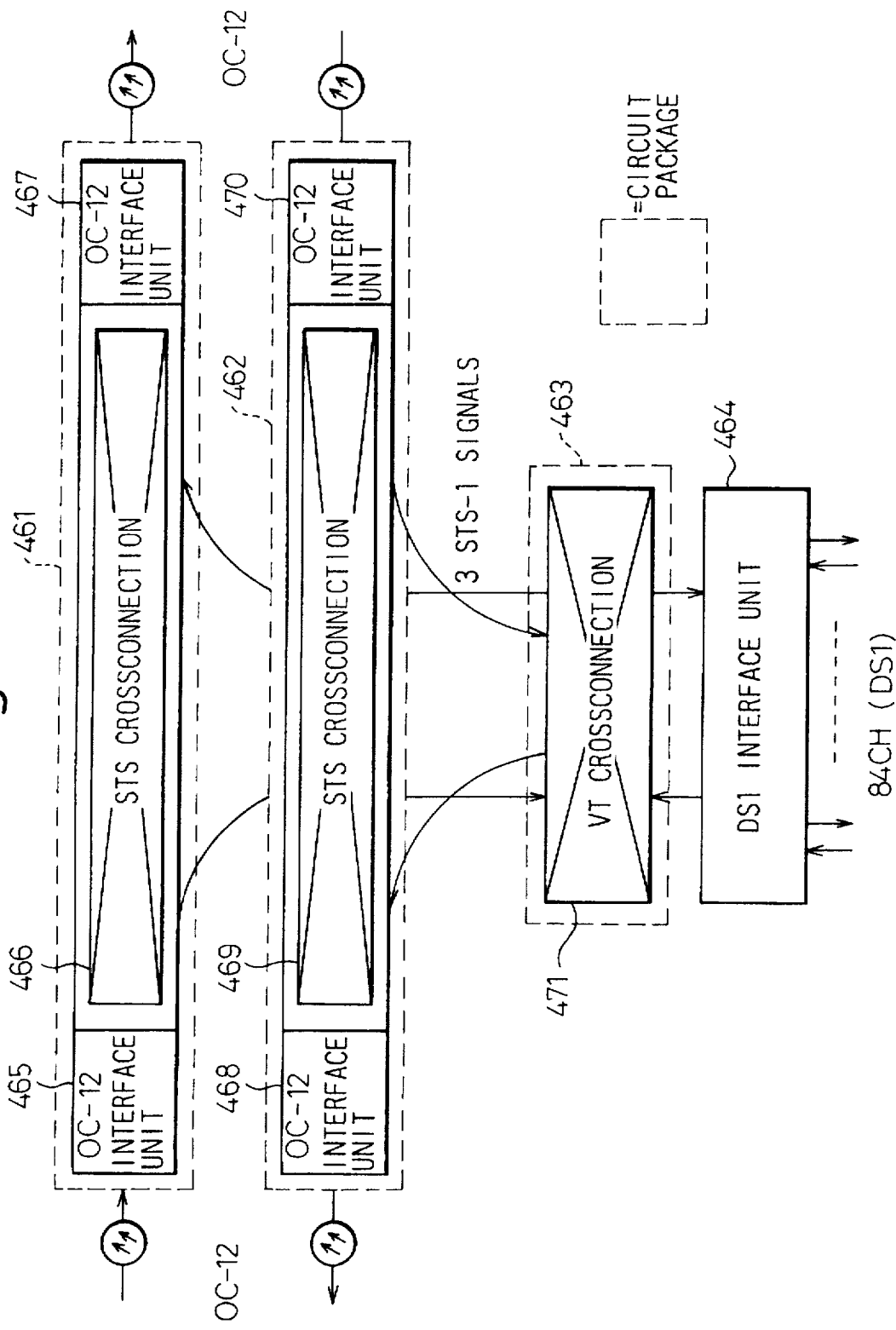

ADD-DROP MULTIPLEXER WITH ENHANCEMENT OF ACCESSIBILITY TO SIGNALS IN DIFFERENT HIERARCHICAL LEVELS AND FLEXIBILITY IN VARIOUS SERVICES AND CIRCUIT SETTING OPERATIONS

BACKGROUND OF THE INVENTION

1. Field of the Invention

The present invention relates to an add-drop multiplexer, which is used in a synchronized communication network. The add-drop multiplexer according to the present invention can be used in an optical synchronous communication system in which a signal which is composed by multiplexing a plurality of signals each being in a transmission frame of a first form, and transmission frames of the first form each can contain a plurality of transmission frames in a second form. The add-drop multiplexer according to the present invention can be used, for example, in the SONET (Synchronous Optical Network) system in accordance with ANSI T1-105, or in the SDH system in accordance with the ITU-T recommendations, G707, G708, and G709, or in the New Synchronous Communication Network in accordance with the standard JT-G707, JT-G708, and JT-G709 by the Telecommunication Technique Committee in Japan. When constructing a large scale network using these communication technologies, accessibility to signals in different hierarchical levels and flexibility in various services and circuit setting operations are required. Hereinafter, explanations are provided based on the SONET system only since the correspondence between the SONET system and the SDH system or the New Synchronous Communication Network system is well known.

2. Description of the Related Art 2.1 Conventional Technique Which Is Common To The First To The Twenty-Second Inventions, And The Problem In The Conventional Technique ANSI T1-105 defines the add-drop multiplexer (ADM) as "network elements that provide access to all N, or some subsets M (M is a standard hierarchical level <=N), of the STS line signals contained within an OC-N optical channel. The STS signals are added to (inserted), and/or dropped from (extracted), the OC-N signal as it passes through the ADM".

As explained in the following subsections, the conventional add-drop multiplexers lack sufficient accessibility to signals in different hierarchical levels and flexibility in various services and circuit setting operations.

2.2 Conventional Technique And The Problem Thereof Which Is To Be Solved By The First Invention In conventional add-drop multiplexers, which are located on a transmission line through which a signal containing a multiplexed plurality of transmission frames (of a plurality of channels) is transmitted, where the add-drop multiplexers can add to and drop from the signal tributary signals, it is not possible to access only to an arbitrary channel or channels of the plurality of channels and to make the transmission frames in the other channel or channels of the plurality of channels pass through the add-drop multiplexers without being output to and input from the tributary side. For example, in the conventional add-drop multiplexers in the SONET system, an arbitrary number of OC-1 signals among OC-1 signals which are multiplexed in an OC-12 signal transmitted through the above transmission line, cannot be exclusively output (extracted) to the tributary side, or an arbitrary number of OC-1 signals among OC-1 signals which are to be multiplexed in the OC-12 signal cannot be exclusively input (inserted) from the tributary side, and the transmission frames in the other channel or channels of the plurality of channels cannot simply pass through the add-drop multiplexers without being output to and input again from the tributary side.

2.3 Conventional Technique And The Problem Thereof Which Is To Be Solved By The Second Invention In conventional add-drop multiplexers, which are located on a main transmission line through which signals of a plurality of first channels are transmitted, where the add-drop multiplexers can add to and drop from the signals on the main transmission line tributary signals, it is not possible to access an arbitrary one of the plurality of first channels from each second channel on the tributary side and to make transmission frames in the other first channel or channels pass through the add-drop multiplexers without being output to and input from the tributary side. For example, in the conventional add-drop multiplexers in the SONET system, an arbitrary one of OC-1 signals among OC-1 signals which are multiplexed in an OC-12 signal transmitted through the above transmission line, cannot be output (extracted) to each second channel on the tributary side, or an arbitrary one of OC-1 signals among OC-1 signals which are to be multiplexed in the OC-12 signal cannot be input (inserted) from each second channel on the tributary side.

2.4 Conventional Technique And The Problem Thereof Which Is To Be Solved By The Third Invention In conventional add-drop multiplexers, which are located on a transmission line through which a signal containing a (multiplexed) plurality of first transmission frames (of a plurality of first channels) in a first form is transmitted, where each first transmission frame further contains a plurality of second transmission frames (of a plurality of second channels) in a second form, and the add-drop multiplexers can add to and drop from the signal tributary signals, it is not possible to access an arbitrary one of the plurality of second channels in a lower multiplicity level (lower hierarchy level) from each channel in the lower multiplicity level on the tributary side. For example, in the conventional add-drop multiplexers in the SONET system, an arbitrary one of VT (virtual tributary) signals, for example, an arbitrary one of VT1.5 signals among VT1.5 signals, which are contained in one of the OC-1 signals multiplexed in the OC-12 signal transmitted through the above transmission line, cannot be output (extracted) to each channel (for example, a channel of DS1) on the tributary side, and an arbitrary one of VT (virtual tributary) signals, for example, an arbitrary one of VT1.5 signals among VT1.5 signals, which are to be contained in one of the OC-1 signals multiplexed in the OC-12 signal cannot be added (inserted) from each channel (for example, a channel of DS1) on the tributary side.

2.5 Conventional Technique And The Problem Thereof Which Is To Be Solved By The Fourth Invention In conventional add-drop multiplexers, which are located on a transmission line through which a signal containing a multiplexed plurality of first transmission frames (of a plurality of first channels) in a first form is transmitted, where each first transmission frame further contains a plurality of second transmission frames (of a plurality of second channels) in a second form, and the add-drop multiplexers can add to and drop from the signal tributary signals, in addition to the problem of the above section 2.4, it is not possible to make the other second channel or channels pass through the add-drop multiplexers without being output to and input from the tributary side. Namely, it is not possible for the conventional add-drop multiplexers to insert signals received from the other second channel or channels into the same channels as they were received. For example, in the conventional add-drop multiplexers in the SONET system, an arbitrary one of VT (virtual tributary) signals, for example, an arbitrary one of VT1.5 signals among VT1.5 signals, which are contained in one of the OC-1 signals multiplexed in the OC-12 signal transmitted through the above transmission line, cannot be output (extracted) to each channel (for example, a channel of DS1) on the tributary side, the remaining VT1.5 signals, which are contained in the above one of the OC-1 signals other than the above arbitrary one of VT1.5 signals cannot be directly inserted into the same channels as they were received, and an arbitrary one of VT1.5 signals among VT1.5 signals, which are to be contained in one of the OC-1 signals multiplexed in the OC-12 signal cannot be added (inserted) from each channel (for example, a channel of DS1) on the tributary side.

2.6 Conventional Technique And The Problem Thereof Which Is To Be Solved By The Fifth Invention In conventional add-drop multiplexers, which are located on a bidirectional transmission line through which signals each containing a multiplexed plurality of transmission frames (of a plurality of channels) are transmitted in two directions, where the add-drop multiplexers can add tributary signals to the above signals in both directions and drop tributary signals from one of the above signals transmitted in a selected one of the two directions, it is not possible to access only to an arbitrary channel or channels of the plurality of channels in the signal transmitted in the selected direction and to make the transmission frames in the other channel or channels of the plurality of channels pass through the add-drop multiplexers without being output to and input from the tributary side. For example, in the conventional add-drop multiplexers in the SONET system, an arbitrary number of OC-1 signals among OC-1 signals which are multiplexed in an OC-12 signal transmitted in the selected one of the two directions cannot be exclusively output (extracted) to the tributary side, or an arbitrary number of OC-1 signals among OC-1 signals which are to be multiplexed in the OC-12 signal transmitted in the selected one of the two directions cannot be exclusively input (inserted) from the tributary side, and the transmission frames in the other channel or channels of the plurality of channels cannot simply pass through the add-drop multiplexers without being output to and input again from the tributary side.

2.7 Conventional Technique And The Problem Thereof Which Is To Be Solved By The Sixth Invention In conventional add-drop multiplexers, which are located on a bidirectional transmission line through which signals each containing a multiplexed plurality of transmission frames (of a plurality of first channels) are transmitted in two directions, where the add-drop multiplexers can add tributary signals to the above signals in both directions and drop tributary signals from one of the above signals transmitted in a selected one of the two directions, it is not possible to access an arbitrary one of the plurality of first channels from each second channel on the tributary side and to make transmission frames in the other first channel or channels pass through the add-drop multiplexers without being output to and input from the tributary side. For example, in the conventional add-drop multiplexers in the SONET system, an arbitrary one of OC-1 signals among OC-1 signals which are multiplexed in an OC-12 signal transmitted through the above transmission line, cannot be output (extracted) to each second channel on the tributary side, or an arbitrary one of OC-1 signals among OC-1 signals which are to be multiplexed in the OC-12 signal cannot be input (inserted) from each second channel on the tributary side.

2.8 Conventional Technique And The Problem Thereof Which Is To Be Solved By The Seventh Invention In conventional add-drop multiplexers, which are located on a bidirectional transmission line through which signals each containing-a multiplexed plurality of first transmission frames (of a plurality of first channels) in a first form are transmitted in two directions, where each first transmission frame further contains a plurality of second transmission frames (of a plurality of second channels) in a second form, and the add-drop multiplexers can add tributary signals to the above signals in both directions and drop tributary signals from one of the above signals transmitted in a selected one of the two directions, it is not possible to access the plurality of second channels in respectively arbitrary ones of the two directions from channels on the tributary side. Namely, it is not possible to switch (or select) the direction of a signal in one of the plurality of second channels for each of the plurality of second channels. For example, in the case wherein VT (virtual tributary) signals, for example, VT1.5 signals, are contained in a respective one of OC-1 signals, and the OC-1 signals are multiplexed in a respective one of the OC-12 signals transmitted in the two directions through the bidirectional transmission line in the SONET system, the directions of VT signals cannot be selected for each channel (for example, a channel of DS1) on the tributary side when accessing to the VT signals from corresponding channels.

2.9 Conventional Technique And The Problem Thereof Which Is To Be Solved By The Eighth Invention In conventional add-drop multiplexers, which are located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, and the add-drop multiplexers can add tributary signals to the above signals in both directions and drop tributary signals from one of the above signals transmitted in a selected one of the two directions, it is not possible to access an arbitrary one of the plurality of second channels in an arbitrary one of the two directions from each channel on the tributary side. Namely, it is not possible to access an arbitrary one of the plurality of second channels from each channel on the tributary side, and at the same time to switch (or select) the direction of a signal in one of the plurality of second channels for each of the plurality of second channels. For example, in the conventional add-drop multiplexers in the SONET system, an arbitrary one of VT (virtual tributary) signals, for example, an arbitrary one of VT1.5 signals among VT1.5 signals, which are contained in one of the OC-1 signals multiplexed in the OC-12 signal transmitted in an arbitrary one of the two directions, cannot be output (extracted) to each channel (for example, a channel of DS1) on the tributary side, and an arbitrary one of VT (virtual tributary) signals, for example, an arbitrary one of VT1.5 signals among VT1.5 signals, which are to be contained in one of the OC-1 signals multiplexed in the OC-12 signal transmitted in an arbitrary one of the two directions, cannot be added (inserted) from each channel (for example, a channel of DS1) on the tributary side.

2.10 Conventional Technique And The Problem Thereof Which Is To Be Solved By The Ninth Invention In conventional add-drop multiplexers, which are located on a transmission line through which a signal containing a multiplexed plurality of first transmission frames (of a plurality of first channels) in a first form is transmitted, where each first transmission frame further contains a plurality of second transmission frames (of a plurality of second channels) in a second form, and the add-drop multiplexers can add to and drop from the signal tributary signals, it is not possible to choose either crossconnecting operations at the level of the plurality of first channels or at the level of the plurality of second channels. For example, in the case wherein VT (virtual tributary) signals, for example, VT1.5 signals, are contained in a respective one of three OC-1 signals, and the three OC-1 signals are multiplexed in an OC-3 signals transmitted through the transmission line in the SONET system, the conventional add-drop multiplexers have a function of crossconnecting three STS-1 signals only. Therefore, when trouble occurs in one of the plurality of second channels for the VT signals, the crossconnection cannot be performed at the level of the VT signals, and the crossconnection must be performed at the level of the STS-1 signals.

2.11 Conventional Technique And The Problem Thereof Which Is To Be Solved By The Tenth Invention If there is provided an add-drop multiplexer, which is located on a transmission line through which a signal containing a multiplexed plurality of first transmission frames (of a plurality of first channels) in a first form is transmitted, where each first transmission frame further contains a plurality of second transmission frames (of a plurality of second channels) in a second form, and the add-drop multiplexers can add to and drop from the signal tributary signals, and are enabled to choose either of crossconnecting operations at the level of the plurality of first channels and at the level of the plurality of second channels, it is desirable that connections (circuit setting) at the level of the plurality of second channels are not changed before and after switching the level of the crossconnecting operations from the level of the plurality of second channels to the level of the plurality of first channels, so that switching of the level of the crossconnecting operations from the level of the plurality of second channels to the level of the plurality of first channels can be performed continuously. For example, it is desirable that connections (circuit setting) at the level of the VT signals are not changed before and after switching the level of the crossconnecting operations between the STS-1 signals and the VT signals, so that switching of the level of the crossconnecting operations between the STS-1 signals and the VT signals can be performed continuously.

2.12 Conventional Technique And The Problem Thereof Which Is To Be Solved By The Eleventh Invention In conventional add-drop multiplexers, which are located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, and the add-drop multiplexers can add tributary signals to the above signals in both directions and drop tributary signals from one of the above signals transmitted in a selected one of the two directions, it is not possible to choose a hierarchy level at which operations are performed for selecting the directions of signals transmitted through the bidirectional transmission line between the level of the plurality of first channels and the plurality of second channels. In conventional add-drop multiplexers, which are located on a bidirectional transmission line through which OC-3 signals, each containing three multiplexed STS-1 signals, are transmitted in two directions, where each STS-1 signal further contains a plurality of VT signals, there is provided only a function for switching the directions of the STS-1 signals. Therefore, when trouble occurs in one of the plurality of second channels for the VT signals, the switching of the direction of the signal cannot be performed at the level of the VT signals, and the switching of the direction must be performed at the level of the STS-1 signals.

2.13 Conventional Technique And The Problem Thereof Which Is To Be Solved By The Twelfth Or Thirteenth Invention In conventional add-drop multiplexers, which are located on a bidirectional transmission line through which signals each containing a multiplexed plurality of transmission frames (of a plurality of channels) are transmitted in two directions, where the add-drop multiplexer can add tributary signals to the above signals in both directions and drop tributary signals from one of the above signals transmitted in a selected one of the two directions, it is not possible to increase a transmission capacity of (in other words, increase a total transmission rate of or a degree of multiplicity in) the bidirectional transmission line on which each add-drop multiplexer is located, while maintaining a function of communication with another node through a portion of the bidirectional transmission line. For example, in the conventional add-drop multiplexer which is located on a bidirectional transmission line through which OC-3 signals are transmitted in two directions, when increasing the transmission capacity of the bidirectional transmission line, it is necessary to stop the operation of the add-drop multiplexer, and replace the entire add-drop multiplexer with a new add-drop multiplexer which is designed for the increased transmission capacity.

2.14 Conventional Technique And The Problem Thereof Which Is To Be Solved By The Fourteenth Invention In conventional add-drop multiplexers which are located on a transmission line through which a signal containing a multiplexed plurality of first transmission frames (of a plurality of first channels) in a first form is transmitted, where each first transmission frame further contains a plurality of second transmission frames (of a plurality of second channels) in a second form, and the add-drop multiplexers can add to and drop from the signal tributary signals, and are enabled to choose either crossconnecting operations at the level of the plurality of first channels or at the level of the plurality of second channels, crossconnection of signals at the level of the above plurality of first channels is performed. However, it is not possible to perform a crossconnection of signals at the level of the above plurality of second channels or, further, to perform a crossconnection of signals between signals of the above plurality of second channels contained in different ones of the plurality of first channels. For example, in the conventional add-drop multiplexer connected to a transmission line transmitting OC-12 signals each being a multiplexed signal of twelve OC-1 signals, crossconnection between VT signals contained in different OC-1 signals cannot be performed.

2.15 Conventional Technique And The Problem Thereof Which Is To Be Solved By The Fifteenth Invention In conventional add-drop multiplexers, which are located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, and the add-drop multiplexers can add tributary signals to the above signals in both directions and drop tributary signals from one of the above signals transmitted in a selected one of the two directions, it is not possible to automatically choose a level of operations of crossconnecting signals between the level of the plurality of first channels and the plurality of second channels, in accordance with the type of an interface connected to the add-drop multiplexers on the tributary side. In the conventional add-drop multiplexer, the level of operations of crossconnecting signals is fixed to, for example, the level of STS-1 signals, or the level of VT signals.

2.16 Conventional Technique And The Problem Thereof Which Is To Be Solved By The Sixteenth Invention If an add-drop multiplexer is located on a bidirectional transmission line through which signals each containing a multiplexed plurality of first transmission frames (of a plurality of first channels) in a first form are transmitted in two directions, each first transmission frame further contains a plurality of second transmission frames (of a plurality of second channels) in a second form, the add-drop multiplexer can add tributary signals to the above signals in both directions and drop tributary signals from one of the above signals transmitted in a selected one of the two directions, and has a function of choosing a level of operations of crossconnecting signals between the level of the plurality of first channels and the plurality of second channels, and a function of choosing a level of operations of selecting directions of signals in the bidirectional transmission line for access from the tributary side, conventionally, there is no technique is proposed for automatically adjusting the above levels in the operations of crossconnecting signals and selecting directions of signals.

2.17 Conventional Technique And The Problem Thereof Which Is To Be Solved By The Seventeenth Invention If an add-drop multiplexer is located on a bidirectional transmission line through which signals each containing a multiplexed plurality of first transmission frames (of a plurality of first channels) in a first form are transmitted in two directions, each first transmission frame further contains a plurality of second transmission frames (of a plurality of second channels) in a second form, the add-drop multiplexer can add tributary signals to the above signals in both directions and drop tributary signals from one of the above signals transmitted in a selected one of the two directions, and has a function of crossconnecting signals of the plurality of first channels, functions of demultiplexing the crossconnected signals of the plurality of first channels to supply the same to the tributary side, and a function of selecting directions of the signals in the bidirectional transmission line for access from the tributary side, conventionally, there is no technique proposed for minimizing the size of the circuitry realizing the add-drop multiplexer having the above functions.

2.18 Conventional Technique And The Problem Thereof Which Is To Be Solved By The Eighteenth Invention Usually, transmission apparatuses connected to a transmission line through which a signal containing a multiplexed plurality of transmission frames (of a plurality of channels) is transmitted, contain a plurality of units for terminating the transmission line, and the operation of the line termination includes overhead processing. Generally, the above transmission frames each contain overhead information. The overhead information is dropped from each transmission frame which is received and is added to each transmission frame to be transmitted in an overhead insertion/extraction circuit which is provided for each channel of the transmission frame, and the overhead processing, i.e., processing of the overhead information including analysis of the received overhead information and generation of the above overhead information to be added to the transmission frame to be transmitted, is performed in an overhead processing unit which is provided separately from the above overhead insertion/extraction circuit for each channel. Further, the overhead insertion/extraction circuits for the respective channels and the overhead processing unit are usually provided in separate circuit packages, respectively. Since the overhead information must be transferred between the overhead processing unit and the respective overhead insertion/extraction circuits, signal paths are necessary between the overhead processing unit and the respective overhead insertion/extraction circuits. Conventionally, a signal path is provided between each of the overhead insertion/extraction circuits and the overhead processing unit. Therefore, a large number of the signal paths are necessary for the above purpose, and cables for realizing these signal paths occupy considerable space in the construction of the transmission apparatus.

2.19 Problems Which Are To Be Solved By The Nineteenth to Twentieth Inventions

When realizing a construction of an add-drop multiplexer which is located on a transmission line through which a signal containing a multiplexed plurality of first transmission frames (of a plurality of first channels) in a first form are transmitted, where each first transmission frame further contains a plurality of second transmission frames (of a plurality of second channels) in a second form, the add-drop multiplexer contains a function of interfacing with the above transmission line, a function of crossconnecting signals at a level of the above plurality of first channels, and a function of crossconnecting signals at a level of the above plurality of second channels, the above functions are required to be allocated to a plurality of circuit packages efficiently based on a consideration as to which one among various advantageous features is most required. The required advantages are considered as follows.

2.19.1 A load on a circuit package which contains at least one interface circuit realizing the above function of interface should be reduced, and processing realizing both the above functions of crossconnecting signals at the level of the plurality of first channels and at the level of the plurality of second channels should be efficiently performed as a whole. These requirements are satisfied by the nineteenth invention as explained later.

2.19.2 Loads on the plurality of circuit packages should be uniform because the plurality of circuit packages can be efficiently mounted in a shelf when the physical sizes of the plurality of circuit packages are uniform. This requirement is satisfied by the twentieth invention as explained later.

2.20 Problems Which Are To Be Solved By The Twenty-First to Twenty-Second Inventions When realizing a construction of an add-drop multiplexer which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, the add-drop multiplexer contains a function of interfacing with the above transmission line for both directions, a function of crossconnecting signals at a level of the above plurality of first channels, and a function of crossconnecting signals at a level of the above plurality of second channels, the above functions are required to be allocated to a plurality of circuit packages efficiently based on a consideration as to which one among various advantageous features is most required. The required advantages are considered as follows.

2.20.1 Wirings between the plurality of circuit packages should be minimized because spaces occupied by the wirings and connectors can be reduced. This requirement is satisfied by the twenty-first invention as explained later.

2.20.2 Loads on constructions for realizing the above functions relating to the respective ones of the above two directions and a further direction to the tributary side, should be equalized because loads on the plurality of circuit packages relating to mounting hardware thereon can be made uniform. This requirement is satisfied by the twenty-second invention as explained later.

SUMMARY OF THE INVENTION

A common object of the first to twenty-second inventions is to provide an add-drop multiplexer in which accessibility to signals in different hierarchical levels and flexibility in various services and circuit setting operations are improved.

An object of the first invention is to provide an add-drop multiplexer which is located on a transmission line through which a signal containing a multiplexed plurality of transmission frames (channels) is transmitted, where the add-drop multiplexers can add to and drop from the signal tributary signals, and are enabled access only to an arbitrary channel or channels of the plurality of channels and to make the transmission frames in the other channel or channels of the plurality of channels pass through the add-drop multiplexer without being output to and input from the tributary side.

An object of the second invention is to provide an add-drop multiplexer which is located on a transmission line through which a signal containing a multiplexed plurality of transmission frames (channels) is transmitted, where the add-drop multiplexers can add to and drop from the signal tributary signals, and are enabled access an arbitrary one of the plurality of channels from each channel on the tributary side and to make the transmission frames in the other channel or channels of the plurality of channels pass through the add-drop multiplexer without being output to and input from the tributary side.

An object of the third invention is to provide an add-drop multiplexer, which is located on a transmission line through which a signal containing a multiplexed plurality of first transmission frames (of a plurality of first channels) in a first form is transmitted, where each first transmission frame further contains a plurality of second transmission frames (of a plurality of second channels) in a second form, and the add-drop multiplexers can add to and drop from the signal tributary signals, and are enabled access an arbitrary one of the plurality of second channels from each channel on the tributary side.

An object of the fourth invention is to provide an add-drop multiplexer, which is located on a transmission line through which a signal containing a multiplexed plurality of first transmission frames (of a plurality of first channels) in a first form is transmitted, where each first transmission frame further contains a plurality of second transmission frames (of a plurality of second channels) in a second form, and the add-drop multiplexer can add to and drop from the signal tributary signals, and are enabled signals in the second channels, other than the dropped second channel signals, to pass through the same second channels as they are received.

An object of the fifth invention is to provide an add-drop multiplexer, which is located on a bidirectional transmission line through which signals each containing a multiplexed plurality of transmission frames (of a plurality of channels) are transmitted in two directions, where the add-drop multiplexer can add tributary signals to the above signals in both directions and drop tributary signals from one of the above signals transmitted in a selected one of the two directions, and are enabled to access only an arbitrary channel or channels of the plurality of channels in the signal transmitted in the selected direction and to make the transmission frames in the other channel or channels of the plurality of channels pass through the add-drop multiplexer without being output to and input from the tributary side.

An object of the sixth invention is to provide an add-drop multiplexer, which is located on a bidirectional transmission line through which signals each containing a multiplexed plurality of transmission frames (of a plurality of channels) are transmitted in two directions, where the add-drop multiplexer can add tributary signals to the above signals in both directions and drop tributary signals from one of the above signals transmitted in a selected one of the two directions, and are enabled to access an arbitrary one of the plurality of first channels from each second channel on the tributary side and to make transmission frames in the other first channel or channels pass through the add-drop multiplexers without being output to and input from the tributary side.

An object of the seventh invention is to provide an add-drop multiplexer, which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, and the add-drop multiplexer can add tributary signals to the above signals in both directions and drop tributary signals from one of the above signals transmitted in a selected one of the two directions, and are enabled to access the plurality of second channels in respectively arbitrary ones of the two directions from channels on the tributary side.

An object of the eighth invention is to provide an add-drop multiplexer, which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, and the add-drop multiplexer can add to and drop from the signal tributary signals, and are enabled to access an arbitrary one of the plurality of second channels in an arbitrary one of the two directions from each channel on the tributary side.

An object of the ninth invention is to provide an add-drop multiplexer, which is located on a transmission line through which a signal containing a multiplexed plurality of first transmission frames (of a plurality of first channels) in a first form is transmitted, where each first transmission frame further contains a plurality of second transmission frames (of a plurality of second channels) in a second form, and the add-drop multiplexer can add to and drop from the signal tributary signals, and are enabled to choose either of crossconnecting operations at the level of the plurality of first channels and at the level of the plurality of second channels.

An object of the tenth invention is to provide a method for switching a level of crossconnecting operations in an add-drop multiplexer, which is located on a transmission line through which signals containing a multiplexed plurality of first transmission frames (of a plurality of first channels) in a first form is transmitted, where each first transmission frame further contains a plurality of second transmission frames (of a plurality of second channels) in a second form, the add-drop multiplexer can add to and drop from the signal tributary signals, and connections (circuit setting) at the level of the plurality of second channels are not changed before and after switching the level of the crossconnecting operations from the level of the plurality of second channels to the level of the plurality of first channels, so that switching of the level of the crossconnecting operations from the level of the plurality of second channels to the level of the plurality of first channels can be performed continuously.

An object of the eleventh invention is to provide an add-drop multiplexer, which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, and the add-drop multiplexer can add tributary signals to the above signals in both directions and drop tributary signals from one of the above signals transmitted in a selected one of the two directions, and are enabled to choose a level of operations of selecting the directions of signals transmitted through the bidirectional transmission line between the level of the plurality of first channels and the plurality of second channels.

A common object of the twelfth and thirteenth inventions is to provide a method of increasing a transmission capacity of a bidirectional transmission line at a location at which an add-drop multiplexer is located, where signals each containing a multiplexed plurality of transmission frames (of a plurality of channels) are transmitted in two directions through the bidirectional transmission line, the add-drop multiplexer can add tributary signals to the above signals in both directions and drop tributary signals from one of the above signals transmitted in a selected one of the two directions, and a transmission capacity of (in other words, increase a total transmission rate of or a degree of multiplicity in) the bidirectional transmission line on which each add-drop multiplexer is located, is increased while maintaining a function of communication with another node through a portion of the bidirectional transmission line.

An object of the fourteenth invention is to provide an add-drop multiplexer, which is located on a transmission line through which a signal containing a multiplexed plurality of first transmission frames (of a plurality of first channels) in a first form is transmitted, where each first transmission frame further contains a plurality of second transmission frames (of a plurality of second channels) in a second form, and the add-drop multiplexer can add to and drop from the signal tributary signals, crossconnection of signals between signals of the above plurality of second channels contained in different ones of the plurality of first channels is possible, and a function of crossconnecting signals at the level of the plurality of first channels and a function of crossconnecting signals at the level of the plurality of second channels can be realized by a single unit.

An object of the fifteenth invention is to provide an add-drop multiplexer, which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, and the add-drop multiplexer can add tributary signals to the above signals in both directions and drop tributary signals from one of the above signals transmitted in a selected one of the two directions, and are enabled to automatically choose a level of operations of crossconnecting signals between the level of the plurality of first channels and the plurality of second channels, in accordance with the type of an interface connected to the add-drop multiplexer on the tributary side.

An object of the sixteenth invention is to provide an add-drop multiplexer, which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, and the add-drop multiplexer can add tributary signals to the above signals in both directions and drop tributary signals from one of the above signals transmitted in a selected one of the two directions, and has a function of choosing a level of operations of crossconnecting signals between the level of the plurality of first channels and the plurality of second channels, a function of choosing a level of operations of selecting directions of signals in the bidirectional transmission line for access from the tributary side, and a further function of automatically adjusting the above levels in the operations of crossconnecting signals and selecting directions of signals.

An object of the seventeenth invention is to provide an add-drop multiplexer, which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, the add-drop multiplexer can add tributary signals to the above signals in both directions and drop tributary signals from one of the above signals transmitted in a selected one of the two directions, and has a function of crossconnecting signals of the plurality of first channels, functions of demultiplexing the crossconnected signals of the plurality of first channels to supply the same to the tributary side, and a function of selecting directions of the signals in the bidirectional transmission line for access from the tributary side, and a size of circuitry realizing the add-drop multiplexer having the above functions are minimized.

An object of the eighteenth invention is to provide a transmission apparatus, which is located on a transmission line through which a signal containing a multiplexed plurality of transmission frames (of a plurality of channels) is transmitted, where the transmission apparatus contains a plurality of separate circuit packages respectively containing a plurality of overhead insertion/extraction circuits and an overhead processing unit, respectively, and is enabled to minimize signal paths connected between the overhead processing unit and the plurality of overhead insertion/extraction circuits.

An object of the nineteenth invention is to provide an add-drop multiplexer, which is located on a transmission line through which a signal containing a multiplexed plurality of first transmission frames (of a plurality of first channels) in a first form are transmitted in two directions, where each first transmission frame further contains a plurality of second transmission frames (of a plurality of second channels) in a second form, the add-drop multiplexer contains at least one interface circuit for interfacing with the above transmission line, a function of crossconnecting signals at a level of the above plurality of first channels, and a function of crossconnecting signals at a level of the above plurality of second channels, a load on a circuit package which contains the interface circuit can be reduced, and both the functions of crossconnecting signals at the level of the plurality of first channels and at the level of the plurality of second channels can be efficiently performed as a whole.

An object of the twentieth invention is to provide an add-drop multiplexer, which is located on a transmission line through which a signal containing a multiplexed plurality of first transmission frames (of a plurality of first channels) in a first form are transmitted in two directions, where each first transmission frame further contains a plurality of second transmission frames (of a plurality of second channels) in a second form, the add-drop multiplexer contains a function of interfacing with the above transmission line, a function of crossconnecting signals at a level of the above plurality of first channels, and a function of crossconnecting-signals at a level of the above plurality of second channels, and loads on the plurality of circuit packages can be uniform so that the plurality of circuit packages can be efficiently mounted in a shelf.

An object of the twenty-first invention is to provide an add-drop multiplexer, which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, the add-drop multiplexer contains a function of interfacing with the above transmission line for both directions, a function of crossconnecting signals at a level of the above plurality of first channels, and a function of crossconnecting signals at a level of the above plurality of second channels, and wiring between the plurality of circuit packages can be minimized so that the space occupied by the wiring and connectors can be reduced.

An object of the twenty-second invention is to provide an add-drop multiplexer, which is located on a bidirectional transmission line through which signals each containing a multiplexed plurality of first transmission frames (of a plurality of first channels) in a first form are transmitted in two directions, where each first transmission frame further contains a plurality of second transmission frames (of a plurality of second channels) in a second form, the add-drop multiplexer contains a function of interfacing with the above transmission line for both directions, a function of crossconnecting signals at a level of the above plurality of first channels, and a function of crossconnecting signals at a level of the above plurality of second channels, and loads on constructions for realizing the above functions relating to the respective ones of the above two directions and a further direction to the tributary side, can be equalized so that loads on the plurality of circuit packages relating to mounting hardware thereon can be made uniform.

(1) According to the first invention, there is provided an add-drop multiplexer which contains: a partial drop unit for selecting n first signal(s) of n channel(s) among N first signals of N channels, which are received from a first transmission line, and transmitting the n first signal(s) of n channel(s) on at least one second transmission line, where N and n are integers satisfying N>n>0; and a partial add unit for receiving n second signal(s) of n channel(s) from at least one third transmission line, and (N-n) first signal(s) of (N-n) channel(s) among the N first signals of the N channels, which are not selected by the partial drop unit, and for transmitting on the first transmission line the n second signal(s) of n channel(s) and the (N-n) first signal(s) of (N-n) channel(s) as N third signals of N channels.

(1-1) In the add-drop multiplexer according to the first invention (1), the above first and third signals may be contained in transmission frames of a predetermined form when being transmitted on the first transmission line, and each transmission frame can contain information to be transmitted and pointer information which indicates a phase of the information to be transmitted, in the transmission frame. The above partial add unit may insert information contained in the n second signal(s) of n channel(s) and the (N-n) first signal(s) of (N-n) channel(s), into the transmission frames to be transmitted, in synchronization with timing of the add-drop multiplexer. The add-drop multiplexer may further contain a phase and frequency control unit which obtains information on phases of the information contained in the n second signal(s) of n channel(s) and the (N-n) first signal(s) of (N-n) channel(s), in the transmission frames to be transmitted, and inserts the information on the phases into the transmission frames as the pointer information.

(1-2) In the add-drop multiplexer according to the above (1-1), the above phase and frequency control may contain a unit for obtaining the phases in the transmission frames based on reference phases of the transmission frames to be transmitted, at least one phase of the information contained in the n second signal(s) of n channel(s), and at least one phase of the information contained in the (N-n) received first signal(s) of (N-n) channel(s).

(1-3) In the add-drop multiplexer according to the above (1-1), the above phase and frequency control may contain a unit for performing stuff and destuff control in the transmission frames containing the third signals, based on frequencies of the third signals to be transmitted, and at least one frequency of the (N-n) first signal(s) when the (N-n) first signal(s) is received.

(1-4) In the add-drop multiplexer according to the first invention (1), the above n first signal(s) of the n channel(s) is contained in at least one transmission frame of a predetermined form when being transmitted on the at least one second transmission line, and each transmission frame can contain information to be transmitted and pointer information which indicates a phase of the information to be transmitted, in the transmission frame. The add-drop multiplexer may further contain a phase and frequency control unit which inserts first information contained in the n first signal(s) of n channel(s) as the n first signal(s) of n channel(s) is received, into the at least one transmission frame which may contain the n first signal(s) and is to be transmitted on the at least one second transmission line, in synchronization with timing of the add-drop multiplexer, obtains second information on at least one phase of the first information inserted in the at least one transmission frame of the n first signal(s), and inserts the second information on the at least one phase into the at least one transmission frame as the pointer information.

(1-5) In the add-drop multiplexer according to the above (1-4), the above phase and frequency control may contain a unit for obtaining the at least one phase in the at least one transmission frame based on at least one reference phase of the at least one transmission frame to be transmitted, and at least one reception phase at which the first information is received.

(1-6) In the add-drop multiplexer according to the above (1-4), the above phase and frequency control may contain a unit for performing stuff and destuff control in the transmission frames containing the n first signal(s) of n channel(s), based on at least one frequency of the n first signal(s) to be transmitted, and at least one frequency of the n first signal(s) when the n first signal(s) of n channel(s) is received.

(1-7) In the add-drop multiplexer according to the first invention (1), may further contain a demultiplexing unit for demultiplexing at least one of the at least one n first signal(s) of the n channel(s) to m of fourth signals of m channels to be output to at least one fourth transmission line, where m is an integer satisfying m>1, and a multiplexing unit for receiving m fifth signals of m channels from at least one fifth transmission line to generate at least one of the n second signal(s) of n channel(s) and supply the at least one of the n second signal(s) of n channel(s) to the partial add unit.

(2) According to the second invention, there is provided an add-drop multiplexer which contains, in addition to the construction of the first invention (1), a first crossconnecting unit for establishing at least one circuit through which each of the n first signal(s) of n channel(s) can be transmitted to one of the at least one second transmission line, in accordance with a correspondence relationship between the n first signal(s) of n channel(s) and the at least one second transmission line, and a second crossconnecting unit for establishing at least one circuit through which each of the n second signal(s) of n channel(s) can be supplied as one of the N third signals, in accordance with a correspondence relationship between the n second signal(s) of n channel(s) and the N third signals.

(2-1) In the add-drop multiplexer according to the second invention (2), the n first signal(s) of the n channel(s) may be contained in at least one transmission frame of a predetermined form when being transmitted on the at least one second transmission line, and each transmission frame can contain information to be transmitted and pointer information which indicates a phase of the information to be transmitted, in the transmission frame. The add-drop multiplexer may further contain a phase and frequency control unit which inserts first information contained in the n first signal(s) of n channel(s) as the n first signal(s) of n channel (s) is received, into the at least one transmission frame to be transmitted on the at least one second transmission line, in synchronization with timing of the add-drop multiplexer, obtains second information on at least one phase of the first information inserted in the at least one transmission frame of the n first signal(s), and inserts the second information on the at least one phase into the at least one transmission frame as the pointer information.

(3) According to the third invention, there is provided an add-drop multiplexer which contains the construction of the above second invention (2). The integers N and n are assumed to satisfy $N \geq n > 0$, and the above add-drop multiplexer further contains a first crossconnecting unit for establishing at least one circuit through which each of the m fourth signal(s) of m channel(s) can be transmitted to one of the at least one fourth transmission line, in accordance with a correspondence relationship between the m fourth signal (s) of m channel(s) and the at least one fourth transmission line, and a second crossconnecting unit for establishing at least one circuit so that each of the m fifth signal(s) of m channel(s) can be supplied to one input port of the multiplexing unit, in accordance with a correspondence relationship between the m fifth signal(s) and the input ports of the multiplexing unit.

(3-1) In the add-drop multiplexer according to the third invention, the integers N and n may be assumed to satisfy $N \geq n > 0$, the m fourth signal(s) and the m fifth signal(s) may be each contained in at least one transmission frame of a predetermined form when they are transmitted, and each transmission frame can contain information to be transmitted and pointer information which indicates a phase of the information to be transmitted, in the transmission frame. The add-drop multiplexer may further contain a first phase and frequency control unit which inserts first information contained in the m fourth signal(s) of m channel(s) as the m fourth signal(s) is received, into the at least one transmission frame to be transmitted, in synchronization with timing of the add-drop multiplexer, obtains second information on at least one phase of the first information inserted in the at least one transmission frame, and inserts the second information on the at least one phase into the at least one transmission frame as the pointer information, and a second phase and frequency control unit which inserts third information contained in the m fifth signal(s) of m channel(s) as the m fifth signal(s) is received, into the at least one transmission frame to be transmitted, in synchronization with timing of the add-drop multiplexer, obtains fourth information on at least one phase of the third information in the at least one transmission frame, and inserts the fourth information on the at least one phase into the at least one transmission frame as the pointer information.

(4) According to the fourth invention, there is provided an add-drop multiplexer which contains the construction of the above second invention (2), and further contains a through connection unit for supplying at least one of the m fourth signal(s) to the multiplexing unit, instead of the at least one of the m fifth signal(s), where the integers N and n are assumed to satisfy $N > n > 0$.

(4-1) In the add-drop multiplexer according to claim, the m fourth signal(s) and the m fifth signal(s) may be each contained in at least one transmission frame of a predetermined form when they are transmitted, and each transmission frame can contain information to be transmitted and pointer information which indicates a phase of the information to be transmitted, in the transmission frame. The add-drop multiplexer may further contain a first phase and frequency control unit which inserts first information contained in the m fourth signal(s) of m channel(s) as the m fourth signal(s) is received, into the at least one transmission frame to be transmitted, in synchronization with the timing of the add-drop multiplexer, obtains second information on at least one phase of the first information inserted in the at least one transmission frame, and inserts the second information on the at least one phase into the at least one transmission frame as the pointer information, and a second phase and frequency control unit which inserts third information contained in the m fifth signal(s) of m channel(s) as the m fifth signal(s) is received, into the at least one transmission frame to be transmitted, in synchronization with timing of the add-drop multiplexer, obtains fourth information on at least one phase of the third information in the at least one transmission frame, and inserts the fourth information on the at least one phase into the at least one transmission frame as the pointer information.

(5) According to the fifth invention, there is provided an add-drop multiplexer which contains: a first partial drop unit for selecting n first signal(s) of n channel(s) among N first signals of N channels, which are received from a first transmission line, and supplying the n first signal(s) of n channel(s) to a drop signal selection unit, where N and n are integers satisfying $N > n > 0$; a second partial drop unit for selecting n second signal(s) of n channel(s) among N second signals of N channels, which are received from a second transmission line and correspond to the n first signal(s), and supplying the n second signal(s) of n channel(s) to the drop signal selection unit; the drop signal selection unit for receiving the n first signal(s) and the n second signal(s) corresponding to the n first signal(s) as n pair(s) of corresponding signals, selecting one signal from each pair of the n pair(s) of corresponding signals to obtain n selected signal(s) and transmit the n selected signal(s) on at least one third transmission line; a first partial add unit for receiving n third signal(s) of n channel(s) from at least one fourth transmission line, and (N-n) first signal(s) of (N-n) channel(s) among the N first signals of the N channels, which are not selected by the first partial drop unit, and for transmitting on the first transmission line the n third signal(s) and the (N-n) first signal(s) as N fourth signals of N channels; a second partial add unit for receiving the n third signal(s) of n channel(s) from at least one fourth transmission line, and (N-n) second signal(s) of (N-n) channel(s) among the N second signals of the N channels, which are not selected by the-second partial drop unit, and for transmitting on the second transmission line the n third signal(s) and the (N-n) second signal(s) as N fifth signals of N channels; and an add signal supplying unit for receiving the n third signal(s) of n channel(s) from the at least one fourth transmission line, and supplying the n third signal(s) to the first and second partial add units.

(5-1) In the add-drop multiplexer according to the fifth invention (5), the n selected signal(s) of the n channel(s) may be contained in at least one transmission frame of a predetermined form when being transmitted on the at least one third transmission line, and each transmission frame can contain information to be transmitted and pointer information which indicates a phase of the information to be transmitted, in the transmission frame. The add-drop multiplexer may further contain a phase and frequency control unit which inserts first information contained in the n selected signal(s) of n channel(s) as the n selected signal(s) of n channel(s) is received, into the at least one transmission frame to be transmitted on the at least one third transmission line, in synchronization with timing of the add-drop multiplexer, obtains second information on at least one phase of the first information inserted in the at least one transmission frame, and inserts the second information on the at least one phase into the at least one transmission frame as the pointer information.

(6) According to the sixth invention, there is provided an add-drop multiplexer which contains the above construction of the fifth invention (5), and further contains a first crossconnecting unit for establishing at least one circuit through which each of the n first signal(s) of n channel(s) can be transferred to one of the at least one third transmission line, in accordance with a correspondence relationship between the n first signal(s) of n channel(s) and the at least one second transmission line, a second crossconnecting unit for establishing at least one circuit through which each of the n second signal(s) of n channel(s) can be transferred to one of the at least one third transmission line, in accordance with a correspondence relationship between the n second signal(s) of n channel(s) and the at least one second transmission line, a third crossconnecting unit for establishing at least one circuit through which each of the n third signal(s) of n channel(s) can be transferred to one of the at least one first transmission line, in accordance with a correspondence relationship between the n third signal(s) of n channel(s) and the at least one first transmission line, and a fourth crossconnecting unit for establishing at least one circuit through which each of the n third signal(s) of n channel(s) can be transferred to one of the at least one second transmission line, in accordance with a correspondence relationship between the n third signal(s) of n channel(s) and the at least one second transmission line.

(7) According to the seventh invention, there is provided an add-drop multiplexer which contains: a first partial drop unit for selecting n first signal(s) of n channel(s) among N first signals of N channels, which are received from a first transmission line, and outputting the n first signal(s), where N and n are integers satisfying N≧n>0; a second partial drop unit for selecting n second signal(s) of n channel(s) among N second signals of N channels, which are received from a second transmission line and correspond to the n first signal(s), and supplying the n second signal(s) of n channel(s) to the drop signal selection unit; a first drop signal selection unit for receiving (n-p) first signal(s) among the n first signal(s) and (n-p) second signal(s) among the n second signal(s) corresponding to the (n-p) first signal(s) as (n-p) pair(s) of corresponding signals, selecting one signal from each pair of the (n-p) pair(s) of corresponding signals to obtain (n-p) selected signal(s) and transmit the (n-p) selected signal(s) on at least one third transmission line, where p is an integer satisfying n≧p>0; a first partial add unit for receiving (n-p) third signal(s) of (n-p) channel(s) from at least one fourth transmission line, first p multiplexed signal (s) of p channels supplied from a first multiplexing unit, and (N-n) first signal(s) of (N-n) channel(s) among the N first signals of the N channels, which are not selected by the first partial drop unit, and for transmitting on the first transmission line the (n-p) third signal(s), the first p multiplexed signal(s), and the (N-n) first signal(s), as N fourth signals of N channels; a second partial add unit for receiving the (n-p) third signal(s) of (n-p) channel(s) from the at least one fourth transmission line, second p multiplexed signal(s) of p channels supplied from a second multiplexing unit, and (N-n) second signal(s) of (N-n) channel(s) among the N second signals of the N channels, which are not selected by the second partial drop unit, and for transmitting on the second transmission line the (n-p) third signal(s), the second p multiplexed signal(s), and the (N-n) second signal(s), as N fifth signals of N channels; a first add signal supplying unit for receiving the (n-p) third signal(s) of (n-p) channel(s) from the at least one fourth transmission line, and supplying the (n-p) third signal(s) to the first and second partial add units; a set of at least one first demultiplexing unit for receiving p first signal(s) other than the (n-p) first signals among the n first signal(s), and demultiplexing each of the p first signal(s) to m sixth signals of m channels to output p set(s) of m sixth signals; a set of at least one second demultiplexing unit for receiving p second signal(s) corresponding to the p first signal(s), other than the (n-p) second signals among the n second signal(s), and demultiplexing each of the p second signal(s) to m seventh signals of m channels for each of the p second signal(s), corresponding to the m sixth signals of m channels for each of the p first signal(s) to output p set(s) of m seventh signals; a set of at least one second drop signal selection unit for receiving the m sixth signals for each of the p first signal(s) and the m seventh signals for each of the p second signal(s) corresponding to the m sixth signals for each of the p first signal(s), as p×m pairs of corresponding signals, selecting one signal from each pair of the p×m pairs of corresponding signals to obtain m selected signals for each of the p first or second signal(s), and transmitting the selected signals for each of the p first or second signal(s), on at least one third transmission line; a set of at least one first multiplexing unit for receiving p set(s) of m eighth signals of m channels from at least one sixth transmission line to generate the p first multiplexed signal(s) of p channels and supply the p first multiplexed signal(s) of p channels to the first partial add unit; a set of at least one second multiplexing unit for receiving the p set(s) of m eighth signals of m channels from the at least one sixth transmission line to generate the p second multiplexed signal(s) of p channels and supply the p second multiplexed signal(s) of p channels to the second partial add unit; and a set of at least one second add signal supplying unit for receiving the p set(s) of m eighth signals of m channels, and supplying the p set(s) of m eighth signals to the first and second multiplexing units.

(8) According to the eighth invention, there is provided an add-drop multiplexer which contains the construction of the above seventh invention, and further contains a set of at least one first crossconnecting unit each for establishing at least one circuit through which a respective one of the p set(s) of m sixth signals can be transferred to one of the at least one fifth transmission line, in accordance with a correspondence relationship between the p set(s) of m sixth signals and the at least one fifth transmission line, a set of at least one second crossconnecting unit each for establishing at least one circuit through which a respective of the p set(s) of m seventh signals can be inserted into one of m time slots of the p multiplexed the at least one sixth transmission line, in accordance with a correspondence relationship between the p set(s) of m seventh signals and the at least one sixth transmission line, a set of at least one third crossconnecting unit each for establishing at least one circuit through which a respective one of the m seventh signals in each of the p set(s) can be transferred to one input port of one of at least one second multiplexing unit corresponding to the above each of the p set(s), and a set of at least one fourth crossconnecting unit each for establishing at least one circuit through which a respective one of the m seventh signals in each of the p set(s) can be transferred to one input port of one of at least one first multiplexing unit corresponding to the above each of the p set(s).

(8-1) In the add-drop multiplexer according to the eighth invention (8), the p set(s) of m sixth signals, the p set(s) of m seventh signals, and the p set(s) of m eighth signals may be each contained in a plurality of transmission frames of a predetermined form when being transmitted, and each transmission frame can contain information to be transmitted and pointer information which indicates a phase of the information to be transmitted, in the transmission frame. The add-drop multiplexer may further contain a set of at least one first phase and frequency control unit which inserts first information contained in the p set(s) of m sixth signals when the p set(s) of m sixth signals are received, into the plurality of transmission frames to be transmitted, in synchronization with the timing of the add-drop multiplexer, obtains second information on a plurality of phases of the first information inserted in the plurality of transmission frames, and inserts the second information on the plurality of phases into the plurality of transmission frames as the pointer information, a set of at least one second phase and frequency control unit which inserts third information contained in the p set(s) of m seventh signals when the p set(s) of m seventh signals are received, into the plurality of transmission frames to be transmitted, in synchronization with timing of the add-drop multiplexer, obtains fourth information on a plurality of phases of the third information inserted in the plurality of transmission frames, and inserts the fourth information on the plurality of phases into the plurality of transmission frames as the pointer information, and a set of at least one third phase and frequency control unit which inserts fifth information contained in the p set(s) of m eighth signals when the p set(s) of m eighth signals are received, into the plurality of transmission frames to be transmitted, in synchronization with timing of the add-drop multiplexer, obtains sixth information on a plurality of phases of the fifth information inserted in the plurality of transmission frames, and inserts the sixth information on the plurality of phases into the plurality of transmission frames as the pointer information.

(9) According to the ninth invention, there is provided an add-drop multiplexer which contains: a higher multiplicity level circuit switching unit for receiving a plurality of first signals, and exchanging channels at a level of the plurality of first signals of a plurality of channels, where each of the plurality of first signals contains a plurality of second signals, a demultiplexing unit for receiving at least one of the plurality of first signals, and for demultiplexing each of the at least one of the plurality of first signals to obtain the plurality of second signals contained in each first signal; a lower multiplicity level circuit switching unit for receiving the plurality of second signals which are obtained by the demultiplexing unit for each of the at least one of the plurality of first signals, and exchanging channels at a level of the plurality of second signals of a plurality of channels; a multiplexing unit for multiplexing the plurality of second signals for each of the at least one of the plurality of first signals, after the channels of the plurality of second signals are exchanged by the lower multiplicity level circuit switching unit, to obtain at least one third signal each of which contains the multiplexed plurality of second signals, where the at least one third signal corresponds to the at least one of the plurality of first signals, respectively; and a circuit switching level selecting unit for selecting one of the at least one of the plurality of first signals after the channels thereof are changed by the higher multiplicity level circuit switching unit, and the at least one third signal is obtained by the multiplexing unit.

(10) According to the tenth invention, there is provided a method of changing a level at which circuit switching is performed, from a higher multiplicity level to a lower multiplicity level, in an add-drop multiplexer which contains a higher multiplicity level circuit switching unit for receiving a plurality of first signals, and exchanging channels at a level of the plurality of first signals of a plurality of channels, where each of the plurality of first signals contains a plurality of second signals, a demultiplexing unit for receiving at least one of the plurality of first signals, and for demultiplexing each of the at least one of the plurality of first signals to obtain the plurality of second signals contained in each first signal, a lower multiplicity level circuit switching unit for receiving the plurality of second signals which are obtained by the demultiplexing unit for each of the at least one of the plurality of first signals, and exchanging channels at a level of the plurality of second signals of a plurality of channels, a multiplexing unit for multiplexing the plurality of second signals for each of the at least one of the plurality of first signals, after the channels of the plurality of second signals are exchanged by the lower multiplicity level circuit switching unit, to obtain at least one third signal each of which contains the multiplexed plurality of second signals, where the at least one third signal corresponds to the at least one of the plurality of first signals, respectively, and a circuit switching level selecting unit for selecting one of the at least one of the plurality of first signals after the channels thereof are changed by the higher multiplicity level circuit switching unit, and the at least one third signal obtained by the multiplexing unit. The above method contains the steps of:

(T1) establishing at least one circuit in the above higher multiplicity level circuit switching unit; (T2) exchanging channels at the level of the plurality of second signals for the at least one of the plurality of first signals, by the lower multiplicity level circuit switching unit, so that an order of the plurality of second signals output from the multiplexing unit is the same as an order of the plurality of second signals contained in the at least one of the plurality of first signals when the plurality of second signals contained in the at least one of the plurality of first signals are output from the higher multiplicity level circuit switching unit; and (T3) selecting the output of the multiplexing unit in the circuit switching level selecting unit.

(11) According to the eleventh invention, there is provided an add-drop multiplexer which contains: a first demultiplexing unit for receiving at least one of a plurality of first signals, and demultiplexing each of the at least one of the plurality of first signals into a plurality of second signals which are contained in each of the at least one of the plurality of first signals; a second demultiplexing unit for receiving at least one of a plurality of third signals corresponding to the at least one of the plurality of first signals, and demultiplexing each of the at least one of the plurality of third signals into a plurality of fourth signals which are contained in each of the at least one of the plurality of third signals; a lower multiplicity level signal selecting unit for selecting one of the outputs of the first and second demultiplexing units; a multiplexing unit for receiving the selected one of the outputs of the first and second demultiplexing units, and multiplexing the plurality of second signals in the selected one, to generate at least one fifth signal corresponding to the at least one of the plurality of first signals; and a selecting unit for selecting one of the at least one of the plurality of first signals, the at least one of the plurality of third signals, and the at least one fifth signal.

(11-1) In the add-drop multiplexer according to the eleventh invention (11), the selecting unit may contain a higher/lower multiplicity level selecting unit for selecting one of the at least one of the plurality of first signals and the at least one fifth signal, and a higher multiplicity level signal selecting unit for selecting one of the at least one of the plurality of third signals and the signal selected by the higher/lower multiplicity level selecting unit.

(11-2) The add-drop multiplexer according to the above (11-1), may further contain a lower multiplicity level signal selection control unit for monitoring the outputs of the first and second demultiplexing units and controlling the lower multiplicity level signal selecting unit so that the lower multiplicity level signal selecting unit selects the output of a specific one of the first and second demultiplexing units according to the monitored outputs, and a higher multiplicity level signal selection control unit for monitoring the at least one third signal and the output of the higher/lower multiplicity level selecting unit, and controlling the higher multiplicity level signal selecting unit so that the higher multiplicity level signal selecting unit selects a specific one of the at least one third signal and the output of the higher/lower multiplicity level selecting unit, according to the monitored outputs.

(12) According to the twelfth invention, there is provided a method of increasing a transmission capacity of a network element by gradually replacing respective portions of the network element, from a first state to a second state. The above network element, when the network element is in the first state, contains a first add-drop multiplexer and two first bidirectional transmission lines connected to the first add-drop multiplexer on first and second sides thereof,
respectively, and the above network element, when the communication network is in the second state, contains a second add-drop multiplexers and two second bidirectional transmission lines connected to the second add-drop multiplexer on first and second sides thereof, respectively. The number N signal(s) of N channel(s) is transmitted in each of the two directions in each of the first bidirectional transmission lines, and N signal(s) of N channel(s) is transmitted in each of the two directions in each of the second bidirectional transmission lines, where the integers N and n are assumed to satisfy N>n>0. In either of the first and second configurations, a bidirectional tributary transmission line is connected to each of the first and second add-drop multiplexer on the tributary side thereof, and N signal(s) of N-channel(s) is transmitted in each of the two directions in each the bidirectional tributary transmission line. The above first add-drop multiplexer, in the first state, contains a first signal input unit for inputting n first signal(s) of n channel(s) from a first one of the first bidirectional transmission lines connected on the first side of the first add-drop multiplexer, where n is an integer satisfying n>0, a first signal output unit for outputting n second signal(s) of n channel(s) onto the first one of the first bidirectional transmission lines, a second signal input unit for inputting n third signal(s) of n channel (s) corresponding to the n first signal(s), from the second one of the first bidirectional transmission lines connected on the second side of the first add-drop multiplexer, a second signal output unit for outputting n fourth signal(s) of n channel(s) corresponding to the n second signal(s), onto the second one of the first bidirectional transmission lines, a drop signal selection unit for receiving the n first signal(s) and the n third signal(s) as n pair(s) of corresponding signals, and selecting one signal from each pair of the n pair(s) of corresponding signals to obtain n selected signal(s) and transmit the n selected signal(s) on the bidirectional tributary transmission line, an add signal supplying unit for receiving the n fifth signal(s) of n channel(s) from the bidirectional tributary transmission line, and supplying the n fifth signal(s) to the first and second signal output units as the n second signal(s) of n channel(s) and the fourth signal(s) of n channel(s), respectively. The above second add-drop multiplexer, in the second state, contains a first partial drop unit for receiving the N sixth signals of N channels which are transmitted on a first one of the second bidirectional transmission lines connected on the first side of the second add-drop multiplexer, and selecting n sixth signal(s) of n channel(s) among the N sixth signals of N channels, and supplying the n sixth signal(s) of n channel(s) to the drop signal selection unit, a second partial drop unit for receiving the N eighth signals of N channels which are transmitted on a second one of the second bidirectional transmission lines connected on the second side of the second add-drop multiplexer, and selecting n eighth signal(s) of n channel(s) corresponding to the n sixth signal(s) of n channel(s), among the N eighth signals of N channels, and supplying the n eighth signal(s) of n channel(s) to the drop signal selection unit, the drop signal selection unit for receiving the n sixth signal(s) and the n eighth signal(s) corresponding to the n sixth signal(s) as n pair(s) of corresponding signals, and selecting one signal from each pair of the n pair(s) of corresponding signals to obtain n selected signal(s) and transmit the n selected signal(s) on the bidirectional tributary transmission line, a first partial add unit for receiving the n fifth signal(s) of n channel(s) from the bidirectional tributary transmission line, and (N-n) sixth signal(s) of (N-n) channel(s) among the N sixth signals of the N channels, which are not selected by the first partial drop unit, and for transmitting on the second one of the second bidirectional transmission lines, the n fifth signal(s) and the (N-n) sixth signal(s) as N seventh signals of N channels, a second partial add unit for receiving the n fifth signal(s) of n channel(s) from the bidirectional tributary transmission line, and (N-n) eighth signal(s) of (N-n) channel(s) among the N seventh signals of the N channels, which are not selected by the second partial drop unit, and for transmitting on the first one of the second bidirectional transmission lines, the n fifth signal(s) and the (N-n) eighth signal(s) as N ninth signals of N channels, and an add signal supplying unit for receiving the n fifth signal(s) of n channel (s) from the bidirectional tributary transmission line, and supplying the n fifth signal(s) to the first and second partial add units. The above method contains steps of: (S1) controlling the drop signal selection unit in the first state, so that the drop signal selection unit selects the n third signal(s) from the second signal input unit, and controlling the add signal supply unit supplies the n fifth signal(s) to the first signal output unit; (S2) replacing the first signal input unit with the first partial drop unit, replacing the second signal input unit with the second partial drop unit, and replacing the first one of the bidirectional transmission lines with the first one of the second bidirectional transmission lines; (S3) controlling the drop signal selection unit, so that the drop signal selection unit selects the n sixth signal(s) which is supplied by the first partial drop unit, and controlling the add signal supply unit so that the add signal supply unit supplies the n fifth signal(s) to the second partial add unit; and (S4) replacing the second signal input unit with the second partial drop unit, replacing the first signal input unit with the first partial drop unit, and replacing the second one of the bidirectional transmission lines with the second one of the second bidirectional transmission lines.

(13) According to the thirteenth invention, there is provided a method of increasing a transmission capacity of a communication network by gradually replacing respective portions of the communication network, from a first state to a second state. The communication network contains a plurality of add-drop multiplexers and a plurality of bidirectional transmission lines connecting between each pair of two adjacent add-drop multiplexers among the plurality of add-drop multiplexers. In the first state, N signal(s) of N channel(s) is transmitted in each of the two directions in each of the bidirectional transmission lines, and in the second state, N signal(s) of N channel(s) is transmitted in each of the two directions in each of the bidirectional transmission lines, where the integers N and n are assumed to satisfy N>n>0. In either of the first and second states, a bidirectional tributary transmission line is connected to each of the add-drop multiplexers on the tributary side thereof, and N signal(s) of N channel(s) is transmitted in each of the two directions in each of the bidirectional tributary transmission lines. The add-drop multiplexer, in the first state, comprises a first signal input unit, provided as an input element of a first side group in the first state, for inputting a number n of first signal(s) of n channel(s) from a first one of the bidirectional transmission lines in the first state connected on the first side of the add-drop multiplexer in the first state, where n is an integer satisfying n>0, a first signal output unit, provided as an output element of a second side group in the first state, for outputting n second signal(s) of n channel(s) onto the first one of the bidirectional transmission lines in the first state, a second signal input unit, provided as an input element of the second side group in the first state, for inputting a number n of third signal(s) of n channel(s) corresponding to the n first signal(s), from the second one of the bidirectional transmission lines in the first state connected on the second side of the add-drop multiplexer in the first state, a second signal output unit, provided as an output element of the first side group in the first state, for outputting n fourth signal(s) of n channel(s) corresponding to the n second signal(s), onto the second one of the bidirectional transmission lines in the first state, a drop signal selection unit for receiving the n first signal(s) and the n third signal(s) as n pair(s) of corresponding signals, and selecting one signal from each pair of the n pair(s) of corresponding signals to obtain n selected signal(s) and transmit the n selected signal(s) on the bidirectional tributary transmission line, and an add signal supplying unit for receiving the n fifth signal(s) of n channel(s) from the bidirectional tributary transmission line, and supplying the n fifth signal(s) to the first and second signal output units as the n second signal(s) of n channel(s) and the fourth signal(s) of n channel(s), respectively. The add-drop multiplexer, in the second state, comprises a first partial drop unit, provided as an input element of a first side group in the second state, for receiving the N sixth signals of N channels which are transmitted on a first one of the bidirectional transmission line in the second states connected on the first side of the add-drop multiplexer in the second state, and selecting n sixth signal(s) of n channel(s) among the N sixth signals of N channels, and supplying the n sixth signal(s) of n channel (s) to the drop signal selection unit, a second partial drop unit, provided as an input element of a second side group in the second state, for receiving the N eighth signals of N channels which are transmitted on a second one of the bidirectional transmission line in the second states connected on the second side of the add-drop multiplexer in the second state, and selecting n eighth signal(s) of n channel(s) corresponding to the n sixth signal(s) of n channel(s), among the N eighth signals of N channels, and supplying the n eighth signal(s) of n channel(s) to the drop signal selection unit, the drop signal selection unit for receiving the n sixth signal(s) and the n eighth signal(s) corresponding to the n sixth signal(s) as n pair(s) of corresponding signals, and selecting one signal from each pair of the n pair(s) of corresponding signals to obtain n selected signal(s) and transmit the n selected signal(s) on the bidirectional tributary transmission line, a first partial add unit provided as an output element of the second side group in the second state, for receiving the n fifth signal(s) of n channel(s) from the bidirectional tributary transmission line, and a number (N-n) of sixth signal(s) of (N-n) channel(s) among the N sixth signals of the N channels, which are not selected by the first partial drop unit, and for transmitting on the second one of the bidirectional transmission line in the second states, the n fifth signal(s) and the (N-n) sixth signal(s) as N seventh signals of N channels, a second partial add unit, provided as an output element of the first side group in the second state, for receiving the n fifth signal(s) of n channel(s) from the bidirectional tributary transmission line, and (N-n) eighth signal(s) of (N-n) channel(s) among the N seventh signals of the N channels, which are not selected by the second partial drop unit, and for transmitting on the first one of the bidirectional transmission line in the second states, the n fifth signal(s) and the (N-n) eighth signal(s) as N ninth signals of N channels, and an add signal supplying unit for receiving the n fifth signal(s) of n channel(s) from the bidirectional tributary transmission line, and supplying the n fifth signal(s) to the first and second partial add units. The above method contains steps of: (S1) in each of two of the add-drop multiplexers located in both ends of one of the plurality of bidirectional transmission lines which is in the first state, controlling the input and output elements of one of the first and second side groups which are located on the opposite side to the side connected to the one of the plurality of bidirectional transmission lines, to be connected with the bidirectional tributary transmission line; (S2) in each of the above two of the add-drop multiplexers, replacing the input and output elements of one of the first and second side groups, with corresponding elements in the second state, and changing the above one of the plurality of bidirectional transmission lines from the first state to the second state; and (S3) in each of the above two of the add-drop multiplexers, when the input and output elements of the above one of the first and second side groups, are in the second state, connecting the first partial drop unit with the first partial add unit for the above (N-n) sixth signal(s) of (N-n) channels, and connecting the second partial drop unit with the second partial add unit for the above (N-n) eighth signal(s) of (N-n) channels.

(14) According to the fourteenth invention, there is provided an add-drop multiplexer which contains: a first transmission frame transforming unit for transforming each of a plurality of first signals contained in a transmission frame of a first form, to obtain a plurality of second signals each being contained in a transmission frame of a second form, where each transmission frame of the first form contains a plurality of transmission frames of the second form; a crossconnecting unit, having a plurality of first input ports for inputting the plurality of second signals obtained for the plurality of first signals by the first transmission frame transforming unit, a plurality of second input ports for inputting a plurality of third signals each being contained in a transmission frame of the second form, a plurality of first output ports for outputting a plurality of fourth signals corresponding to the plurality of first signals, where each of the plurality of fourth signals is contained in a transmission frame of the first form, and a plurality of second output ports for outputting a plurality of fifth signals each being contained in a transmission frame of the second form, the above crossconnecting unit can perform circuit switching between the plurality of second and third signals to obtain the plurality of fourth and fifth signals, which are to be output from the first and second output ports, respectively; and a second transmission frame transforming unit for transforming each of the plurality of fourth signals which are output from the plurality of second output ports, to obtain a plurality of sixth signals each being contained in a transmission frame of the first form.

(15) According to the fifteenth invention, there is provided an add-drop multiplexer which contains: a path protection switch which simultaneously inputs through first and second input ports thereof a plurality of first signals and a plurality of second signals corresponding to the plurality of first signals, respectively, and selects one of signal inputs from the first and second input ports to output the selected one of the signal inputs, where each of the plurality of first signals is formed by multiplexing a plurality of third signals, each of the plurality of second signals is formed by multiplexing a plurality of fourth signals, each of the first and second signals is contained in a transmission frame of a first form, each of the third and fourth signals is contained in a transmission frame of a second form, each transmission frame of the first form contains a plurality of transmission frames of the second form, and the operation of selecting one of the signal inputs can be switched at a level of each transmission frame of the first form, or at a level of each transmission frame of the second form; a switch level setting unit for setting the level at which the switching in the path protection switch is performed; and a tributary-side interface unit which transforms the signal which is output from the path protection switch into a tributary signal. The above tributary-side interface unit contains a unit type indication unit which indicates the type of the tributary-side interface unit. The above add-drop multiplexer further contains: a unit type recognizing unit for recognizing the indication of the type of the tributary-side interface unit; a switch level determining unit for determining, based on the indication, whether the operation of selecting one of the signal inputs should be exchanged at a level of each transmission frame of the first form, or at a level of each transmission frame of the second form; and a level setting control unit for controlling the switch level setting unit based on the determination by the switch level determining unit.

(16) According to the sixteenth invention, there is provided an add-drop multiplexer which contains: a first crossconnecting unit which inputs a plurality of first signals, each of which is formed by multiplexing a plurality of second signals, and exchanges channels at a level of the plurality of first signals, or at a level of the plurality of second signals, where each of the first signals is contained in a transmission frame of a first form, each of the second signals is contained in a transmission frame of a second form, each transmission frame of the first form contains a plurality of transmission frames of the second form, and the level at which the operation of exchanging channels is performed can be set therein; a second crossconnecting unit which inputs a plurality of third signals, each of which is formed by multiplexing a plurality of fourth signals, and exchanges channels at a level of the plurality of third signals, or at a level of the plurality of fourth signals, where each of the third signals is contained in a transmission frame of the first form, each of the fourth signals is contained in a transmission frame of the second form, and the level at which the operation of exchanging channels is performed can be set therein; a first crossconnecting level setting unit for setting in the first crossconnecting unit, the level at which the operation of exchanging channels is performed in the first crossconnecting unit; a second crossconnecting level setting unit for setting, in the second crossconnecting unit, the level at which the operation of exchanging channels is performed in the second crossconnecting unit; a path protection switch which simultaneously inputs, through first and second input ports thereof, the outputs of the first and second crossconnecting units, respectively, and selects one of the outputs of the first and second crossconnecting units, to output the selected one of the outputs of the first and second crossconnecting units, where the operation of selecting one of the outputs of the first and second crossconnecting units, can be exchanged at a level of each transmission frame of the first form, or at a level of each transmission frame of the second form, and the level at which the operation of selecting one of the outputs of the first and second crossconnecting units is switched, can be set therein; a switch level setting unit for setting the level at which the switching in the path protection switch is performed; and a tributary-side interface unit which transforms the signal which is output from the path protection switch into a tributary signal; a crossconnecting level input unit for inputting information which designates the levels at which the operations of exchanging channels are performed in the first and second crossconnecting units, respectively; a crossconnecting level control unit for controlling the first and second crossconnecting units, based on the information which designates the levels at which the operations of exchanging channels are performed in the first and second crossconnecting units, respectively; a switch level determining unit for determining the level at which the switching in the path protection switch is performed, based on the information which designates the levels at which the operations of exchanging channels are performed in the first and second crossconnecting units, respectively; and a switch level setting control unit for controlling the switch level setting unit, based on the determination by the switch level determining unit.

(17) According to the seventeenth invention, there is provided an add-drop multiplexer which contains: a first partial drop unit for selecting n first signal(s) of n channel(s) among N first signals of N channels, which are received from a first transmission line, and outputting the n first signal(s) of n channel(s), where N and n are integers satisfying $N \geq n > 0$, and each of the N first signals contains a signal formed by multiplexing a plurality of lower multiplicity level signals of a plurality of channels; a second partial drop unit for selecting n second signal(s) of n channel(s) among N second signals of N channels, which are received from a second transmission line and correspond to the n first signal(s), and outputting the n second signal(s) of n channel(s), where each of the N second signals contains a signal formed by multiplexing a plurality of lower multiplicity level signals of a plurality of channels; a first crossconnecting unit for exchanging time slots in each of the n first signal(s), in which time slots the plurality of lower multiplicity level signals in each of the n first signal(s) are contained; a second crossconnecting unit for exchanging time slots in each of the n second signal(s), in which time slots the plurality of lower multiplicity level signals in each of the n second signal(s) are contained; a drop signal selection unit for receiving outputs of the first and second crossconnecting units, selecting one of the outputs of the first and second crossconnecting units, to output the selected one; a demultiplexing unit for demultiplexing the selected one output from the drop signal selection unit to obtain and output n sets of a plurality of lower multiplicity level signals; a multiplexing unit for inputting n sets of a plurality of lower multiplicity level signals, and multiplexing the plurality of lower multiplicity level signals in each set to obtain and output n third signal(s) of n channels; third and fourth crossconnecting units, each for exchanging time slots in each of the n third signal(s), in which time slots the plurality of lower multiplicity level signals in-each of the n third signal(s) are contained; a first partial add unit for receiving the output of the third crossconnecting unit, and (N-n) first signal(s) of (N-n) channel(s) among the N first signals of the N channels, which are not selected by the first partial drop unit, and for transmitting on the first transmission line the n third signal(s) and the (N-n) first signal(s) as N fourth signals of N channels; a second partial add unit for receiving the output of the fourth crossconnecting unit, and (N-n) second signal(s) of (N-n) channel(s) among the N second signals of the N channels, which are not selected by the second partial drop unit, and for transmitting on the second transmission line the n third signal(s) and the (N-n) second signal(s) as N fifth signals of N channels.

(18) According to the eighteenth invention, there is provided a transmission apparatus contains: a first circuit package which can hold thereon at least one first overhead insertion/extraction circuit for inputting a first signal contained in a transmission frame of a first form, extracting overhead information contained in the first signal, and inserting overhead information into a signal to be output, to generate a second signal contained in a transmission frame of the first form; a second circuit package which can hold thereon at least one second overhead insertion/extraction circuit for inputting a third signal contained in a transmission frame of the first form, extracting overhead information contained in the first signal, and inserting overhead information into a signal to be output, to generate a second signal contained in a transmission frame of the first form; a first signal line connecting the first and second circuit packages; an overhead information processing unit for processing the overhead information which is extracted from or inserted into the first or third signal in the first and second overhead insertion/extraction circuit; a second signal line connecting the overhead information processing unit and the second circuit package; a first connection unit for connecting the first signal line with the first overhead insertion/extraction circuit when the first overhead insertion/extraction circuit is mounted on the first circuit package; and a second connection unit for connecting the first signal line with the second signal line, in the second circuit package when the first overhead insertion/extraction circuit is mounted on the first circuit package.

(19) According to the nineteenth invention, there is provided an add-drop multiplexer provided between first and second optical transmission lines. The add-drop multiplexer contains first, second, and third circuit packages, where the first and second optical transmission lines each transmit an optical signal in first and second directions, a plurality of higher multiplicity level signals are respectively contained in transmission frames of a first form, and are multiplexed in the optical signal, and a plurality of lower multiplicity level signals are respectively contained in transmission frames of a second form, and are multiplexed in each of the plurality of higher multiplicity level signals. The first circuit package contains a first optical interface unit which receives a first optical signal transmitted through the first optical transmission line in the first direction, and converts the first optical signal into a plurality of first higher multiplicity level signals to be transmitted in the first direction, and the first optical interface unit converts a plurality of second higher multiplicity level signals to be transmitted in the second direction, into a second optical signal to be transmitted in the second direction, and transmits the second optical signal on the first optical transmission line. The second circuit package contains a second optical interface unit which receives a third optical signal transmitted through the second optical transmission line in the second direction, and converts the third optical signal into a plurality of third higher multiplicity level signals to be transmitted in the second direction, and the second optical interface unit converts a plurality of fourth higher multiplicity level signals to be transmitted in the first direction, into a fourth optical signal to be transmitted in the first direction, and transmits the fourth optical signal on the second optical transmission line; and the third circuit package contains a first crossconnecting unit for exchanging channels of the plurality of first higher multiplicity level signals, and exchanging channels of the plurality of third higher multiplicity level signals, and a second crossconnecting unit for exchanging channels of the plurality of lower multiplicity level signals in the plurality of first higher multiplicity level signals, and exchanging channels of the plurality of lower multiplicity level signals in the plurality of third higher multiplicity level signals.

(20) According to the twentieth invention, there is provided an add-drop multiplexer provided between first and second optical transmission lines. The add-drop multiplexer contains first, second, and third circuit packages, where the first and second optical transmission lines each transmit an optical signal in first and second directions, a plurality of higher multiplicity level signals are respectively contained in transmission frames of a first form, and are multiplexed in the optical signal, and a plurality of lower multiplicity level signals are respectively contained in transmission frames of a second form, and are multiplexed in each of the plurality of higher multiplicity level signals. The first circuit package contains a first optical interface unit which receives a first optical signal transmitted through the first optical transmission line in the first direction, and converts the first optical signal into a plurality of first higher multiplicity level signals to be transmitted in the first direction, and the first optical interface unit converts a plurality of second higher multiplicity level signals to be transmitted in the second direction, into a second optical signal to be transmitted in the second direction, and transmits the second optical signal on the first optical transmission line. The second circuit package contains a second optical interface unit which receives a third optical signal transmitted through the second optical transmission line in the second direction, and converts the third optical signal into a plurality of third higher multiplicity level signals to be transmitted in the second direction, and the second optical interface unit converts a plurality of fourth higher multiplicity level signals to be transmitted in the first direction, into a fourth optical signal to be transmitted in the first direction, and transmits the fourth optical signal on the second optical transmission line; and a first crossconnecting unit for exchanging channels of the plurality of first higher multiplicity level signals, and exchanging channels of the plurality of third higher multiplicity level signals, is divided into two portions, and the two portions are separately mounted in the first and second circuit packages, respectively, and the third circuit package contains a second crossconnecting unit for exchanging channels of the plurality of lower multiplicity level signals in the plurality of first higher multiplicity level signals, and exchanging channels of the plurality of lower multiplicity level signals in the plurality of third higher multiplicity level signals.

(21) According to the twenty-first invention, there is provided an add-drop multiplexer provided between first and second optical transmission lines. The add-drop multiplexer contains first and second circuit packages, where the first and second optical transmission lines each transmit an optical signal in first and second directions, a plurality of higher multiplicity level signals are respectively contained in transmission frames of a first form, and are multiplexed in the optical signal, and a plurality of lower multiplicity level signals are respectively contained in transmission frames of a second form, and are multiplexed in each of the plurality of higher multiplicity level signals. The first circuit package contains a first optical interface unit which receives a first optical signal transmitted through the first optical transmission line in the first direction, and converts the first optical signal into a plurality of first higher multiplicity level signals to be transmitted in the first direction, a first crossconnecting unit for exchanging channels of the plurality of first higher multiplicity level signals, a second crossconnecting unit for exchanging channels of the plurality of lower multiplicity level signals in the plurality of first higher multiplicity level signals, and a second optical interface unit converts a plurality of second higher multiplicity level signals to be transmitted in the first direction, into a second optical signal to be transmitted in the first direction, and transmits the second optical signal on the second optical transmission line; and the second circuit package contains a third optical interface unit which receives a third optical signal transmitted through the second optical transmission line in the second direction, and converts the third optical signal into a plurality of third higher multiplicity level signals to be transmitted in the second direction, a third crossconnecting unit for exchanging channels of the plurality of third higher multiplicity level signals, a fourth crossconnecting unit for exchanging channels of the plurality of lower multiplicity level signals in the plurality of third higher multiplicity level signals, and a fourth optical interface unit converts a plurality of fourth higher multiplicity level signals to be transmitted in the second direction, into a fourth optical signal to be transmitted in the second direction, and transmits the fourth optical signal on the first optical transmission line.

(22) According to the twenty-second invention, there is provided an add-drop multiplexer provided between first and second optical transmission lines. The add-drop multiplexer contains first, second, and third circuit packages, where the first and second optical transmission lines each transmit an optical signal in first and second directions, a plurality of higher multiplicity level signals are respectively contained in transmission frames of a first form, and are multiplexed in the optical signal, and a plurality of lower multiplicity level signals are respectively contained in transmission frames of a second form, and are multiplexed in each of the plurality of higher multiplicity level signals. The first circuit package contains a first optical interface unit which receives a first optical signal transmitted through the first optical transmission line in the first direction, and converts the first optical signal into a plurality of first higher multiplicity level signals to be transmitted in the first direction, a first crossconnecting unit for exchanging channels of the plurality of first higher multiplicity level signals, and a second optical interface unit converts a plurality of second higher multiplicity level signals to be transmitted in the first direction, into a second optical signal to be transmitted in the first direction, and transmits the second optical signal on the second optical transmission line. The second circuit package contains a third optical interface unit which receives a third optical signal transmitted through the second optical transmission line in the second direction, and converts the third optical signal into a plurality of third higher multiplicity level signals to be transmitted in the second direction, a second crossconnecting unit for exchanging channels of the plurality of third higher multiplicity level signals, and a fourth optical interface unit converts a plurality of fourth higher multiplicity level signals to be transmitted in the second direction, into a fourth optical signal to be transmitted in the second direction, and transmits the fourth optical signal on the first optical transmission line; and the third circuit package contains a third crossconnecting unit for exchanging channels of the plurality of lower multiplicity level signals in the plurality of first higher multiplicity level signals, and exchanging channels of the plurality of lower multiplicity level signals in the plurality of third higher multiplicity level signals.

(23) In the constructions of the add-drop multiplexers according to any of (1) to (4-1), the N first signals of N channels may be transmitted through the first transmission line in a form of a first multiplexed signal in which the N first signals are multiplexed, and the N third signals of N channels may be transmitted through the first transmission line in a form of a second multiplexed signal in which the N third signals are multiplexed. The above add-drop multiplexer may further contain a demultiplexing unit for demultiplexing the first multiplexed signal into the N first signals, and a multiplexing unit for multiplexing the N third signals into the second multiplexed signal.

(24) In the add-drop multiplexer according to any of the above (5) to (8-1), the N first signals of N channels are transmitted through the first transmission line in a form of a first multiplexed signal in which the N first signals are multiplexed, the N fourth signals of N channels are transmitted through the first transmission line in a form of a second multiplexed signal in which the N third signals are multiplexed, the N second signals of N channels are transmitted through the second transmission line in a form of a third multiplexed signal in which the N second signals are multiplexed, and the N fifth signals of N channels are transmitted through the second transmission line in a form of a fourth multiplexed signal in which the N fifth signals are multiplexed. The above add-drop multiplexer may further contain a first demultiplexing unit for demultiplexing the first multiplexed signal into the N first signals, a first multiplexing unit for multiplexing the N fourth signals into the second multiplexed signal, a second demultiplexing unit for demultiplexing the third multiplexed signal into the N second signals, and a second multiplexing unit for multiplexing the N fifth signals into the fourth multiplexed signal.

BRIEF DESCRIPTION OF THE DRAWINGS

In the drawings:

FIGS. 20A and 20B are diagrams illustrating the construction of the seventh invention;

FIG. 28 is a diagram illustrating the basic operation steps in the method for increasing the transmission capacity, according to the twelfth invention;

FIG. 46A and 46B are diagrams illustrating an example construction of the VT path protection switch in FIG. 45D;

FIG. 59 is a diagram illustrating the construction of an embodiment of the twenty-first invention; and FIG. 60 is a diagram illustrating the construction of an embodiment of the twenty-second invention.

DESCRIPTION OF THE PREFERRED EMBODIMENTS

Figure 1:
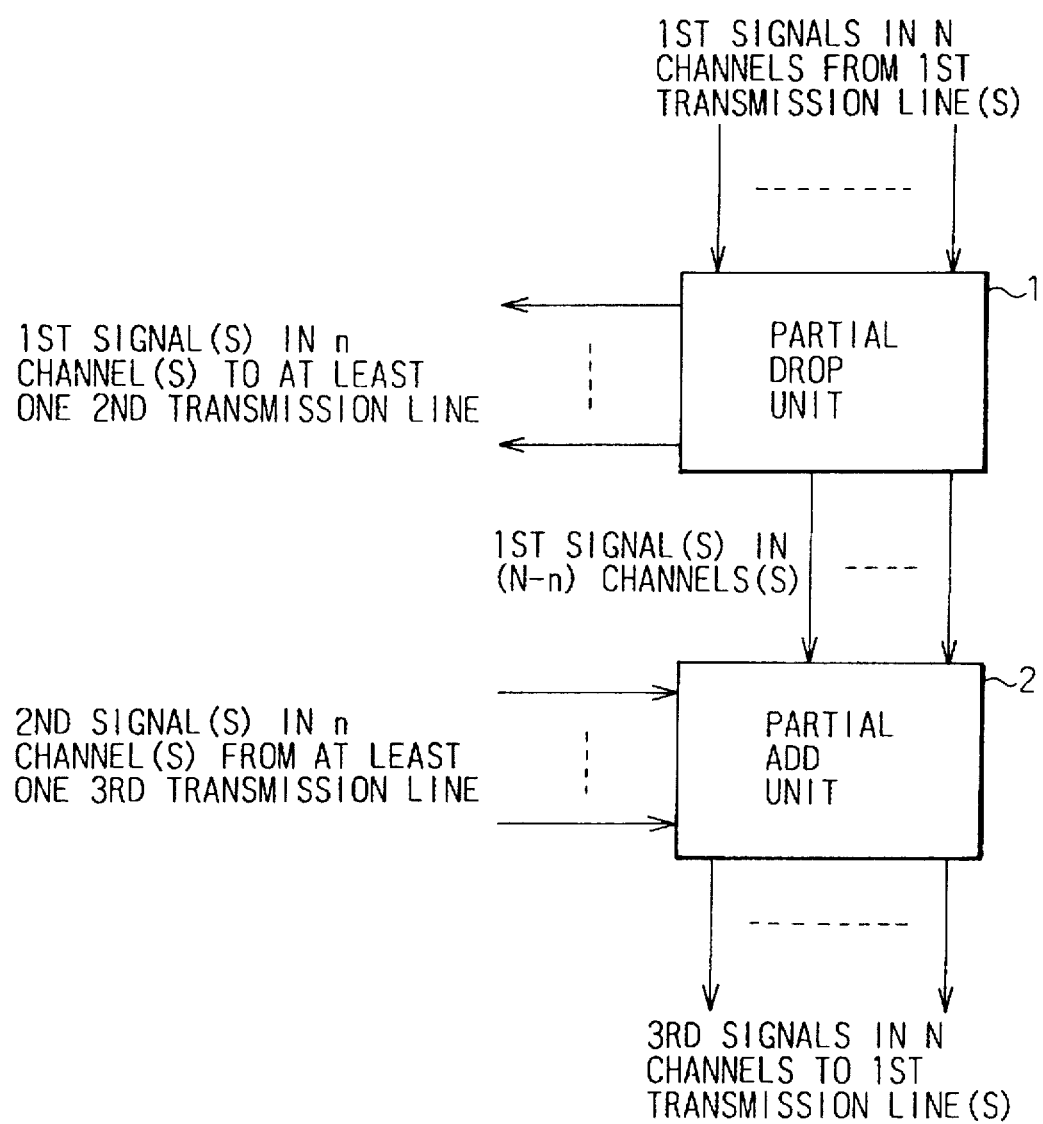
FIG. 1 is a diagram illustrating the construction of the first aspect of the first invention.

FIG. 1 is a diagram illustrating the construction of the first aspect of the first invention. In the construction of FIG. 1, the partial drop unit 1 selects n first signal(s) of n channel(s) among N first signals of N channels, which are received from a first transmission line, and transmits the n first signal(s) of n channel(s) on at least one second transmission line, where N and n are integers satisfying N>n>0. The partial add unit 2 receives n second signal(s) of n channel(s) from at least one third transmission line, and (N-n) first signal(s) of (N-n) channel(s) among the N first signals of the N channels, which are not selected by the partial drop unit 1, and transmits on the first transmission line the n second signal(s) of n channel(s) and the (N-n) first signal(s) of (N-n) channel(s) as N third signals of N channels.

According to the construction of the first invention, it is possible to access only an arbitrary channel or channels among a plurality of channels in signals transmitted through the first transmission line, and to make the transmission frames in the other channel or channels of the plurality of channels pass through the add-drop multiplexer without being output to and input from the tributary side.

Figure 2:
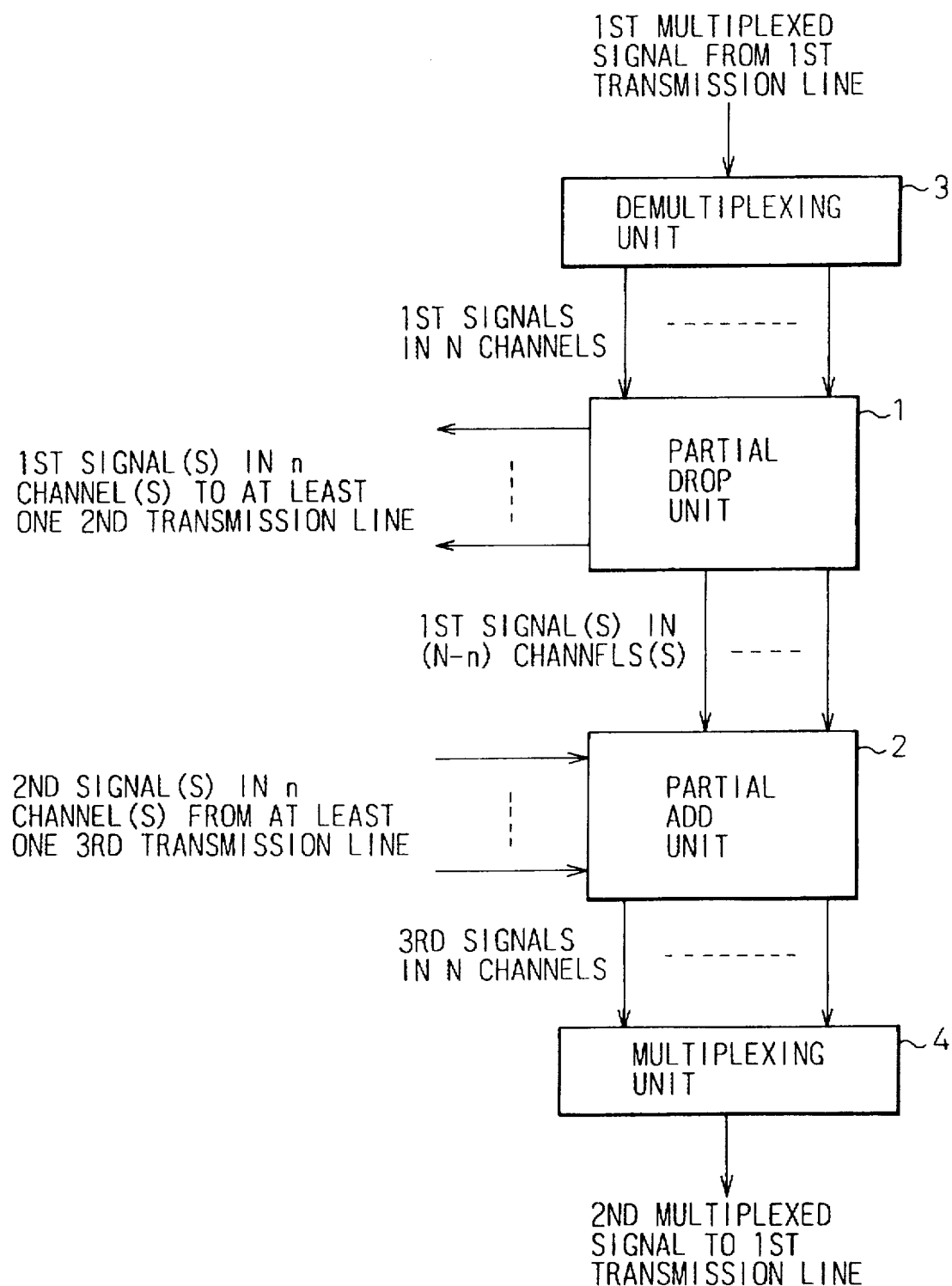
FIG. 2 is a diagram illustrating the construction of the second aspect of the first invention.

FIG. 2 is a diagram illustrating the construction of the second aspect of the first invention.

Generally, the N first signals of N channels in FIG. 1, may be transmitted through the first transmission line in a form of a first multiplexed signal in which the N first signals are multiplexed, and the N third signals of N channels may be transmitted through the first transmission line in a form of a second multiplexed signal in which the N third signals are multiplexed. In the construction of FIG. 2, the add-drop multiplexer contains, in addition to the construction of FIG. 1, a demultiplexing unit 3 and a multiplexing unit 4. The demultiplexing unit 3 demultiplexes the first multiplexed signal into the N first signals, and the multiplexing unit 4 multiplexes the N third signals into the second multiplexed signal.

Figure 3:
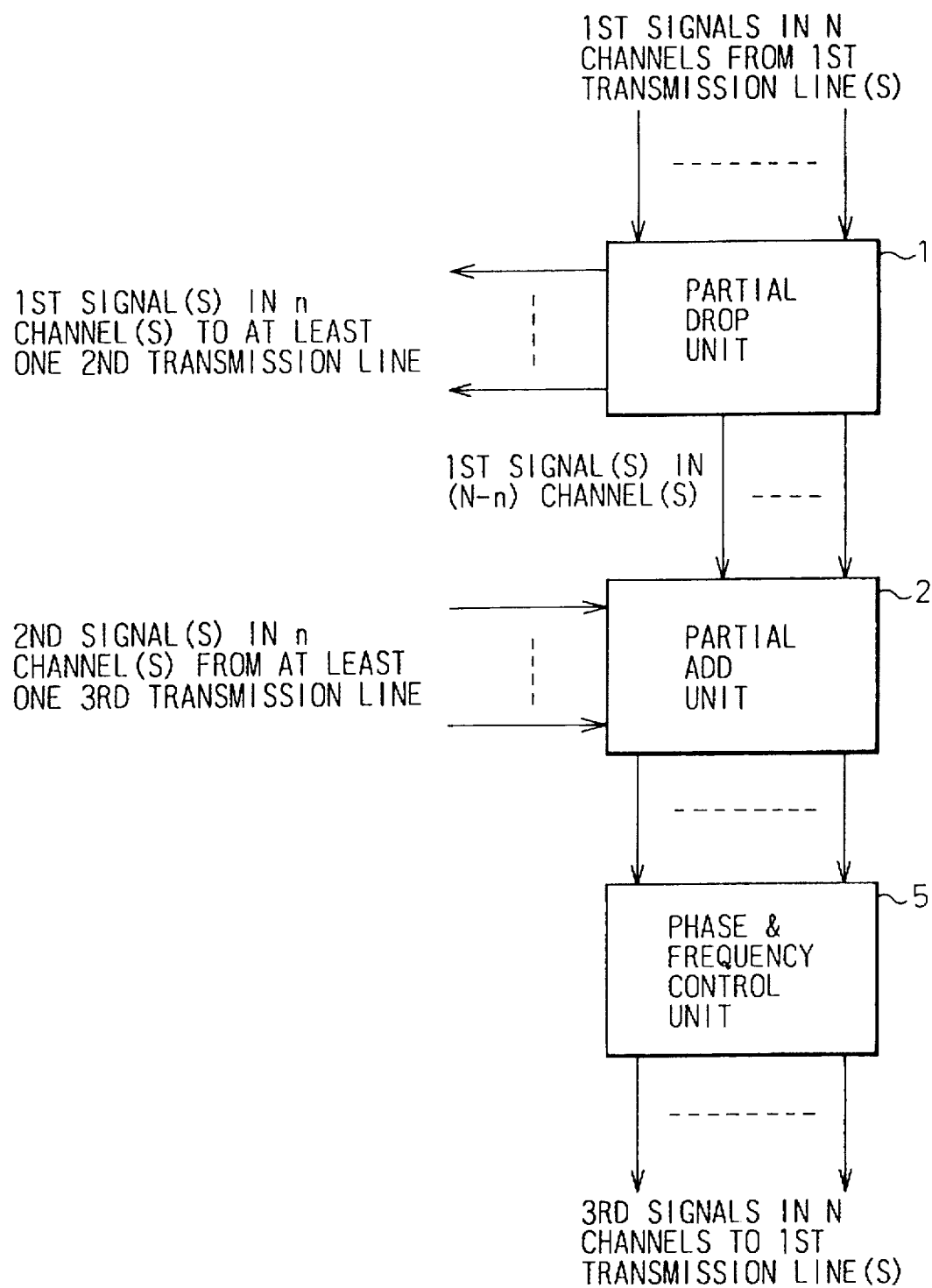
FIG. 3 is a diagram illustrating the construction of the third aspect of the first invention.

FIG. 3 is a diagram illustrating the construction of the third aspect of the first invention.

The above first and third signals are contained in transmission frames of a predetermined form when being transmitted on the first transmission line, and each transmission frame can contain information to be transmitted and pointer information which indicates a phase of the information to be transmitted, in the transmission frame. In this case, the above partial add unit 2 inserts information contained in the n second signal(s) of n channel(s) and the (N-n) first signal(s) of (N-n) channel(s), into the transmission frames to be transmitted, in synchronization with timing of the add-drop multiplexer, and the add-drop multiplexer of FIG. 3 contains, in addition to the construction of FIG. 1, a phase and frequency control unit 5. The phase and frequency control unit 5 obtains information on phases of the information contained in the n second signal(s) of n channel(s) and the (N-n) first signal(s) of (N-n) channel(s), in the transmission frames to be transmitted on the first transmission line, and inserts the information on the phases into the transmission frames as the pointer information.

The above phase and frequency control 5 may contain a unit for obtaining the phases in the transmission frames based on reference phases of the transmission frames to be transmitted on the first transmission line, at least one phase of the information contained in the n second signal(s) of n channel(s), and at least one phase of the information contained in the (N-n) received first signal(s) of (N-n) channel(s).

Figure 4:
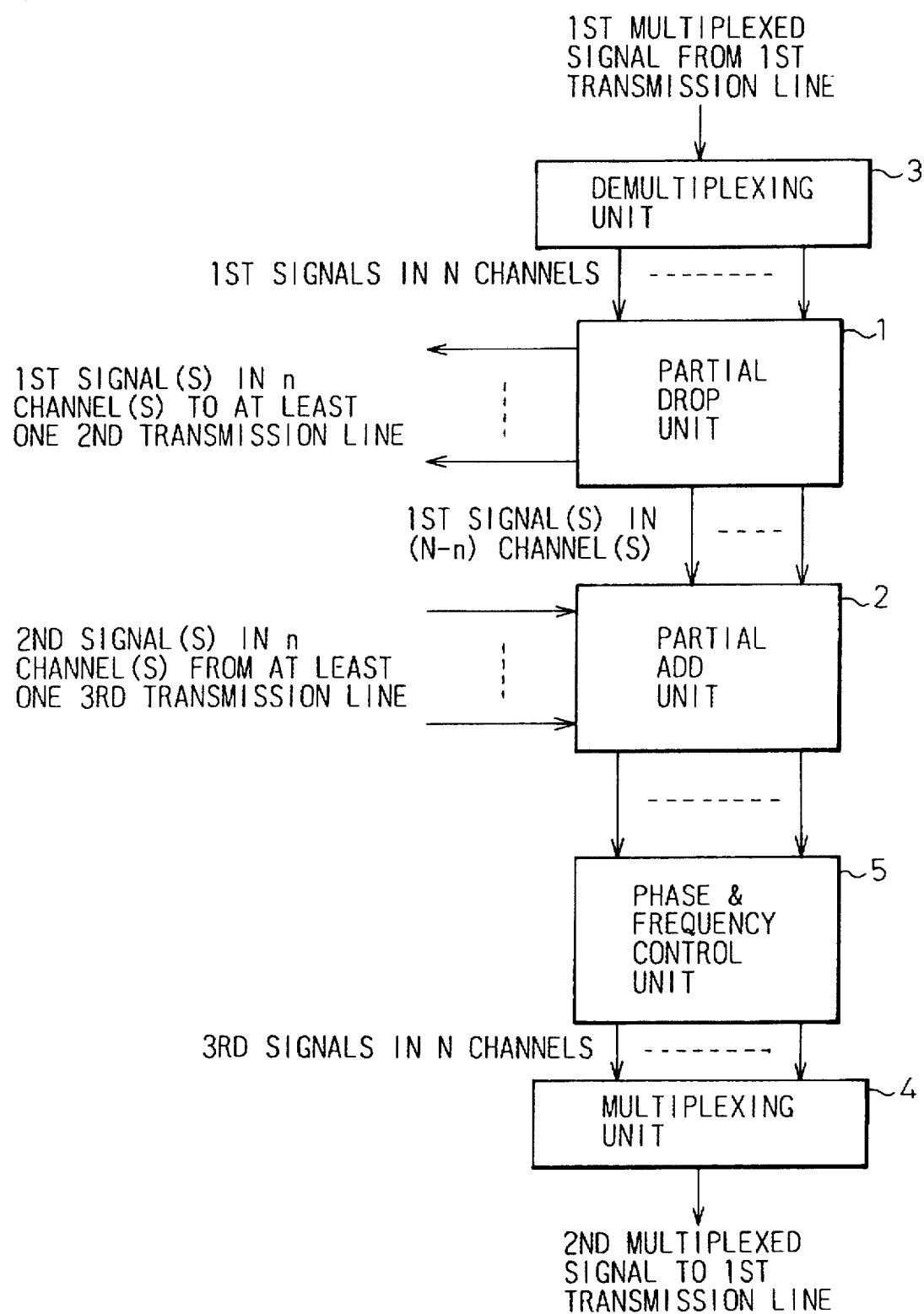
FIG. 4 is a diagram illustrating the construction of the fourth aspect of the first invention.

In addition, the above phase and frequency control 5 may further contain a unit for performing stuffing and destuffing control in the transmission frames containing the third signals, based on frequencies of the third signals to be transmitted, and at least one frequency of the (N-n) first signal(s) when the (N-n) first signal(s) is received by the above partial add unit 2. FIG. 4 is a diagram illustrating the construction of the fourth aspect of the first invention. In the construction of FIG. 4, the add-drop multiplexer further contains, in addition to the construction of FIG. 3, the demultiplexing unit 3 and the multiplexing unit 4. The demultiplexing unit 3 and the multiplexing unit 4 in FIG. 4 function in the same manner as the corresponding elements in the construction of FIG. 2, respectively.

Figure 5:
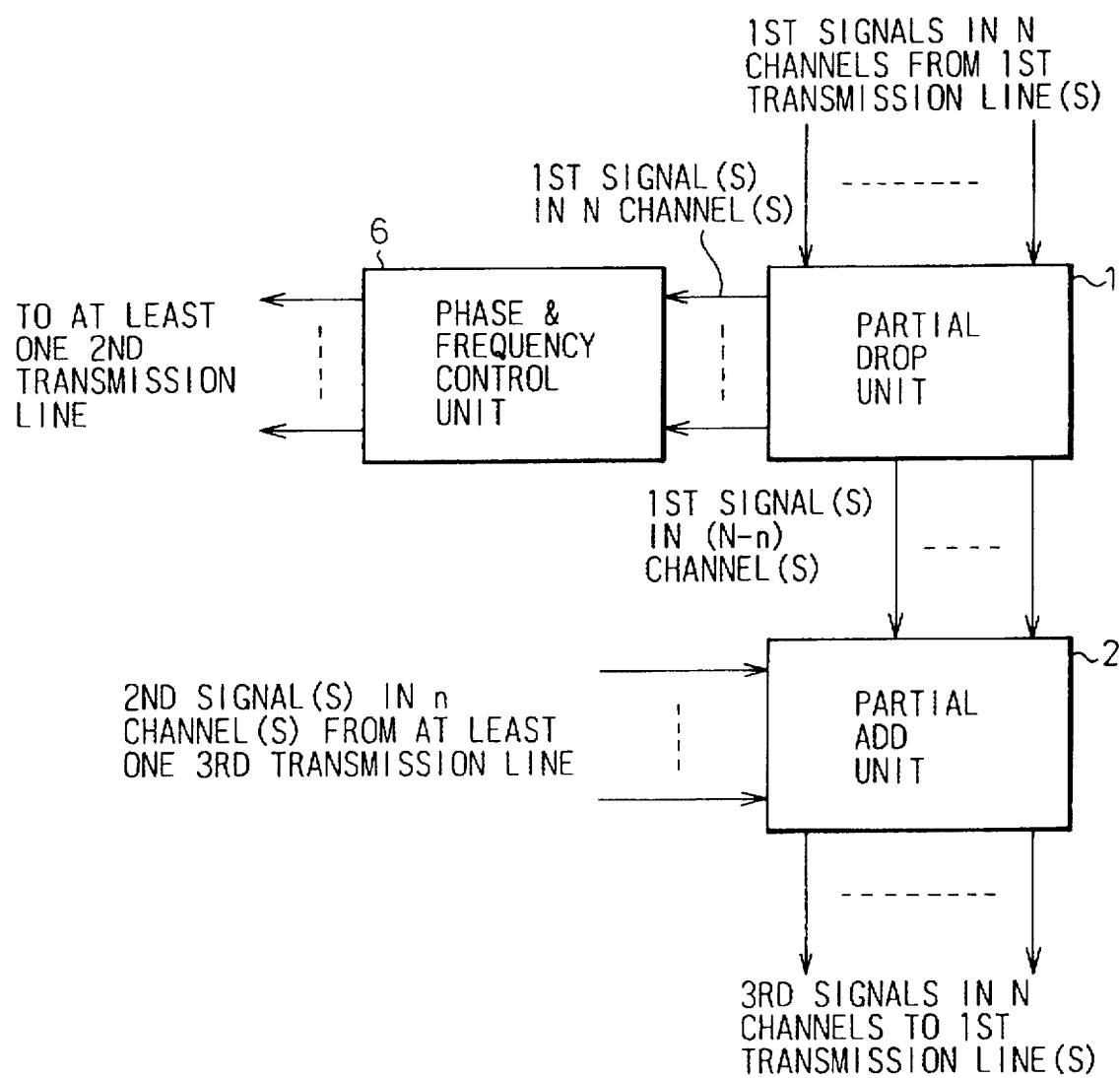
FIG. 5 is a diagram illustrating the construction of the fifth aspect of the first invention.

FIG. 5 is a diagram illustrating the construction of the fifth aspect of the first invention;

In the construction of FIG. 1, the above n first signal(s) of the n channel(s) may be contained in at least one transmission frame of a predetermined form when the n first signal(s) of the n channel(s) is transmitted on the at least one second transmission line, and each transmission frame can contain information to be transmitted and pointer information which indicates a phase of the information to be transmitted, in the transmission frame. For example, the transmission frames of STS signals in the SONET system, as well as STM signals in the SDH system and the TTI standard system in Japan, contain such pointer information. In this case, the pointer information in a received transmission frame must be rewritten before transmitting the transmission frame, according to the timing of the add-drop multiplexer. Therefore, the add-drop multiplexer further contains a phase and frequency control unit 6, in addition to the construction of FIG. 1. The phase and frequency control unit 6 inserts first information contained in the n first signal(s) of n channel(s) as the n first signal(s) of n channel(s) is received, into the at least one transmission frame which contains the n first signal(s) and is to be transmitted on the at least one second transmission line, in synchronization with timing of the add-drop multiplexer, obtains second information on at least one phase of the first information inserted in the at least one transmission frame of the n first signal(s), and inserts the second information on the at least one phase into the at least one transmission frame as the pointer information.

In the construction of FIG. 5, the phase and frequency control unit 6 may contain a unit for obtaining the at least one phase in the at least one transmission frame based on at least one reference phase of the at least one transmission frame to be transmitted, and at least one reception phase at which the first information is received.

In addition, the above phase and frequency control 6 may contain a unit for performing stuffing and destuffing control in the transmission frames containing the n first signal(s) of n channel(s), based on at least one frequency of the n first signal(s) to be transmitted, and at least one frequency of the n first signal(s) when the n first signal(s) of n channel(s) is received.

Figure 6:
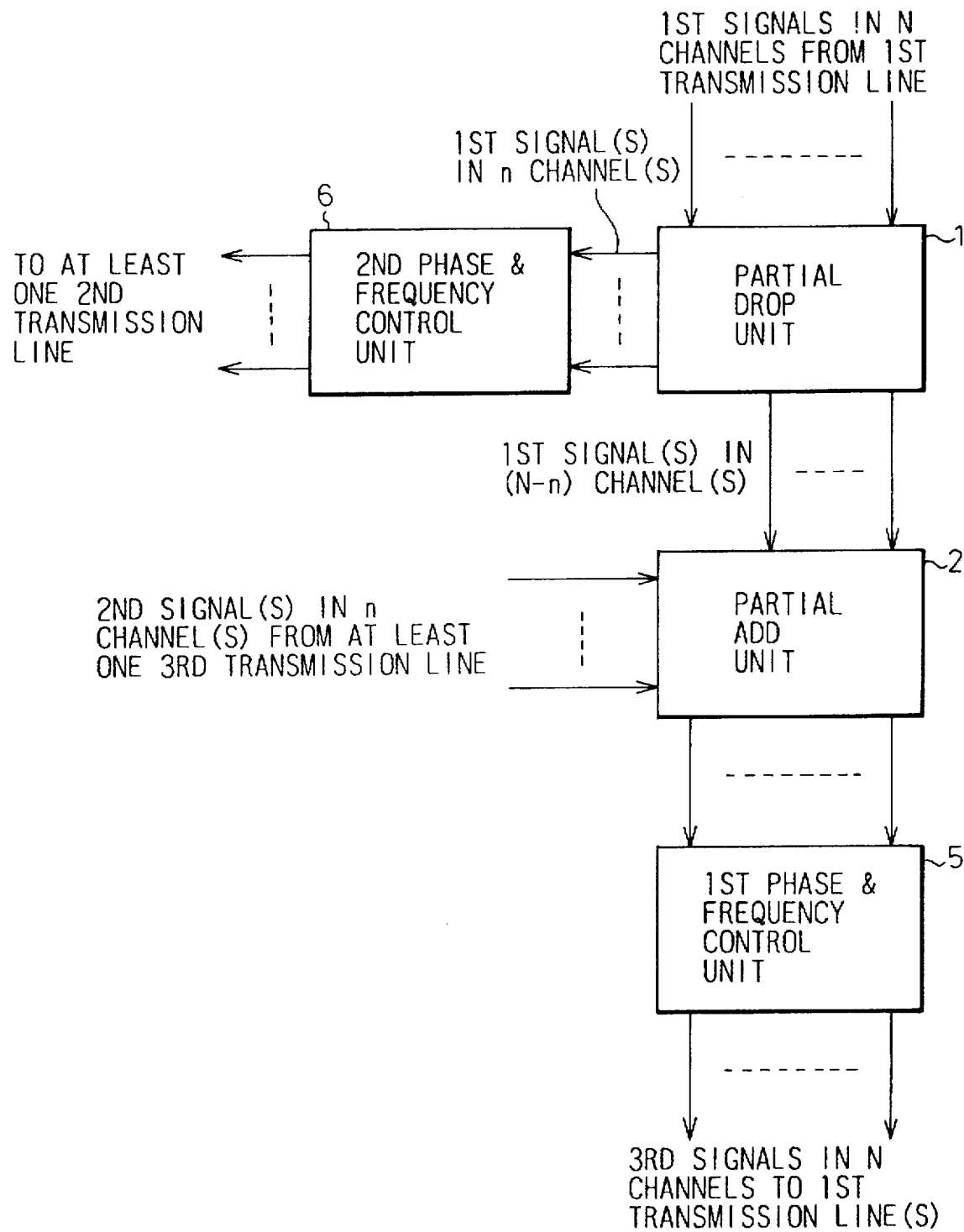
FIG. 6 is a diagram illustrating the construction of the sixth aspect of the first invention.

FIG. 6 is a diagram illustrating the construction of the sixth aspect of the first invention. The add-drop multiplexer of FIG. 6 contains both the phase and frequency control unit 5 in FIG. 3 and the phase and frequency control unit 6 in FIG. 5, as the first and second phase and frequency control units 5 and 6, respectively.

Figure 7:
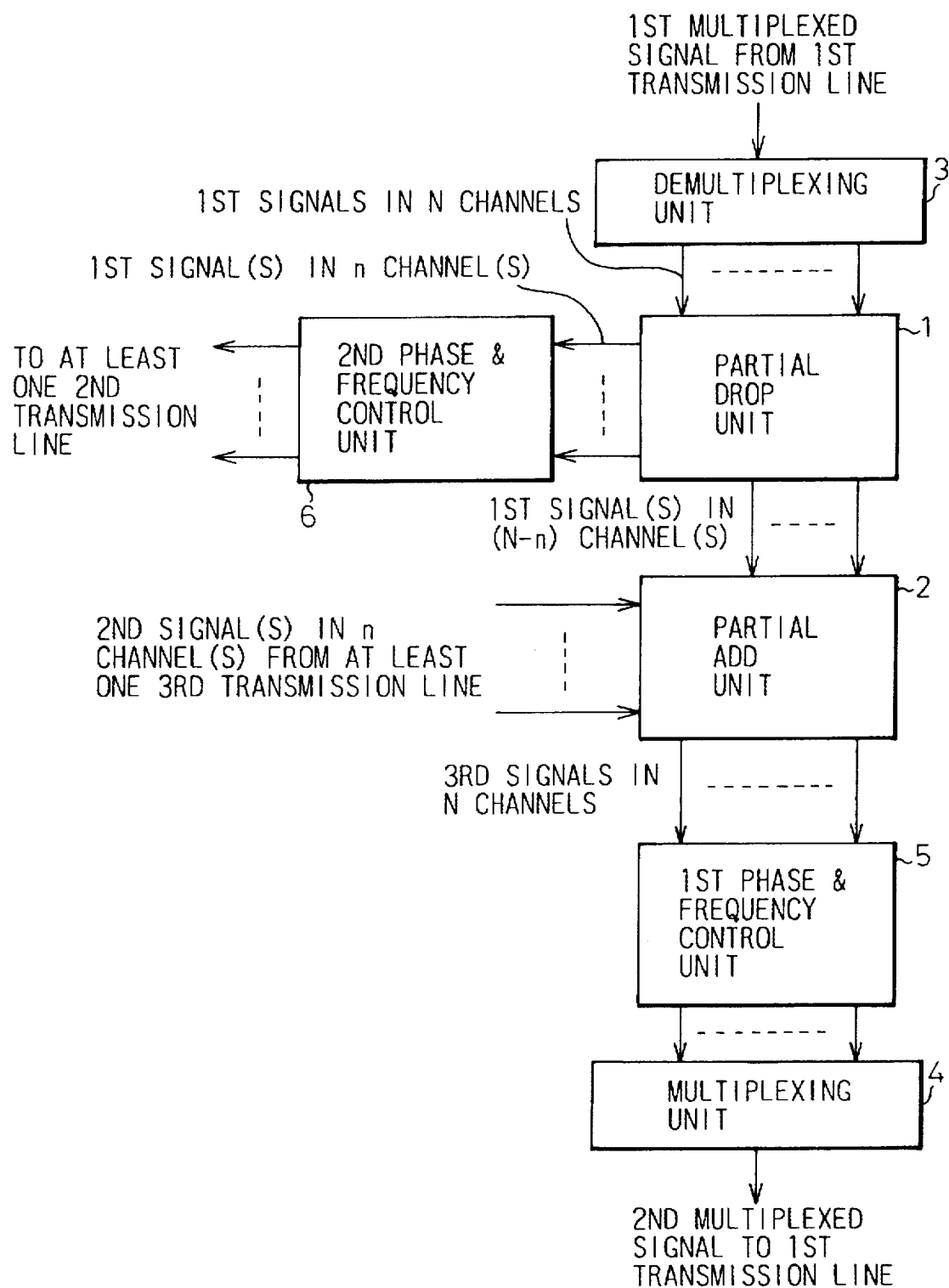
FIG. 7 is a diagram illustrating the construction of the seventh aspect of the first invention.

FIG. 7 is a diagram illustrating the construction of the seventh aspect of the first invention. The add-drop multiplexer of FIG. 7 contains, in addition to the construction of FIG. 6, the demultiplexing unit 3 and the multiplexing unit 4, which function in the same manner as in the construction of FIG. 2.

Figure 8:
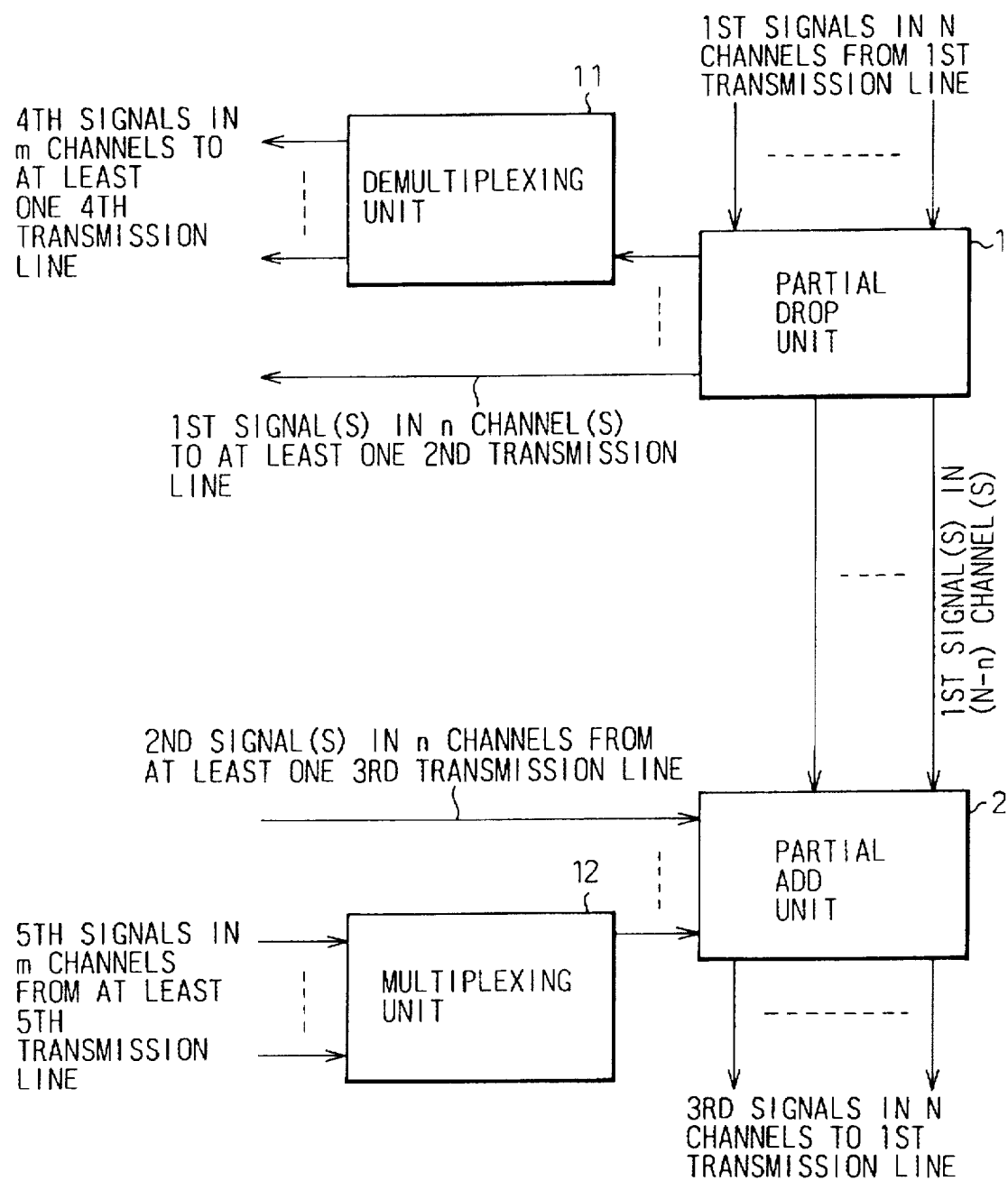
FIG. 8 is a diagram illustrating the construction of the eighth aspect of the first invention.
Figure 11:
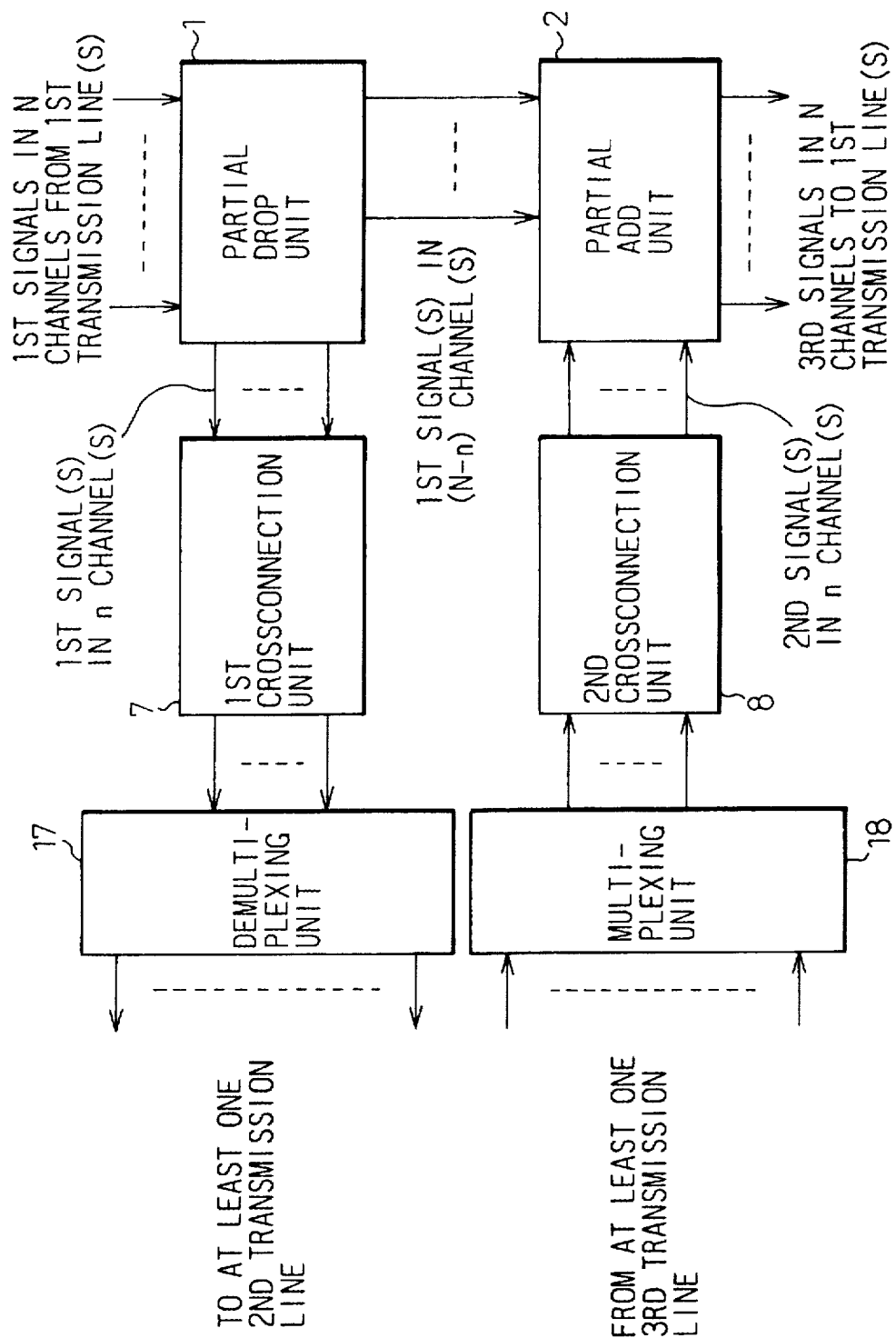
FIG. 11 is a diagram illustrating the construction of the third aspect of the second invention.

FIG. 8 is a diagram illustrating the construction of the eighth aspect of the first invention. In the construction of FIG. 11, it is assumed that at least one of the signals transmitted through the main (first) transmission line each contain a plurality of sub-channels (channels in a lower multiplicity level or lower hierarchy level). The add-drop multiplexer of FIG. 8 contains a demultiplexing unit 11 and a multiplexing unit 12 on the tributary side. The demultiplexing unit 11 demultiplexes at least one of the at least one n first signal(s) of the n channel(s) to m fourth signals of m channels (in a lower multiplicity level or lower hierarchy level) to be output to at least one fourth transmission line, where m is an integer satisfying m>1, and the multiplexing unit 12 receives m fifth signals of m channels (in the lower multiplicity level or lower hierarchy level) from at least one fifth transmission line to generate at least one of the n second signal(s) of n channel(s) and supply the at least one of the n second signal(s) of n channel(s) to the partial add unit 2. The provision of the demultiplexing unit 11 and the multiplexing unit 12 on the tributary side, enables access to the signal transmitted on the main transmission line from the lower multiplicity level (lower hierarchy level) on the tributary side.

EXPLANATIONS OF BASIC CONSTRUCTIONS OF THE SECOND INVENTION (FIGS. 9 to 12)

Figure 9:
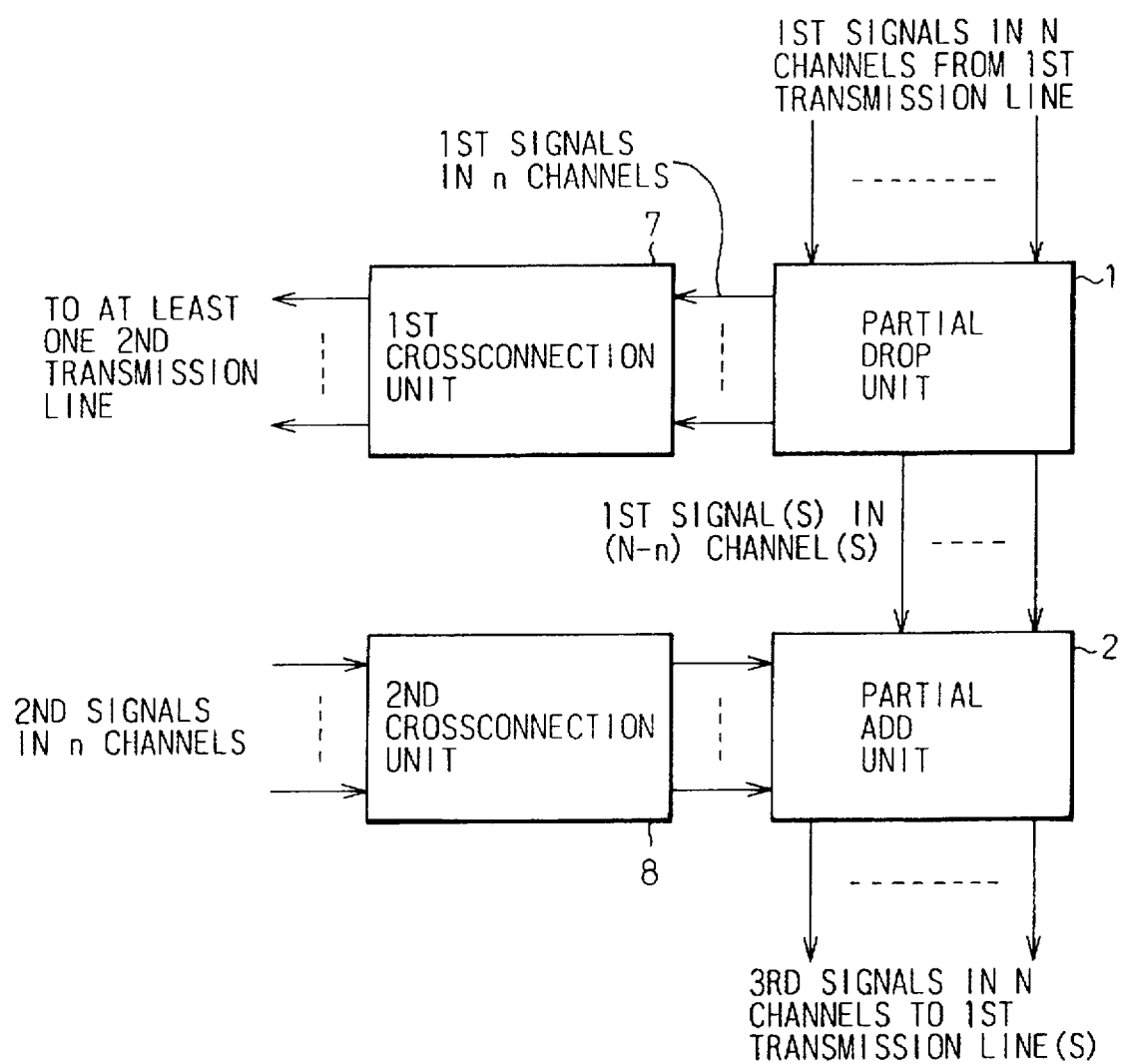
FIG. 9 is a diagram illustrating the construction of the first aspect of the second invention.

FIG. 9 is a diagram illustrating the construction of the first aspect of the second invention. The add-drop multiplexer according to the second invention contains, in addition to the construction of FIG. 1, first and second crossconnecting units 7 and 8 on the tributary side, as indicated in FIG. 9. The first crossconnecting unit 7 establishes at least one circuit through which each of the n first signal(s) of n channel(s) can be transmitted to one of the at least one second transmission line, in accordance with a correspondence relationship between the n first signal(s) of n channel(s) and channel(s) in a signal(s) on the at least one second transmission line. The second crossconnecting unit 8 establishes at least one circuit through which each of the n second signal(s) of n channel(s) can be supplied as one of the N third signals, in accordance with a correspondence relationship between the n second signal(s) of n channel(s) and the N third signals.

According to the construction of FIG. 9, it is possible to access an arbitrary one of the plurality of first channels in each of the N signals from each second channel on the tributary side and while letting transmission frames in the other channel or channels pass through the add-drop multiplexers without being output to and input from the tributary side.

Figure 10:
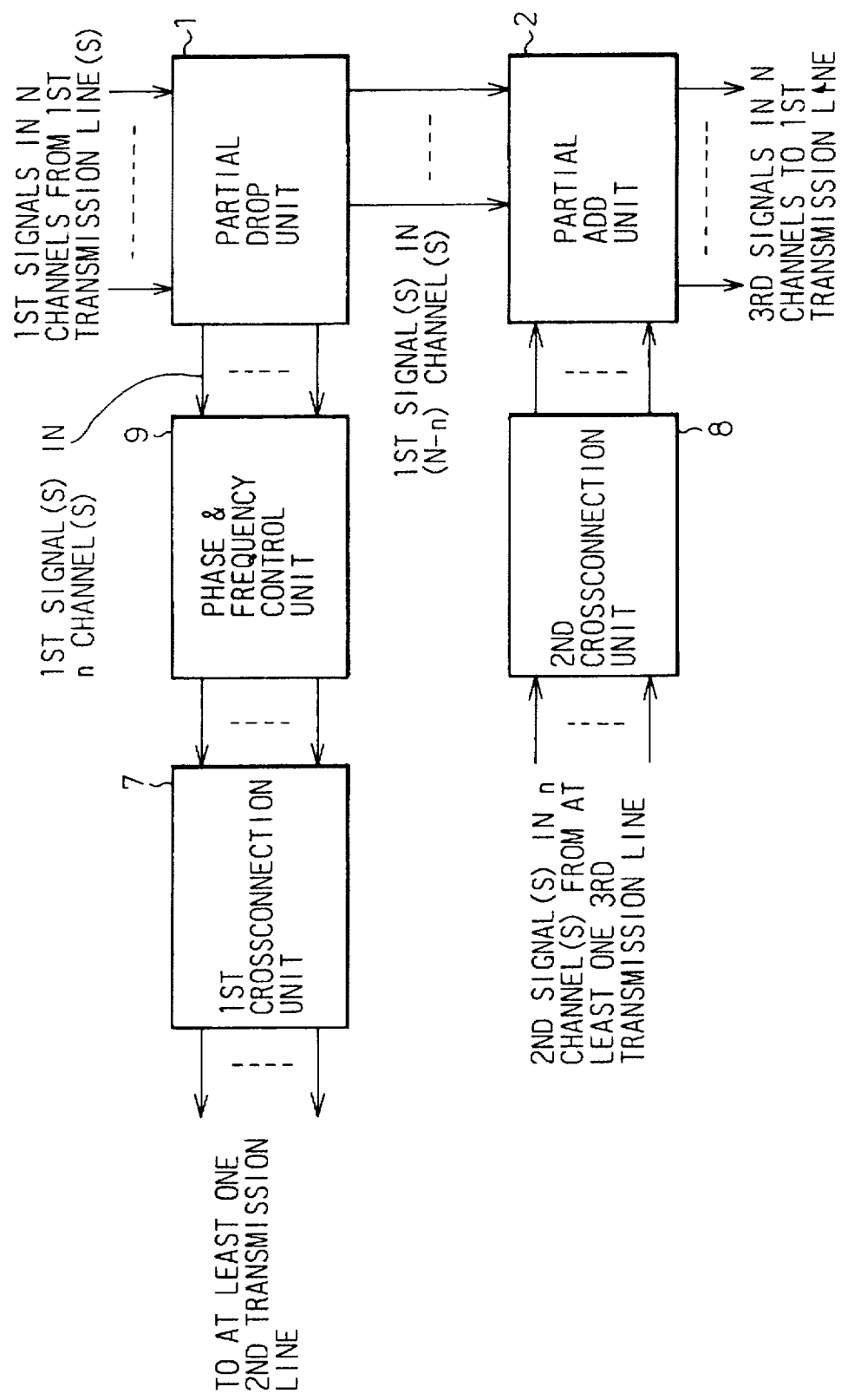
FIG. 10 is a diagram illustrating the construction of the second aspect of the second invention.

FIG. 10 is a diagram illustrating the construction of the second aspect of the second invention. The add-drop multiplexer of FIG. 10 contains, in addition to the construction of FIG. 9, a phase and frequency control unit 9, which functions in the same manner as the phase and frequency control unit 6 in FIG. 5.

FIG. 11 is a diagram illustrating the construction of the third aspect of the second invention. In the construction of FIG. 11, it is assumed that at least one of the signals transmitted through the main (first) transmission line each contain a plurality of sub-channels (channels in a lower multiplicity level or lower hierarchy level). The add-drop multiplexer of FIG. 11 contains, in addition to the construction of FIG. 9, a demultiplexing unit 17 and a multiplexing unit 18 on the tributary side. The provision of the demultiplexing unit 17 and the multiplexing unit 18 on the tributary side, in addition to the first and second crossconnecting units 7 and 8, enables access to the signals in the various channels transmitted on the main transmission line from a lower multiplicity level (lower hierarchy level) on the tributary side.

Figure 12:
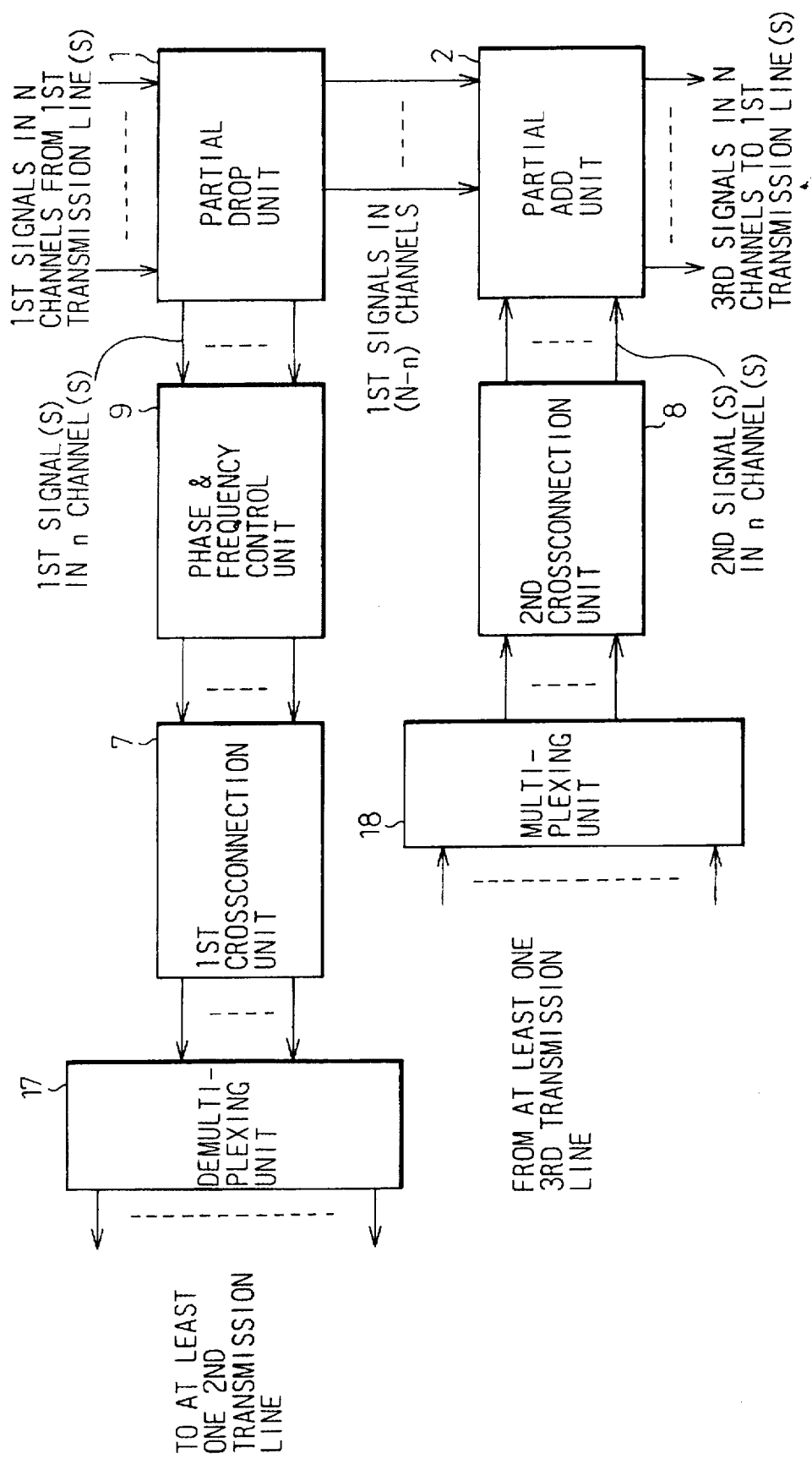
FIG. 12 is a diagram illustrating the construction of the fourth aspect of the second invention.

FIG. 12 is a diagram illustrating the construction of the fourth aspect of the second invention. The add-drop multiplexer of FIG. 12 contains, in addition to the construction of FIG. 11, a phase and frequency control unit 9, which functions in the same manner as the phase and frequency control unit 6 in FIG. 5 and the phase and frequency control unit 9 in FIG. 10.

Figure 13:
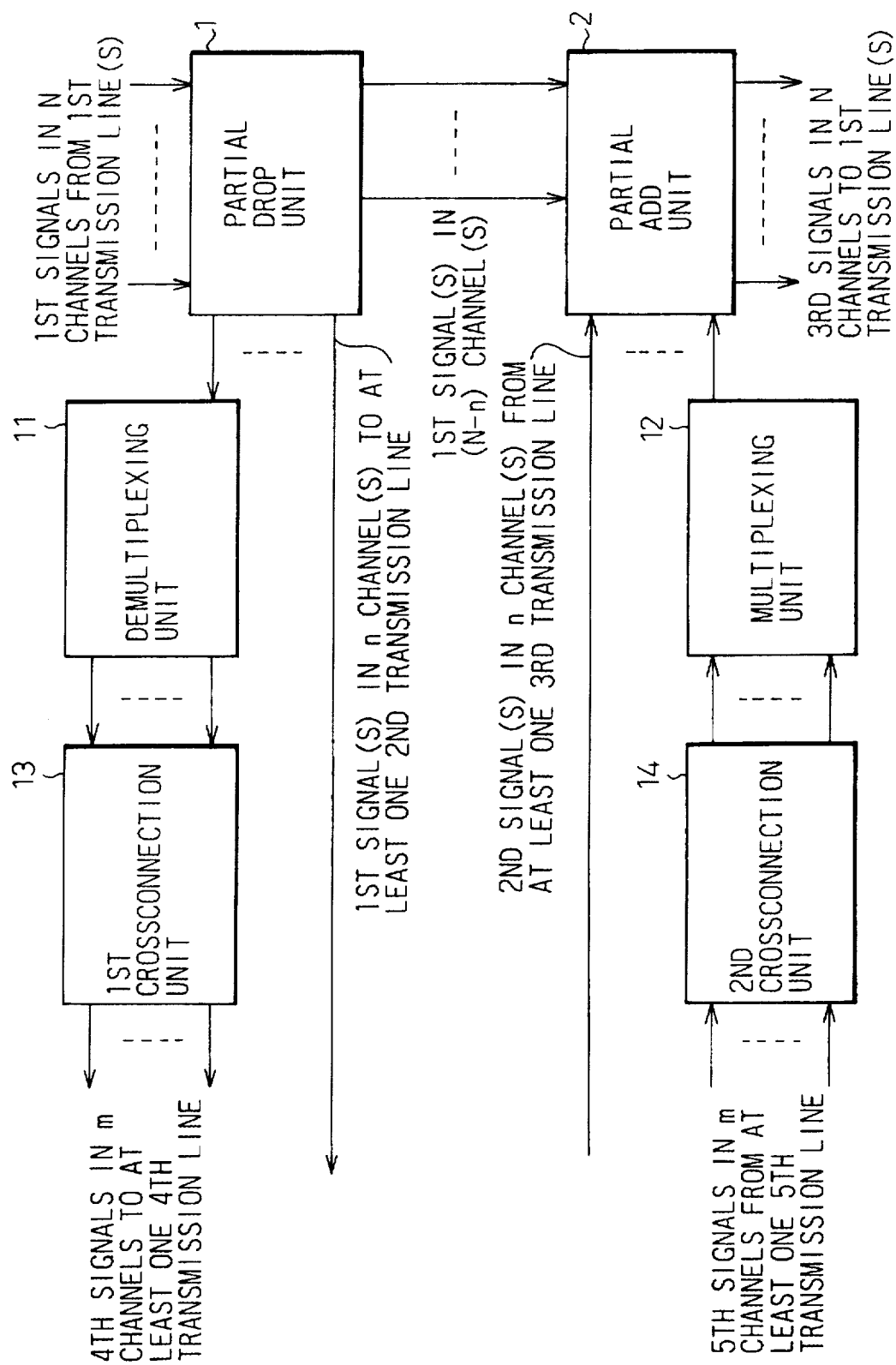
FIG. 13 is a diagram illustrating the construction of the first aspect of the third invention.
Figure 14:
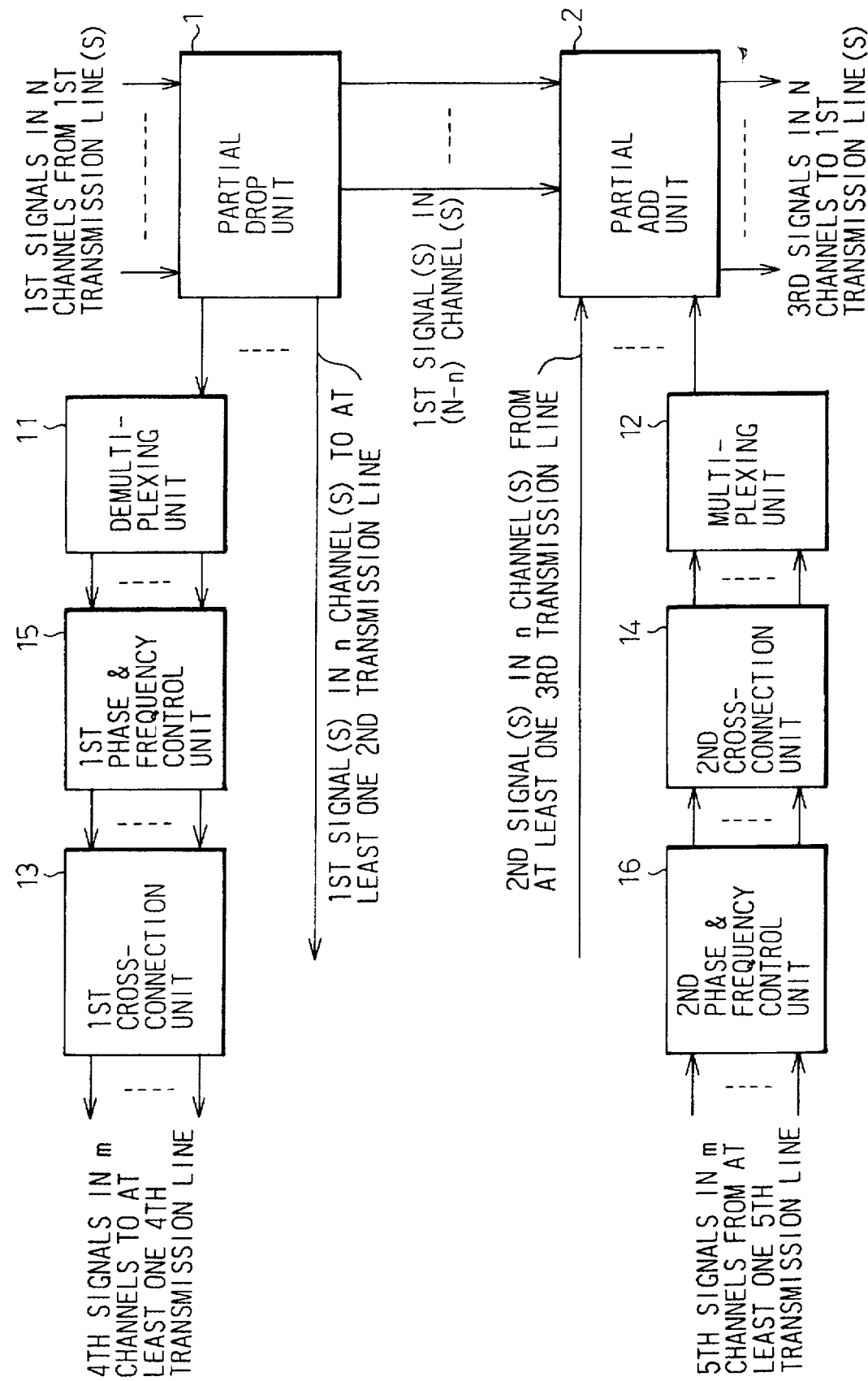
FIG. 14 is a diagram illustrating the construction of the second aspect of the third invention.

EXPLANATIONS OF BASIC CONSTRUCTIONS OF THE THIRD INVENTION (FIGS. 13 and 14)

FIG. 13 is a diagram illustrating the construction of the first aspect of the third invention. In the construction of FIG. 11, it is assumed that the signals transmitted through the main (first) transmission line each contain a plurality of sub-channels (channels in a lower multiplicity level or lower hierarchy level), and that the integers N and n satisfy $N \geq n > 0$. The add-drop multiplexer of FIG. 13 contains, in addition to the construction of FIG. 1, the demultiplexing unit 9 and the multiplexing unit 8 on the tributary side, and further contains first and second crossconnecting units 13 and 14 on the tributary side of the demultiplexing unit 9 and the multiplexing unit 8, respectively. The demultiplexing unit 9 and the multiplexing unit 8 in FIG. 13 are the same as the corresponding elements in FIG. 8. The first crossconnecting unit 13 establishes at least one circuit through which each of the m fourth signal(s) of m channel(s) (in the lower multiplicity level or lower hierarchy level) can be transmitted to one of the at least one fourth transmission line, in accordance with a correspondence relationship between the m fourth signal(s) of m channel(s) and the at least one fourth transmission line, and the second crossconnecting unit 14 establishes at least one circuit so that each of the m fifth signal(s) of m channel(s) (in the lower multiplicity level or lower hierarchy level) can be supplied to one input port of the multiplexing unit 12, in accordance with a correspondence relationship between the m fifth signal(s) and the input ports of the multiplexing unit 12.

According to the construction of the third invention, it is possible to access an arbitrary one of the plurality of sub-channels (channels in the lower multiplicity level or lower hierarchy level) in at least one of the signals transmitted through the main transmission line, from each channel in the lower multiplicity level on the tributary side.

FIG. 14 is a diagram illustrating the construction of the second aspect of the third invention. In the add-drop multiplexer of FIG. 14, it is assumed that the integers N and n satisfy N≧n>0, and the m fourth signal(s) and the m fifth signal(s) (in the lower multiplicity level or lower hierarchy level) are each contained in at least one transmission frame of a predetermined form when they are transmitted, and each transmission frame can contain information to be transmitted and pointer information which indicates a phase of the information to be transmitted, in the transmission frame. For example, the transmission frames of VT signals in the SONET system, as well as VC (virtual container) signals in the SDH system and the TTI standard system in Japan, contain such pointer information. In this situation, the pointer information in a received transmission frame must be rewritten before transmitting the transmission frame, according to the timing of the add-drop multiplexer. Therefore, the add-drop multiplexer of FIG. 14 further contains first and second first phase and frequency control units 15 and 16. The first phase and frequency control unit 15 inserts first information contained in the m fourth signal (s) of m channel(s) as the m fourth signal(s) is received, into the at least one transmission frame to be transmitted, in synchronization with timing of the add-drop multiplexer, obtains second information on at least one phase of the first information inserted in the at least one transmission frame, and inserts the second information on the at least one phase into the at least one transmission frame as the pointer information. The second phase and frequency control unit 16 inserts third information contained in the m fifth signal(s) of m channel(s) as the m fifth signal(s) is received, into the at least one transmission frame to be transmitted, in synchronization with timing of the add-drop multiplexer, obtains fourth information on at least one phase of the third information in the at least one transmission frame, and inserts the fourth information on the at least one phase into the at least one transmission frame as the pointer information.

Figure 15:
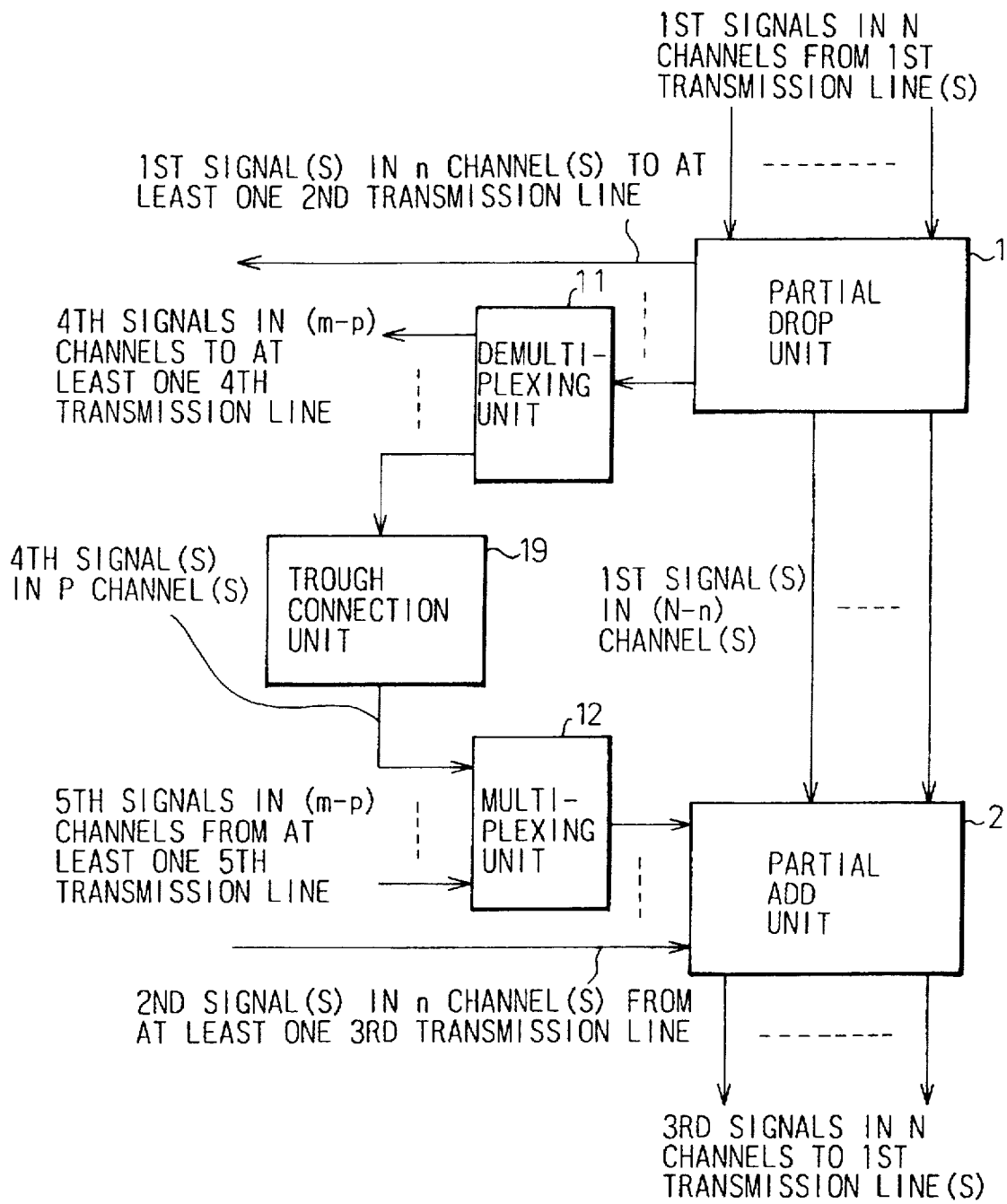
FIG. 15 is a diagram illustrating the construction of the first aspect of the fourth invention.
Figure 16:
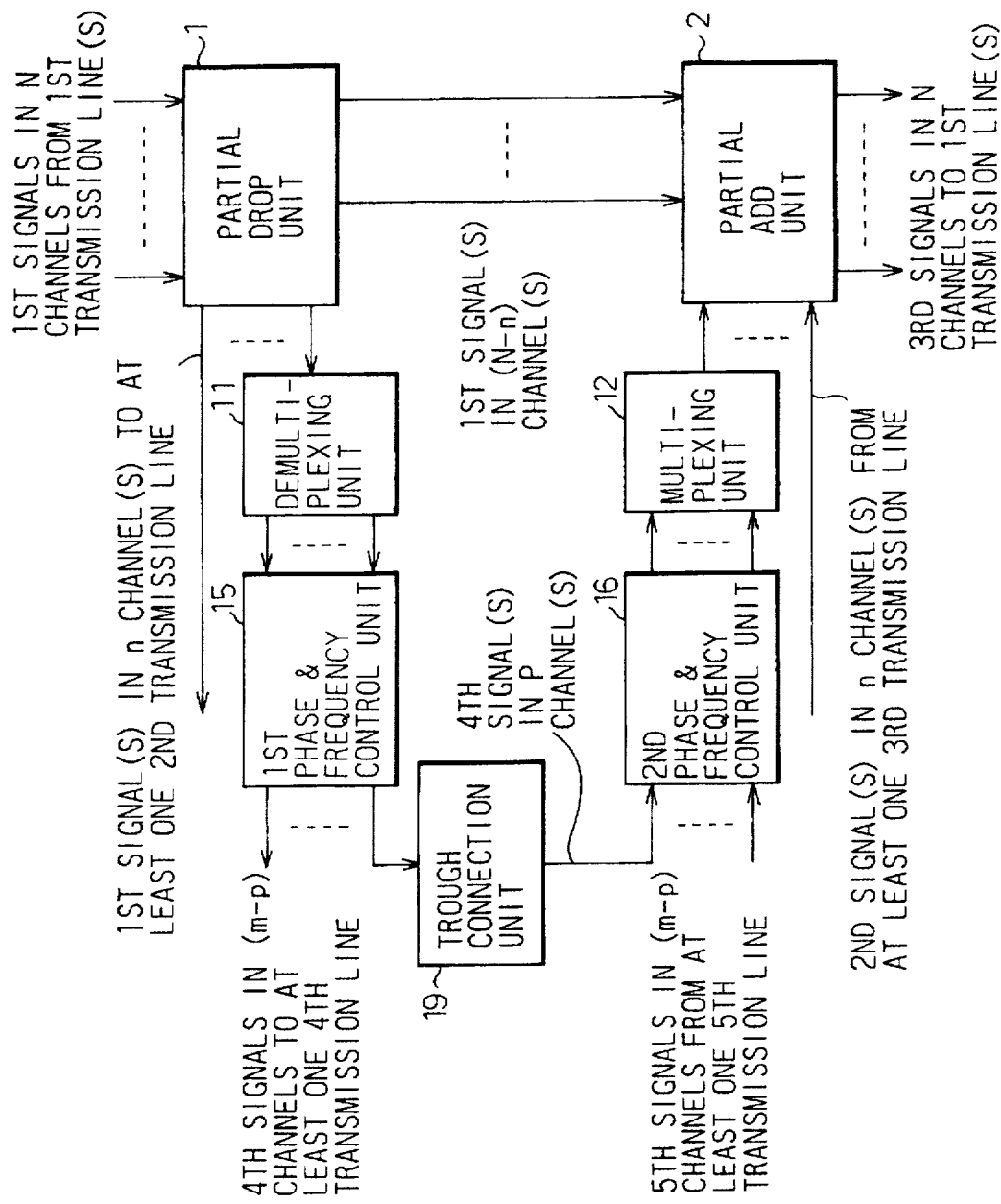
FIG. 16 is a diagram illustrating the construction of the second aspect of the fourth invention.

EXPLANATIONS OF BASIC CONSTRUCTIONS OF THE FOURTH INVENTION (FIGS. 15 and 16)

FIG. 15 is a diagram illustrating the construction of the first aspect of the fourth invention. The add-drop multiplexer of FIG. 15 contains, in addition to the construction of FIG. 8, a through connection unit 19. The through connection unit 19 supplies at least one of the m fourth signal(s) to the multiplexing unit 15, instead of the at least one of the m fifth signal(s), where the integers N and n are assumed to satisfy N≧n>0.

According to the construction of the fourth invention, it is possible to make signals in a sub-channel or sub-channels in the lower multiplicity level other than a signal(s) in the lower multiplicity level which is required to be accessed from the tributary side, pass through the add-drop multiplexer without being output to and input from the tributary side when both signals in a sub-channel or sub-channels in the lower multiplicity level are contained in the same channel in the higher multiplicity level.

FIG. 16 is a diagram illustrating the construction of the second aspect of the fourth invention. The add-drop multiplexer of FIG. 16 contains, in addition to the construction of FIG. 15, the first and second phase and frequency control units 15 and 16, which function in the same manner as the corresponding elements in FIG. 14.

Figure 17:
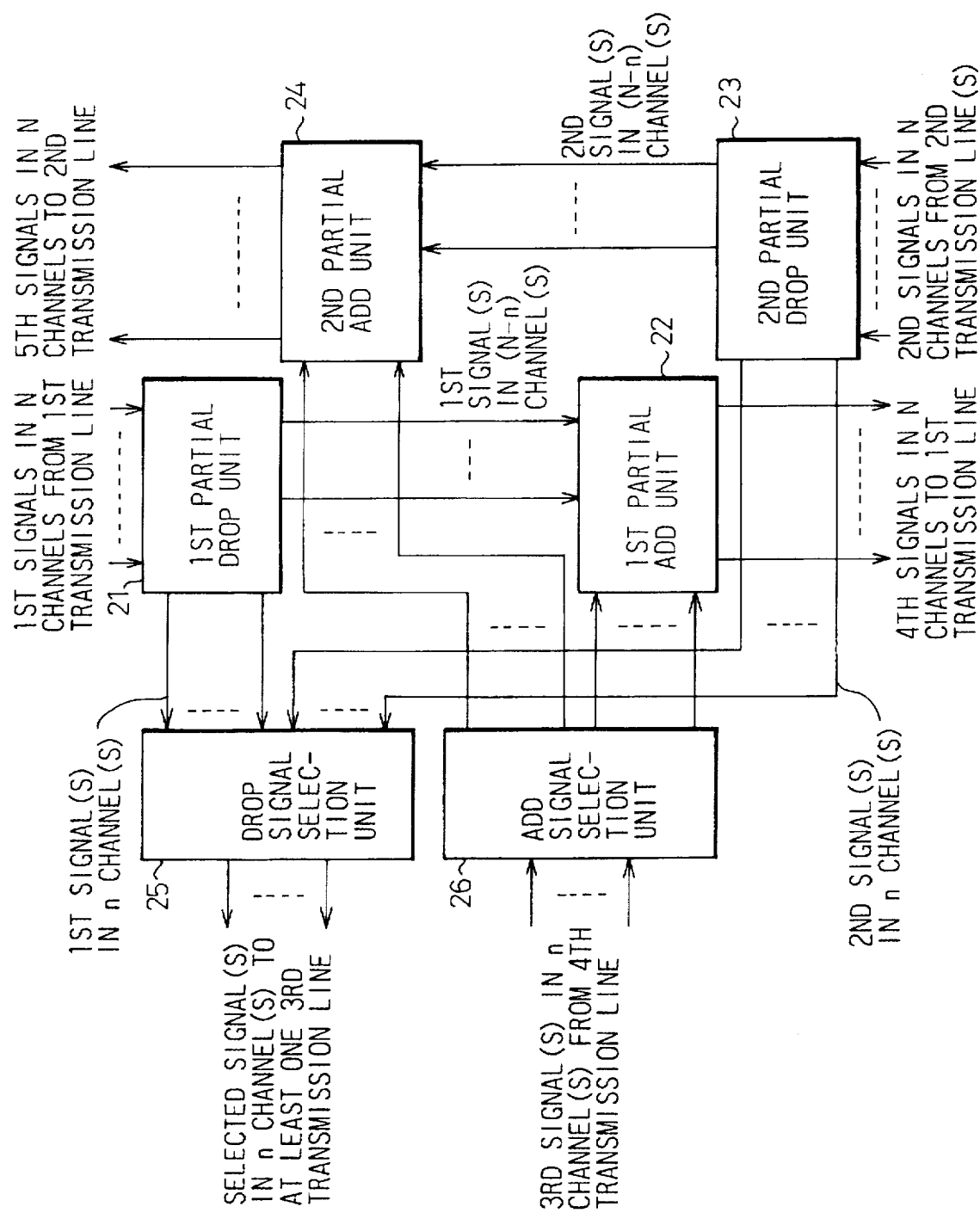
FIG. 17 is a diagram illustrating the construction of the first aspect of the fifth invention.
Figure 18:
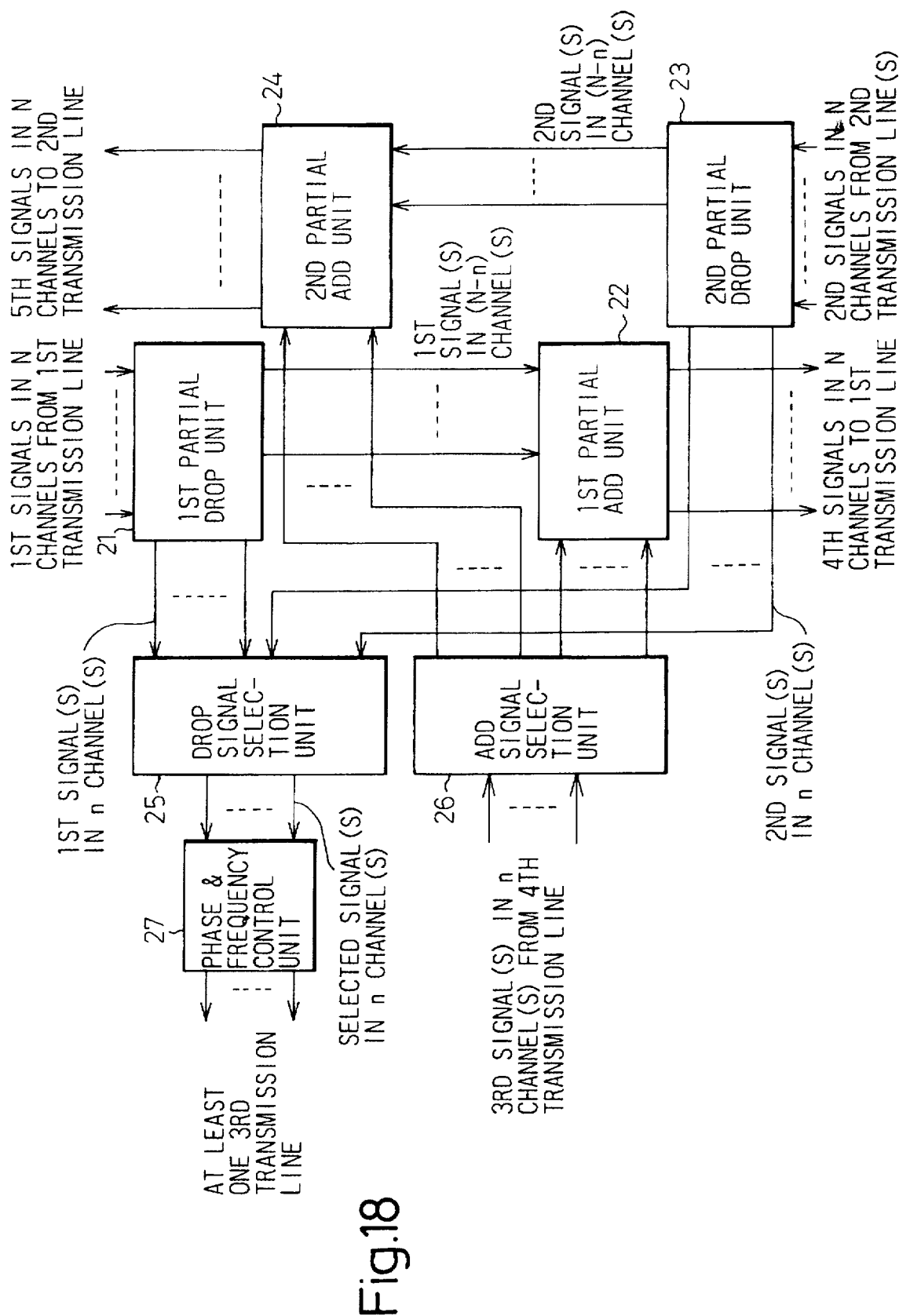
FIG. 18 is a diagram illustrating the construction of the second aspect of the fifth invention.

EXPLANATIONS OF BASIC CONSTRUCTIONS OF THE FIFTH INVENTION (FIGS. 17 and 18)

FIG. 17 is a diagram illustrating the construction of the first aspect of the fifth invention. According to the fifth invention, the provision of the first invention, in which the main transmission line is a unidirectional transmission line, is extended to cases wherein the main transmission line is a bidirectional transmission line or a pair of transmission lines in opposite directions.

For the above purpose, the add-drop multiplexer of FIG. 17 contains: a first partial drop unit 21, a second partial drop unit 23, a drop signal selection unit 25, a first partial add unit 22, a second partial add unit 24, and an add signal supplying unit 26. The first partial drop unit 21 selects n first signal(s) of n channel(s) among N first signals of N channels, which are received from a first transmission line, and supplies the n first signal(s) of n channel(s) to a drop signal selection unit 25, where N and n are integers satisfying N>n>0. The second partial drop unit 23 selects n second signal(s) of n channel(s) among N second signals of N channels, which are received from a second transmission line and correspond to the n first signal(s), and supplies the n second signal(s) of n channel(s) to the drop signal selection unit 25. The drop signal selection unit 25 receives the n first signal(s) and the n second signal(s) corresponding to the n first signal(s) as n pair(s) of corresponding signals, selects one signal from each pair of the n pair(s) of corresponding signals to obtain n selected signal(s) and transmits the n selected signal(s) on at least one third transmission line. The first partial add unit 22 receives n third signal(s) of n channel(s) from at least one fourth transmission line, and (N-n) first signal(s) of (N-n) channel(s) among the N first signals of the N channels, which are not selected by the first partial drop unit 21), and for transmitting on the first transmission line the n third signal(s) and the (N-n) first signal(s) as N fourth signals of N channels. The second partial add unit 24 receives the n third signal(s) of n channel(s) from at least one fourth transmission line, and (N-n) second signal(s) of (N-n) channel(s) among the N second signals of the N channels, which are not selected by the second partial drop unit 23), and transmits on the second transmission line the n third signal(s) and the (N-n) second signal(s) as N fifth signals of N channels. The add signal supplying unit 26 receives the n third signal(s) of n channel(s) from the at least one fourth transmission line, and supplies the n third signal(s) to the first and second partial add units 22 and 24.

According to the fifth invention, it is possible to access only to an arbitrary channel or channels of the plurality of channels in the signal transmitted in a selected direction, while letting the transmission frames in the other channel or channels of the plurality of channels pass through the add-drop multiplexers without being output to and input from the tributary side.

FIG. 18 is a diagram illustrating the construction of the second aspect of the fifth invention. In the construction of FIG. 18, a phase and frequency control unit 27 is provided on the tributary side of the drop signal selection unit 25. The function of the phase and frequency control unit 27 is basically the same as the phase and frequency control unit 6 in FIG. 5. Namely, the phase and frequency control unit 27 inserts first information contained in the n selected signal(s) of n channel(s) as the n selected signal(s) of n channel(s) is received, into the at least one transmission frame to be transmitted on the at least one third transmission line, in synchronization with timing of the add-drop multiplexer, obtains second information on at least one phase of the first information inserted in the at least one transmission frame, and inserts the second information on the at least one phase into the at least one transmission frame as the pointer information.

EXPLANATION OF BASIC CONSTRUCTION OF THE SIXTH INVENTION (FIG. 19)

Figure 19:
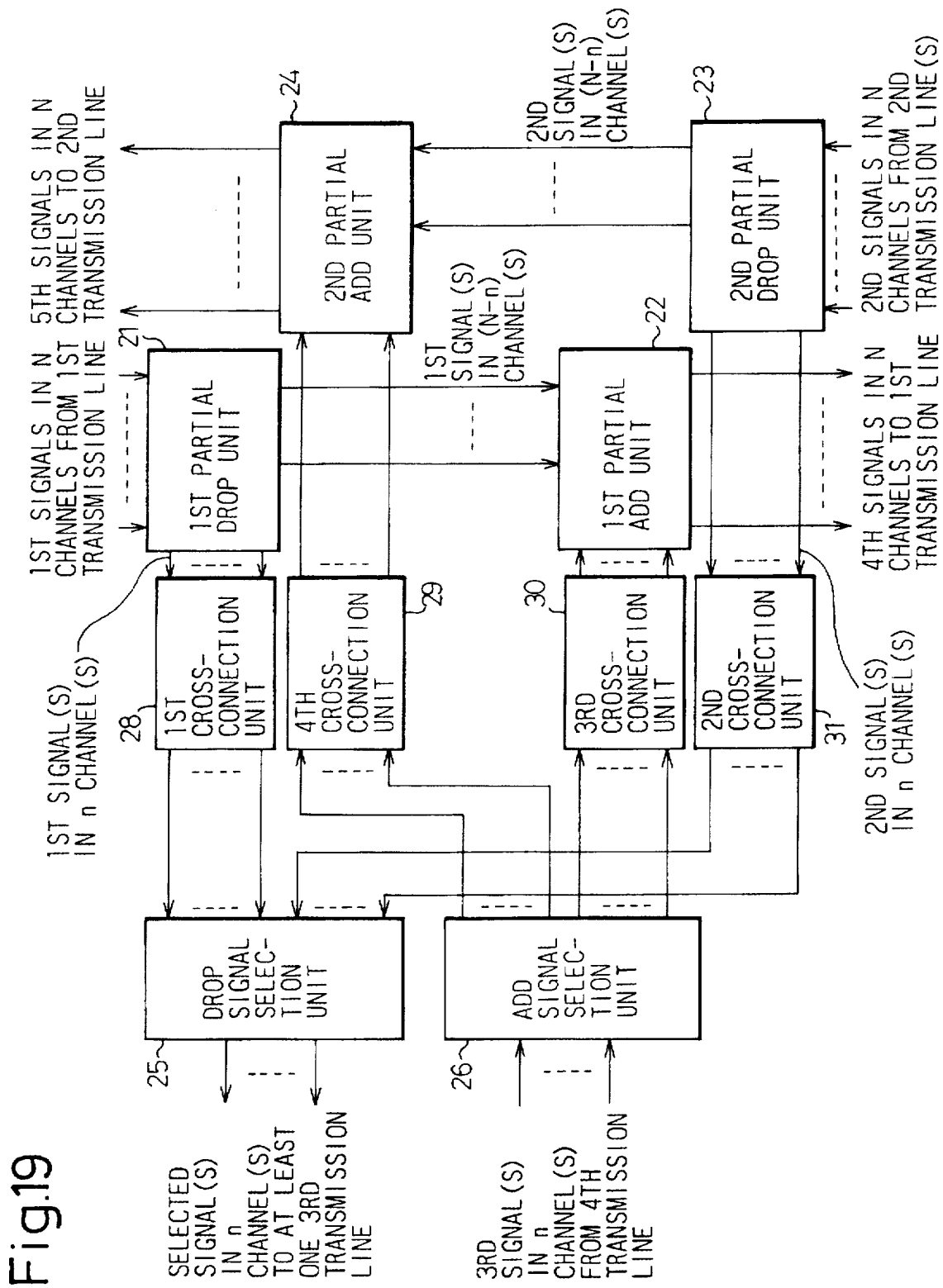
FIG. 19 is a diagram illustrating the construction of the first aspect of the sixth invention.

FIG. 19 is a diagram illustrating the construction of the first aspect of the sixth invention. According to the sixth invention, the provision of the second invention (FIG. 9), in which the main transmission line is a unidirectional transmission line, is extended to cases wherein the main transmission line is a bidirectional transmission line or a pair of transmission lines in opposite directions.

For the above purpose, the add-drop multiplexer of FIG. 19 contains, in addition to the construction of FIG. 17, first to fourth crossconnecting units 28 to 31. The first crossconnecting unit 28 establishes at least one circuit through which each of the n first signal(s) of n channel(s) can be transferred to one of the at least one third transmission line, in accordance with a correspondence relationship between the n first signal(s) of n channel(s) and the at least one second transmission line. The second crossconnecting unit 31 establishes at least one circuit through which each of the n second signal(s) of n channel(s) can be transferred to one of the at least one third transmission line, in accordance with a correspondence relationship between the n second signal(s) of n channel(s) and the at least one second transmission line. The third crossconnecting unit 30 establishes at least one circuit through which each of the n third signal(s) of n channel(s) can be transferred to one of the at least one first transmission line, in accordance with a correspondence relationship between the n third signal(s) of n channel(s) and the at least one first transmission line. The fourth crossconnecting unit 29 establishes at least one circuit through which a respective one of the n third signal(s) of n channel(s) can be transferred to one of the at least one second transmission line, in accordance with a correspondence relationship between the n third signal(s) of n channel(s) and the at least one second transmission line.

According to the sixth invention, it is possible to access an arbitrary one of the plurality of channels in the main signal transmitted on the main (first) transmission line in a selected direction, from each channel on the tributary side while letting transmission frames in the other channel or channels in the main signal pass through the add-drop multiplexer without being output to and input from the tributary side.

Figure 20A:
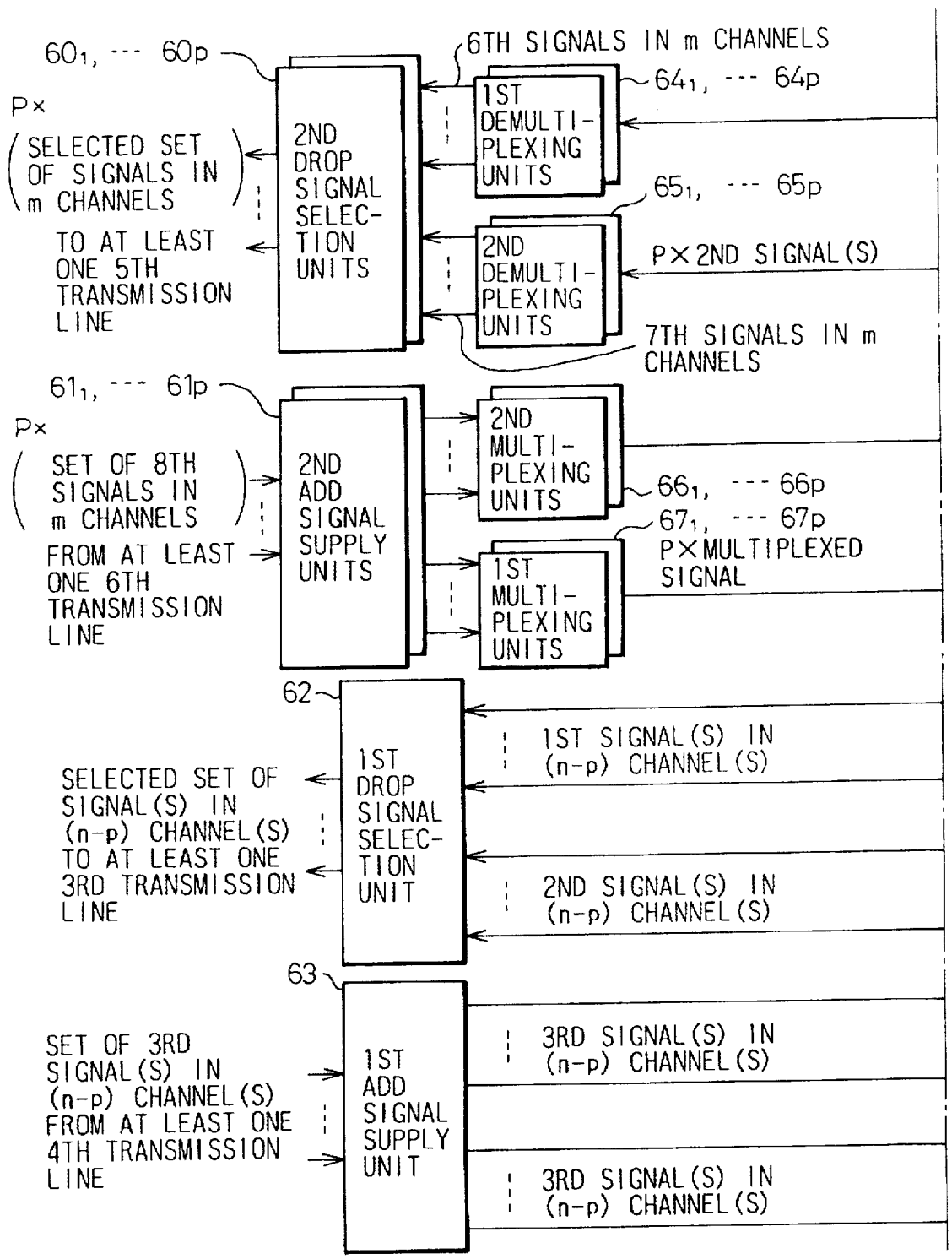

EXPLANATION OF BASIC CONSTRUCTION OF THE SEVENTH INVENTION (FIGS. 20A and 20B)

FIGS. 20A and 20B are diagrams illustrating the construction of the seventh invention. According to the seventh invention, the provision in the construction of FIG. 9, in which the main transmission line is a unidirectional transmission line, is extended to cases wherein the main transmission line is a bidirectional transmission line or a pair of transmission lines in opposite directions.

For this purpose, the add-drop multiplexer of FIGS. 20A and 20B contains: a first partial drop unit 21, a second partial drop unit 23, a first drop signal selection unit 62, a first partial add unit 22, a second partial add unit 24, a first add signal supplying unit 63, a set of at least one first demultiplexing unit $64_1, \ldots, 64_p$, a set of at least one second demultiplexing unit $65_1, \ldots, 65_p$, a set of at least one drop signal selection unit $60_1, \ldots, 60_p$, a set of at least one first multiplexing unit $67_1, \ldots, 67_p$, a set of at least one second multiplexing unit $66_1, \ldots, 66_p$, and a set of at least one second add signal supplying unit $61_1, \ldots, 61_p$. The first partial drop unit 21 selects n first signal(s) of n channel(s) among N first signals of N channels, which are received from a first transmission line, and outputs the n first signal (s), where N and n are integers satisfying N≧n>0. The second partial drop unit 23 selects n second signal(s) of n channel(s) among N second signals of N channels, which are received from a second transmission line and correspond to the n first signal(s), and supplies the n second signal(s) of n channel(s) to the drop signal selection unit 25. The first drop signal selection unit 62 receives (n-p) first signal(s) among the n first signal(s) and (n-p) second signal(s) among the n second signal(s) corresponding to the (n-p) first signal(s) as (n-p) pair(s) of corresponding signals, selects one signal from each pair of the (n-p) pair(s) of corresponding signals to obtain (n-p) selected signal(s) and transmit the (n-p) selected signal(s) on at least one third transmission line, where p is an integer satisfying n≧p>0. The first partial add unit 22 receives (n-p) third signal(s) of (n-p) channel(s) from at least one fourth transmission line, first p multiplexed signal(s) of p channels supplied from a first multiplexing unit $67_1, \ldots 67_p$, and (N-n) first signal(s) of (N-n) channel(s) among the N first signals of the N channels, which are not selected by the first partial drop unit 21), and transmits on the first transmission line the (n-p) third signal(s), the first p multiplexed signal(s), and the (N-n) first signal(s), as N fourth signals of N channels. The second partial add unit 24 receives the (n-p) third signal(s) of (n-p) channel(s) from the at least one fourth transmission line, second p multiplexed signal(s) of p channels supplied from a second multiplexing unit $66_1, \ldots, 66_p$, and (N-n) second signal(s) of (N-n) channel(s) among the N second signals of the N channels, which are not selected by the second partial drop unit 23), and transmits on the second transmission line the (n-p) third signal(s), the second p multiplexed signal(s), and the (N-n) second signal(s), as N fifth signals of N channels. The first add signal supplying unit 63 receives the (n-p) third signal(s) of (n-p) channel(s) from the at least one fourth transmission line, and supplies the (n-p) third signal(s) to the first and second partial add units 22, 24. The set of at least one first demultiplexing unit $64_1, \ldots, 64_p$ receives p first signal(s) other than the (n-p) first signals among the n first signal(s), and demultiplexes each of the p first signal(s) to m sixth signals of m channels to output p set(s) of m sixth signals. The set of at least one second demultiplexing unit $65_1, \ldots, 65_p$ receives p second signal(s) corresponding to the p first signal(s), other than the (n-p) second signals among the n second signal(s), and demultiplexes each of the p second signal(s) to m seventh signals of m channels for each of the p second signal(s), corresponding to the m sixth signals of m channels for each of the p first signal(s) to output p set(s) of m seventh signals. The set of at least one second drop signal selection unit $60_1, \ldots, 60_p$ receives the m sixth signals for each of the p first signal(s) and the m seventh signals for each of the p second signal(s) corresponding to the m sixth signals for each of the p first signal(s), as p×m pairs of corresponding signals, selects one signal from each pair of the p×m pairs of corresponding signals to obtain m selected signals for each of the p first or second signal(s), and transmits the selected signals for each of the p first or second signal(s), on at least one third transmission line. The set of at least one first multiplexing unit $67_1, \ldots, 67_p$ receives and multiplexes p set(s) of m eighth signals of m channels from at least one sixth transmission line to generate the p first multiplexed signal(s) of p channels and supply the p first multiplexed signal(s) of p channels to the first partial add unit 22. The set of at least one second multiplexing unit $66_1, \ldots 66_p$ receives and multiplexes the p set(s) of m eighth signals of m channels from the at least one sixth transmission line to generate the p second multiplexed signal(s) of p channels and supply the p second multiplexed signal(s) of p channels to the second partial add unit 24. The set of at least one second add signal supplying unit $61_1, \ldots 61_p$ receives the p set(s) of m eighth signals of m channels, and supplies the p set(s) of m eighth signals to the first and second multiplexing units $67_1, \ldots 67_p, 66_1, \ldots 66_p$.

According to the seventh invention, it is possible to access the plurality of lower hierarchy level channels, contained in the main signal in respectively arbitrary ones of the two directions from lower hierarchy level channels on the tributary side. Namely, it is possible to switch (or select) the direction of a signal to be accessed, for each of the plurality of lower hierarchy level channels.

EXPLANATIONS OF BASIC CONSTRUCTIONS OF THE EIGHTH INVENTION (FIGS. 21A to 22B)

Figure 21A:
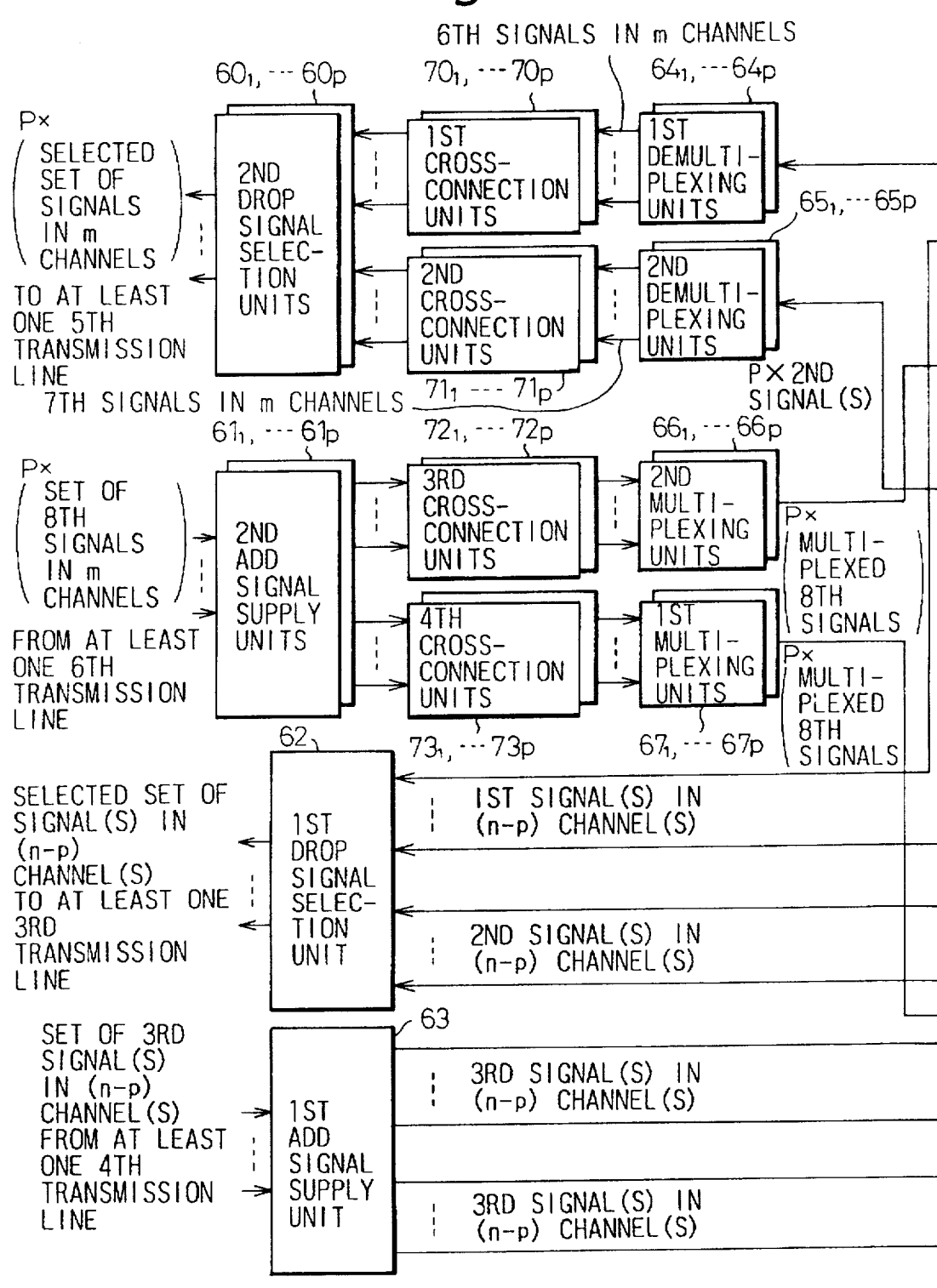
FIGS. 21A and 21B are diagrams illustrating the construction of the first aspect of the eighth invention.
Figure 21B:
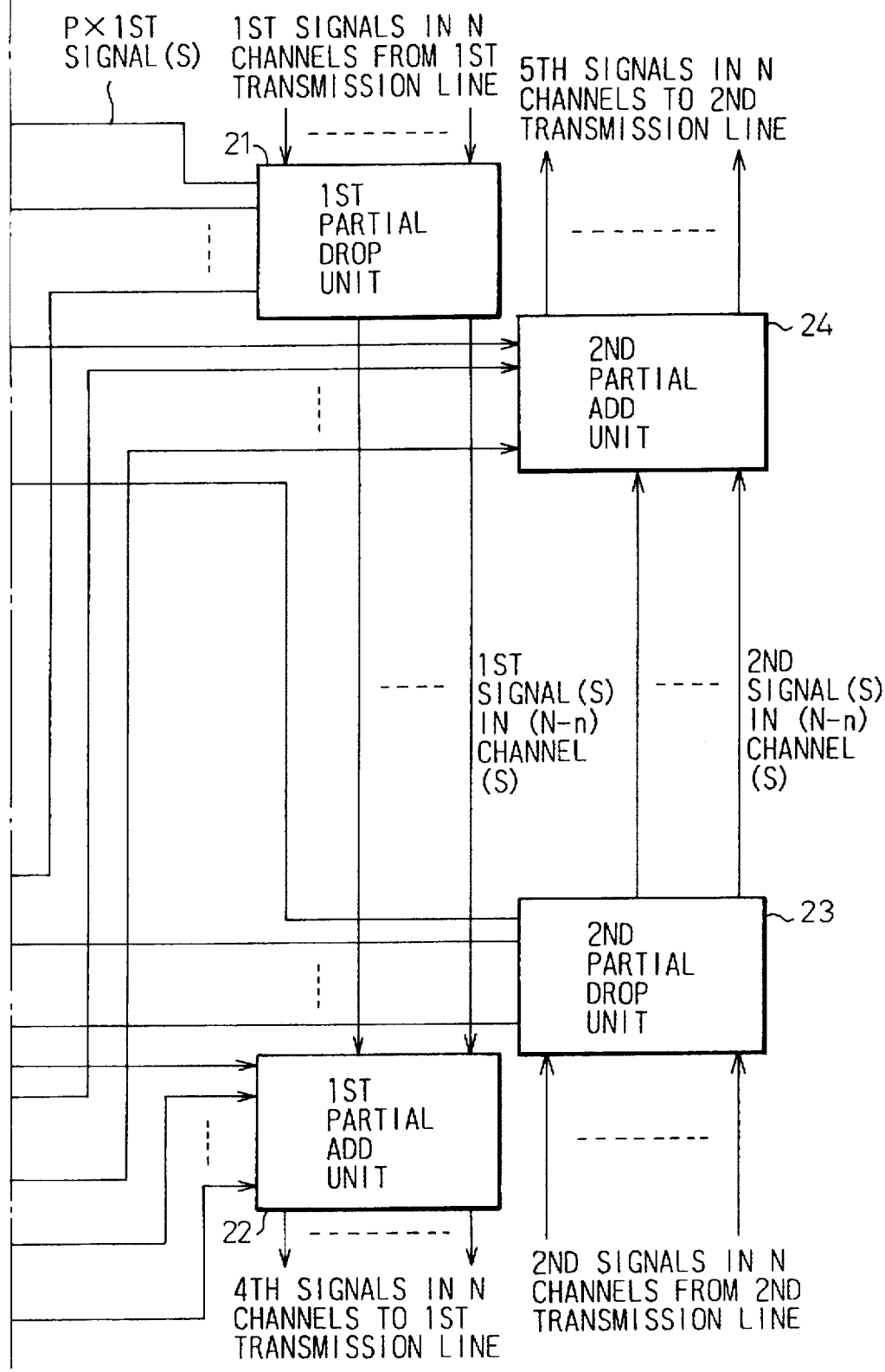

FIGS. 21A and 21B are diagrams illustrating the construction of the first aspect of the eighth invention. According to the eighth invention, the provision in the construction of the third invention (FIG. 13)., in which the main transmission line is a unidirectional transmission line, is extended to cases wherein the main transmission line is a bidirectional transmission line or a pair of transmission lines in opposite directions.

For this purpose, the add-drop multiplexer of FIGS. 21A and 21B contains, in addition to the construction of FIGS. 20A and 20B, a set of at least one first crossconnecting unit $70_1, \ldots 70_p$, a set of at least one second crossconnecting unit $71_1, \ldots 71_p$, a set of at least one third crossconnecting unit $72_1, \ldots 72_p$, and a set of at least one fourth crossconnecting unit $73_1, \ldots 73_p$, a set of at least one first crossconnecting unit $70_1, \ldots 70_p$, a set of at least one second crossconnecting unit $71_1, \ldots 71_p$, a set of at least one third crossconnecting unit $72_1, \ldots 72_p$, and a set of at least one fourth crossconnecting unit $73_1, \ldots 73_p$. The set of at least one first crossconnecting unit $70_1, \ldots 70_p$ each for establishing at least one circuit through which a respective one of the p set(s) of m sixth signals can be transferred to one of the at least one fifth transmission line, in accordance with a correspondence relationship between the p set(s) of m sixth signals and the at least one fifth transmission line. The set of at least one second crossconnecting unit $71_1, \ldots 71_p$ each for establishing at least one circuit through which a respective one of the p set(s) of m seventh signals can be inserted into one of m time slots of the p multiplexed the at least one sixth transmission line, in accordance with a correspondence relationship between the p set(s) of m seventh signals and the at least one sixth transmission line. The set of at least one third crossconnecting unit $72_1, \ldots 72_p$ each for establishing at least one circuit through which a respective one of the m seventh signals in each of the p set(s) can be transferred to one input port of one of at least one second multiplexing unit $66_1, \ldots 66_p$ corresponding to the above each of the p set(s). The set of at least one fourth crossconnecting unit $73_1, \ldots 73_p$ each for establishing at least one circuit through which a respective one of the m seventh signals in each of the p set(s) can be transferred to one input port of one of at least one first multiplexing unit $67_1, \ldots 67_p$ corresponding to the above each of the p set(s).

According to the eighth invention, it is possible to access an arbitrary one of the plurality of lower hierarchy level channels contained in the main signal in an arbitrary one of the two directions from each channel in the lower hierarchy level on the tributary side. Namely, it is possible to access an arbitrary one of the plurality of lower hierarchy level channels in the main signal from each channel in the lower hierarchy level on the tributary side, and at the same time to switch (or select) the direction of a signal in one of the plurality of lower hierarchy level channels in the main signal for each of the plurality of lower hierarchy level channels.

Figure 22A:
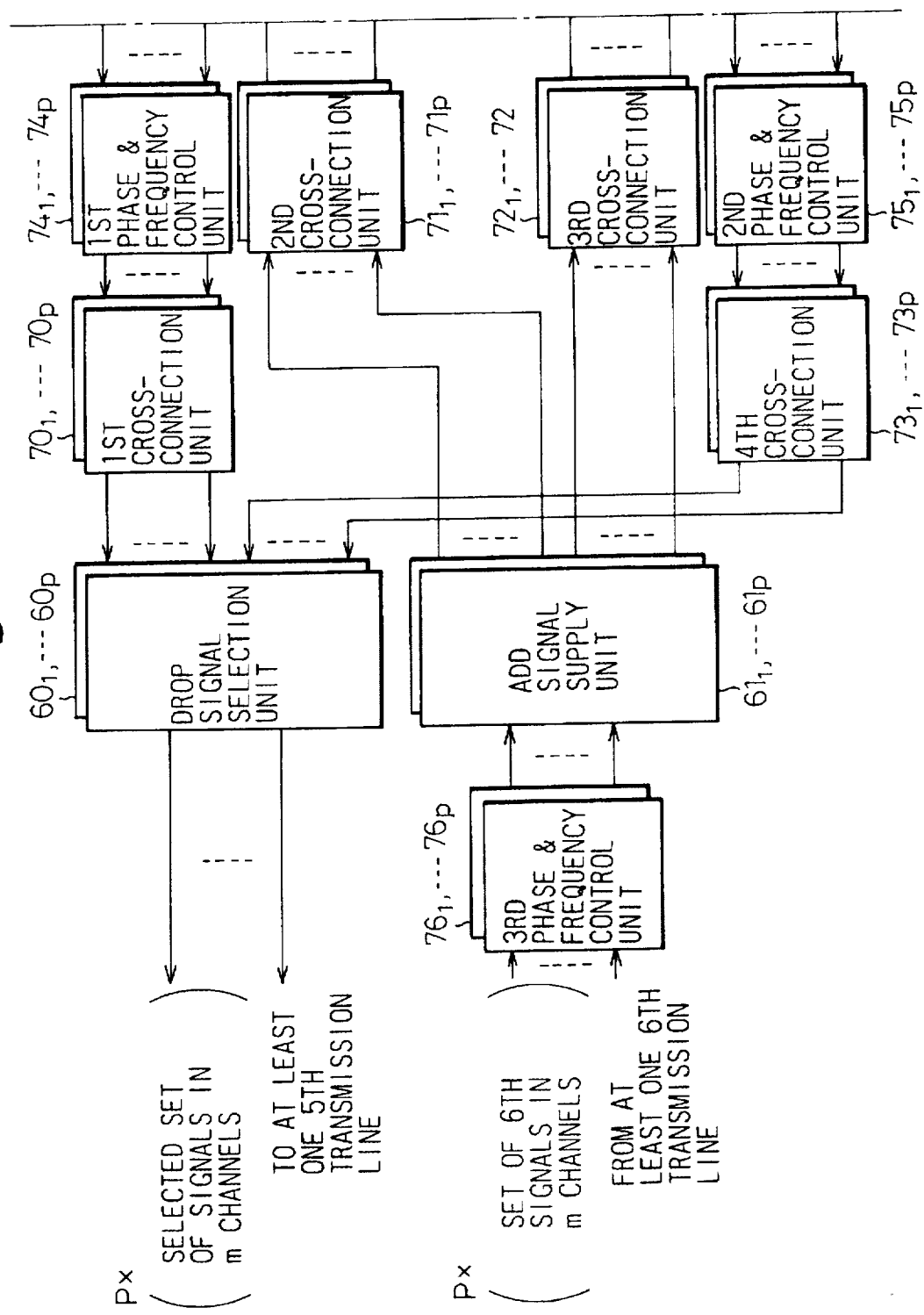
FIGS. 22A and 22B are diagrams illustrating the construction of the second aspect of the eighth invention.
Figure 22B:
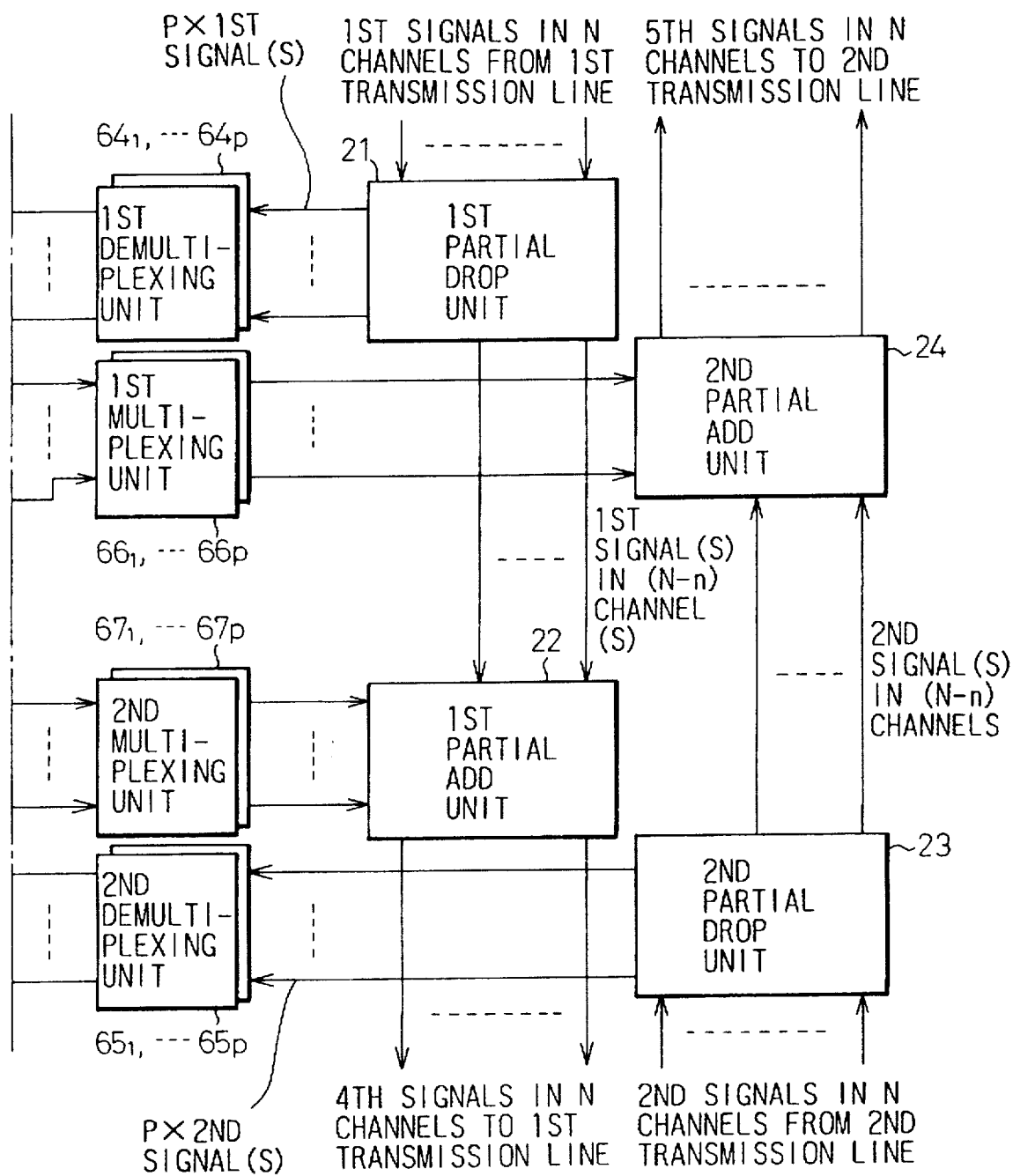

FIGS. 22A and 22B are diagrams illustrating the construction of the second aspect of the eighth invention. In the add-drop multiplexer of FIGS. 22A and 22B, it is assumed that the p set(s) of m sixth signals, the p set(s) of m seventh signals, and the p set(s) of m eighth signals are each contained in a plurality of transmission frames of a predetermined form when being transmitted, and each transmission frame can contain information to be transmitted and pointer information which indicates a phase of the information to be transmitted, in the transmission frame. Therefore, the add-drop multiplexer of FIGS. 22A and 22B contains additional provision for phase and frequency control as in the construction of FIG. 14. Namely, the add-drop multiplexer of FIGS. 22A and 22B contains, in addition to the construction of FIGS. 21A and 21B, a set of at least one first phase and frequency control unit $74_1, \ldots 74_p$, a set of at least one second phase and frequency control unit $75_1, \ldots 75_p$, and a set of at least one third phase and frequency control unit $76_1, \ldots 76_p$. In FIGS. 22A and 22B, the first drop signal selection unit 62 and the first add signal supply unit 63 are not shown, since these portions do not directly relate to the above additional provision for phase and frequency control.

The set of at least one first phase and frequency control unit $74_1, \ldots 74_p$ inserts first information contained in the p set(s) of m sixth signals when the p set(s) of m sixth signals are received, into the plurality of transmission frames to be transmitted, in synchronization with timing of the add-drop multiplexer, obtains second information on a plurality of phases of the first information inserted in the plurality of transmission frames, and inserts the second information on the plurality of phases into the plurality of transmission frames as the pointer information. The set of at least one second phase and frequency control unit $75_1, \ldots 75_p$ inserts third information contained in the p set(s) of m seventh signals when the p set(s) of m seventh signals are received, into the plurality of transmission frames to be transmitted, in synchronization with timing of the add-drop multiplexer, obtains fourth information on a plurality of phases of the third information inserted in the plurality of transmission frames, and inserts the fourth information on the plurality of phases into the plurality of transmission frames as the pointer information. The set of at least one third phase and frequency control unit $76_1, \ldots 76_p$ inserts fifth information contained in the p set(s) of m eighth signals when the p set(s) of m eighth signals are received, into the plurality of transmission frames to be transmitted, in synchronization with timing of the add-drop multiplexer, obtains sixth information on a plurality of phases of the fifth information inserted in the plurality of transmission frames, and inserts the sixth information on the plurality of phases into the plurality of transmission frames as the pointer information.

EXPLANATION OF BASIC CONSTRUCTION OF THE NINTH INVENTION (FIG. 23)

Figure 23:
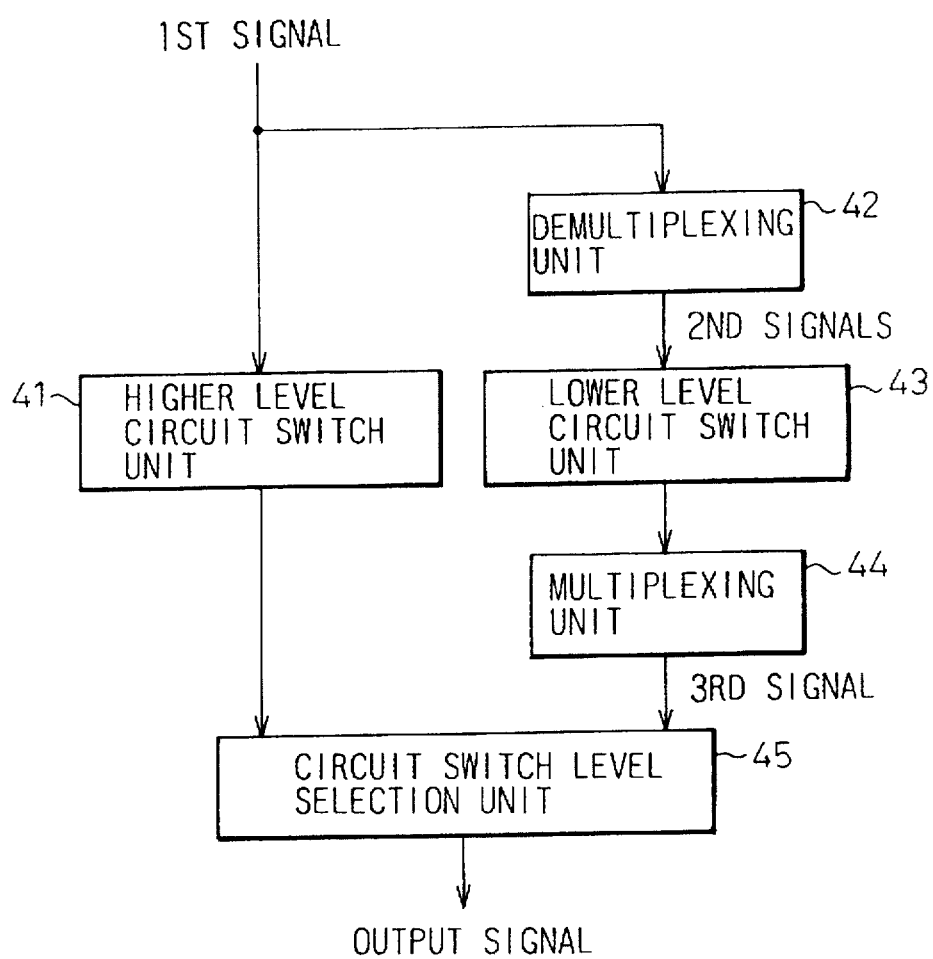
FIG. 23 is a diagram illustrating the construction of the ninth invention.

FIG. 23 is a diagram illustrating the construction of the ninth invention. The ninth invention is applicable to add-drop multiplexers located on a transmission line through which a signal containing a plurality of higher hierarchy level signals is transmitted, and each of the higher hierarchy level signals further contains a multiplexed signal containing a plurality of lower hierarchy level signals.

The add-drop multiplexer according to the ninth invention contains: a higher multiplicity level circuit switching unit 41, a demultiplexing unit 42, a lower multiplicity level circuit switching unit 43, a multiplexing unit 44, and a circuit switching level selecting unit 45. The higher multiplicity level circuit switching unit 41 receives a plurality of first signals at the higher hierarchy level, and exchanges channels of the first signals, where each of the plurality of first signals contains a plurality of second signals at the lower hierarchy level in a multiplexed form. The demultiplexing unit 42 receives at least one of the plurality of first signals, and demultiplexes each of the at least one of the plurality of first signals to obtain the plurality of second signals contained in each first signal. The lower multiplicity level circuit switching unit 43 receives the plurality of second signals which are obtained by the demultiplexing unit 42 for each of the at least one of the plurality of first signals, and exchanges channels of the plurality of second signals, at the lower hierarchy level. The multiplexing unit 44 multiplexes the plurality of second signals for each of the at least one of the plurality of first signals, after the channels of the plurality of second signals are exchanged by the lower multiplicity level circuit switching unit 43, to obtain at least one third signal each of which contains the multiplexed plurality of second signals, where the at least one third signal corresponds to the at least one of the plurality of first signals, respectively. The circuit switching level selecting unit 45 selects one of the at least one of the plurality of first signals after the channels thereof are changed by the higher multiplicity level circuit switching unit 41, and the at least one third signal obtained by the multiplexing unit 44.

According to the ninth invention, it is possible to choose either crossconnecting operations at the higher hierarchy level or at the lower hierarchy level.

EXPLANATION OF BASIC CONSTRUCTION OF THE EIGHTH INVENTION (FIG. 24)

Figure 24:
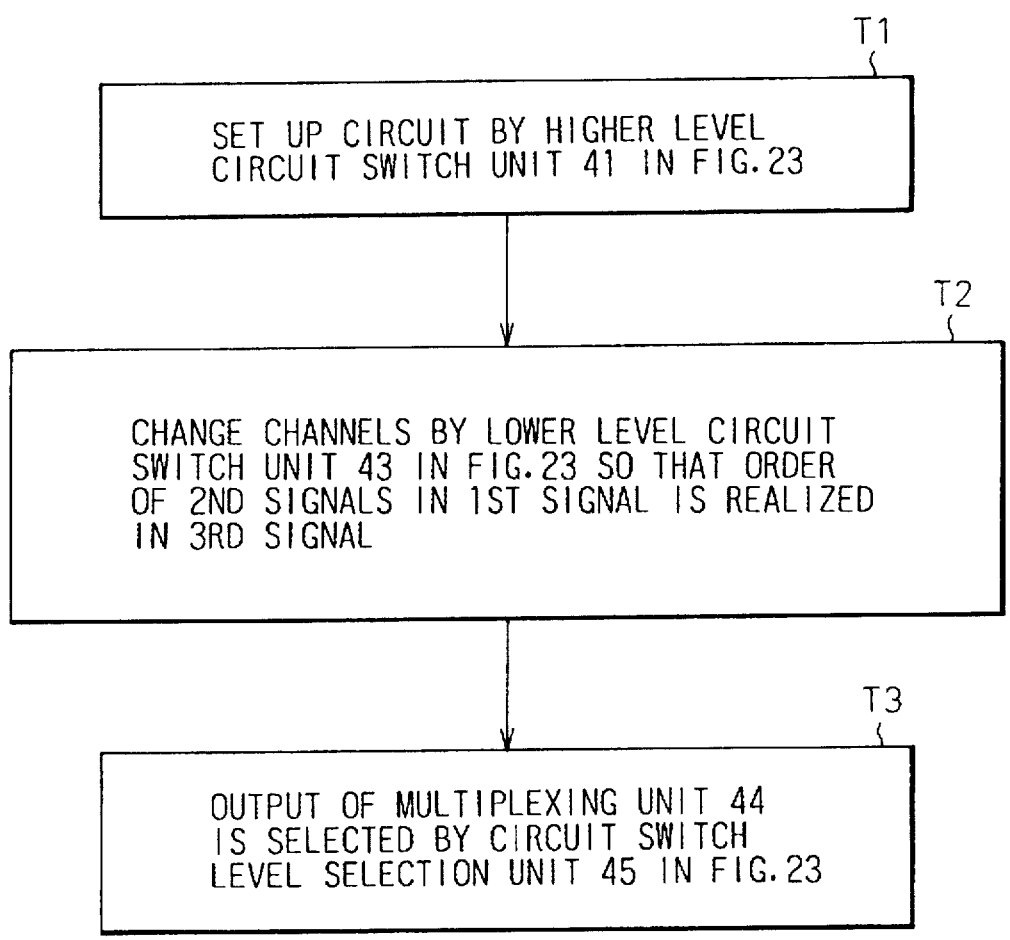
FIG. 24 is a diagram illustrating the basic operation steps in the circuit switching method according to the tenth invention.

FIG. 24 is a diagram illustrating the basic operation steps in the circuit switching method according to the tenth invention. The tenth invention provides a method of changing a level at which circuit switching is performed, from a higher multiplicity level (higher hierarchy level) to a lower multiplicity level (lower hierarchy level), in an add-drop multiplexer having the construction of FIG. 23. According to the method of the tenth invention, in step T1, at least one circuit is established in the above higher multiplicity level circuit switching unit 41. Next, in step T2, channels are exchanged at the level of the plurality of second signals (lower hierarchy level) for the at least one of the plurality of first signals, by the lower multiplicity level circuit switching unit 43, so that an order of the plurality of second signals output from the multiplexing unit 44 is the same as an order of the plurality of second signals contained in the at least one of the plurality of first signals when the plurality of second signals contained in the at least one of the plurality of first signals are output from the higher multiplicity level circuit switching unit 41. Then, in step T3, the output of the multiplexing unit 44 in the circuit switching level selecting unit 45 is selected.

According to the method by the tenth invention, connections (circuit setting) at the level of the plurality of second channels are not changed before and after switching the level of the crossconnecting operations from the level of the plurality of second channels to the level of the plurality of first channels, so that switching of the level of the crossconnecting operations from the level of the plurality of second channels to the level of the plurality of first channels can be performed continuously.

Figure 25:
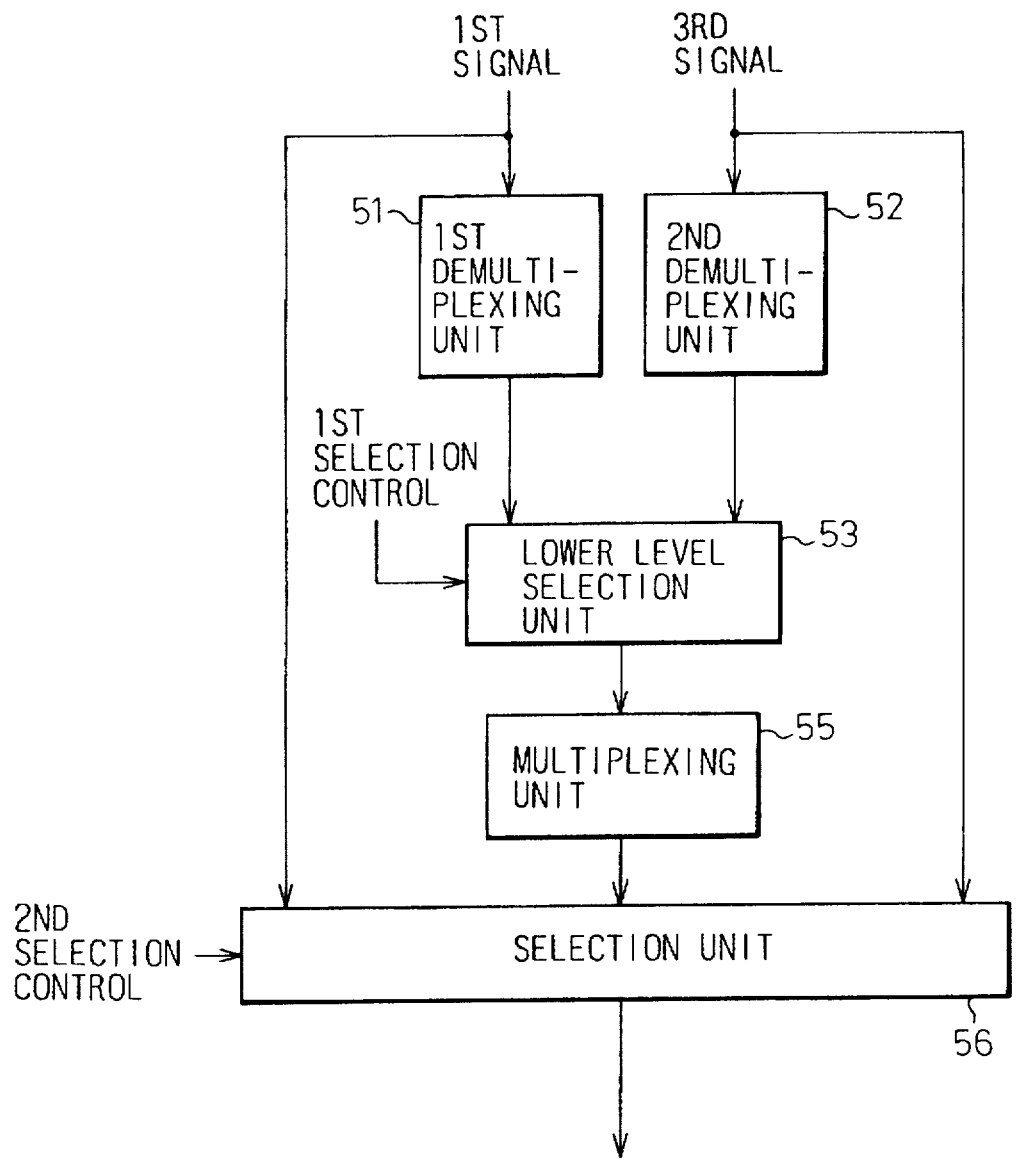
FIG. 25 is a diagram illustrating the construction of the first aspect of the eleventh invention.
Figure 26:
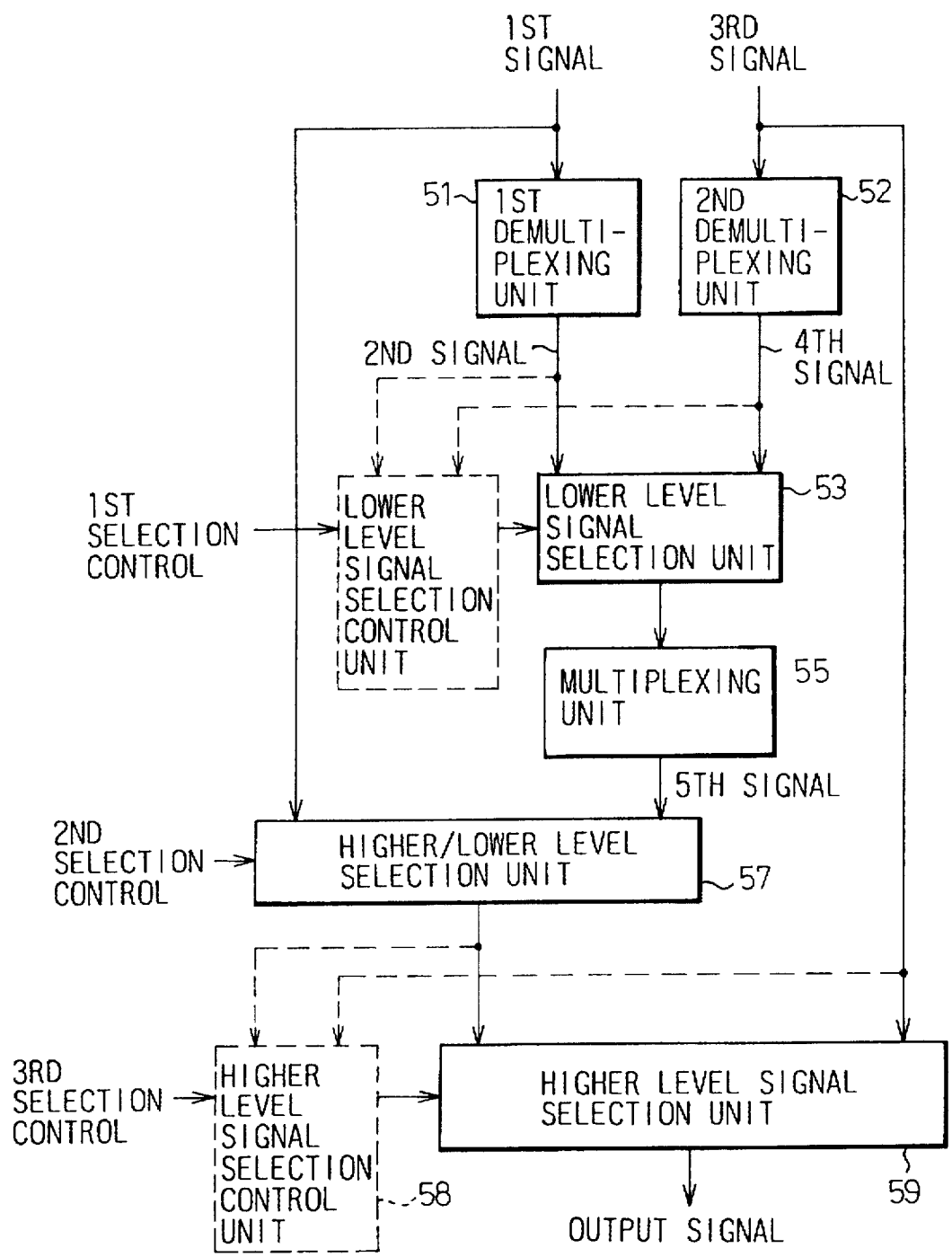
FIG. 26 is a diagram illustrating the construction of the second aspect of the eleventh invention.

EXPLANATIONS OF BASIC CONSTRUCTIONS OF THE ELEVENTH INVENTION (FIGS. 25 and 26)

FIG. 25 is a diagram illustrating the construction of the first aspect of the eleventh invention. The eleventh invention is applicable to add-drop multiplexers located on a bidirectional transmission line through which signals each containing a plurality of higher hierarchy level signals are transmitted in two directions, and each of the higher hierarchy level signals further contains a multiplexed signal containing a plurality of lower hierarchy level signals.

The add-drop multiplexer of FIG. 25 contains: a first demultiplexing unit 51, a second demultiplexing unit 52, a lower multiplicity level signal selecting unit 53, a multiplexing unit 55, and a selecting unit 56. The first demultiplexing unit 51 receives at least one of a plurality of first signals at the higher hierarchy level, and demultiplexes each of the at least one of a plurality of first signals into a plurality of second signals which are contained in each of the at least one of the plurality of first signals and are at the lower hierarchy level. The second demultiplexing unit 52 receives at least one of a plurality of third signals at the higher hierarchy level, corresponding to the at least one of the plurality of first signals, and demultiplexes each of the at least one of the plurality of third signals into a plurality of fourth signals which are contained in each of the at least one of the plurality of third signals and are at the lower hierarchy level. The lower multiplicity level signal selecting unit 53 selects one of the outputs of the first and second demultiplexing units 51 and 52. The multiplexing unit 55 receives the selected one of the outputs of the first and second demultiplexing units 51 and 52, and multiplexes the plurality of second signals in the selected one, to generate at least one fifth signal at the higher hierarchy level, corresponding to the at least one of the plurality of first signals. The selecting unit 56 selects one of the at least one of the plurality of first signals, the at least one of the plurality of third signals, and the at least one fifth signal.

In the add-drop multiplexer according to the eleventh invention, it is possible to choose a level at which operations are performed for selecting the directions of signals transmitted through the bidirectional transmission line (or a pair of transmission lines transmitting signals in opposite directions) between the level of the plurality of first channels and the plurality of second channels.

FIG. 26 is a diagram illustrating the construction of the second aspect of the eleventh invention.

In the add-drop multiplexer of FIG. 26, the selecting unit 56 contains a higher/lower multiplicity level selecting unit 57 and a higher multiplicity level signal selecting unit 59. In addition, the construction of FIG. 26 may further contain a lower multiplicity level signal selection control unit 54 and a higher multiplicity level signal selection control unit 58.

The higher/lower multiplicity level selecting unit 57 selects one of the at least one of the plurality of first signals and the at least one fifth signal, and the higher multiplicity level signal selecting unit 59 selects one of the at least one of the plurality of third signals and the signal selected by the higher/lower multiplicity level selecting unit 57.

Further, the lower multiplicity level signal selection control unit 54 monitors the outputs of the first and second demultiplexing units 51 and 52, and can control the lower multiplicity level signal selecting unit 53 so that the lower multiplicity level signal selecting unit 53 selects the output of a specific one of the first and second demultiplexing units 51 and 52 according to the monitored outputs, and the higher multiplicity level signal selection control unit 58 monitors the at least one third signal and the output of the higher/ lower multiplicity level selecting unit 57, and can control the higher multiplicity level signal selecting unit 59 so that the higher multiplicity level signal selecting unit 59 selects a specific one of the at least one third signal and the output of the higher/lower multiplicity level selecting unit 57), according to the monitored outputs.

Figure 27:
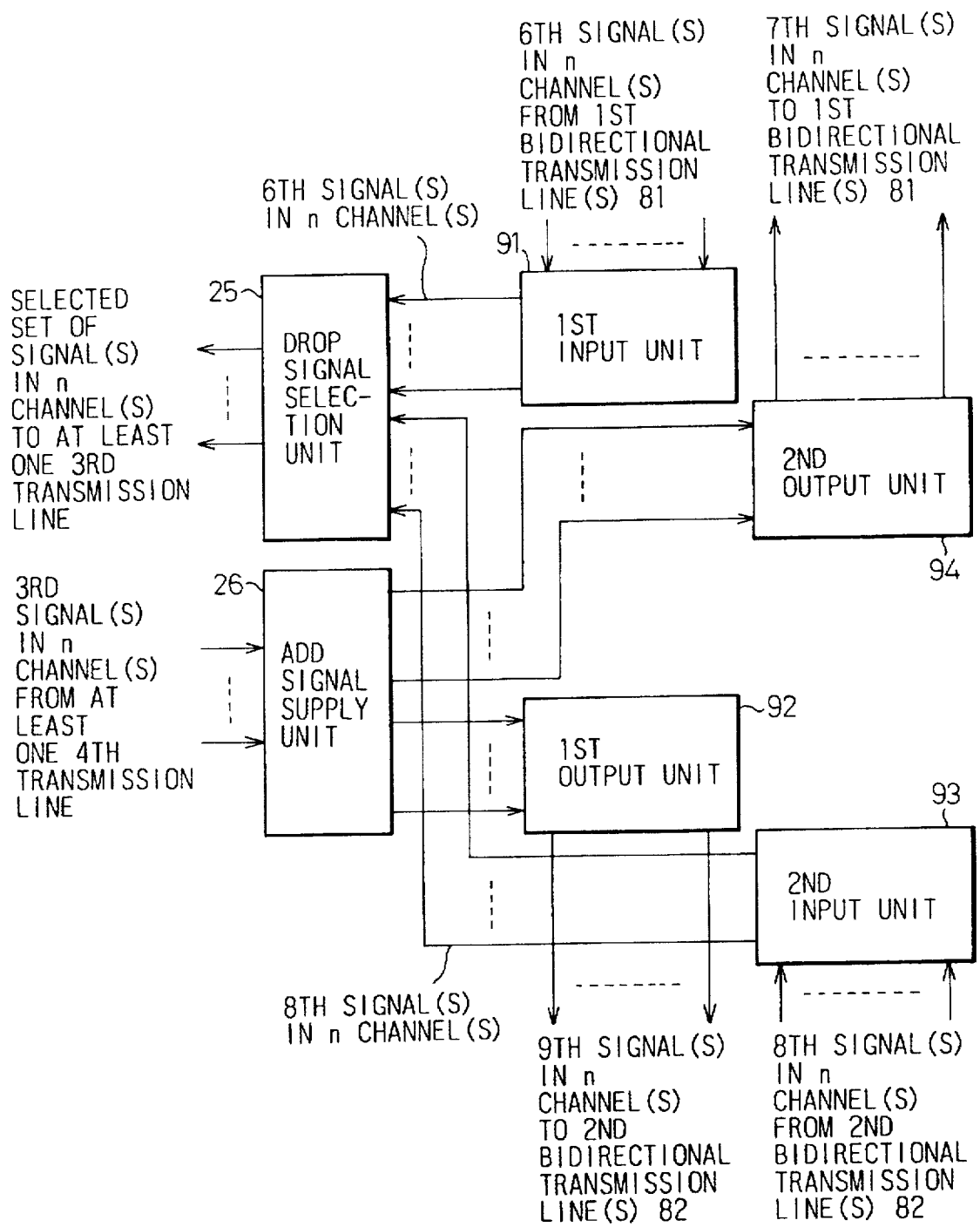
FIG. 27 is a diagram illustrating the construction of the add-drop multiplexer before executing the method according to the twelfth invention.

EXPLANATION OF BASIC PROCESS OF THE TWELFTH INVENTION (FIGS. 27 and 28)

According to the method of the twelfth invention, a transmission capacity of a network element is increased by gradually replacing respective portions of the network element, from a first state to a second state, while maintaining a function of communication with another network element in the network.

The above network element, when the communication network is in the second state, contains a second add-drop multiplexers and two second bidirectional transmission lines connected to the second add-drop multiplexer on first and second sides thereof, respectively, and the second state is the same as the construction of FIG. 17.

The above network element, when the network element is in the first state, contains a first add-drop multiplexer and two first bidirectional transmission lines connected to the first add-drop multiplexer on first and second sides thereof, respectively, and FIG. 27 is a diagram illustrating the above first state of the add-drop multiplexer before executing the method according to the twelfth invention. As indicated in FIG. 27, the above first add-drop multiplexer contains a first signal input unit 91, a first signal output unit 92, a second signal input unit 93, a second signal output unit 94, a drop signal selection unit 25, and an add signal supplying unit 26.

The first signal input unit 91 inputs n sixth signal(s) of n channel(s) from a first one 81 of the first bidirectional transmission lines connected on the first side of the first add-drop multiplexer, where n is an integer satisfying n>0. The first signal output unit 92 outputs n ninth signal(s) of n channel(s) onto the first one 81 of the first bidirectional transmission lines. The second signal input unit 93 inputs n eighth signal(s) of n channel(s) corresponding to the n sixth signal(s), from the second one 82 of the first bidirectional transmission lines connected on the second side of the first add-drop multiplexer. The second signal output unit 94 outputs n seventh signal(s) of n channel(s) corresponding to the n ninth signal(s), onto the second one 82 of the first bidirectional transmission lines. The drop signal selection unit 25 receives the n sixth signal(s) and the n eighth signal(s) as n pair(s) of corresponding signals, and selects one signal from each pair of the n pair(s) of corresponding signals to obtain n selected signal(s) and transmit the n selected signal(s) on the bidirectional tributary transmission line. The add signal supplying unit 26 receives the n third signal(s) of n channel(s) from the bidirectional tributary transmission line, and supplies the n third signal(s) to the first and second signal output units 92 and 94 as the n ninth signal(s) of n channel(s) and the seventh signal(s) of n channel(s), respectively.

Therefore, N signal(s) of N channel(s) is transmitted in each of the two directions in each of the first bidirectional transmission lines in the first state, and N signal(s) of N channel(s) is transmitted in each of the two directions in each of the second bidirectional transmission lines in the second state, where the integers N and n are assumed to satisfy N>n>0. In either of the first and second configurations, a bidirectional tributary transmission line is connected to each of the first and second add-drop multiplexer on the tributary side thereof, and N signal(s) of N channel(s) is transmitted in each of the two directions in each the bidirectional tributary transmission line.

As indicated in FIG. 26, operations in the above method according to the twelfth invention are as follows.

In step S1, the drop signal selection unit 25 in the first state is controlled to select the n eighth signal(s) from the second signal input unit 93, and the add signal supply unit 26 is controlled to supply the n third signal(s) to the first signal output unit 92.

In step S2, the first signal input unit 91 is replaced with the first partial drop unit 21, the second signal input unit 94 is replaced with the second partial drop unit 24, and the first one 81 of the bidirectional transmission lines is replaced with the first one of the second bidirectional transmission lines.

In step S3, the drop signal selection unit 25 is controlled to select the n sixth signal(s) which is supplied by the first partial drop unit 21, and the add signal supply unit 26 is controlled to supply the n third signal(s) to the second partial add unit 24.

In step S4, the second signal input unit 93 is replaced with the second partial drop unit 23, the first signal input unit 94 is replaced with the first partial drop unit 22, and the second one 82 of the bidirectional transmission lines is replaced with the second one of the second bidirectional transmission lines.

In the above operations, during the replacement in step S2, access from the tributary side to the second side of the first bidirectional transmission line is possible through the second signal input unit 93 and the first signal output unit 92, and during the replacement in step S4, access from the tributary side to the first side of the first bidirectional transmission line is possible through the first signal input unit 91 and the second signal output unit 94. According to method of the twelfth invention, it is possible to increase the transmission capacity of (in other words, increase a total transmission rate of or a degree of multiplicity in) the bidirectional transmission line on which each add-drop multiplexer is located, while maintaining a function of communication with another node through a portion of the bidirectional transmission line.

EXPLANATION OF BASIC CONSTRUCTION OF THE THIRTEENTH INVENTION (FIG. 29)

According to the method of the thirteenth invention, a transmission capacity of a communication network is increased by gradually replacing respective portions of the communication network, while maintaining a function of communication from each network element to another network element in the network, even when a portion of the network element is subject to an operation of replacement. By performing the method, the state of the network is changed from a first state to a second state.

The communication network contains a plurality of add-drop multiplexers and a plurality of bidirectional transmission lines connecting between each pair of two adjacent add-drop multiplexers among the plurality of add-drop multiplexers. In the first state, N signal(s) of N channel(s) is transmitted in each of the two directions in each of the bidirectional transmission lines and, in the second state, N signal(s) of N channel(s) is transmitted in each of the two directions in each of the bidirectional transmission lines, where the integers N and n are assumed to satisfy N>n>0. In either of the first and second states, a bidirectional tributary transmission line is connected to each of the add-drop multiplexers on the tributary side thereof, and N signal(s) of N channel(s) is transmitted in each of the two directions in each of the bidirectional tributary transmission lines.

Each add-drop multiplexer, in the first state, has the construction as indicated in FIG. 27, and in the second state, has the construction as indicated in FIG. 17. For describing the operations in the method according to the thirteenth invention, the respective elements in the constructions of FIGS. 27 and 17 are sorted as follows.

The first signal input unit 91 in FIG. 27 and the first partial drop unit 21 in FIG. 17 are sorted into input elements of a first side group; the second signal output unit 94 in FIG. 27 and the second partial add unit 24 in FIG. 17 are sorted into output elements of the first side group; the second signal input unit 93 in FIG. 27 and the second partial drop unit 23 in FIG. 17 are sorted into input elements of a second side group; and the first signal output unit 92 in FIG. 27 and the first partial add unit 22 in FIG. 17 are sorted into output elements of the second side group.

The operations in the above method according to the thirteenth invention are as follows.

In step (S1), in each of two of the add-drop multiplexers located in both ends of one of the plurality of bidirectional transmission lines which is in the first state, the input and output elements of one of the first and second side groups which are located on the opposite side to the side connected to the above one of the plurality of bidirectional transmission lines, are controlled to be connected with the bidirectional tributary transmission line.

In step (S2), in each of the above of two of the add-drop multiplexers, the input and output elements of one of the first and second side groups, are replaced with corresponding elements in the second state, and the above one of the plurality of bidirectional transmission lines is changed from the first state to the second state.

In step (S3), in each of the above two of the add-drop multiplexers, when the input and output elements of the above one of the first and second side groups, are in the second state, the first partial drop unit 21 is connected with the first partial add unit 22 for the above (N-n) sixth signal(s) of (N-n) channels, and connecting the second partial drop unit 23 is connected with the second partial add unit 24 for the above (N-n) eighth signal(s) of (N-n) channels.

In the above operations, during the replacement in step S2, the tributary side is connected to the input and output elements of one of the first and second side groups which are located on the opposite side to the side connected to the above one of the plurality of bidirectional transmission lines, as a result of the operation in step (S1). Therefore, according to method of the thirteenth invention, it is possible to increase a transmission capacity of (in other words, increase a total transmission rate of or a degree of multiplicity in) the bidirectional transmission line on which each add-drop multiplexer is located, while maintaining a function of communication with another node through a portion of the bidirectional transmission line.

EXPLANATION OF BASIC CONSTRUCTION OF THE FOURTEENTH INVENTION (FIG. 30)

Figure 30:
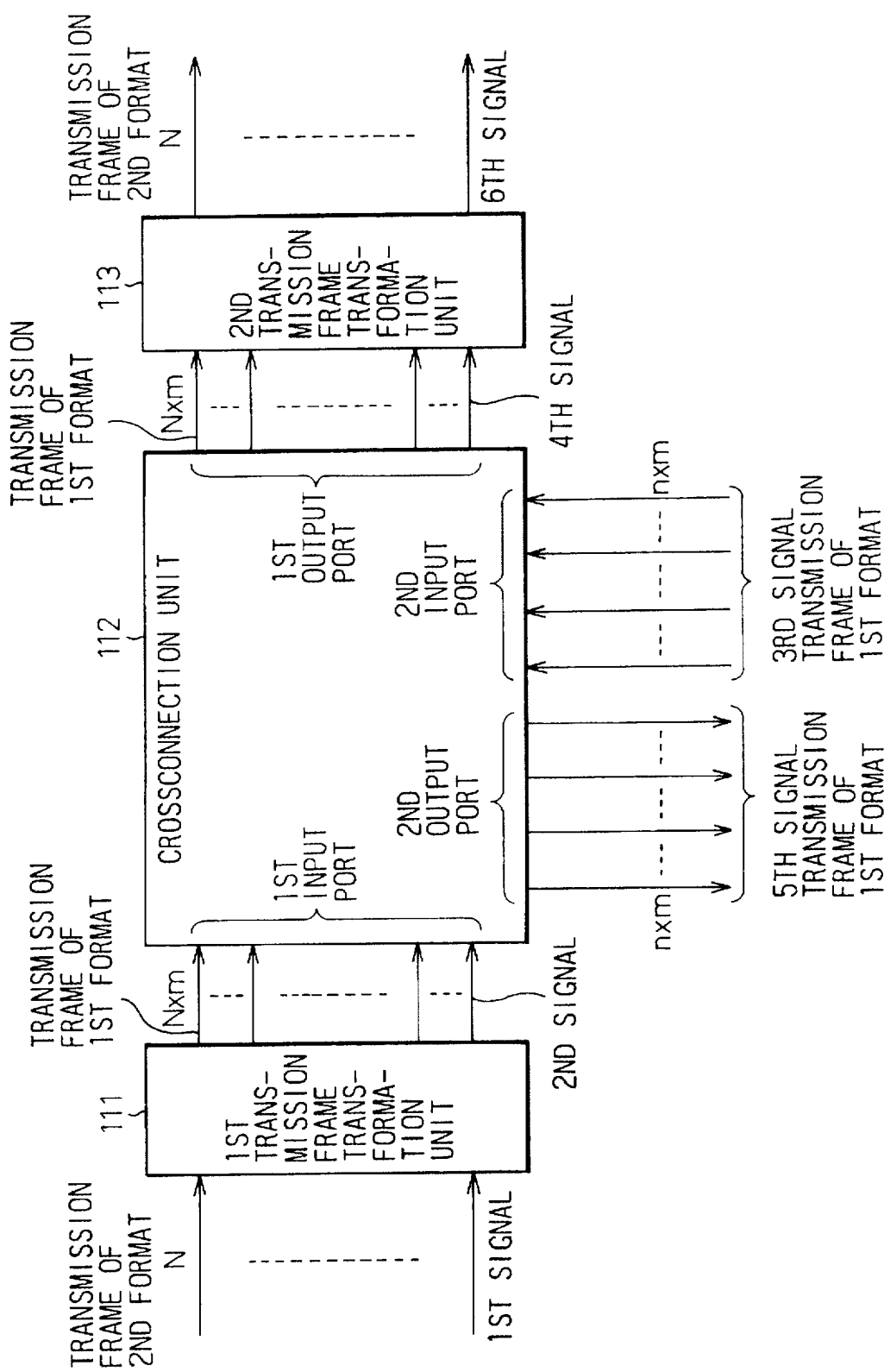
FIG. 30 is a diagram illustrating the construction of the first aspect of the fourteenth invention.

FIG. 30 is a diagram illustrating the construction of the fourteenth invention. The fourteenth invention is applicable to add-drop multiplexers located on a transmission line through which a signal containing a plurality of higher hierarchy level signals is transmitted, and each of the higher hierarchy level signals further contains a multiplexed signal containing a plurality of lower hierarchy level signals.

The add-drop multiplexer of FIG. 30 contains: a first transmission frame transforming unit 111, a crossconnecting unit 112, and a second transmission frame transforming unit 113. The first transmission frame transforming unit 111 transforms each of a plurality of first signals contained in a transmission frame of a first form, to a plurality of second signals each being contained in a transmission frame of a second form, where each transmission frame of the first form contains a plurality of transmission frames of the second form. The crossconnecting unit 112 has a plurality of first input ports for inputting the plurality of second signals obtained for the plurality of first signals by the first transmission frame transforming unit 111, a plurality of second input ports for inputting a plurality of third signals each being contained in a transmission frame of the second form, a plurality of first output ports for outputting a plurality of fourth signals corresponding to the plurality of first signals, where each of the plurality of fourth signals is contained in a transmission frame of the first form, and a plurality of second output ports for outputting a plurality of fifth signals each being contained in a transmission frame of the second form. The above crossconnecting unit 112 can perform circuit switching between the plurality of second and third signals to obtain the plurality of fourth and fifth signals, which are to be output from the first and second output ports, respectively. The second transmission frame transforming unit 113 transforms each of the plurality of fourth signals which are output from the plurality of second output ports, to a plurality of sixth signals each being contained in a transmission frame of the first form.

According to the fourteenth invention, it is possible to perform a crossconnection of signals at the lower hierarchy level or, further, to perform a crossconnection of signals between signals of the above plurality of lower hierarchy level channels contained in different ones of the plurality of higher hierarchy level channels.

EXPLANATION OF BASIC CONSTRUCTION OF THE FIFTEENTH INVENTION (FIG. 31)

Figure 31:
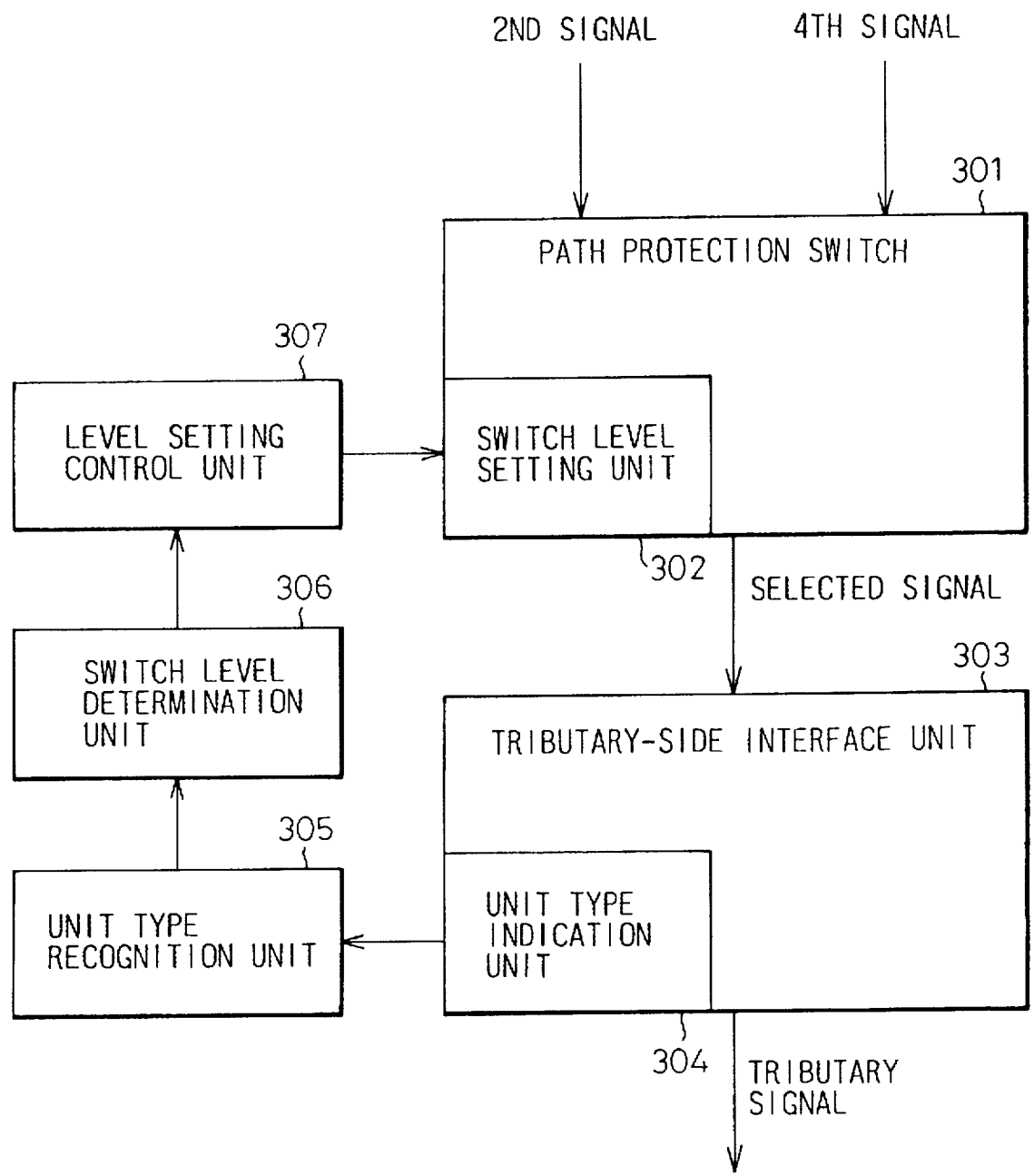
FIG. 31 is a diagram illustrating the basic construction of the fifteenth invention.

FIG. 31 is a diagram illustrating the basic construction of the fifteenth invention. The fifteenth invention is applicable to add-drop multiplexers located on a bidirectional transmission line through which signals each containing a plurality of higher hierarchy level signals are transmitted in two directions, and each of the higher hierarchy level signals further contains a multiplexed signal containing a plurality of lower hierarchy level signals.

The add-drop multiplexer of FIG. 31 contains: a path protection switch 301, a switch level setting unit 302, a tributary-side interface unit 303, a unit type recognizing unit 305, a switch level determining unit 306, and a level setting control unit 307.

The path protection switch 301 simultaneously inputs through first and second input ports thereof a plurality of first signals and a plurality of second signals corresponding to the plurality of first signals, respectively, and selects one of signal inputs from the first and second input ports to output the selected one of the signal inputs. Each of the plurality of first signals is formed by multiplexing a plurality of third signals, each of the plurality of second signals is formed by multiplexing a plurality of fourth signals, each of the first and second signals is contained in a transmission frame of a first form, each of the third and fourth signals is contained in a transmission frame of a second form, and each transmission frame of the first form contains a plurality of transmission frames of the second forms. The operation of selecting one of the signal inputs can be switched at a level of each transmission frame of the first form, or at a level of each transmission frame of the second form.

The switch level setting unit 302 sets the level at which the switching in the path protection switch 301 is performed. The tributary-side interface unit 303 which transforms the signal which is output from the path protection switch 301 into a tributary signal. The above tributary-side interface unit 303 contains a unit type indication unit 304 which indicates a type of the tributary-side interface unit 303. The unit type recognizing unit 305 recognizes the indication of the type of the tributary-side interface unit 303. The switch level determining unit 306 determines, based on the indication, whether the operation of selecting one of the signal inputs should be exchanged at a level of each transmission frame of the first form, or at a level of each transmission frame of the second form. The level setting control unit 307 controls the switch level setting unit 302 based on the determination by the switch level determining unit 306.

According to the fifteenth invention, it is possible to automatically choose, for a level at which operations of crossconnecting channels are performed, one of the higher hierarchy level and the lower hierarchy level, in accordance with the type of an interface connected to the add-drop multiplexers on the tributary side.

EXPLANATION OF BASIC CONSTRUCTION OF THE SIXTEENTH INVENTION (FIG. 32)

Figure 32:
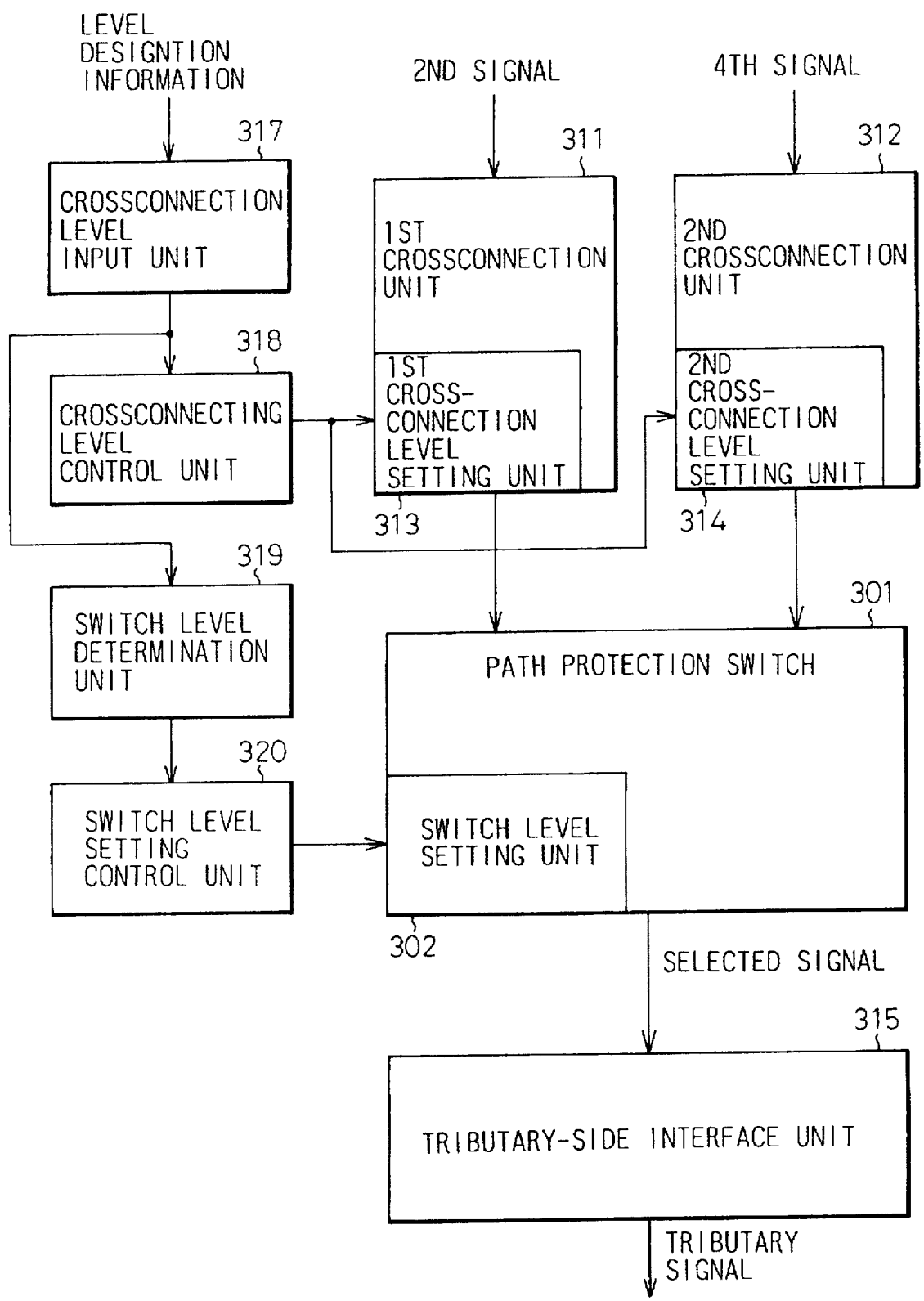
FIG. 32 is a diagram illustrating the basic construction of the sixteenth invention.

FIG. 32 is a diagram illustrating the basic construction of the sixteenth invention. The sixteenth invention is applicable to add-drop multiplexers located on a bidirectional transmission line through which signals each containing a plurality of higher hierarchy level signals are transmitted in two directions, and each of the higher hierarchy level signals further contains a multiplexed signal containing a plurality of lower hierarchy level signals.

The add-drop multiplexer of FIG. 32 contains a first crossconnecting unit 311, a second crossconnecting unit 312, a first crossconnecting level setting unit 313, a second crossconnecting level setting unit 314, a path protection switch 301, a switch level setting unit 302, a tributary-side interface unit 315, a crossconnecting level input unit 317, a crossconnecting level control unit 318, a switch level determining unit 319, and a switch level setting control unit 320.

The first crossconnecting unit 311 inputs a plurality of first signals at the higher hierarchy level, each of which is formed by multiplexing a plurality of second signals at the lower hierarchy level. The first crossconnecting unit 311 exchanges channels at a level of the plurality of first signals, or at a level of the plurality of second signals, where each of the first signals is contained in a transmission frame of a first form, each of the second signals is contained in a transmission frame of a second form, each transmission frames of the first form contains a plurality of transmission frames of the second form, and the mode of the first crossconnecting unit 311 can be set to perform the operation of exchanging channels at one of the higher hierarchy level and the lower hierarchy level.

Similarly, the second crossconnecting unit 312 inputs a plurality of third signals at the higher hierarchy level, each of which is formed by multiplexing a plurality of fourth signals at the lower hierarchy level. The second crossconnecting unit 312 exchanges channels at a level of the plurality of third signals, or at a level of the plurality of fourth signals, where each of the third signals is contained in a transmission frame of the first form, each of the fourth signals is contained in a transmission frame of the second form, and the mode of the second crossconnecting unit 312 can be set to perform the operation of exchanging channels at one of the higher hierarchy level and the lower hierarchy level.

The first crossconnecting level setting unit 313 sets the mode of the first crossconnecting unit 311, so that the first crossconnecting unit 311 performs the operation of exchanging channels at a specific one of the higher hierarchy level and the lower hierarchy level. The second crossconnecting level setting unit 314 sets the mode of the second crossconnecting unit 312, so that the second crossconnecting unit 312 performs the operation of exchanging channels at a specific one of the higher hierarchy level and the lower hierarchy level. The path protection switch 301 simultaneously inputs through first and second input ports thereof the outputs of the first and second crossconnecting units 311 and 312, respectively, and selects one of the outputs of the first and second crossconnecting units 311 and 312 to output the selected one of the outputs of the first and second crossconnecting units 311 and 312. The operation mode of the path protection switch 301 can be set to perform the operation of exchanging channels at one of the higher hierarchy level and the lower hierarchy level. The switch level setting unit 302 sets the operation mode of the path protection switch 301 so that the path protection switch 301 performs the operation of exchanging channels at a specific one of the higher hierarchy level and the lower hierarchy level. The tributary-side interface unit 315 transforms the signal which is output from the path protection switch 301 into a tributary signal. The crossconnecting level input unit 317 inputs information which designates the levels at which the operations of exchanging channels are to be performed in the first and second crossconnecting units 311 and 312, respectively. The crossconnecting level control unit 318 controls the first and second crossconnecting units 311 and 312 based on the information which designates the levels at which the operations of exchanging channels are to be performed in the first and second crossconnecting units 311 and 312, respectively. The switch level determining unit 319 determines the level at which the switching in the path protection switch 301 is to be performed, based on the information which designates the levels at which the operations of exchanging channels are to be performed in the first and second crossconnecting units 311 and 312, respectively. The switch level setting control unit 320 controls the switch level setting unit 302, based on the determination by the switch level determining unit 319.

According to the sixteenth invention, it is possible to automatically adjust the levels at which the operations of crossconnecting signals and selecting directions of signals are performed, in an add-drop multiplexer which can add tributary signals to the above signals in both directions and drop tributary signals from one of the above signals transmitted in a selected one of the two directions, and has a function of choosing a level of operations of crossconnecting signals between the level of the plurality of first channels and the plurality of second channels, and a function of choosing a level of operations of selecting directions of signals in the bidirectional transmission line for access from the tributary side.

Figure 33A:
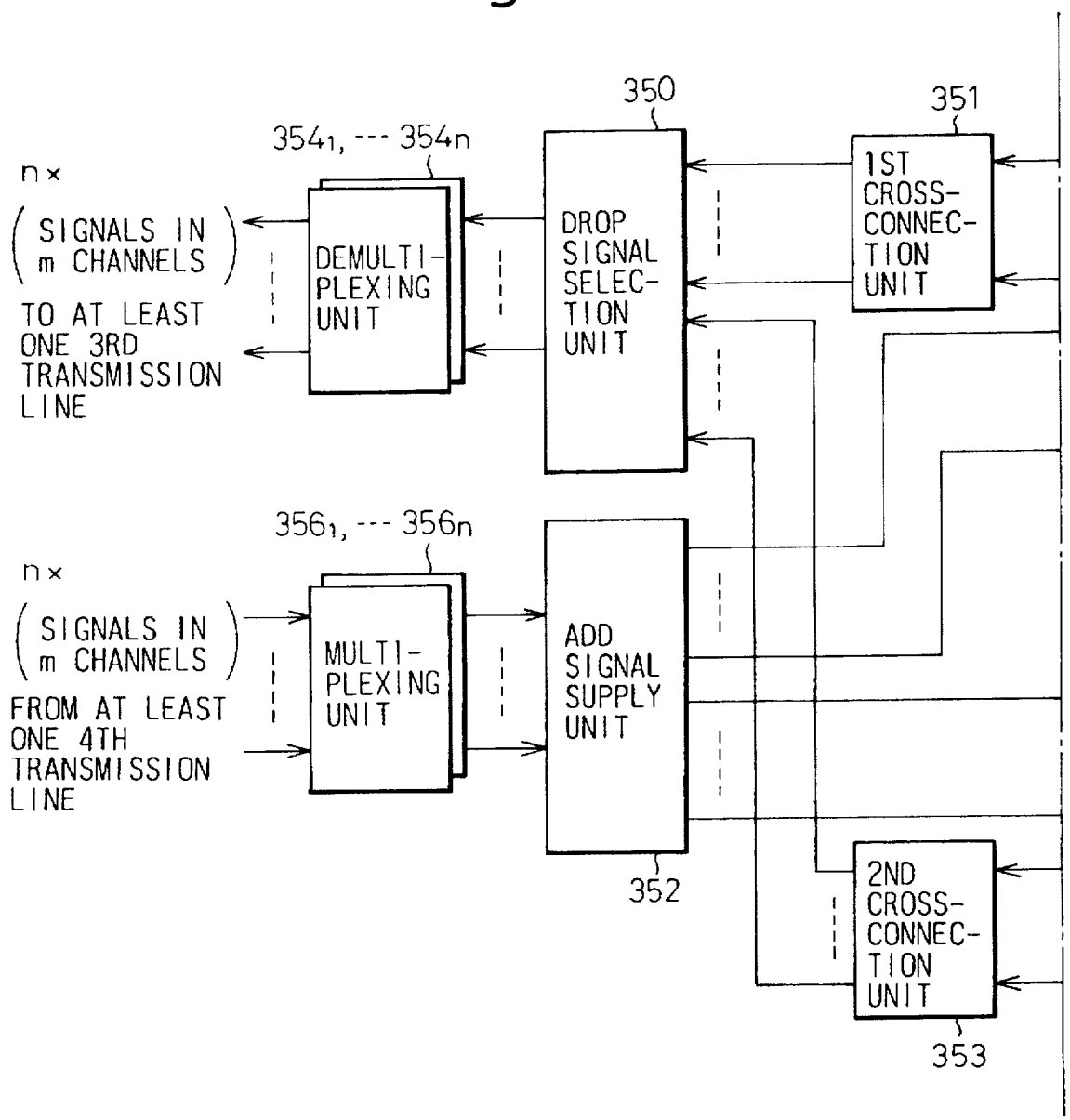
FIGS. 33A and 33B are diagrams illustrating the construction of the first aspect of the seventeenth invention.
Figure 33B:
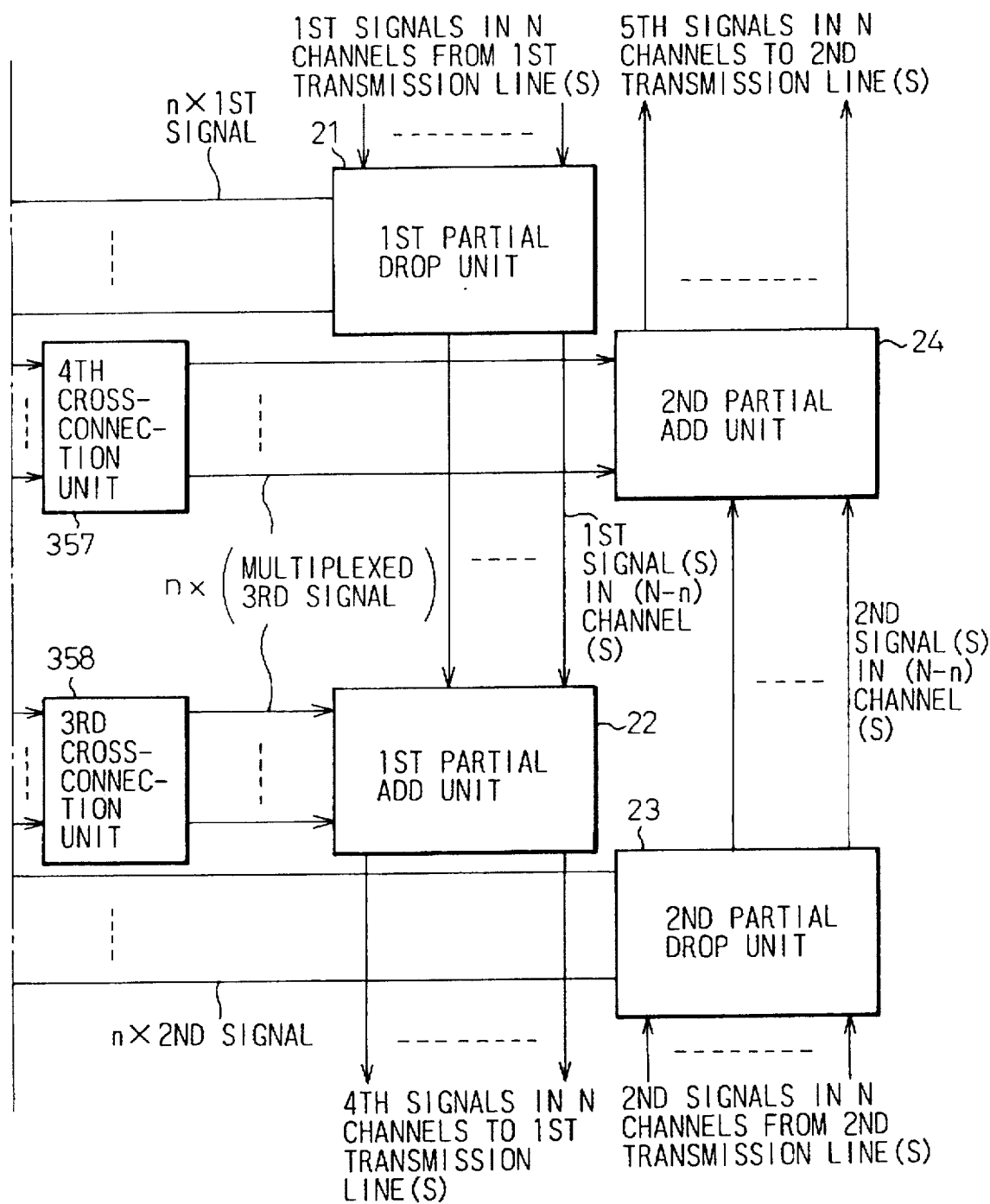

EXPLANATION OF BASIC CONSTRUCTION OF THE SEVENTEENTH INVENTION (FIGS. 33A and 33B)

FIGS. 33A and 33B are diagrams illustrating the construction of the first aspect of the seventeenth invention. The seventeenth invention is applicable to add-drop multiplexers located on a bidirectional transmission line through which signals each containing a plurality of higher hierarchy level signals are transmitted in two directions, and each of the higher hierarchy level signals further contains a multiplexed signal containing a plurality of lower hierarchy level signals.

The add-drop multiplexer of FIGS. 33A and 33B contains: a first partial drop unit 21, a second partial drop unit 23, a first crossconnecting unit 351, a second crossconnecting unit 353, a drop signal selection unit 350, a demultiplexing unit $354_1$ ... $354_n$, a multiplexing unit $356_1$ ... $356_n$, third and fourth crossconnecting units 358 and 357, a first partial add unit 22, and a second partial add unit 24.

The first partial drop unit 21 selects n first signal(s) of n channel(s) among N first signals of N channels, which are received from a first transmission line, and outputs the n first signal(s) of n channel(s), where N and n are integers satisfying N≧n>0. Each of the N first signals contains a signal formed by multiplexing a plurality of lower multiplicity level signals of a plurality of channels. The second partial drop unit 23 selects n second signal(s) of n channel(s) among N second signals of N channels, which are received from a second transmission line and correspond to the n first signal(s), and outputs the n second signal(s) of n channel(s), where each of the N second signals contains a signal formed by multiplexing a plurality of lower multiplicity level signals of a plurality of channels. The first crossconnecting unit 351 exchanges time slots in each of the n first signal(s), in which time slots the plurality of lower multiplicity level signals in each of the n first signal(s) are contained. The second crossconnecting unit 353 exchanges time slots in each of the n second signal(s), in which time slots the plurality of lower multiplicity level signals in each of the n second signal(s) are contained. The drop signal selection unit 350 receives outputs of the first and second crossconnecting units 351 and 353, selects one of the outputs of the first and second crossconnecting units 351 and 353 to output the selected one. The demultiplexing unit $354_1 \ldots 354_n$ demultiplexes the selected one output from the drop signal selection unit 350 to obtain and output n sets of a plurality of lower multiplicity level signals. The multiplexing unit $356_1 \ldots 356_n$ inputs n sets of a plurality of lower multiplicity level signals, and multiplexes the plurality of lower multiplicity level signals in each set to obtain and output n third signal(s) of n channels. The third and fourth crossconnecting units 358, 357 each exchange time slots in each of the n third signal(s), in which time slots the plurality of lower multiplicity level signals in each of the n third signal(s) are contained. The first partial add unit 22 receives the output of the third crossconnecting unit 358), and (N-n) first signal(s) of (N-n) channel(s) among the N first signals of the N channels, which are not selected by the first partial drop unit 21, and transmits on the first transmission line the n third signal(s) and the (N-n) first signal(s) as N fourth signals of N channels. The second partial add unit 24 receives the output of the fourth crossconnecting unit 357), and (N-n) second signal(s) of (N-n) channel(s) among the N second signals of the N channels, which are not selected by the second partial drop unit 23), and transmits on the second transmission line the n third signal(s) and the (N-n) second signal(s) as N fifth signals of N channels.

According to the seventeenth invention, in add-drop multiplexers having a function of crossconnecting signals of the plurality of first channels, functions of demultiplexing the crossconnected signals of the plurality of first channels to supply the same to the tributary side, and a function of selecting directions of the signals in the bidirectional transmission line for access from the tributary side, it is possible to minimizing the size of the circuitry realizing the add-drop multiplexer having the above functions. This advantage will be clearly understood in the embodiment of the seventeenth invention, which is explained later with reference to FIG. 52.

EXPLANATION OF BASIC CONSTRUCTION OF THE SEVENTEENTH INVENTION (FIG. 34)

Figure 34:
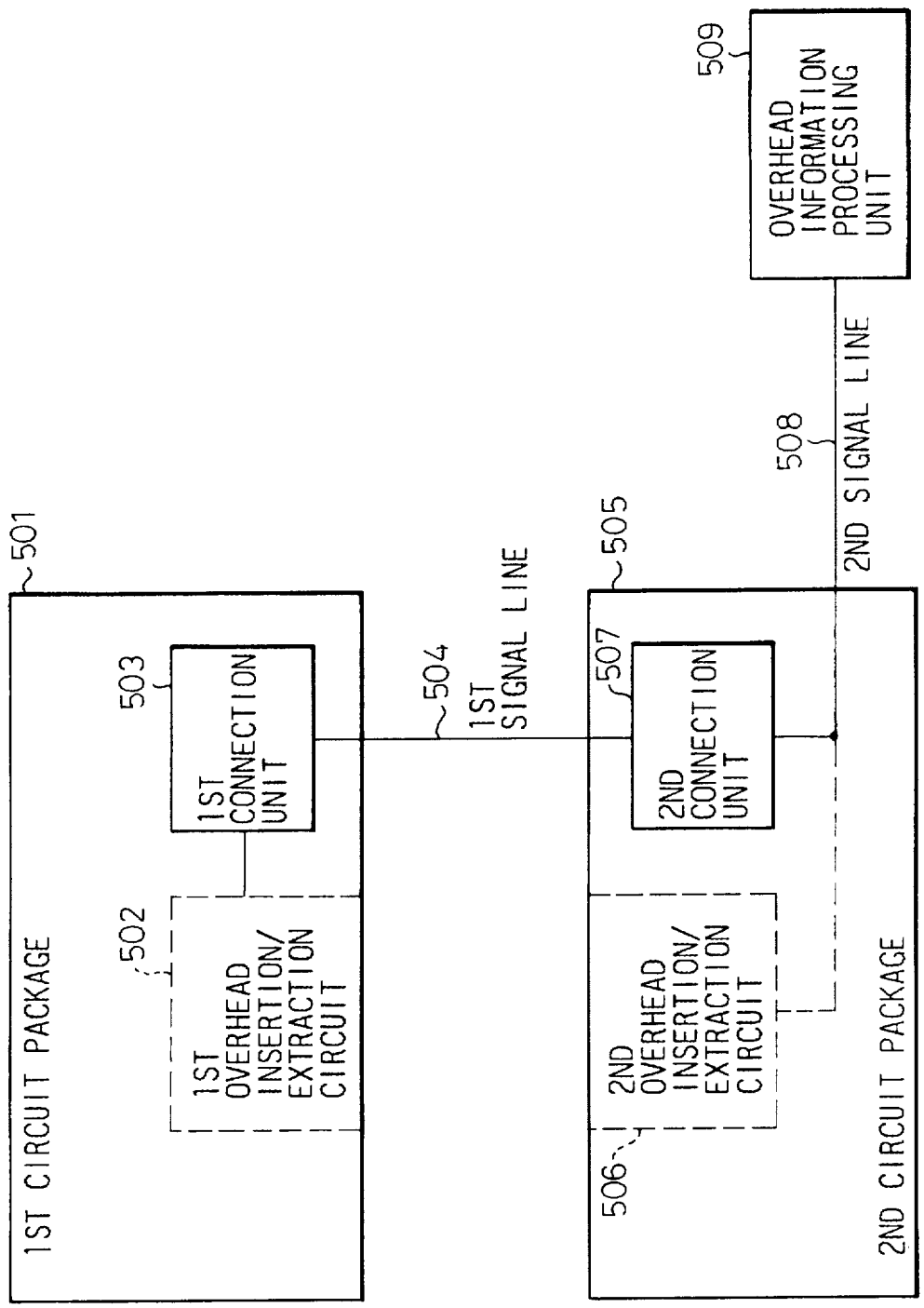
FIG. 34 is a diagram illustrating the construction of the first aspect of the eighteenth invention.

FIG. 34 is a diagram illustrating the construction of a transmission apparatus according to the eighteenth invention. The transmission apparatus according to the eighteenth invention is assumed to be connected to a transmission line through which a signal containing a multiplexed plurality of transmission frames (of a plurality of channels) is transmitted, where the add-drop multiplexer contains a plurality of separate circuit packages respectively containing a plurality of overhead insertion/extraction circuits and an overhead processing unit, respectively.

The transmission apparatus of FIG. 34 contains: a first circuit package 501, a second circuit package 505, a first signal line 504, an overhead information processing unit 509, a second signal line 508, a first connection unit 503, and a second connection unit 507.

The first circuit package 501 can hold thereon at least one first overhead insertion/extraction circuit 502, which inputs a first signal contained in a transmission frame of a first form, extracts overhead information contained in the first signal, and inserts overhead information into a signal to be output, to generate second signal contained in a transmission frame of the first form. The second circuit package 505 can hold thereon at least one second overhead insertion/extraction circuit 506, which inputs a third signal contained in a transmission frame of the first form, extracts overhead information contained in the first signal, and inserts overhead information into a signal to be output, to generate a second signal contained in a transmission frame of the first form. The first signal line 504 connects the first and second circuit packages 501 and 505. The overhead information processing unit 509 processes the overhead information which is extracted from or is to be inserted into the first or third signal in the first and second overhead insertion/extraction circuit 502 and 506. The second signal line 508 connects the overhead information processing unit 509 and the second circuit package 505. The first connection unit 503 connects the first signal line 504 with the first overhead insertion/extraction circuit 502 when the first overhead insertion/extraction circuit 502 is mounted on the first circuit package 501. The second connection unit 507 connects the first signal line 504 with the second signal line 508, in the second circuit package 505 when the first overhead insertion/extraction circuit 502 is mounted on the first circuit package 501.

According to the eighteenth invention, it is possible to minimize signal paths connected between the overhead processing unit and the plurality of overhead insertion/extraction circuits. This advantage will be clearly understood in the embodiment of the eighteenth invention, which is explained later with reference to FIGS. 54 and 55.

EMBODIMENT OF THE FIRST AND SECOND INVENTION (FIG. 35)

Figure 35:
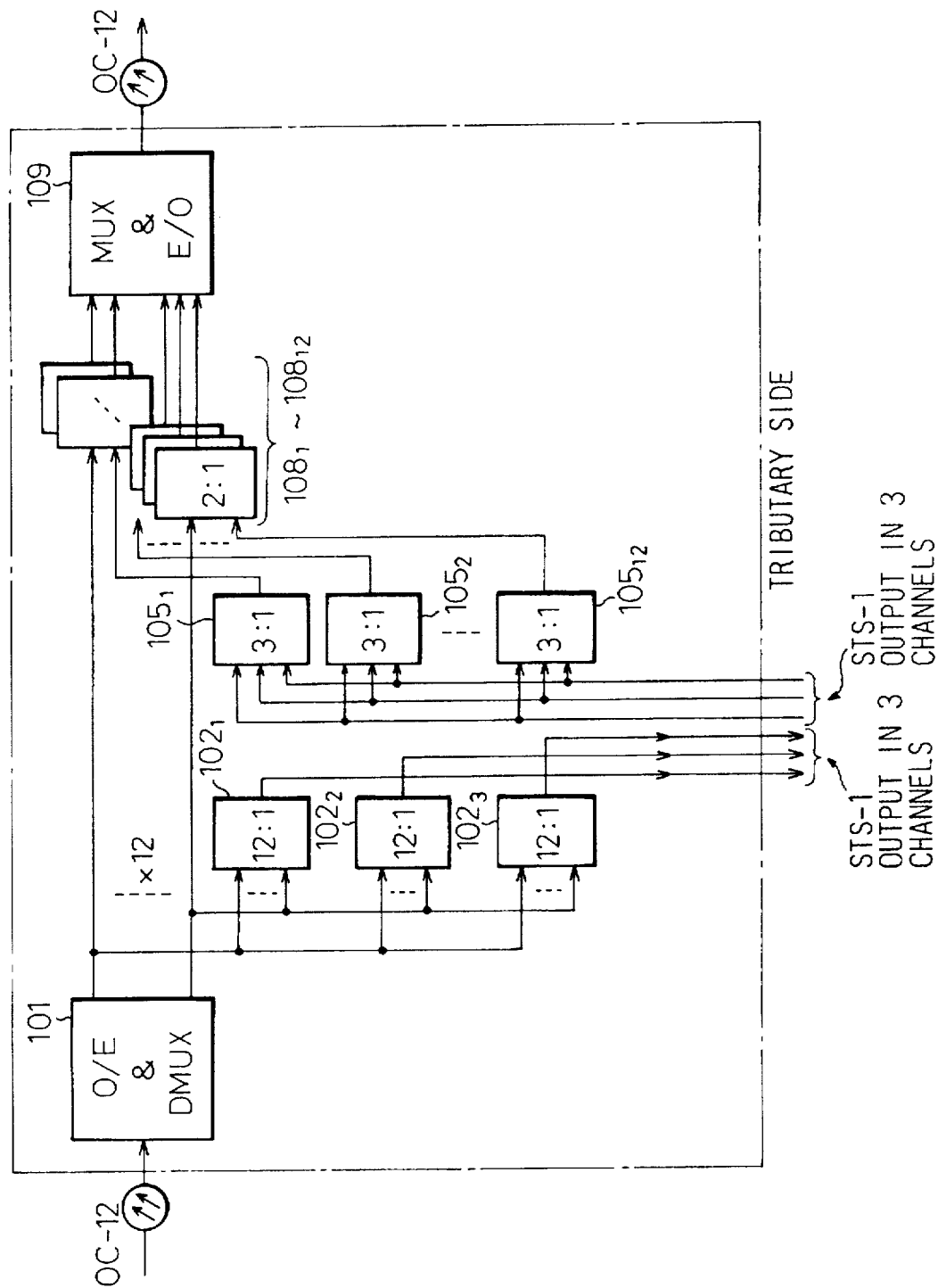
FIG. 35 is a diagram illustrating the construction of an embodiment of the first and the second invention.
Figure 39:
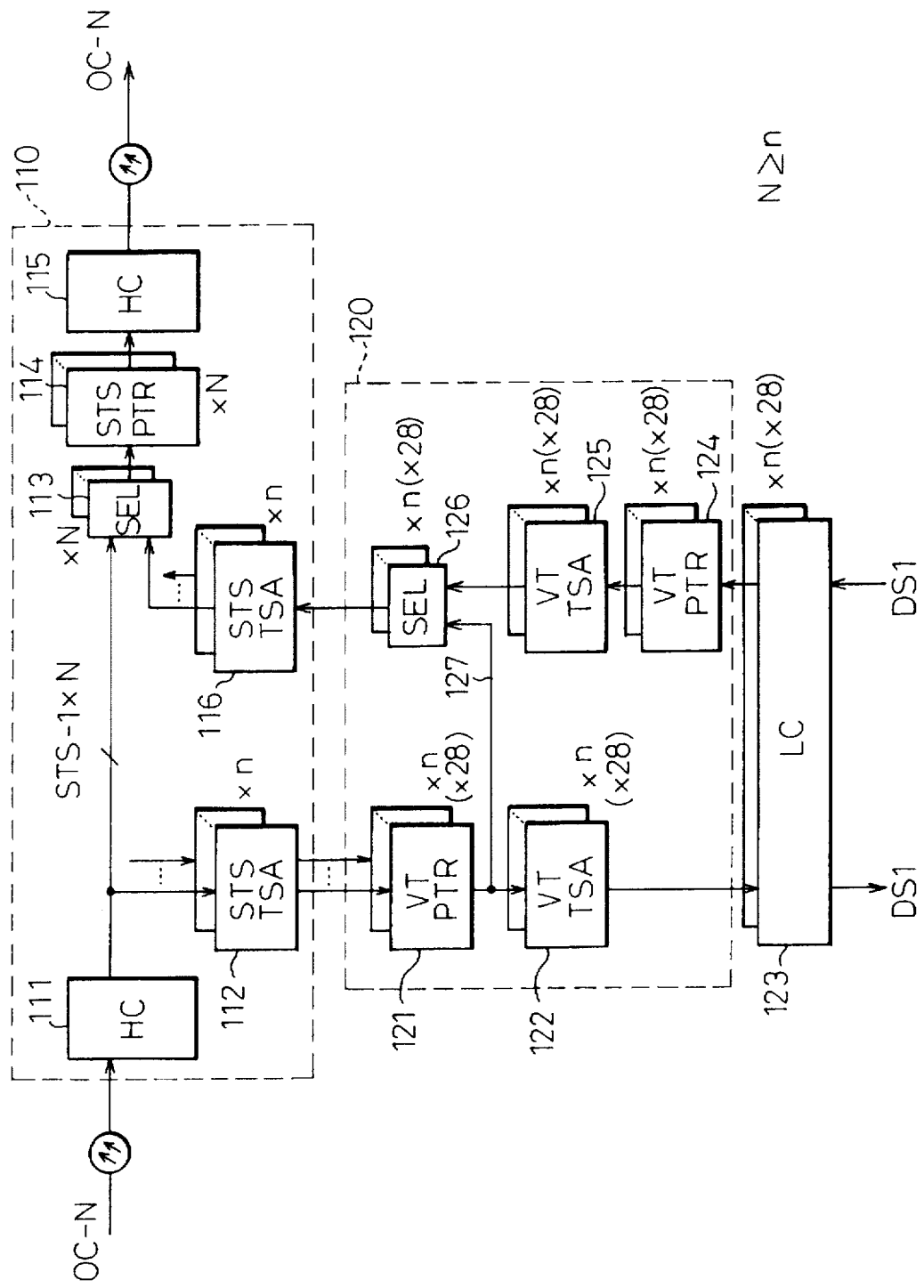
FIG. 39 is a diagram illustrating the construction of an embodiment of the fourth and the fifth invention.

FIG. 35 is a diagram illustrating the construction of an embodiment of the first and the second invention. In FIG. 39, reference numeral 101 denotes a reception unit, $102_1$ to $102_3$ each denote a 2:1 selector, $105_1$ to $105_{12}$ each denote a 3:1 selector, $108_1$ to $108_{12}$ each denote a 2:1 selector, 109 denotes a transmission unit.

The reception unit 101 receives an optical line signal OC-12, converts the OC-12 signal into an electric signal, and demultiplexes the electric signal into twelve STS-1 signals. The 12:1 selectors $102_1$ to $102_3$ are provided corresponding to three tributary channels, and each select one of the twelve STS-1 signals which is to be output (dropped) to the corresponding one of the three tributary channels. The 3:1 selectors $105_1$ to $105_{12}$ are provided corresponding to twelve channels on the line side, and each select one of three STS-1 signals from the tributary side, where the selected one is supplied to a first input terminal of one of the 2:1 selectors $108_1$ to $108_{12}$, which are provided corresponding to twelve channels for the twelve STS-1 signals to be transmitted from the add-drop multiplexer. The 2:1 selectors $108_1$ to $108_{12}$ select one of the above selected one of the three STS-1 signals from the tributary side and one of the twelve STS-1 signals which are received by the reception unit 101, and are directly transferred to second input terminals of the 2:1 selectors $108_1$ to $108_{12}$. Namely, each of the 2:1 selectors $108_1$ to $108_{12}$ selects one of a first STS-1 signal which is to be added from the tributary side, and a second STS-1 signal which is to be passed through the add-drop multiplexer, as an STS-1 signal to be transmitted from one of the twelve channels corresponding to the 2:1 selector. The STS-1 signals selected by the 2:1 selectors $108_1$ to $108_{12}$ are supplied to the transmission unit 109. The transmission unit 109 multiplexes the twelve STS-1 signals, and converts the multiplexed signal into an optical signal OC-12 to be transmitted through the optical transmission line. When realizing the above construction, the direct connections between the reception unit 101 and the transmission unit 109 can be realized by connecting these units by cables or providing wirings on a back plane of a shelf which contains the above construction.

In the construction of FIG. 35, the reception unit 101 and the 12:1 selectors $102_1$ to $102_3$ realize the partial drop unit 1 and the first crossconnecting unit 7 in FIG. 9, the transmission unit 109 and the 2:1 selectors $108_1$ to $108_{12}$ realize the partial add unit 2 in FIG. 9, and the 3:1 selectors $105_1$ to $105_{12}$ realize the second crossconnecting unit 8 in FIG. 9.

Figure 36:
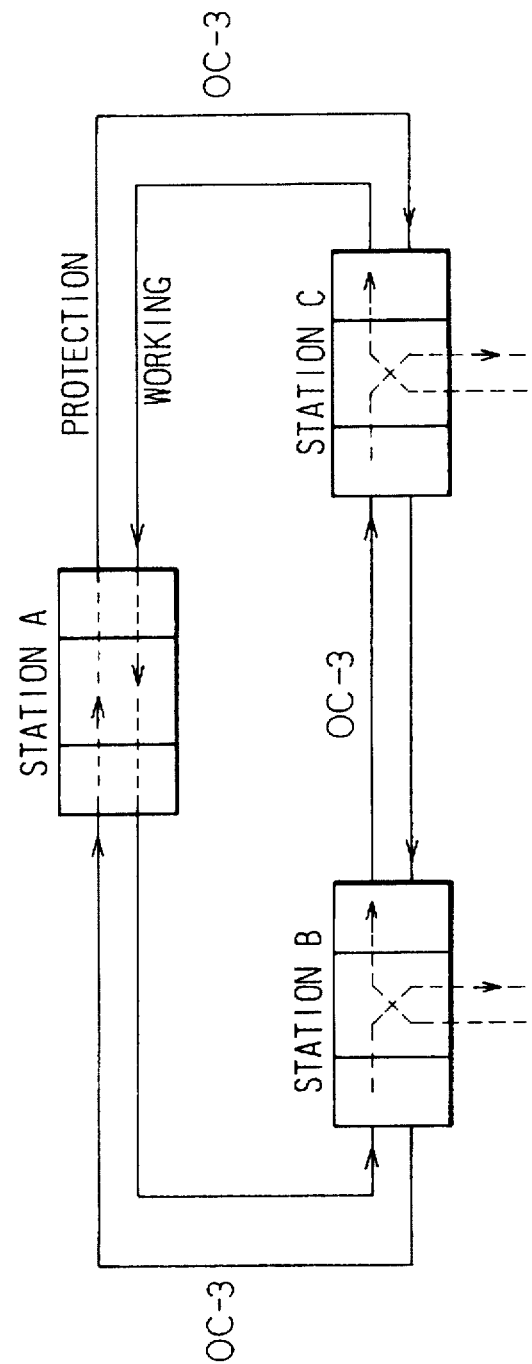
FIG. 36 is a diagram illustrating the construction of the network before the method of the twelfth or the thirteenth invention is applied thereto.
Figure 37:
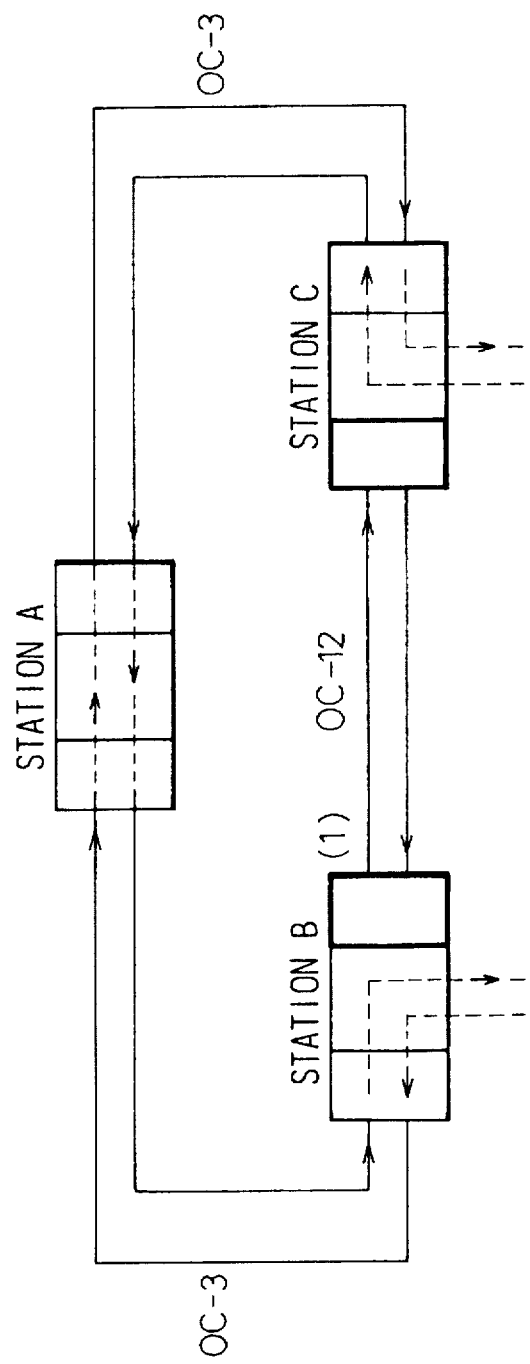
FIG. 37 is a diagram illustrating the construction of the network while the method of the twelfth or the thirteenth invention is applied thereto.
Figure 38:
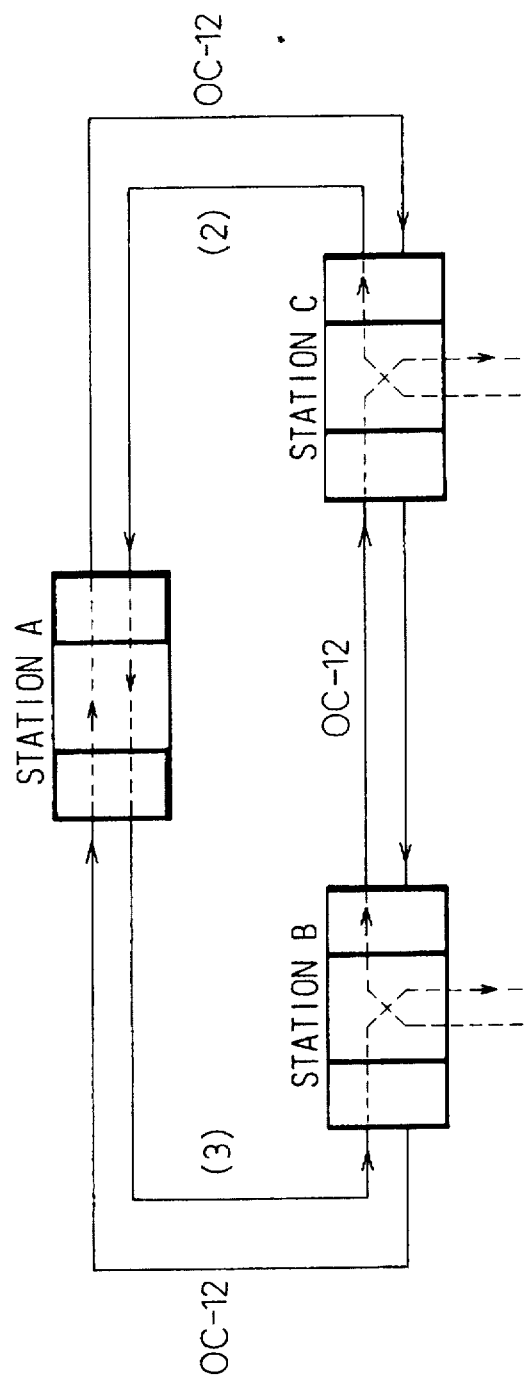
FIG. 38 is a diagram illustrating the construction of the network as a result of- the application thereto of the method of the twelfth or the thirteenth invention.

EMBODIMENT OF THE TWELFTH OR THE THIRTEENTH INVENTIONS (FIGS. 36 to 38)

As embodiments of the twelfth and thirteenth inventions, a process for upgrading an OC-3 path switch ring which is in service, to an OC-12 path switch ring, while maintaining the service, is explained with reference to FIGS. 36 to 38. FIG. 36 shows the construction of an embodiment of the twelfth or the thirteenth invention; FIG. 37 shows the construction of the network when the method of the twelfth or the thirteenth invention is applied thereto; and FIG. 38 shows the construction of the network as a result of the application thereto of the method of the twelfth or the thirteenth invention.

In this embodiment, three transmission stations A, B, and C are connected by a bidirectional transmission line connected in a ring form. Each of the transmission stations A, B, and C is connected to the bidirectional transmission line with an add-drop multiplexer. Normally, one direction of the bidirectional transmission line is used as a working transmission line for transmitting an OC-3 signal, and the other direction can be used as a protection (stand-by) transmission line for transmitting an OC-3 signal.

In the situation indicated in FIGS. 36 to 38, the transmission stations B and C are communicating with each other through their add-drop multiplexers, and signals transmitted on the bidirectional transmission line pass through the add-drop multiplexer at the transmission station A. In the construction of FIG. 36, the add-drop multiplexers at the transmission stations are assumed to have the construction of FIG. 27, and in the construction of FIG. 38, the add-drop multiplexers at the transmission stations have been changed to the construction of FIG. 17.

Figure 29:
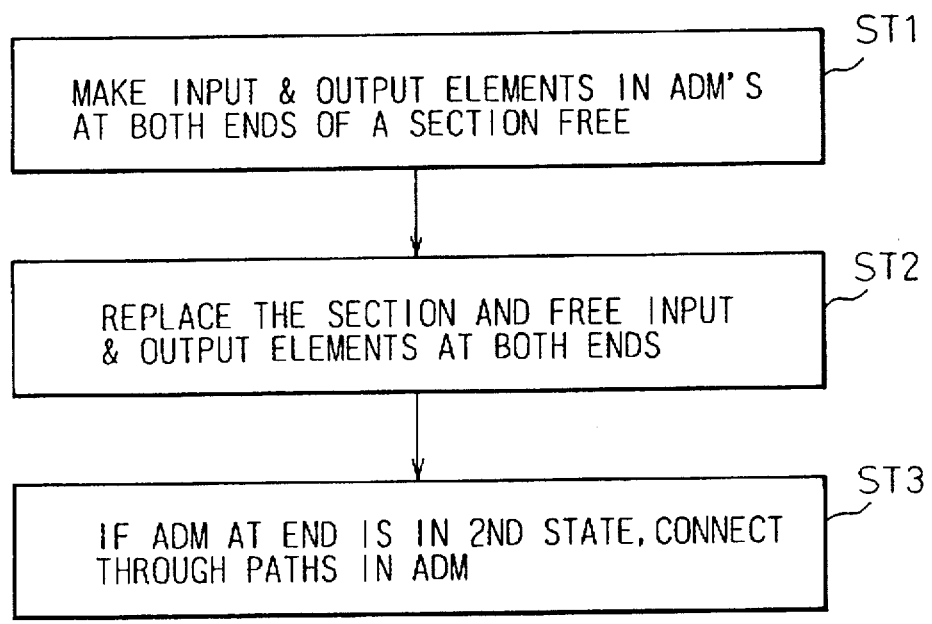
FIG. 29 is a diagram illustrating the basic operation steps in the method for increasing the transmission capacity, according to the thirteenth invention.

In the above process, at first, in the add-drop multiplexers at the transmission stations B and C, the selection in the drop signal selection unit 25 in FIG. 27 is switched so that a section of the bidirectional transmission line connecting the transmission stations B and C is not used for the communication between the transmission stations B and C. This operation corresponds to step S1 in FIG. 28 or step ST1 in FIG. 29.

In this situation, the section of the bidirectional transmission line connecting the transmission stations B and C is replaced with a new bidirectional transmission line for OC-12, and interfacing elements on the side of the section connecting the transmission stations B and C in the add-drop multiplexers at the transmission stations B and C, are changed from the conventional interfacing elements for OC-3 (the first signal input unit 91 and the second signal output unit 94, or the second signal input unit 93 and the first signal output unit 92 in FIG. 27) to the new interfacing elements for OC-12 (the first partial drop unit 21 and the second partial add unit 24, or the second partial drop unit 23 and the first partial add unit 22 in FIG. 17). These operations correspond to step S2 of FIG. 28 or step ST2 of FIG. 29.

Then, the above selection in the drop signal selection unit 25 in FIG. 27 in each of the add-drop multiplexers transmission stations B and C is switched to the opposite side, so that the other sections of the bidirectional transmission line except for the above section of the bidirectional transmission line connecting the transmission stations B and C is not used for the communication between the transmission stations B and C. Thus, the section connecting transmission stations A and B, the section connecting transmission stations C and A, interfacing elements on the side of these sections in the add-drop multiplexers at the transmission stations B and C, and the add-drop multiplexer at the transmission station A become free. This operation corresponds to step S3 in FIG. 28, and step ST1 in FIG. 29.

In the above situation, the section of the bidirectional transmission line connecting transmission stations A and B, and the section of the bidirectional transmission line connecting transmission stations C and A, are replaced with new bidirectional transmission line for OC-12; the above interfacing elements on the side of the above free sections in the add-drop multiplexers at the transmission stations B and C, are changed from the conventional interfacing elements for OC-3 (the first signal input unit 91 and the second signal output unit 94, or the second signal input unit 93 and the first signal output unit 92 in FIG. 27) to the new interfacing elements for OC-12 (the first partial drop unit 21 and the second partial add unit 24, or the second partial drop unit 23 and the first partial add unit 22 in FIG. 17); and the add-drop multiplexer for OC-3 at the transmission station A, is replaced with a new add-drop multiplexer for OC-12 of the construction of FIG. 17. These operations correspond to step S4 of FIG. 28 or step ST2 of FIG. 29. Thus, the construction of FIG. 38 is obtained.

The above operations are possible because respective interfacing elements in the constructions of FIGS. 17 and 27 are independently replaceable.

EMBODIMENT OF THE FIRST TO FOURTH INVENTIONS (FIGS. 39 to 42)

FIG. 39 is a diagram illustrating the construction of an embodiment of the first to fourth inventions. The add-drop multiplexer of FIG. 39 allows access (addition and drop) from a plurality of tributary channels (for example, DS1 channels) to a plurality of higher hierarchy level signals (for example, STS-1 signals) contained in an optical signal OC-N.

In FIG. 39, reference numeral 110 denotes a line unit, 120 denotes a tributary unit. In the line unit 110, 111 denotes an OC-12 line reception interface unit, 112 and 116 each denote an STS (synchronous transport signal) TSA (time slot assignment) unit, 113 denotes a group of selectors for add-or-through selection, 114 denotes an STS PTR control (pointer processing) unit, and 115 denotes an OC-12 line transmission interface unit. In the tributary unit 120, 121 and 124 each denote a VT (virtual tributary) PTR control (pointer processing) unit, 122 and 124 each denote a VT (virtual tributary) TSA (time slot assignment) unit, 123 denotes a tributary interface unit, and 126 denotes a group of selectors for tributary signal add-or-through operations.

The line unit 110 corresponds to the construction of FIG. 35, the OC-12 line reception interface unit 111 receives an OC-12 signal from the optical transmission line, converts the OC-12 signal into an electric signal, and demultiplexes the electric signal into twelve STS-1 signals. The OC-12 line transmission interface unit 115 multiplexes the twelve STS-1 signals, multiplexes and converts the twelve STS-1 signals into an OC-12 signal to be transmitted onto the optical transmission line. The STS TSA unit 112 contains three 12:1 selectors each of which selects one of the twelve STS-1 signals from the line unit 110 to drop the selected one to the tributary side. The STS TSA unit 116 contains twelve 3:1 selectors, each of which selects one of three STS-1 signals to be added, which are output from the tributary unit 120. The twelve 3:1 selectors correspond to twelve STS-1 signals contained in the OC-12 signal to be transmitted from the add-drop multiplexer. The group of selectors for add-or-through selection 113 contains twelve 2:1 selectors, each of which selects one of one of the twelve STS-1 signals output from the OC-12 line reception interface unit 111 and the STS-1 signal to be added, which is output from the tributary unit 120. The STS PTR control unit 114 obtains pointer information to be inserted into a frame of an STS-1 signal to be transmitted, based on the phase of a frame of the STS-1 signal input thereto, the pointer information (value) in the input STS-1 signal, and the phase of a frame of the STS-1 signal to be transmitted from the add-drop multiplexer. The pointer information indicates the top position (phase) in each frame of an STS-1 signal, of service information (of a service unit) to be conveyed in the STS-1 signal through the communication network. The service unit is, for example, a VT1.5 signal. The pointer information is inserted into a predetermined location in an overhead area in each frame of the STS-1 signal. In addition, when the frequency of the input STS-1 signal is different from the frequency of the STS-1 signal to be transmitted from the add-drop multiplexer, the STS PTR control unit 114 performs stuffing and destuffing control by using a byte which is provided in a predetermined location in the overhead area in each frame of the STS-1 signal to be transmitted. The STS PTR control unit 114 corresponds to the phase and frequency control unit 5 in the constructions of FIGS. 3, 4, 6, 7, etc.

Although not shown, an STS signal termination unit may be provided between the line unit 110 and the tributary unit 120, to terminate the STS-1 signal, and demultiplex the STS SPE (synchronous payload envelope) of each STS-1 signal which contains a plurality of VT signals, into the plurality of VT signals to be supplied to the tributary unit 120 in parallel (or serially). In addition, an STS signal generation unit may be provided between the tributary unit 120 and the line unit 110, to contain a plurality of VT signals supplied in parallel (or serially) from the tributary unit 120, in the STS SPE of each STS-1 signal, and supply the STS SPE to line unit 110.

In the tributary unit 120, the VT PTR control unit 121 obtains pointer information to be inserted into a frame of a VT signal to be handled in the add-drop multiplexer, based on the phase of a frame of the VT signal input thereto, the pointer information (value) in the input VT signal, and the phase of the frame of the VT signal to be handled in the add-drop multiplexer. The pointer information indicates the top position (phase) in each frame of a VT signal, of service information (of a service unit) to be conveyed in the VT signal through the communication network. The pointer information is inserted into a predetermined location in each frame of the VT signal. In addition, when the frequency of the input VT signal is different from the frequency of the VT signal to be handled in the add-drop multiplexer, the STS PTR control unit 114 performs stuffing and destuffing control by using a byte which is provided in a predetermined location in each frame of the VT signal to be handled. The VT PTR control unit 121 corresponds to the first phase and frequency control unit 15 in the constructions of FIGS. 14 and 16.

The VT TSA unit 122 is provided for exchanging channels among a plurality of VT signals. The VT TSA unit 122 corresponds to the first crossconnection unit 13 in FIGS. 13 and 14. The tributary interface unit 123 terminates the plurality of VT signals whose channels are exchanged by the VT TSA unit 122, and transforms the VT signals into, for example, DS1 signals, which are output onto tributary-side transmission lines. In addition, the tributary interface unit 123 receives tributary signals such as DS1 signals, from the tributary-side transmission lines, to generate a VT signals (containing the tributary signals in a frame of a VT signal) and supply the VT signals to the VT pointer control unit 124.

The VT pointer control unit 124 obtains pointer information to be inserted into a frame of a VT signal to be handled in the add-drop multiplexer, based on the phase of a frame of the VT signal input thereto from the tributary interface unit 123, the pointer information (value) in the input VT signal, and the phase of the frame of the VT signal to be handled in the add-drop multiplexer. The pointer information indicates the top position (phase) in each frame of a VT signal, of service information (of a service unit) to be conveyed in the VT signal through the communication network. The pointer information is inserted into a predetermined location in each frame of the VT signal. In addition, when the frequency of the input VT signal is different from the frequency of the VT signal to be handled in the add-drop multiplexer, the STS PTR control unit 114 performs stuffing and destuffing control by using a byte which is provided in a predetermined location in each frame of the VT signal to be handled. The VT PTR control unit 124 corresponds to the second phase and frequency control unit 16 in the constructions of FIGS. 14 and 16.

The VT TSA unit 125 is provided for exchanging channels among a plurality of VT signals which are supplied from the VT PTR control unit 124. The VT TSA unit 125 corresponds to the second crossconnection unit 14 in FIGS. 13 and 14.

The group of selectors for tributary signal add-or-through selection 126 selects, for each channel, one of a VT signal which is directly supplied from the VT pointer control unit 121 through the through path 127, and a VT signal supplied from the VT TSA unit 125, to output the selected one to the line unit 110. This construction containing the through path 127 corresponds to the through connection unit 19 in the construction of FIGS. 15 and 16.

Figure 40:
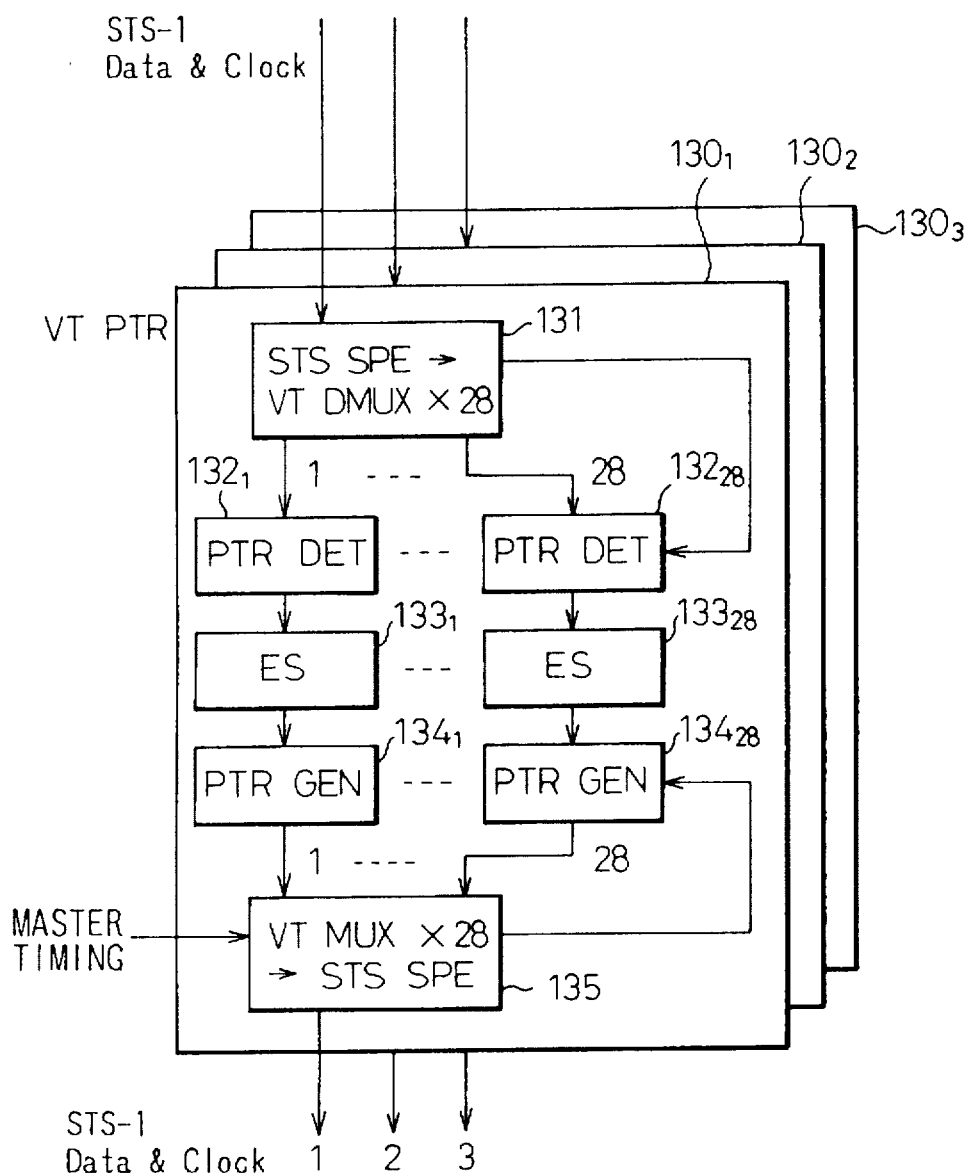
FIG. 40 is a diagram illustrating an example construction of the VT PTR control unit.

FIG. 40 is a diagram illustrating an example construction of the VT PTR control unit.

In FIG. 40, reference numeral 131 denotes a demultiplex unit, $132_1$ to $132_{28}$ each denote a pointer detection unit, $133_1$ to $133_{28}$ each denote elastic storage, $134_1$ to $134_{28}$ each denote a pointer generation unit, and 135 denotes a multiplex unit. The demultiplex unit 131, when a plurality of VT signals, contained in an STS SPE, are supplied thereto, demultiplexes the STS SPE into the plurality of VT signals. When the plurality of VT signals are supplied thereto in parallel, the demultiplex unit 131 is unnecessary. The multiplex unit 135, when a plurality of VT signals, contained in an STS SPE, are output therefrom, multiplexes the plurality of VT signals to generate the STS SPE. When the plurality of VT signals are output in parallel, the multiplex unit 135 is unnecessary. The pointer detection units $132_1$ to $132_{28}$ each detect and extract pointer information (for example, V1 to V5 bytes) in each VT signal. Since each STS-1 signal contains twenty-eight VT1.5 signals, twenty-eight pointer detection units are provided. The pointer information extracted by each pointer detection unit is stored in a corresponding one of the elastic storages $133_1$ to $133_{28}$. The pointer generation units $134_1$ to $134_{28}$ obtain pointer information to be written in each VT signal. In addition, the aforementioned stuffing and destuffing control may be performed. The construction as above is provided for each of the three STS-1 signals, as indicated by reference numerals $130_1$ to $130_3$ in FIG. 40.

Figure 41:
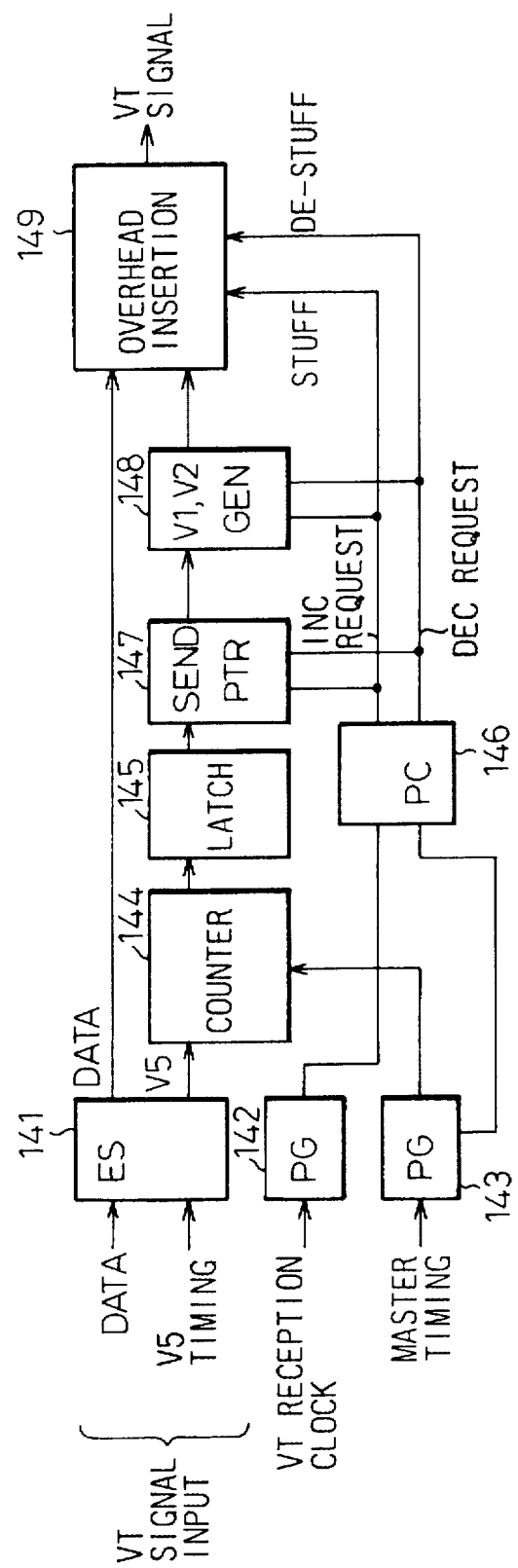
FIG. 41 is a diagram illustrating an example construction of the pointer generation unit in FIG. 40.

FIG. 41 is a diagram illustrating an example construction of each of the pointer generation units $134_1$ to $134_{28}$ in FIG. 40.

In FIG. 41, reference numeral 141 denotes elastic storage which sequentially outputs a portion of each input VT signal, other than the V5 byte in the input VT signal, and also outputs a signal which indicates the timing of the V5 byte in the input VT signal. Reference numeral 142 denotes a pulse generation circuit which generates a clock signal which is synchronized with the input VT signal. 143 denotes a pulse generation circuit which generates a master clock signal, which determines the top phase of each VT signal generated in the add-drop multiplexer, and a clock signal which is synchronized with the master clock signal. 144 denotes a counter which detects a time elapsed from the timing of the master clock signal to the time at which the elastic storage 141 outputs the signal indicating the timing of the V5 byte. 145 denotes a latch circuit which latches the output of the counter 144, and 146 denotes a phase comparison circuit which detects a phase difference between the clock signals output from the two pulse generation circuits 142 and 143, and outputs an increment request signal or an decrement request signal for performing stuffing control or destuffing control according to the phase difference.

Reference numeral 147 denotes a transmission pointer calculation unit, which obtains a pointer value to be written in the V1 and V2 bytes in the VT signal handled in the add-drop multiplexer, based on the above timing of the V5 byte, which is latched in the above latch circuit 145, i.e., information on the phase of the V5 byte in the VT signal to be processed in the add-drop multiplexer, and the above increment request signal or decrement request signal. The pointer value which is to be written in the V1 and V2 byte, increments the above information on the phase of the V5 byte in response to the increment request signal, and decrements the above information on the phase of the V5 byte in response to the decrement request signal. Reference numeral 148 denotes a transmission pointer generation unit which generates the V1 and V2 bytes so that the V1 and V2 bytes indicate the above pointer value obtained by the transmission pointer calculation unit 147. Reference numeral 149 denotes an overhead insertion unit, which inserts the above V1 and V2 bytes into a data portion of a VT signal which is output from the elastic storage 141, and performs stuffing and destuffing control by inserting a stuff byte or destuffing one byte in response to the above increment request signal or decrement request signal, to generate a VT signal to be transmitted.

Figure 42:
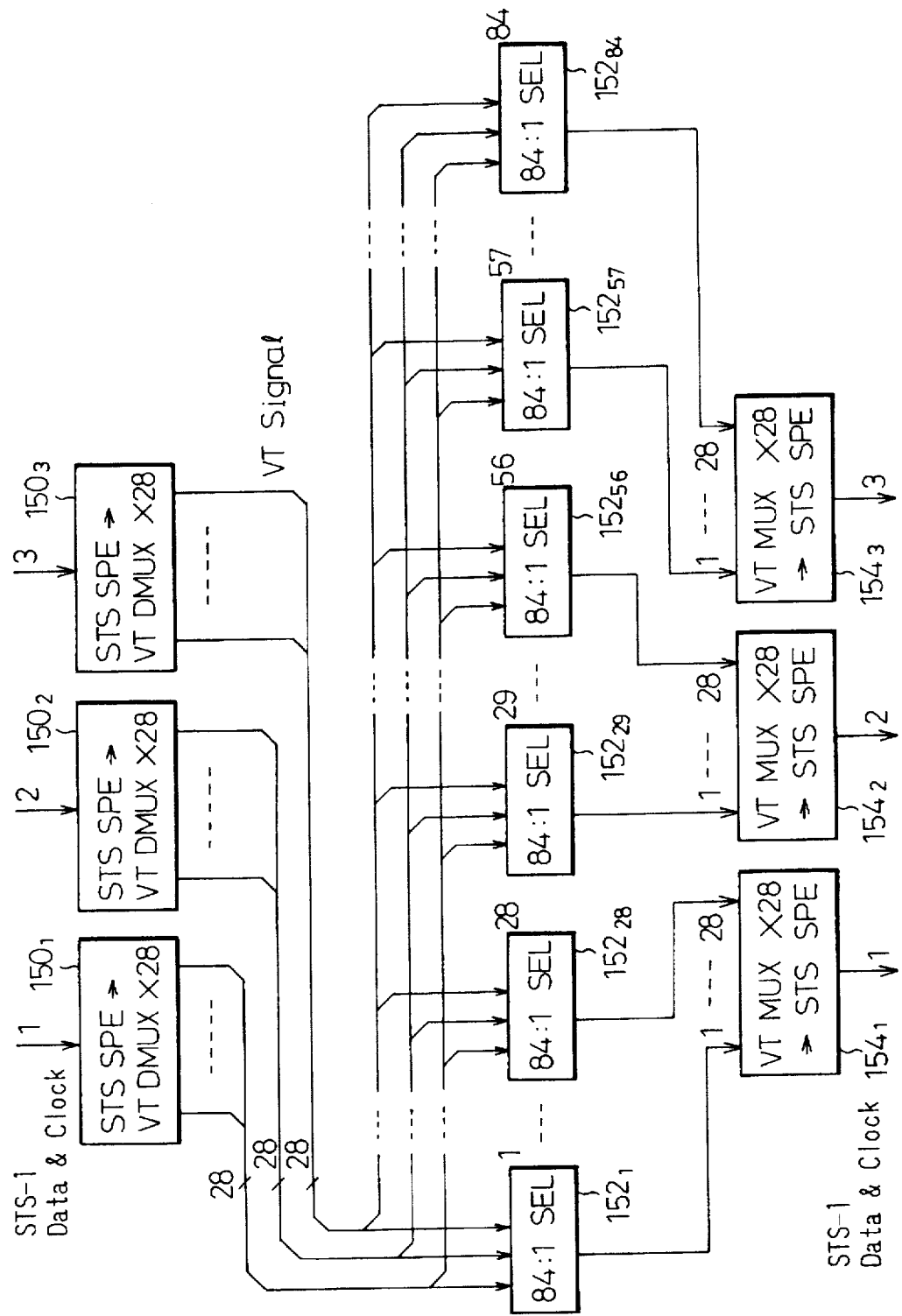
FIG. 42 is a diagram illustrating the construction of the VT TSA unit in FIG. 39.

FIG. 42 is a diagram illustrating an example of the construction of the VT TSA units 122 and 125 in FIG. 39. In FIG. 42, reference numerals $150_1$ to $150_3$ each denote a demultiplex unit, $152_1$ to $152_{28}$, $152_{29}$ to $152_{56}$, and $152_{57}$ to $152_{84}$ each denote an 84:1 selector, and $154_1$ to $154_3$ each denote a multiplex unit. The demultiplex units $150_1$ to $150_3$ each demultiplex a plurality of VT signals when the plurality of VT signals are supplied contained in an STS SPE, where three demultiplex units $150_1$ to $150_3$ correspond to the three STS-1 signals. When the plurality of VT signals are supplied thereto in parallel, the demultiplex units $150_1$ to $150_3$ are unnecessary. The multiplex units $154_1$ to $154_3$ multiplex a plurality of VT signals to generate an STS SPE when the plurality of VT signals are output in an STS SPE, where the three multiplex units $154_1$ to $154_3$ correspond to the three STS-1 signals. When the plurality of VT signals are output in parallel, the multiplex units $154_1$ to $154_3$ are unnecessary. The eighty-four 84:1 selectors $152_1$ to $152_{28}$, $152_{29}$ to $152_{56}$, and $152_{57}$ to $152_{84}$ are provided corresponding to eighty-four VT signals contained in the three STS-1 signals to be output, and each select one of the eighty-four input VT signals as a corresponding one of the eighty-four output VT signals.

Figure 43:
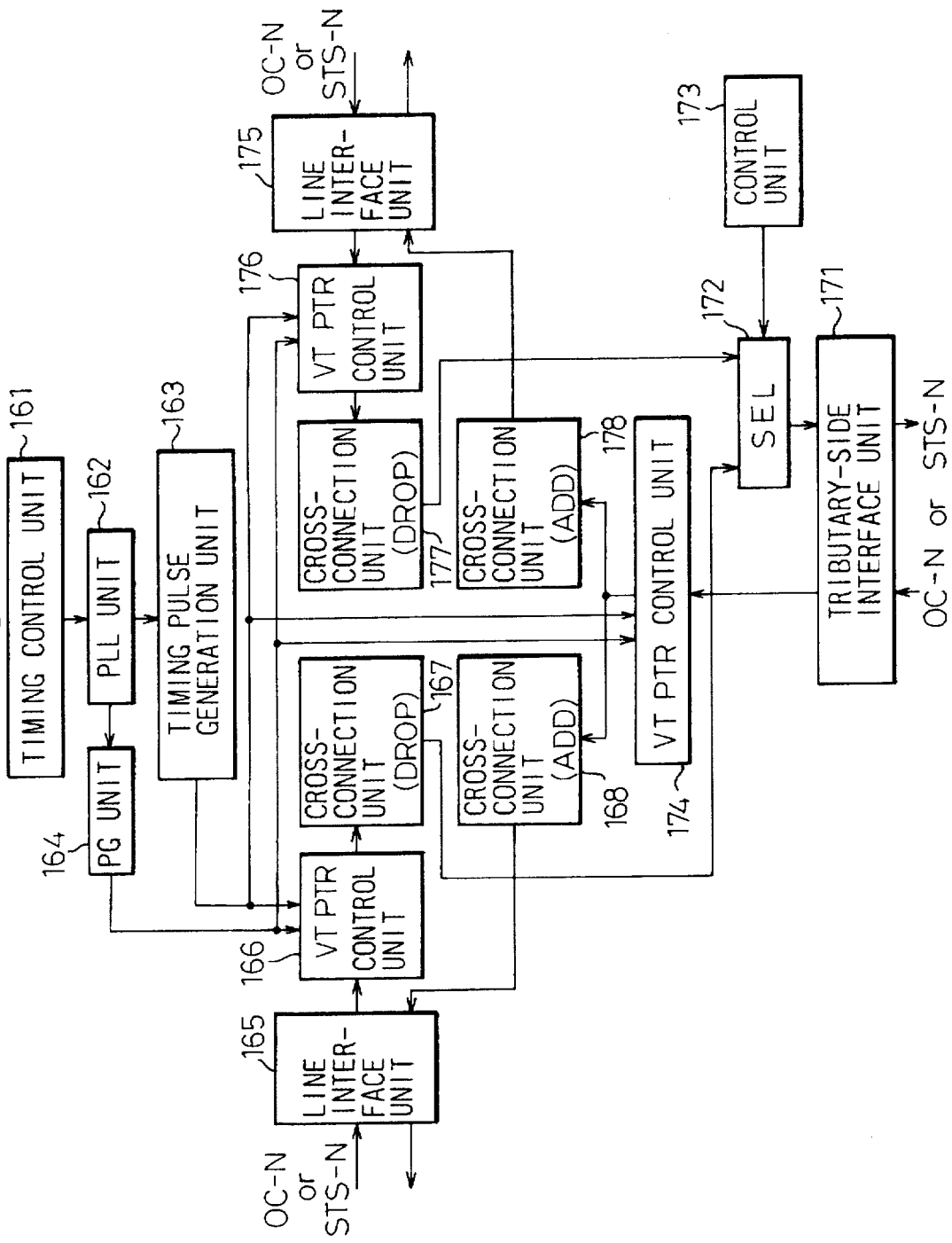
FIG. 43 is a diagram illustrating the construction of the first embodiment of the eighth invention.
Figure 44:
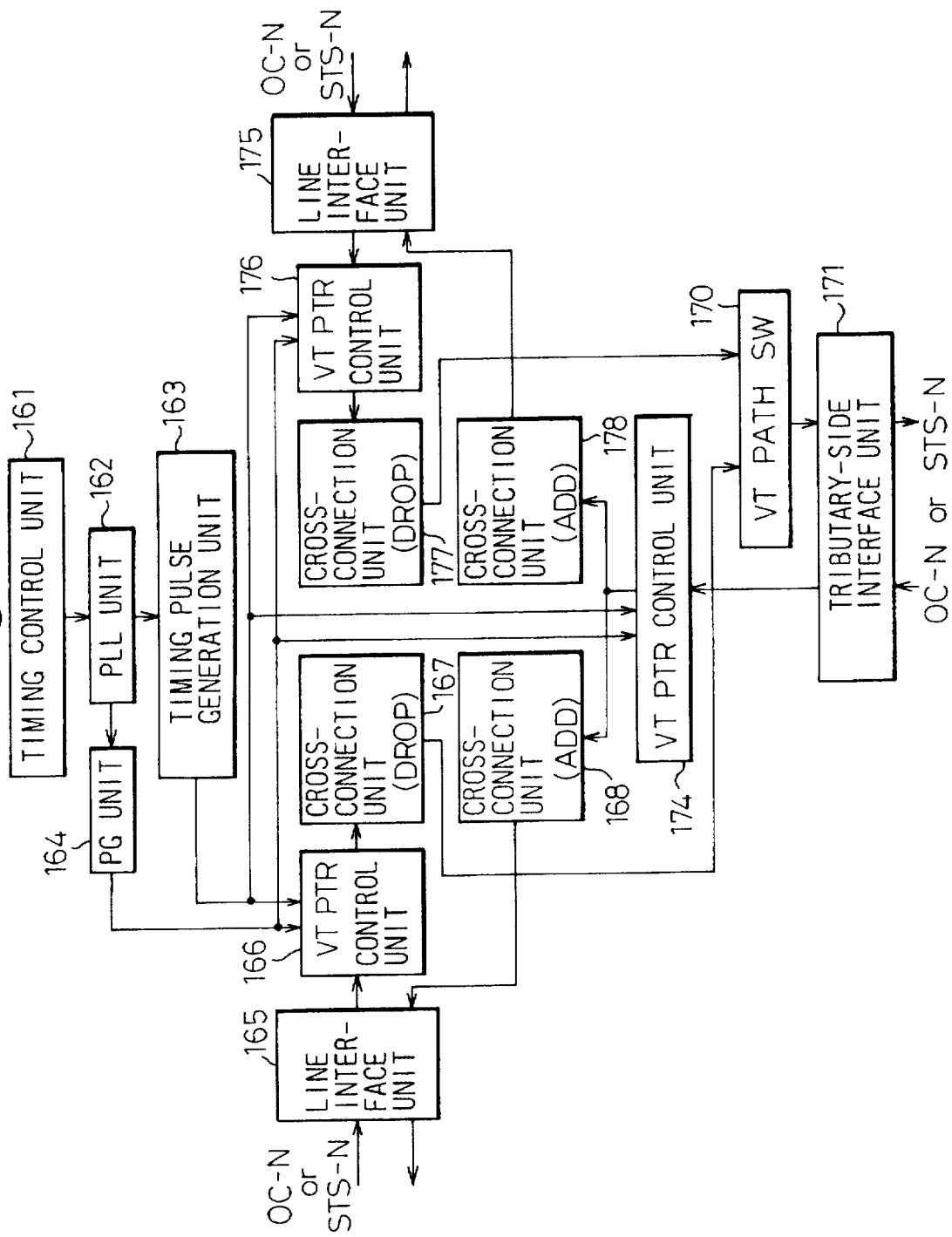
FIG. 44 is a diagram illustrating the construction of the second embodiment of the eighth invention.

EMBODIMENTS OF THE EIGHTH INVENTION (FIGS. 43 and 44)

FIG. 43 is a diagram illustrating the construction of the first embodiment of the eighth invention. The construction of FIG. 43 corresponds to the construction of FIG. 22A and FIG. 22B. FIG. 43 indicates a construction of each add-drop multiplexer in a communication system of a linear construction in which a plurality of add-drop multiplexers are connected to a linear bidirectional transmission line. Therefore, each add-drop multiplexer contains a selector 172 for selecting one of a drop signal transmitted from another add-drop multiplexer which is located on the east side (the left side of FIG. 43), and a drop signal transmitted from another add-drop multiplexer which is located on the west side (the right side of FIG. 43).

In FIG. 43, reference numeral 161 denotes a timing control unit, 162 denotes a PLL unit, 163 denotes a timing pulse generation unit, 164 denotes a pulse generation unit, 165 denotes an east-side line-side interface unit, 166 denotes an east-side drop signal VT PTR control (pointer processing) unit, 167 denotes an east-side drop signal crossconnection unit, 168 denotes an east-side add signal crossconnection unit, 171 denotes a tributary-side interface unit, 172 denotes a drop signal selector, 173 denotes a selector control unit, 174 denotes a add signal VT PTR control (pointer processing) unit, 175 denotes a west-side line-side interface unit, 176 denotes a west-side drop signal VT PTR control (pointer processing) unit, 177 denotes a west-side drop signal crossconnection unit, and 178 denotes a west-side add signal crossconnection unit.

The timing control unit 161 generates master timing for the system, and the PLL unit 162 generates a master clock which is synchronized with the above master timing. The timing pulse generation unit 163 generates timing pulses for aligning channel phases of the respective VT signals contained in each STS-1 signal. The pulse generation unit 164 generates a read clock by using the master clock generated by the PLL unit 162. The synchronization of the plurality of VT signals contained in the plurality of STS-1 signals with the master timing of the add-drop multiplexer is carried out by outputting the plurality of VT signals in synchronization with this read clock. The east-side drop signal VT PTR control unit 166 performs rewriting of the VT pointer and the stuffing and destuffing control, based on the timing pulse from the timing pulse generation unit 161 and the read clock from the pulse generation unit 164. Thus, frequencies and channel phases of the plurality of VT signals contained in the plurality of STS-1 signals are synchronized, and therefore, the crossconnection at the level of the VT signals can be performed over the different STS-1 signals, and signals after crossconnection can be multiplexed again. The east-side drop signal crossconnection unit 167 performs circuit setting operations of a plurality of VT signals contained in a plurality of STS-1 signals input from the line-side over the plurality of STS-1 signals. The drop signal selector 172 selects one of drop signals from the east and west sides, for each VT signal, in accordance with circuit setting information for the communication system of the linear construction. The control unit 173 controls the drop signal selector 172 for each VT signal, based on the circuit setting information which indicates whether the communication by each VT signal is performed with another add-drop multiplexer on the east-side (the left side of FIG. 43) or on the west-side (the right side of FIG. 43). The tributary-side interface unit 171 contains the respectively selected VT signals as above, in N STS SPEs, and further byte multiplexes the N STS SPEs to generate an STS-N signal, or further converts the STS-N signal into an optical signal OC-N signal, which is then output to the tributary-side.

In addition, the tributary-side interface unit 171 receives an STS-N signal or an OC-N signal from the tributary side, demultiplexes it into a plurality of STS-1 signals, and further terminates the STS-1 signals to obtain a plurality of separate VT signals. The rewriting of the VT pointer and the stuffing and destuffing control are performed in the add signal VT PTR control unit 174, on the plurality of VT signals, based on the timing pulse from the timing pulse generation unit 161 and the read clock from the pulse generation unit 164. Thus, the frequencies and the channel phases of the plurality of VT signals contained in different STS-1 signals are synchronized, and therefore, the crossconnection of the VT signals can be performed over a plurality of STS-1 signals, and signals after the crossconnection can be multiplexed again. The output of the add signal VT PTR control unit 174 is supplied to the west-side add signal crossconnection unit 178 and the east-side add signal crossconnection unit 168. In each of the west-side add signal crossconnection unit 178 and the east-side add signal crossconnection unit 168, circuit setting operations at the level of the VT signals is performed over a plurality of STS-1 signals which are input from the tributary side. The outputs of the west-side add signal crossconnection unit 178 and the east-side add signal crossconnection unit 168 are supplied to the west-side line-side interface unit 175 and east-side line-side interface unit 165, respectively. The west-side line-side interface unit 175 contains a plurality of VT signals supplied from the west-side add signal crossconnection unit 178, in N STS SPEs, and further byte multiplexes the N STS SPEs to obtain an STS-N signal, or further converts the STS-N signal into an optical signal OC-N signal to be transmitted on an optical transmission line on the west side. Similarly, the east-side line-side interface unit 165 contains a plurality of VT signals supplied from the east-side add signal crossconnection unit 168, in N STS SPEs, and further byte multiplexes the N STS SPEs to obtain an STS-N signal, or further converts the STS-N signal into an optical signal OC-N signal to be transmitted on an optical transmission line on the east side.

Conventionally, the crossconnection can be performed only at the level of the STS-1 signals when the tributary-side interface signal is an OC-N signal or an STS-N signal, and the path switching (selection) can be performed at the level of the STS-1 signals only. Namely, conventionally, when the tributary-side interface signal is an OC-N signal or an STS-N signal, the crossconnection at the level of VT signals and the path selection at the level of the VT signals cannot be performed. However, according to the eighth invention, for example, in the above embodiment, when the tributary-side interface is an OC-N interface or an STS-N interface, crossconnection can be performed either at the STS signal level or at the VT signal level. Therefore, the add-drop multiplexer according to the eighth invention can be used in both a communication system wherein access at the STS level is required, and a communication system wherein access at the VT signal level is required.

FIG. 44 is a diagram illustrating the construction of the second embodiment of the eighth invention. The construction of FIG. 44 also corresponds to the construction of FIG. 22A and FIG. 22B. The only difference in the construction of FIG. 44 from the construction of FIG. 43 is that the drop signal selector 172 in FIG. 43 is replaced with the VT path protection switch 170 in FIG. 44, and the other constructions are the same in FIGS. 43 and 44. The add-drop multiplexer of FIG. 44 is provided for use in a communication system in which a plurality of add-drop multiplexers are connected to a bidirectional transmission line in a ring form, for example, as indicated in FIG. 38. In such a communication system, one direction of the bidirectional transmission line is used for the working-system, and the opposite direction of the bidirectional transmission line is used for the protection system. Therefore, the above VT path protection switch 170 in each add-drop multiplexer is provided for selecting one of a drop signal from the working-system transmission line and a drop signal from the protection-system transmission line. Normally, the VT path protection switch 170 selects the drop signal from the working-system transmission line. However, when trouble is detected in the drop signal from the working-system transmission line, or switching of the selection is instructed, the drop signal from the protection-system transmission line is selected by the VT path protection switch 170.

Conventionally, when trouble is detected in one of the plurality of VT signals contained in the STS-1 signals in an add-drop multiplexer which has an interface unit for an OC-N signal or an STS-N signal on the tributary-side, the channel cannot be relieved at the VT signal level since the conventional path protection switch can be switched at the STS signal level only. However, according to the eighth invention, as in the embodiment of FIG. 44, in an add-drop multiplexer which has an interface unit for an OC-N signal or an STS-N signal on the tributary-side, path protection switching operations can be performed both at the STS-1 signal level and at the VT signal level. In particular, in this embodiment, a path protection switch circuit at the VT signal level is provided after the stage of the crossconnection at the VT signal level, and therefore, path protection switching at the VT signal level can be performed. Thus, when trouble is detected in one of the plurality of VT signals contained in the STS-1 signals in an add-drop multiplexer which has an interface unit for an OC-N signal or an STS-N signal on the tributary-side, the VT channel having trouble only can be relieved by path protection switching at the VT signal level. In addition, in this embodiment, in both the east-side drop signal VT PTR control unit 176 and the west-side drop signal VT PTR control unit 176, all of a plurality of VT signals contained in a plurality of STS-1 signals which are input from the line side are synchronized with a common timing and clock, and path protection switching at the VT signal level is performed by the path protection switch 170 after the crossconnection at the VT signal level is performed by the west-side and east-side drop signal crossconnection units 167 and 177, respectively. Therefore, crossconnection of VT signals can be performed over a plurality of STS-1 signals, and thus the add-drop multiplexer in this embodiment can be used in the communication system of a ring construction wherein circuit setting is required at the VT signal level.

Figure 45:
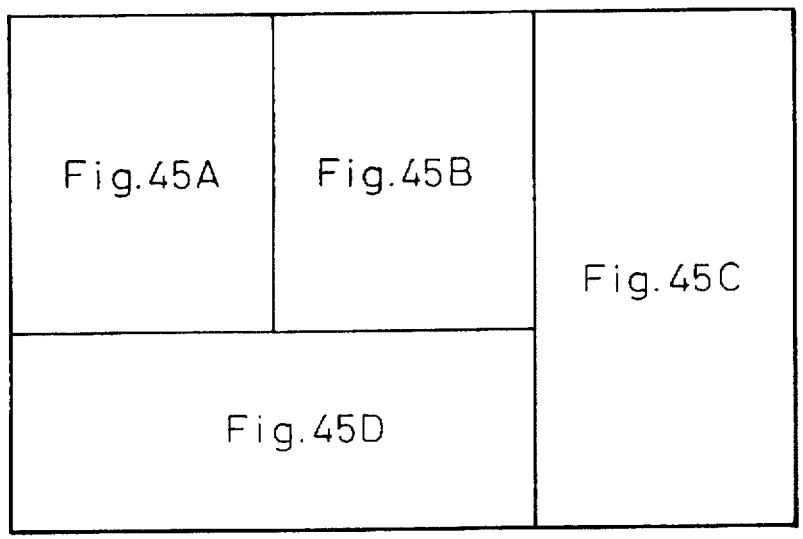
FIG. 45 is a diagram indicating the configuration of FIGS. 45A to 45D.

EMBODIMENT OF THE FIRST TO NINTH, ELEVENTH, TWELFTH, AND FOURTEENTH INVENTIONS (FIGS. 45 and 46B)

FIG. 45 is a diagram indicating the configuration of FIGS. 45A to 45D, and FIGS. 45A, 45B, 45C, and 45D are diagrams illustrating the construction of an embodiment of the first to ninth, eleventh, and fourteenth inventions.

Figure 45A:
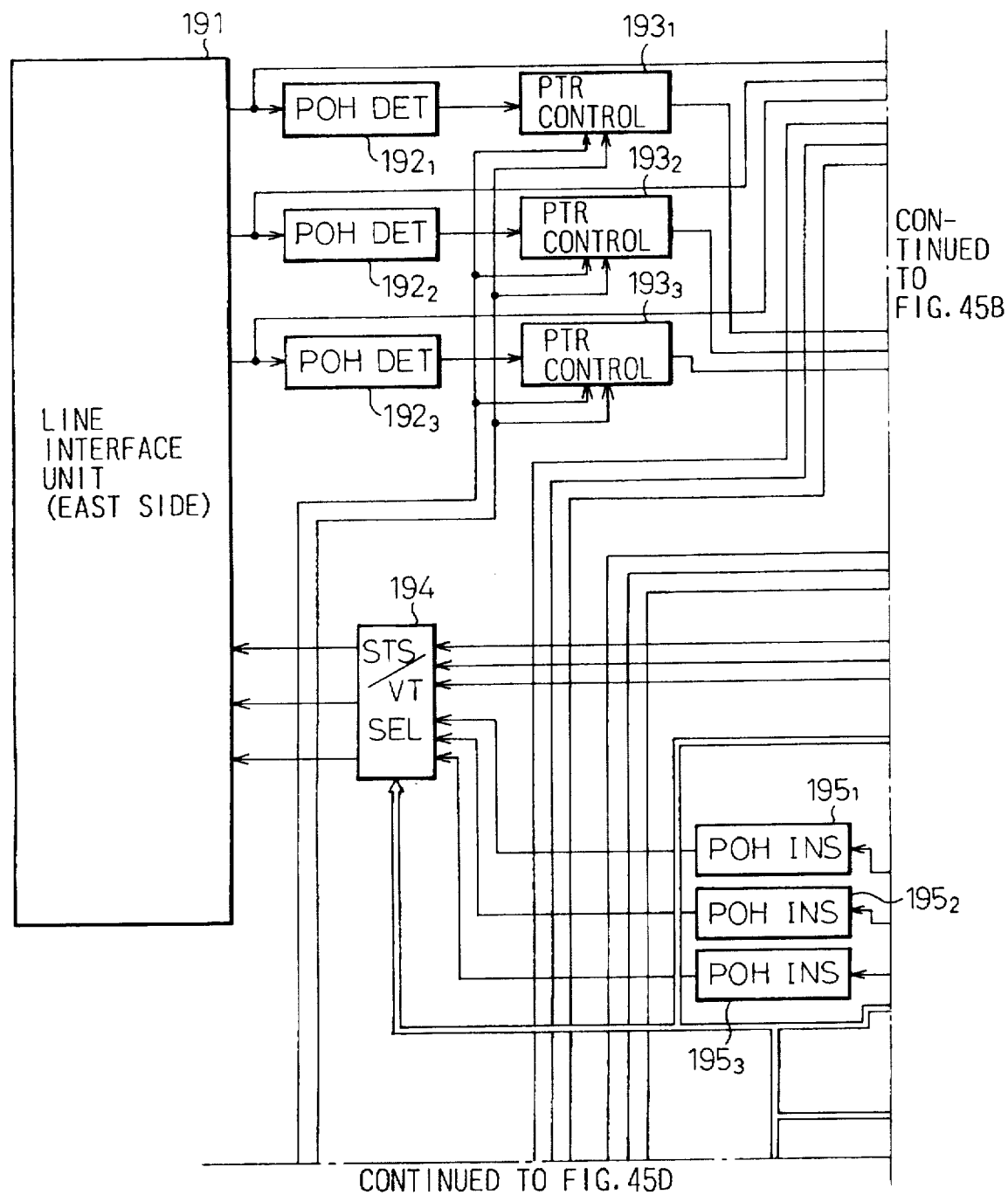
FIGS. 45A, 45B, 45C, and 45D are diagrams illustrating the construction of an embodiment of the first to ninth, eleventh, and fourteenth inventions.
Figure 45B:
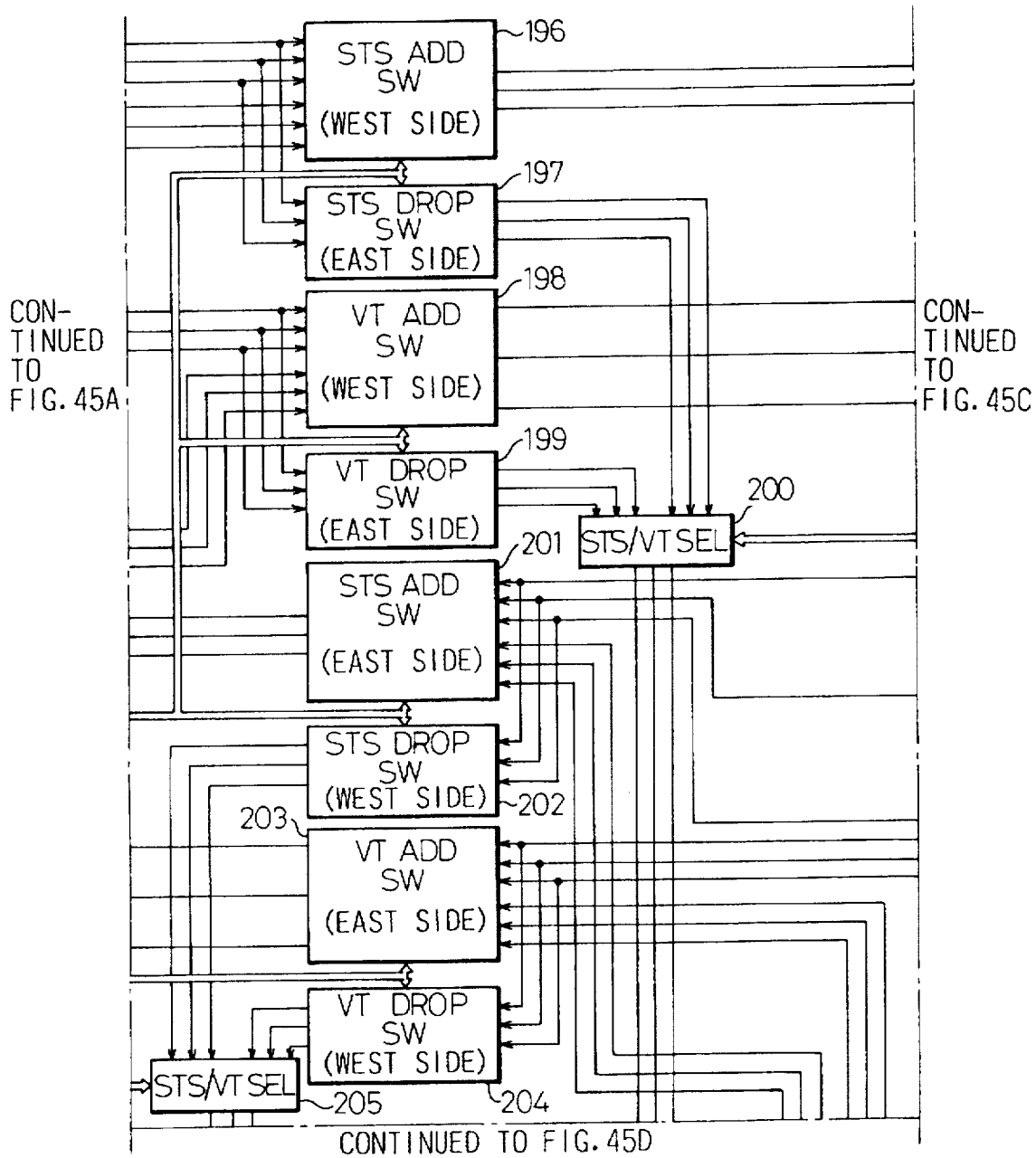
Figure 45C:
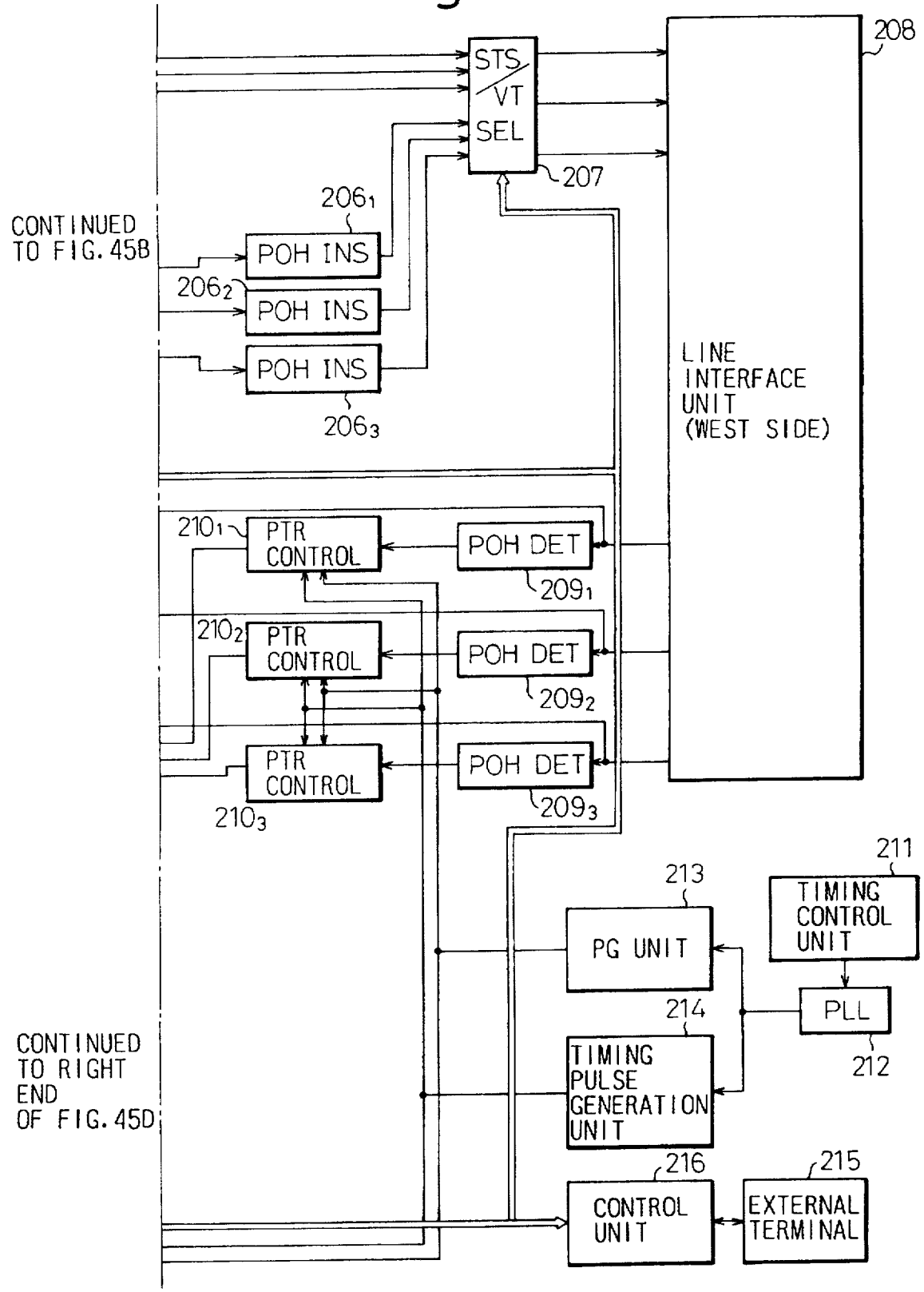
Figure 45D:
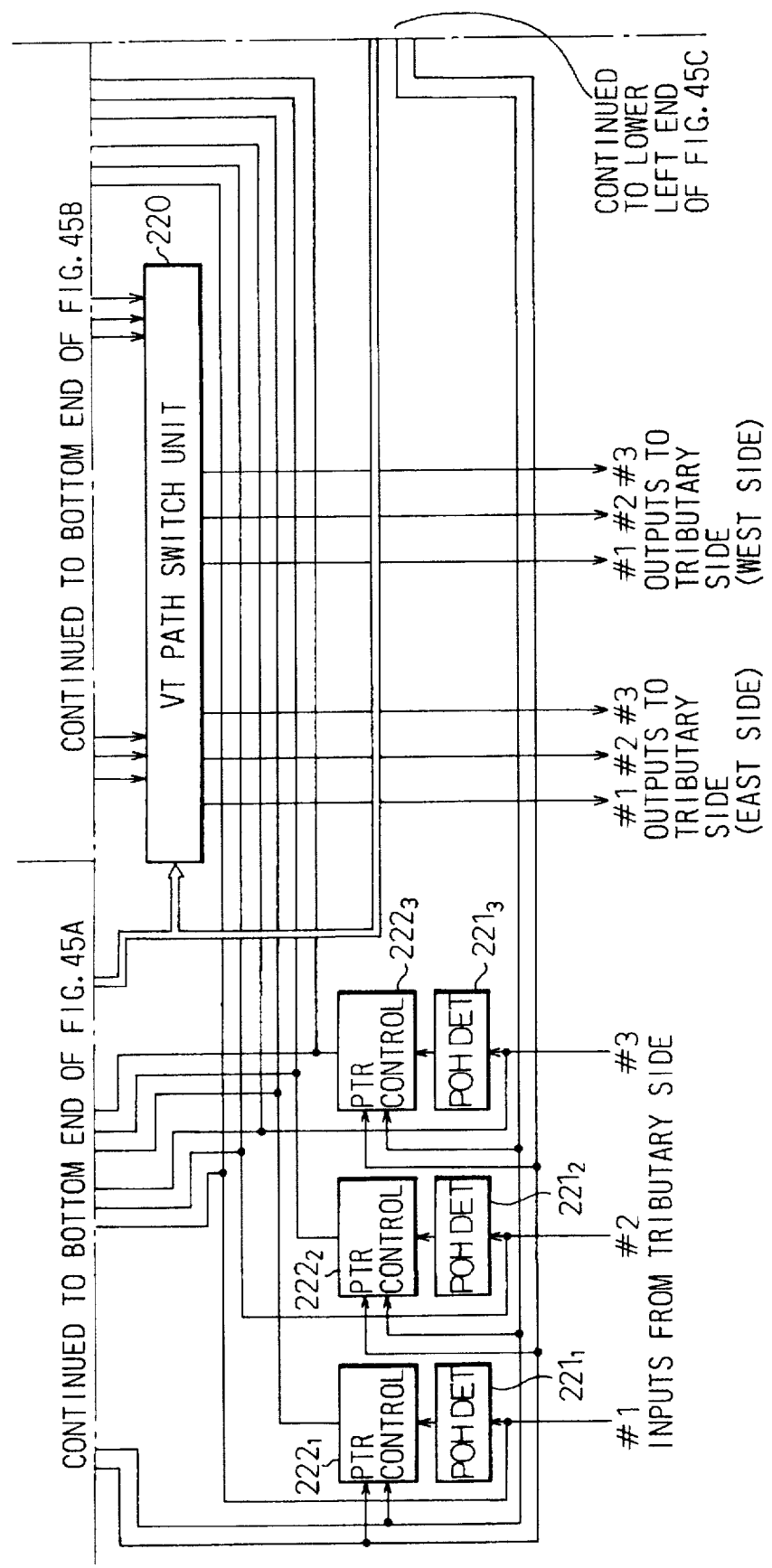

In FIG. 45A, reference numeral 191 denotes an east-side line (OC-3)-side interface unit, $192_1$ to $192_3$ each denote an east-side line-side path overhead detection unit, $193_1$ to $193_3$ each denote an east-side line-side pointer control unit, 194 denotes an east-side line-side output selector, and $195_1$ to $195_3$ each denote an east-side line-side path overhead insertion unit. In FIG. 45B, reference numeral 196 denotes a west-side STS add signal switch unit, 197 denotes an east-side STS drop signal switch unit, 198 denotes a west-side VT add signal switch unit, 199 denotes an east-side VT drop signal switch unit, 200 denotes an east-side drop signal selector, 201 denotes an east-side STS add signal switch unit, 202 denotes a west-side STS drop signal switch unit, 203 denotes an east-side VT add signal switch unit, 204 denotes a west-side VT drop signal switch unit, and 205 denotes a west-side drop signal selector. In FIG. 45C, reference numerals $206_1$ to $206_3$ each denote a west-side line-side path overhead insertion unit, 207 denotes a west-side line-side output selector, 208 denotes a west-side line-side interface unit, $209_1$ to $209_3$ each denote a west-side line-side path overhead detection unit, $210_1$ to $210_3$ each denote a west-side line-side pointer control unit, 211 denotes a timing control unit, 212 denotes a PLL unit, 213 denotes a pulse generation unit, 214 denotes a timing pulse generation unit, 215 denotes an external terminal, and 216 denotes a control unit. In FIG. 45D, reference numeral 220 denotes a VT path protection switch unit, $221_1$ to $221_3$ each denote a tributary-side path overhead detection unit, and $222_1$ to $222_3$ each denote a tributary-side pointer control unit.

The add-drop multiplexer indicated in FIG. 45A to FIG. 45D, is located on a bidirectional transmission line through which OC-3 signals are transmitted in two directions, where the OC-3 signals are each formed by byte multiplexing three OC-1 signals, and each OC-1 signal contains in its payload a plurality of VT signals. The add-drop multiplexer drops three STS-1 signals to the tributary side, and adds three STS-1 signals from the tributary side.

The timing control unit 211 in FIG. 45D generates master timing for the system, the PLL unit 212 generates a master clock which is synchronized with the master timing. The pulse generation unit 213 generates a read clock by using the master clock from the PLL unit 212. The read clock is used to synchronize a plurality of VT signals contained in a plurality of STS-1 signals with the timing of the add-drop multiplexer by a clock change. The timing pulse generation unit 214 generates a timing pulse for aligning phases of a plurality of VT signals contained in the plurality of STS-1 signals.

The east-side line-side interface unit 191 in FIG. 45A, in this embodiment, receives an OC-3 signal which is transmitted through a bidirectional optical transmission line in one direction, converts it into an electric signal, and demultiplexes the electric signal into three STS-1 signals. The east-side line-side interface unit 191 further inputs three STS-1 signals, multiplexes them to an STS-3 signal, and converts the STS-3 signal into an OC-3 signal which is to be transmitted onto the bidirectional optical transmission line in the other direction. The east-side line-side path overhead detection units $192_1$ to $192_3$ inputs the above three STS-1 signals which are output from the east-side line-side interface unit 191, detects path overhead in the STS-1 signals, and performs overhead processing. The east-side line-side pointer control units $193_1$ to $193_3$ correspond to the aforementioned phase and frequency control unit, and perform rewriting of VT pointer and stuffing and destuffing control by using the timing pulse from the timing pulse generation unit 214 and the read clock from the pulse generation unit 213. The insertion and deletion of a byte for the stuffing and destuffing control may be performed by the above east-side line-side path overhead detection units $192_1$ to $192_3$.

Similarly, the west-side line-side interface unit 208 in FIG. 45C, in this embodiment, receives an OC-3 signal which is transmitted through a bidirectional optical transmission line in one direction, converts it into an electric signal, and demultiplexes the electric signal into three STS-1 signals. The west-side line-side interface unit 208 further inputs three STS-1 signals, multiplexes them to an STS-3 signal, and converts the STS-3 signal into an OC-3 signal which is to be transmitted onto the bidirectional optical transmission line in the other direction. The west-side line-side path overhead detection units $209_1$ to $209_3$ inputs the above three STS-1 signals which are output from the west-side line-side interface unit 208, detects path overhead in the STS-1 signals, and performs overhead processing. The west-side line-side pointer control units $210_1$ to $210_3$ correspond to the aforementioned phase and frequency control unit, and perform rewriting of VT pointer and stuffing and destuffing control by using the timing pulse from the timing pulse generation unit 214 and the read clock from the pulse generation unit 213. The insertion and deletion of a byte for the stuffing and destuffing control may be performed by the above west-side line-side path overhead detection units $209_1$ to $209_3$.

The tributary-side path overhead detection units $221_1$ to $221_3$ in FIG. 45D inputs three STS-1 signals which are output from the tributary-side interface unit, detects path overhead, and performs overhead processing. The tributary-side pointer control units $222_1$ to $222_3$ correspond to the aforementioned phase and frequency control unit, and perform rewriting of VT pointer and stuffing and destuffing control by using the timing pulse from the timing pulse generation unit 214 and the read clock from the pulse generation unit 213. The insertion and deletion of a byte for the stuffing and destuffing control may be performed by the above tributary-side path overhead detection units $221_1$ to $221_3$.

The west-side STS add signal switch unit 196 in FIG. 45B, is a switch (crossconnection unit) in which one of the three STS-1 signals input from the east-side line-side interface unit 191, or one of the above three STS-1 signals input from the above tributary-side interface unit is selected as each of the above three STS-1 signals to be output from west-side line-side interface unit 208. The east-side STS drop signal switch unit 197 is a switch in which crossconnection between the above three STS-1 signals input from the east-side line-side interface unit 191 and the three STS-1 signals to be output to the tributary side, is performed. The west-side VT add signal switch unit 198 is a switch in which one of VT signals contained in one of the above three STS-1 signals which are output from the east-side line-side path overhead detection unit $192_1$ to $192_3$ and subjected to phase frequency control by the east-side line-side pointer control unit $193_1$ to $193_3$, or a corresponding one of VT signals contained in one of the above three STS-1 signals which are output from the tributary-side path overhead detection unit $221_1$ to $221_3$, and subjected to phase frequency control by the tributary-side pointer control unit $222_1$ to $222_3$, is selected as each of VT signals which are to be contained in the three STS-1 signals to be output from the west-side line-side interface unit 208. The east-side VT drop signal switch unit 199 is a switch in which crossconnection between VT signals contained in the above three STS-1 signals output from the east-side line-side path overhead detection unit $192_1$ to $192_3$ and subjected to the phase and frequency control by the east-side line-side pointer control unit $193_1$ to $193_3$, and VT signals contained in the three STS-1 signals to be output to the tributary side, is performed.

The east-side STS add signal switch unit 201 in FIG. 45B, is a switch (crossconnection unit) in which one of the three STS-1 signals input from the west-side line-side interface unit 208, or one of the above three STS-1 signals input from the above tributary-side interface unit is selected as each of the above three STS-1 signals to be output from west-side line-side interface unit 208. The west-side STS drop signal switch unit 202 is a switch in which crossconnection between the above three STS-1 signals input from the west-side line-side interface unit 208 and the three STS-1 signals to be output to the tributary side, is performed. The east-side VT add signal switch unit 203 is a switch in which one of VT signals contained in one of the above three STS-1 signals which are output from the west-side line-side path overhead detection unit $209_1$ to $209_3$ and subjected to phase frequency control by the west-side line-side pointer control unit $210_1$ to $210_3$, or a corresponding one of VT signals contained in one of the above three STS-1 signals which are output from the tributary-side path overhead detection unit $22_{11}$ to $22_{13}$, and subjected to phase frequency control by the tributary-side pointer control unit $222_1$ to $222_3$, is selected as each of VT signals which are to be contained in the three STS-1 signals to be output from the east-side line-side interface unit 191. The west-side VT drop signal switch unit 204 is a switch in which crossconnection between VT signals contained in the above three STS-1 signals output from the west-side line-side path overhead detection unit $209_1$ to $209_3$ and subjected to the phase and frequency control by the west-side line-side pointer control unit $210_1$ to $210_3$, and VT signals contained in the three STS-1 signals to be output to the tributary side, is performed.

The east-side line-side path overhead insertion units $195_1$ to $195_3$ in FIG. 45A insert path overhead for an STS SPE, into the output signals from the east-side VT add signal switch unit 203 in FIG. 45B. The east-side line-side output selector 194 selects one of each of the three STS-1 signals output from the east-side STS add signal switch unit 201, and a corresponding one of the three outputs of the east-side line-side path overhead insertion units $195_1$ to $195_3$, to supply the selected one to the east-side line-side interface unit 191. The east-side line-side output selector 194 selects one of the three STS-1 signals output from the east-side STS add signal switch unit 201 when circuit setting is performed at the level of the STS signals, or selects one of the three outputs of the east-side line-side path overhead insertion units $195_1$ to $195_3$ when circuit setting is performed at the level of the VT signals.

The west-side line-side path overhead insertion units $206_1$ to $206_3$ in FIG. 45C insert path overhead for an STS SPE, into the output signals from the west-side VT add signal switch unit 198 in FIG. 45B. The west-side line-side output selector 207 selects one of each of the three STS-1 signals output from the west-side STS add signal switch unit 196, and a corresponding one of the three outputs of the west-side line-side path overhead insertion units $206_1$ to $206_3$, to supply the selected one to the west-side line-side interface unit 208. The west-side line-side output selector 207 selects the above one of the three STS-1 signals output from the west-side STS add signal switch unit 196 when circuit setting is performed at the level of the STS signals, or selects the above corresponding one of the three outputs of the west-side line-side path overhead insertion unit $206_1$ to $206_3$ when circuit setting is performed at the level of the VT signals.

The east-side drop signal selector 200 selects one of one of the three outputs (STS-1 signals) from the east-side STS drop signal switch unit 197, and a corresponding one of the three outputs from the east-side VT drop signal switch unit 199, to supply the selected one to the VT path protection switch 220 in FIG. 45D. The east-side drop signal selector 200 selects the above one of the three outputs (STS-1 signals) from the east-side STS drop signal switch unit 197 when circuit setting is performed at the level of the STS signals, or selects the above corresponding one of the three outputs from the east-side VT drop signal switch unit 199 when circuit setting is performed at the level of the VT signals. The west-side drop signal selector 205 selects one of one of the three outputs (STS-1 signals) from the west-side STS drop signal switch unit 202, and a corresponding one of the three outputs from the west-side VT drop signal switch unit 204, to supply the selected one to the VT path protection switch 220 in FIG. 45D. The west-side drop signal selector 205 selects the above one of the three outputs (STS-1 signals) from the west-side STS drop signal switch unit 202 when circuit setting is performed at the level of the STS signals, or selects the above corresponding one of the three outputs from the west-side VT drop signal switch unit 204 when circuit setting is performed at the level of the VT signals.

The VT path protection switch 220 has a function of selecting one of a respective one of the three outputs (east-side drop signals) from the east-side drop signal selector 200, and a corresponding one of the three outputs (west-side drop signals) from the west-side drop signal selector 205, to supply the selected one to the tributary interface (which is not shown). This selection can be made for each VT signal. The tributary interface contains a path protection switch at the STS signal level. When the protection switch 220 does not perform the above selection at the VT signal level, the above path protection switch at the STS signal level operates. That is, the selection is performed at the STS signal level.

The control unit 216 controls the above operations of the VT path protection switch 220, in accordance with an instruction from outside.

FIGS. 46A and 46B are diagrams illustrating an example construction of the VT path protection switch 220 in FIG. 45D. Although three STS-1 signals are dropped to the tributary side from each of the east side and the west side, in the embodiment of FIGS. 45A to 45D, FIG. 46A indicates only a portion of the VT path protection switch 220, which relates to a pair of one east-side drop signal and one west-side drop signal.

In FIG. 46A, reference numeral 231 denotes a microcomputer interface which is connected to the control unit 216 in FIG. 45C, 232 denotes an east-side demultiplex unit, 233 denotes a west-side demultiplex unit, $256_1$ to $256_{28}$ each denote a VT path switch unit provided for each of twenty-eight VT channels, 252 denotes a multiplex unit, 253 denotes a path overhead insertion unit, 254 denotes a VT/STS selector, and 255 denotes a west-side STS signal fix control unit.

The demultiplex units 232 and 233 on the east-side and west-side in FIG. 46A, receive STS SPEs for STS-1 signals of the east-side and of the west-side from the east-side drop signal selector 200 and the west-side drop signal selector 205, respectively. Then, the demultiplex units 232 and 233 demultiplex the STS SPEs into a plurality (twenty-eight) of VT signals, which are supplied as east-side and west-side drop signals to the respective VT path switch units $256_1$ to $256_{28}$.

In each of the VT path switch units $256_1$ to $256_{28}$, reference numeral 234 denotes a condition setting memory, 235 denotes an east-side VT path AIS detection unit, 242 denotes a west-side VT path AIS detection unit, 236 denotes an east-side major error (Bit Interleaved Parity-2 Major Error) detection unit, 243 denotes a west-side major error (Bit Interleaved Parity-2 Major Error) detection unit, 237 denotes an east-side minor error (Bit Interleaved Parity-2 Minor Error) detection unit, and 244 denotes a west-side minor error (Bit Interleaved Parity-2 Minor Error) detection unit, 238 denotes an east-side unequipped VT signal detection unit, and 245 denotes a west-side vacant VT signal detection unit, 239 denotes an east-side VT path monitor, 246 denotes a west-side VT path monitor, 240 denotes a path protection switch counter which records a history of the path protection switch, 247 and 250 each denote a performance monitor, 248 denotes an east-side timing counter, 249 denotes a west-side timing counter, and 251 denotes a path switch.

The east-side and west-side timing counters 248 and 249 count differences in bit phases of the received signals in the east side and west side, and control the path switch 251 so that the phases of the VT signals in the east-side and the west-side coincide.

The setting condition of the path protection switch is set in the condition setting memory 234 from the external terminal 215 through the control unit 216 and the microcomputer interface 231. The contents of the setting condition contains: for example, whether the add-drop multiplexer is connected to a communication network of a ring construction or a linear construction; manual mode or not; forced setting or not; east-side drop signal or west-side drop signal when the add-drop multiplexer is connected to a linear network (PROVISIONING EAST OR WEST); whether the setting is automatically reverted to the original setting after trouble is cleared (REVERTIVE), waiting time for protection before the original setting is restored (WAIT TO RESTORE), and the like. The east-side and west-side VT path AIS detection unit 235 and 242 detect east-side and west-side VT path AIS'es (Alarm Indication Signals). The east-side and west-side major error (Bit Interleaved Parity-2 Major Error) detection units 236 and 243 detect a major error (error exceeding a predetermined level) in VT signals of the east side and west side, respectively. The minor error (Bit Interleaved Parity-2 Minor Error) detection units 237 and 244 detect a minor error (not exceeding the predetermined level) in VT signals of the east side and west side, respectively. The east-side and west-side unequipped VT signal detection units 238 and 245 detect unequipped code (which is transmitted when a VT signal is unequipped or not used) in the VT signals of the east side and west side. The east-side and west-side VT path monitors 239 and 246 supply VT signals of the east side and west side to be monitored, to the performance monitors 247 and 250, the east-side and west-side major error detection units 236 and 243, the minor error detection unit 237 and 244, and the unequipped VT signal detection units 238 and 245, respectively. The east-side and west-side performance monitors 247 and 250 monitor bit error rates in the VT signals of the east side and west side, respectively, to be read out through the microcomputer interface 231 and the control unit 216 from the external terminal 215. The east-side and west-side timing counters 248 and 249 count deviations in bit phases in the VT signals of the east side and west side, respectively, and control the VT path switch 251 so that bit phases in VT signals of the east side and the west side coincide. The VT path switch 251 selects VT signals of the east side or the west side, in accordance with the above setting in the condition setting memory 234, and in particular, when the add-drop multiplexer is connected to a communication network of a ring (RING) construction, the detection results of the above east-side and west-side VT path AIS detection units 235 and 242, east-side and west-side major error detection units 236 and 243, the minor error detection units 237 and 244, and east-side and west-side unequipped VT signal detection units 238 and 245, for each VT signal. The selected VT signals are supplied to the tributary side. In addition, a condition that no pointer is detected in the VT signals of the east side and west side, can be added to the above information based on which the selection of VT signals is made in the VT path switch 251. In this case, a loss-of-pointer detection units may be provided for the VT signals of the east side and the west side, in addition to the construction of FIG. 46A.

The multiplex unit 252 in FIG. 46B multiplexes the VT signals selected by the VT path selection switch 251 to form a multiplexed data for an STS SPE for the STS-1 signal. The path overhead insertion unit 253 generates a STS SPE for an STS-1 signal by inserting path overhead into the above multiplexed data. The VT/STS selector 254 can be set to the STS mode or the VT mode under control from the external terminal 215 through the microcomputer interface 231 and the control unit 216. In the VT mode, the above STS-1 signal formed by the multiplex unit 252 and the path overhead insertion unit 253 is selected, and in the STS mode, the east-side STS-1 signal per se, which is supplied from the east-side drop signal selector 200 is selected. The selected STS-1 signal is supplied to the tributary side interface unit. The west-side STS signal fix control unit 255 is provided on the path for the STS-1 signal of the west side, which is supplied from the west-side drop signal selector 205. When it is required to fixedly select the STS-1 signal of the east side in the above-mentioned STS level path protection switch in the tributary-side interface unit, all "one" data is written by the west-side STS signal fix control unit 255, in the STS-1 signal of the west side. Since the STS level path protection switch in the tributary-side interface unit determines this STS-1 signal containing all "one" data, as an AIS signal, it substantially fixedly selects the STS-1 signal of the east side.

As can be understood from the above explanations, the above construction indicated in FIG. 45A to FIG. 46B and the tributary-side interface unit (not shown) containing the STS level path protection switch (not shown), realizes the aforementioned first to ninth, the eleventh, twelfth, and fourteenth inventions.

Figure 47:
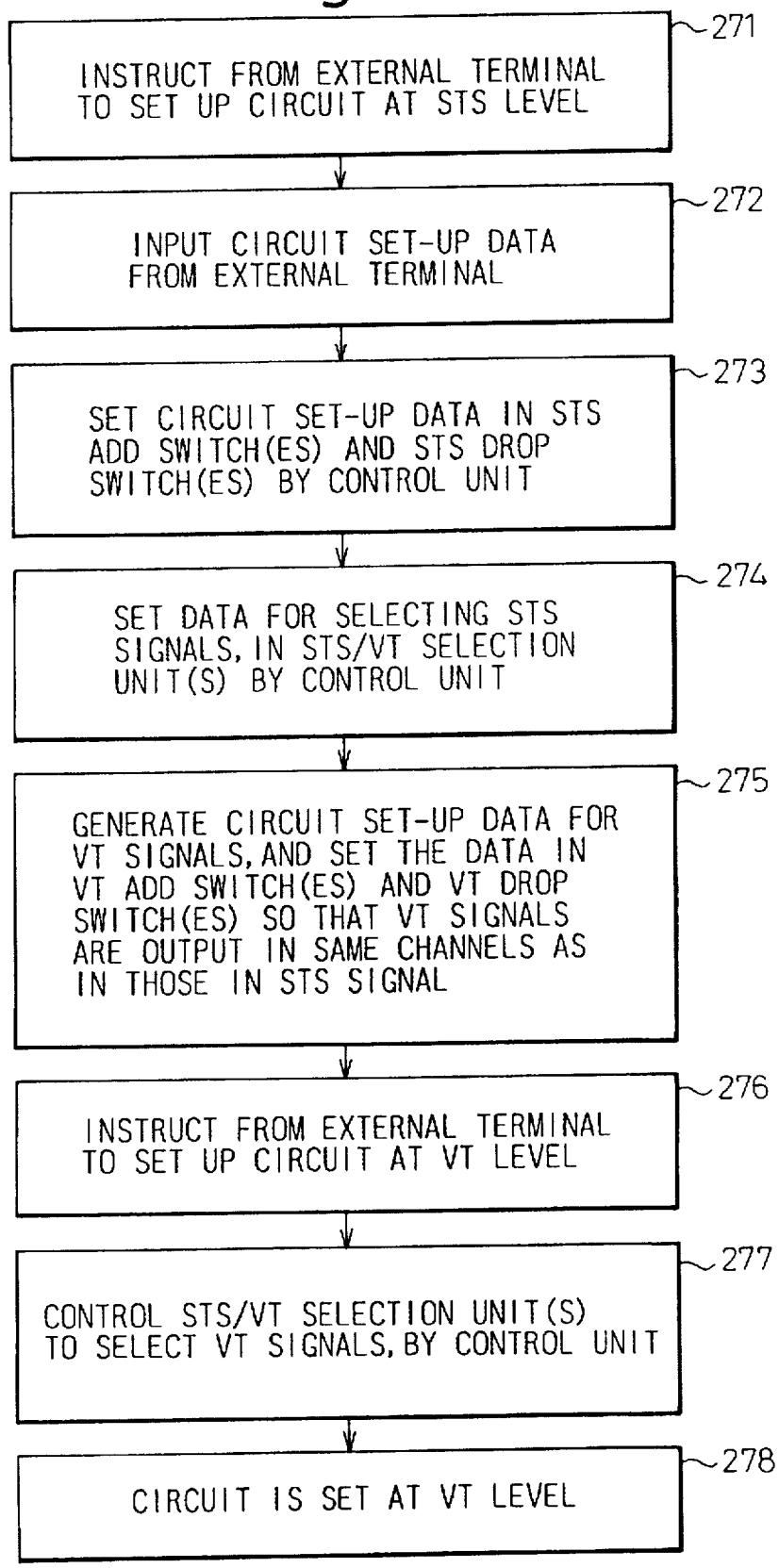
FIG. 47 is a diagram illustrating the construction of the first embodiment of the tenth invention.
Figure 48:
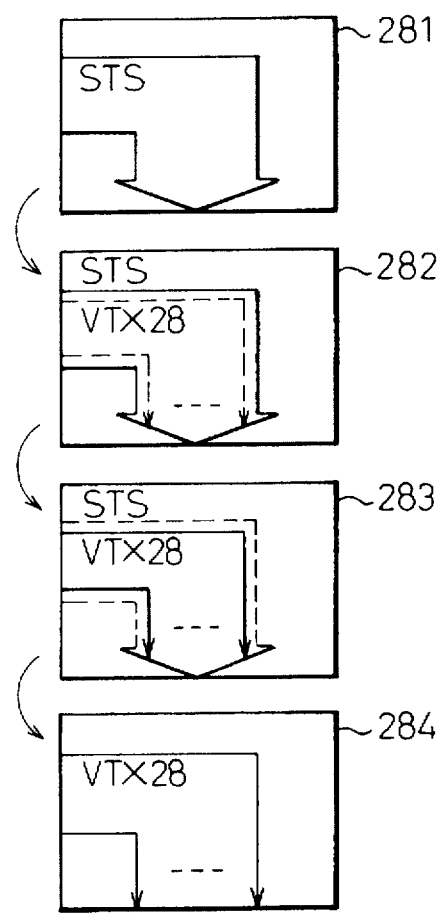
FIG. 48 is an explanatory diagram illustrating the operation of the method according to the tenth invention is.
Figure 49:
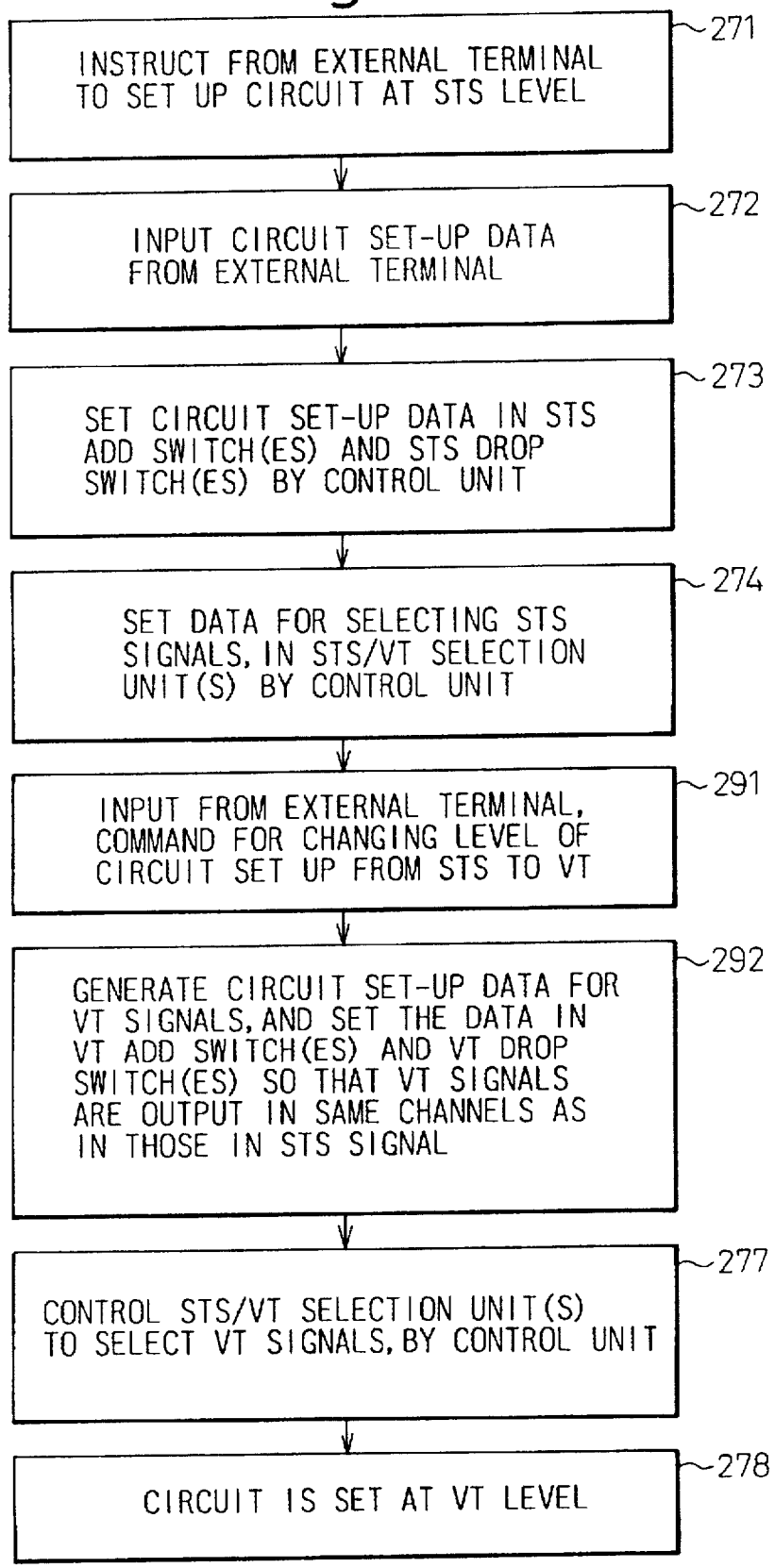
FIG. 49 is a diagram illustrating the construction of the second embodiment of the tenth invention.

EMBODIMENTS OF THE TENTH INVENTION (FIGS. 47 to 49)

Since the construction of FIG. 45A to FIG. 46B realizes the construction of the ninth invention as indicated in FIG. 23, the process of the tenth invention can be executed on the construction of FIG. 45A to FIG. 46B. FIG. 47 is a diagram illustrating the construction of the first embodiment of the tenth invention, and FIG. 48 is an explanatory diagram illustrating the operation of the method according to the tenth invention.

In FIG. 47, in step 271, a command for circuit setting is input from the external terminal 215 of FIG. 45D, and in step 272, circuit setting information at the STS signal level, is input. In response to this input, in step 273, the control unit 216 controls the east-side STS drop signal switch unit 197, the west-side STS drop signal switch unit 202, the east-side STS add signal switch unit 201, and the west-side STS add signal switch unit 196 in FIG. 45B, in accordance with the above circuit setting information at the STS signal level, to establish a circuit at the STS level, where the east-side STS drop signal switch unit 197, the west-side STS drop signal switch unit 202, the east-side STS add signal switch unit 201, and the west-side STS add signal switch unit 196 in FIG. 45B correspond to the higher level circuit switch unit 41 in FIG. 23. In addition, in step 274, the control unit 216 controls the east-side drop signal selector 200 and the west-side drop signal selector 205 in FIG. 45B, the east-side line-side output selector 194 in FIG. 45A, and the west-side line-side output selector 207 in FIG. 45C, so that these selectors select and output STS-1 signals (step 281 in FIG. 48), where the east-side drop signal selector 200 and the west-side drop signal selector 205 in FIG. 45B, the east-side line-side output selector 194 in FIG. 45A, and the west-side line-side output selector 207 in FIG. 45C, correspond to the circuit switching level selection unit 45 in FIG. 23. Next, in step 275, the control unit 216 controls the east-side VT drop signal switch unit 199, the west-side VT drop signal switch unit 204, the east-side VT add signal switch unit 203, and the west-side VT add signal switch unit 198 in FIG. 45B, so that these VT signal level switches output VT signals in the same channel order as the order in which the VT signals are originally arranged (multiplexed) in the corresponding STS-1 signals (step 282 in FIG. 48).

Then, in step 276, a command for circuit setting at the VT signal level is input from the external terminal 215 of FIG. 45D. In response to this command, the control unit 216 controls the east-side drop signal selector 200 and the west-side drop signal selector 205 in FIG. 45B, so that these selectors select and output the VT signals. Thus, the level of circuit setting is changed from the STS signal level to the VT signal level (steps 283 and 284 in FIG. 48).

FIG. 49 is a diagram illustrating the construction of the second embodiment of the tenth invention.

In the above process of FIG. 47, as indicated in step 275 of FIG. 47, the control unit 216 controls the VT signal level switches so that so that these VT signal level switches output VT signals in the same channel order as the order in which the VT signals are originally arranged (multiplexed) in the corresponding STS-1 signals, before the command for circuit setting at the VT signal level is input. Therefore, the above orders of the VT signals are maintained while the circuit setting is made at the STS signal level.

On the other hand, in the process of FIG. 49, the control unit 216 does not control the crossconnection at the VT signal level while the circuit setting is made at the STS signal level. As indicated in step 291 in FIG. 49, when a command for changing the level of circuit setting from the STS signal level to the VT signal level is input from the external terminal 215 of FIG. 45D, in step 292, the control unit 216 controls the east-side VT drop signal switch unit 199, the west-side VT drop signal switch unit 204, the east-side VT add signal switch unit 203, and the west-side VT add signal switch unit 198 in FIG. 45B, so that these VT signal level switches output VT signals in the same channel order as the order in which the VT signals are originally arranged (multiplexed) in the corresponding STS-1 signals (step 282 in FIG. 48). Then, in step 277, the east-side drop signal selector 200 and west-side drop signal selector 205 in FIG. 47 are controlled to select and output the STS-1 signals (steps 283 and 284 in FIG. 48).

EMBODIMENT OF THE FIFTEENTH INVENTION (FIG. 50)

Figure 50:
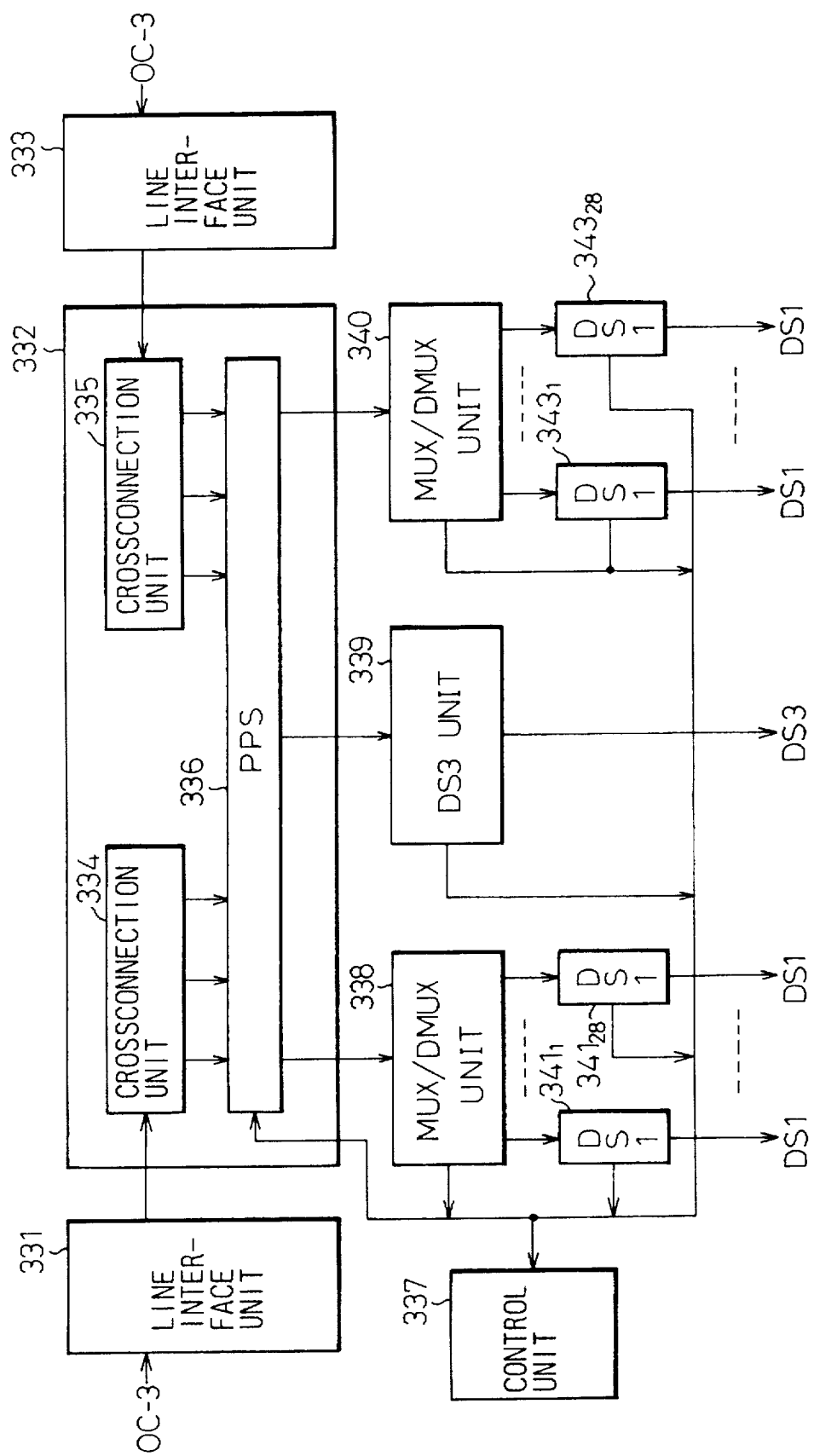
FIG. 50 is a diagram illustrating the construction of an embodiment of the fifteenth invention.

FIG. 50 is a diagram illustrating the construction of an embodiment of the fifteenth invention.

In FIG. 50, reference numeral 331 denotes an east-side line-side interface unit, 332 denotes a common unit, 333 denotes a west-side line-side interface unit, 337 denotes a control unit, 338 and 340 each denote a multiplex/demultiplex unit, 339 denotes a DS3 interface unit, and $341_1$ to $341_{28}$ and $343_1$ to $343_{28}$ each denote a DS1 interface unit. In the common unit 332, reference numeral 334 denotes an east-side crossconnection unit, and 335 denotes a west-side crossconnection unit, and 336 denotes a path protection switch. The add-drop multiplexer of FIG. 50 is located on a bidirectional optical transmission line through which OC-3 signals (in general, OC-N signals) are transmitted in two directions, and the add-drop multiplexer has on the tributary side one DS3 interface unit 339 and two sets of 28-channel DS1 interface units $341_1$ to $341_{28}$ and $343_1$ to $343_{28}$. From these interfaces, signals at the DS1 or DS3 levels contained in the OC-3 signals are accessed.

Since the fifteenth invention relates only to the levels (STS-1 signal level, or VT signal level) at which the operations of the path protection switch are performed, only the constructions relating to the drop signals from the east side and west side are indicated in FIG. 50. 1

The east-side line-side interface unit 331 in FIG. 50 receives, converts and demultiplexes an OC-3 signal transmitted thereto in one direction, into three STS-1 signals of the east side, and the west-side line-side interface unit 333 in FIG. 50 receives, converts and demultiplexes an OC-3 signal transmitted thereto in the other direction, into three STS-1 signals of the west side. These STS-1 signals of the east and west sides are supplied to the common unit 332. In the common unit 332, these STS-1 signals are subjected to crossconnection in the east-side and west-side crossconnection units 334 and 335, respectively. The crossconnection is performed at the STS signal level, or at the VT signal level when any of the above STS-1 signals contain a multiplexed VT signals. The east-side and west-side crossconnection units 334 and 335 can be realized, for example, by the construction of FIG. 45B. The outputs of the east-side and west-side crossconnection units 334 and 335 are supplied in parallel to the path protection switch 336. These outputs from the east-side and west-side crossconnection units 334 and 335 are mutually corresponding signals, and the path protection switch 336 selects one of these corresponding signals from the east side and west side, to output the selected one to the tributary side. The operation in the path protection switch 336 can be performed at the STS signal level, or at the VT signal level when any of the above STS-1 signals contains a multiplexed VT signals. When the outputs of the east-side and west-side crossconnection units 334 and 335 are each comprised of three STS-1 signals, as in the construction of FIGS. 46A and 46B, the path protection switch 336 may be comprised of three path protection switches each performing a selection of a pair of corresponding STS-1 signals. Thus, in the construction FIG. 50, the path protection switch 336 performs selection for three pairs of mutually corresponding signals, and outputs three selected signals.

Among these outputs of the path protection switch 336, the two outputs supplied to the two multiplex/demultiplex units 338 and 340, each contain a multiplexed plurality of VT signals. The multiplex/demultiplex units 338 and 340 each demultiplex the multiplexed plurality of VT signals, and supply to the DS1 interface units $341_1$ to $341_{28}$ and $343_1$ to $343_{28}$ for 28 channels, respectively. Each of the DS1 interface units $341_1$ to $341_{28}$ and $343_1$ to $343_{28}$ transforms the VT signal supplied from the multiplex/demultiplex unit 338 or 340 into a DS1 signal to be output to a tributary-side DS1 channel.

The signal supplied from the path protection switch 336 to the DS3 interface unit 339 contains information corresponding to a DS3 signal (45 Mb/s). The DS3 interface unit 339 receives and transforms this information into a DS3 signal to be output to a DS3 channel.

In the above construction, it is required for both the operations of the crossconnection by the east-side and west-side crossconnection units 334 and 335 and of the path protection switching by the path protection switch 336 to be performed at the same level, for example, at the VT signal level for the signals to be dropped to the tributary-side DS1 interface units $341_1$ to $341_{28}$ and $343_1$ to $343_{28}$, or at the STS level for the signal to be dropped to the DS3 interface unit 339.

According to the fifteenth invention, each of the tributary-side DS1 interface units $341_1$ to $341_{28}$ and $343_1$ to $343_{28}$, and the DS3 interface unit 339 can indicate the type of its own interface unit, for example, DS1, DS-3, or the like. For example, a specific digital pattern indicating the type may be output from a respective tributary-side interface unit, as the indication. The control unit 337 can realize the unit type recognition unit 305, the switch level determination unit 306, and the level setting control unit 307 in the construction of FIG. 31, and can be constructed by software, hardware logic circuit, or their combination. Therefore, the control unit 337 in FIG. 50 reads the above indication, determines which type of tributary signal each tributary-side interface unit outputs, for example, DS1 or DS3, based on the indication, and sets the switch level of the path protection switch 336, based on the determination. The setting or change of the switch level can be realized, for example, by the construction according to the eleventh invention. Thus, in the construction of FIG. 50, the above-mentioned three path protection switches in the switch 336 are able to have their switch levels automatically set by the control unit 337 in accordance with the types of the tributary-side interface units to which the signals from the path protection switches are to be dropped, respectively.

EMBODIMENT OF THE SIXTEENTH INVENTION (FIG. 51)

Figure 51:
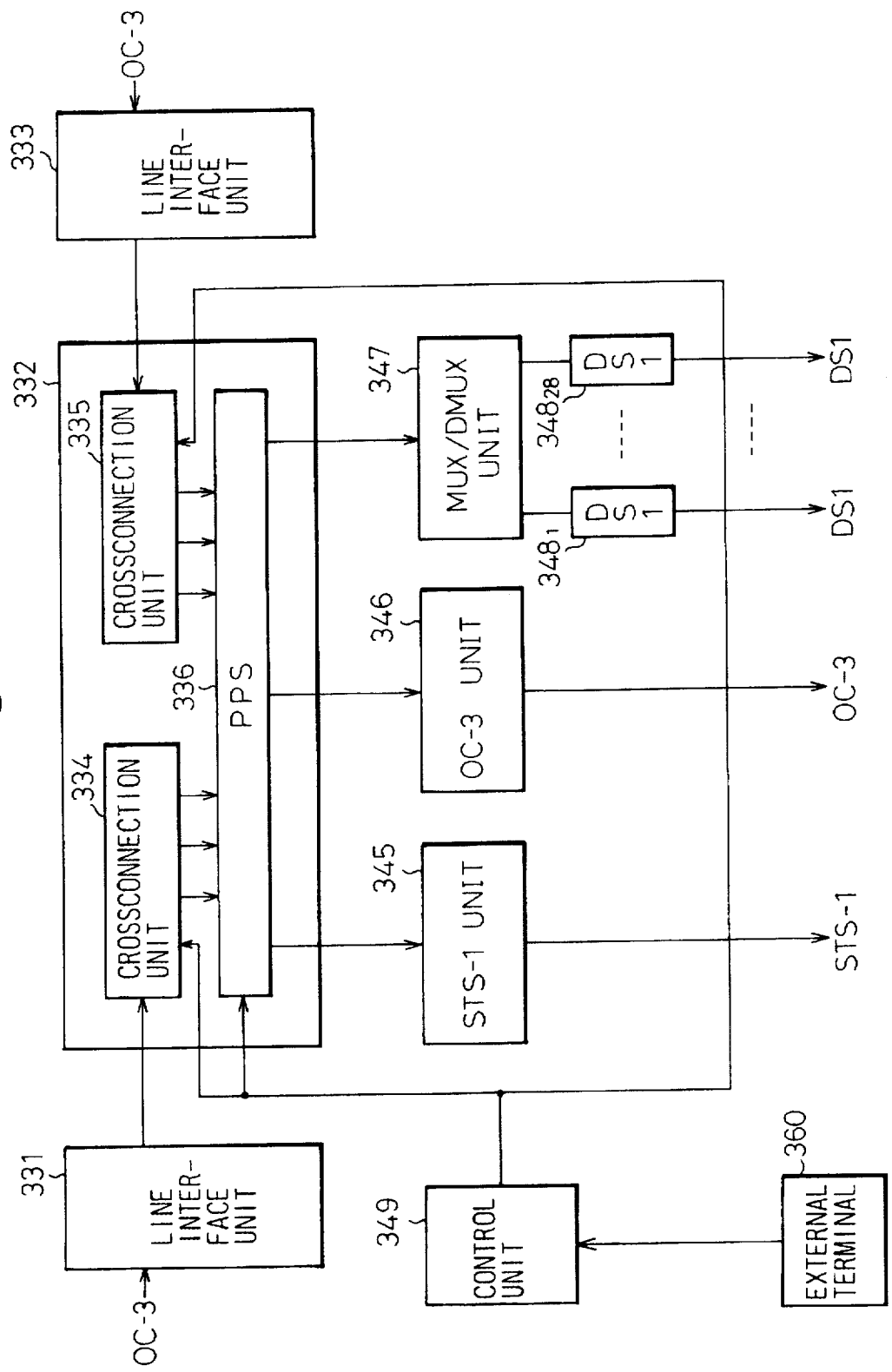
FIG. 51 is a diagram illustrating the construction of an embodiment of the sixteenth invention.

FIG. 51 is a diagram illustrating the construction of an embodiment of the sixteenth invention.

In FIG. 51, the constructions of the line-side interface units 331 and 333, and the common unit 332 are the same as the corresponding elements in FIG. 50. In the embodiment of FIG. 51, the add-drop multiplexer has, on the tributary-side, an STS-1 interface unit 345, an OC-3 interface unit 346, and a multiplex/demultiplex unit 347 to which DS1 interface units $348_1$ to $348_{28}$ for twenty-eight channels are connected. Further, an external terminal 360 is connected to the control unit 349. Level setting information which designates the level at which the crossconnecting operation by the east-side and west-side crossconnection units 334 and 335 are performed, STS-1 level or VT signal level, is supplied from the external terminal 360 to the control unit 349. The control unit 349 the crossconnection level input unit 317, the crossconnection level control unit 318, the switch level determination unit 319, and the switch level setting control unit 320 in the construction of FIG. 32, and can be constructed by software, hardware logic circuit, or their combination. The control unit 349 inputs the level setting information, and controls the east-side and west-side crossconnection units 334 and 335 based on the level setting information. According to the sixteenth invention, the control unit 349 determines the level (STS signal level or VT signal level) at which the operations by the path protection switch 336 are performed, based on level setting information, and controls the path protection switch 336 based on the determination.

In the construction of FIG. 51, an STS-1 signal is supplied to each of the STS-1 interface unit 345 and the OC-3 interface unit 346. The STS-1 interface unit 345 outputs the received STS-1 signal to a tributary STS-1 channel. The OC-3 interface unit 346 generates an STS-3 signal containing the received STS-1 signal only, and converts the STS-3 signal into an OC-3 signal to be output to an OC-3 channel. The multiplex/demultiplex unit 347 receives a multiplexed VT signals, and demultiplexes the multiplexed VT signals into the plurality of VT signals, which are to be supplied to the DS1 interface unit $348_1$ to $348_{28}$, respectively. Each of the DS1 interface units $348_1$ to $348_{28}$, transforms the supplied VT signal into a DS1 signal, which is to be output to a tributary-side DS1 channel.

In the above construction, the signals to be dropped to the multiplex/demultiplex unit 347 are required to be crossconnected by the east-side and west-side crossconnection units 334 and 335 at the VT signal level, and are also required to be switched by the path protection switch 336 at the VT signal level.

On the other hand, the signals to be dropped to the STS-1 interface unit 345 and the OC-3 interface unit 346 are required to be crossconnected by the east-side and west-side crossconnection units 334 and 335 at the STS signal level, and are also required to be switched by the path protection switch 336 at the STS signal level.

According to the sixteenth invention, level setting information which designates the levels at which the crossconnecting operations by the east-side and west-side crossconnection units 334 and 335 are to be performed, for respective tributary-side interface units, is input from the external terminal 360 to the control unit 347. The control unit 347 controls the east-side and west-side crossconnection units 334 and 335 based on the above level setting information, determines the levels at which the operations of the path protection switch 336 are to be performed, based on the level setting information, for the respective tributary-side interface units, and controls the path protection switch 336 based on the determination. Namely, the control unit 347 controls the above-mentioned three path protection switches respectively supplying drop signals to the STS-1 interface unit 345, the OC-3 interface unit 346, and the multiplex/demultiplex unit 347, so that the path protection switch corresponding to the STS-1 interface unit 345 and the path protection switch corresponding to the OC-3 interface unit 346 perform the path protection switching operations at the STS signal level, and the path protection switch corresponding to the multiplex/demultiplex unit 347 performs the path protection switching operation at the VT signal level.

Figure 52:
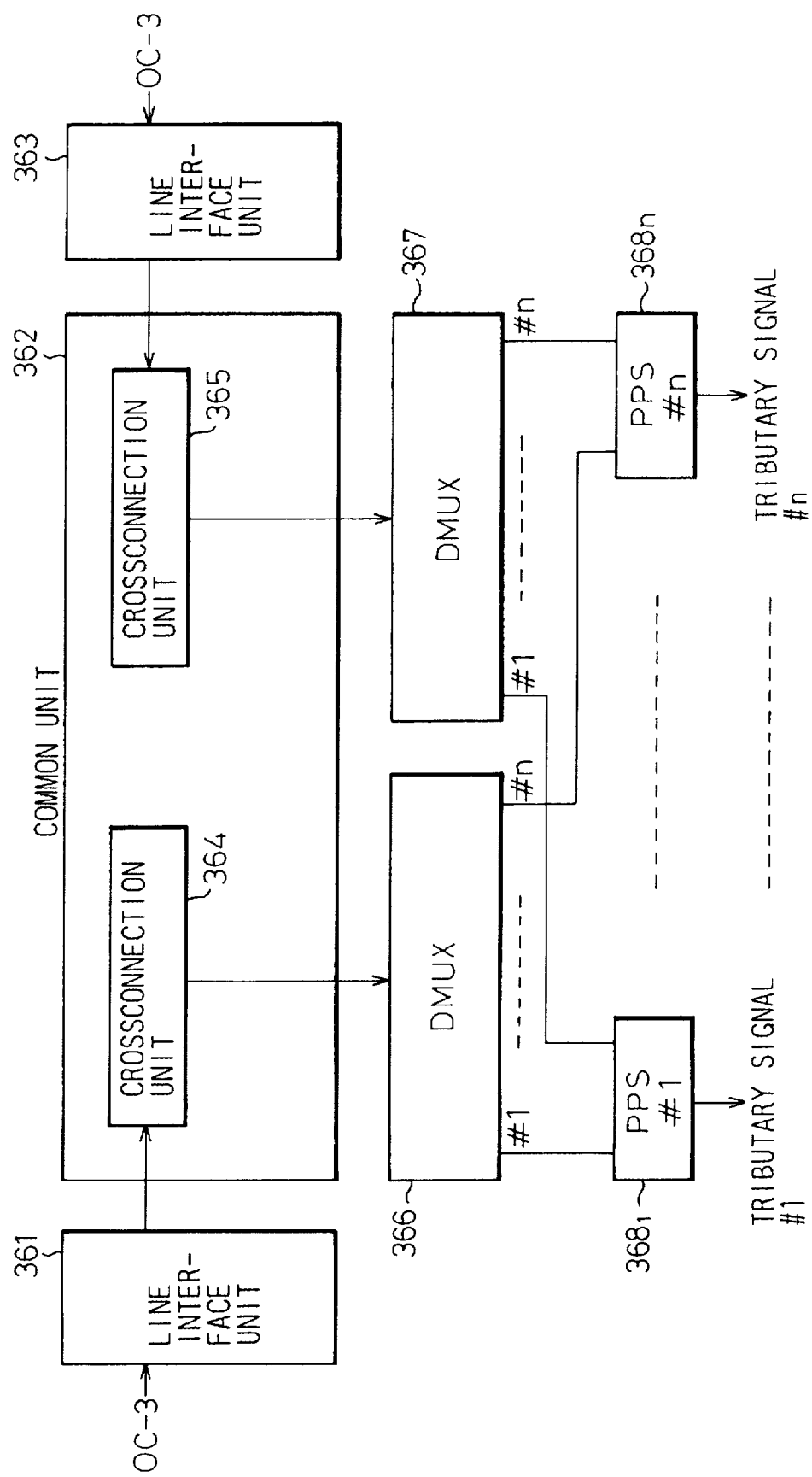
FIG. 52 is a diagram illustrating a conventional construction corresponding to the construction of the seventeenth invention.
Figure 53:
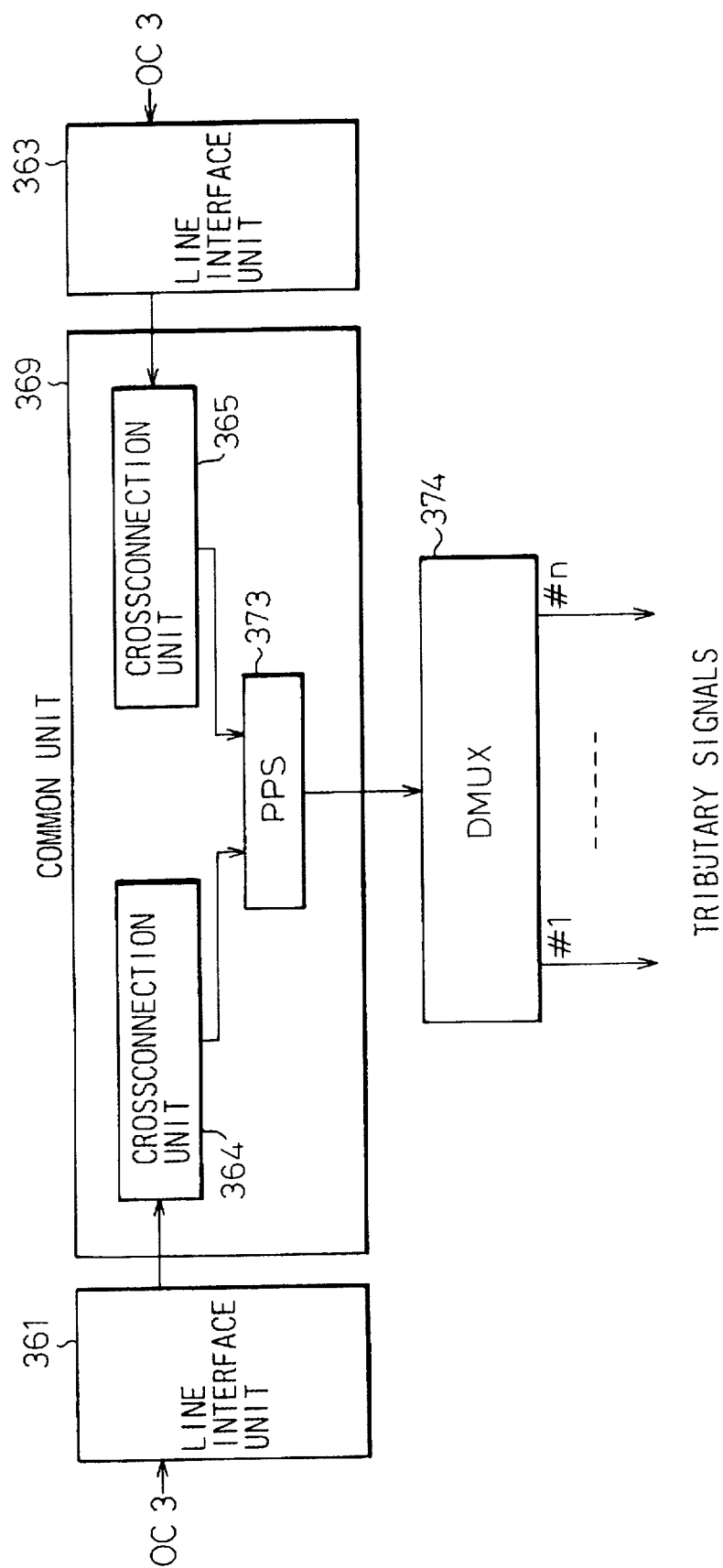
FIG. 53 is a diagram illustrating the construction of an embodiment of the seventeenth invention.

EMBODIMENT OF THE SEVENTEENTH INVENTION (FIGS. 52 and 53)

FIG. 52 is a diagram illustrating a conventional construction corresponding to the construction of the seventeenth invention, and FIG. 53 is a diagram illustrating the construction of an embodiment of the seventeenth invention.

In FIG. 52, reference numeral 361 denotes an east-side line-side interface unit, 362 denotes a common unit, 363 denotes a west-side line-side interface unit, 366 denotes an east-side demultiplex unit, 367 denotes a west-side demultiplex unit, and $368_1$ to $368_n$ each denote a path protection switch. In the common unit 362, 364 denotes an east-side crossconnection unit, and 365 denotes a west-side crossconnection unit.

In the construction of FIG. 53, the east-side line-side interface unit 361, the west-side line-side interface unit 363, and the east-side and west-side crossconnection units 364 and 365 in the common unit 369, are the same as the corresponding elements in the conventional construction of FIG. 52.

In the construction of FIG. 53, according to the seventeenth invention, the outputs of the east-side and west-side crossconnection units 364 and 365 are supplied to a single path protection switch 373, and the signal output from the path protection switch 373 is supplied to a single demultiplexer 374, which outputs tributary signals of n channels. On the other hand, in the conventional construction of FIG. 52, two demultiplexers 366 and 367 for the east and west sides, and n path protection switches for n tributary channels are necessary. Namely, according to the seventeenth invention, the circuit construction is simplified by providing a demultiplexer on the tributary side of the path protection switch.

Figure 54:
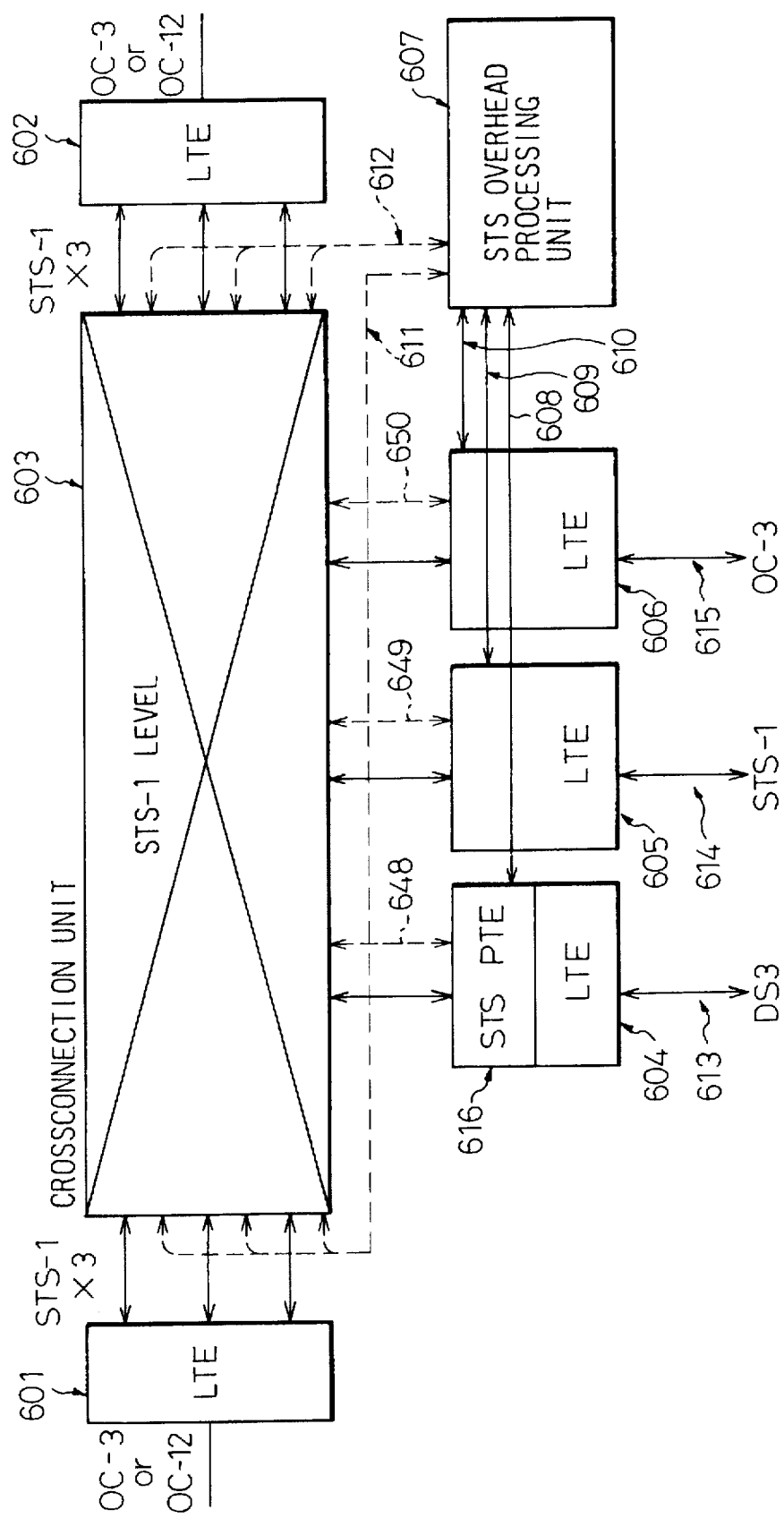
FIG. 54 is a diagram illustrating a conventional construction corresponding to the construction of the eighteenth invention.
Figure 55:
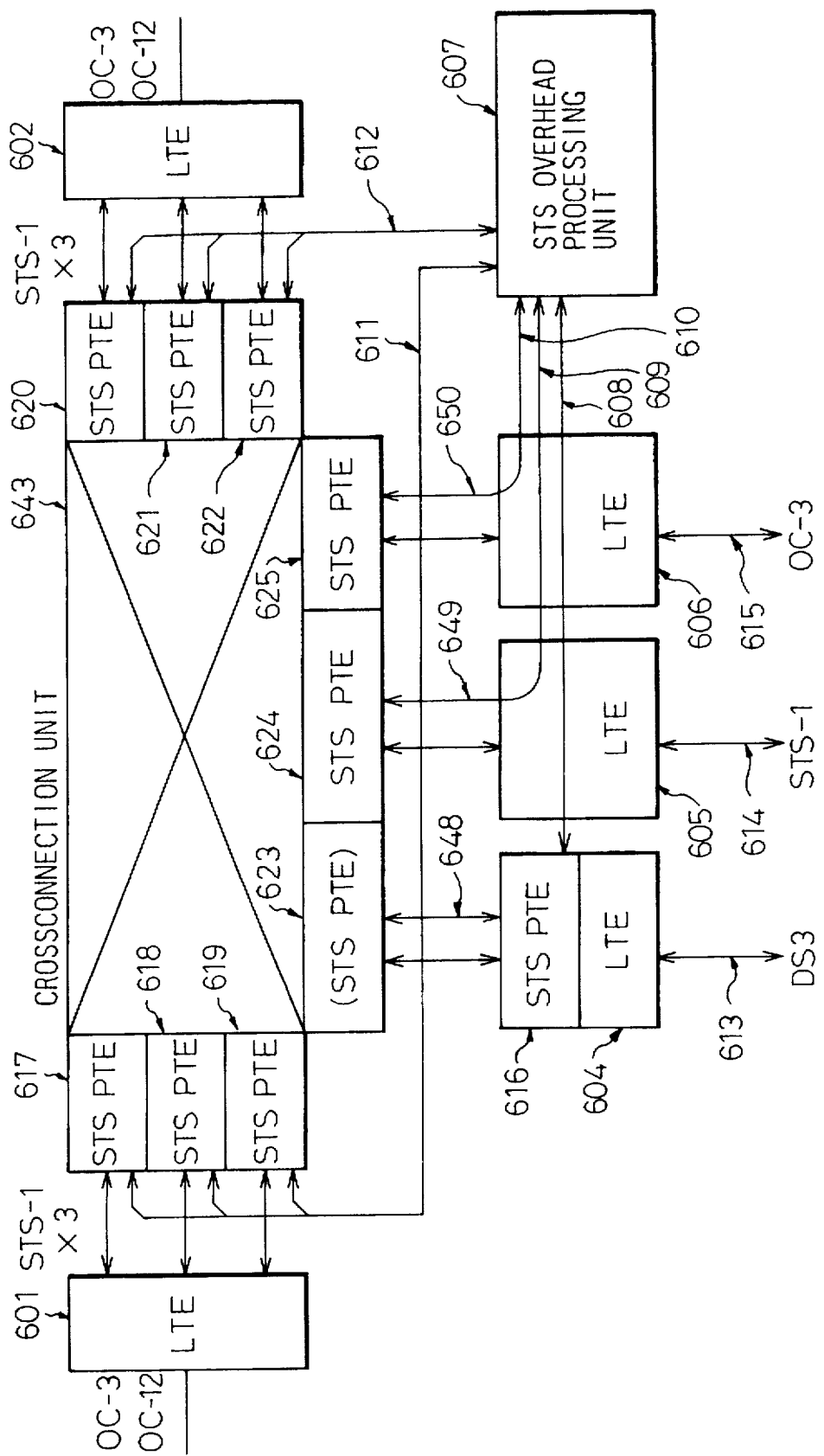
FIG. 55 is a diagram illustrating the construction of an embodiment of the eighteenth invention.
Figure 56:
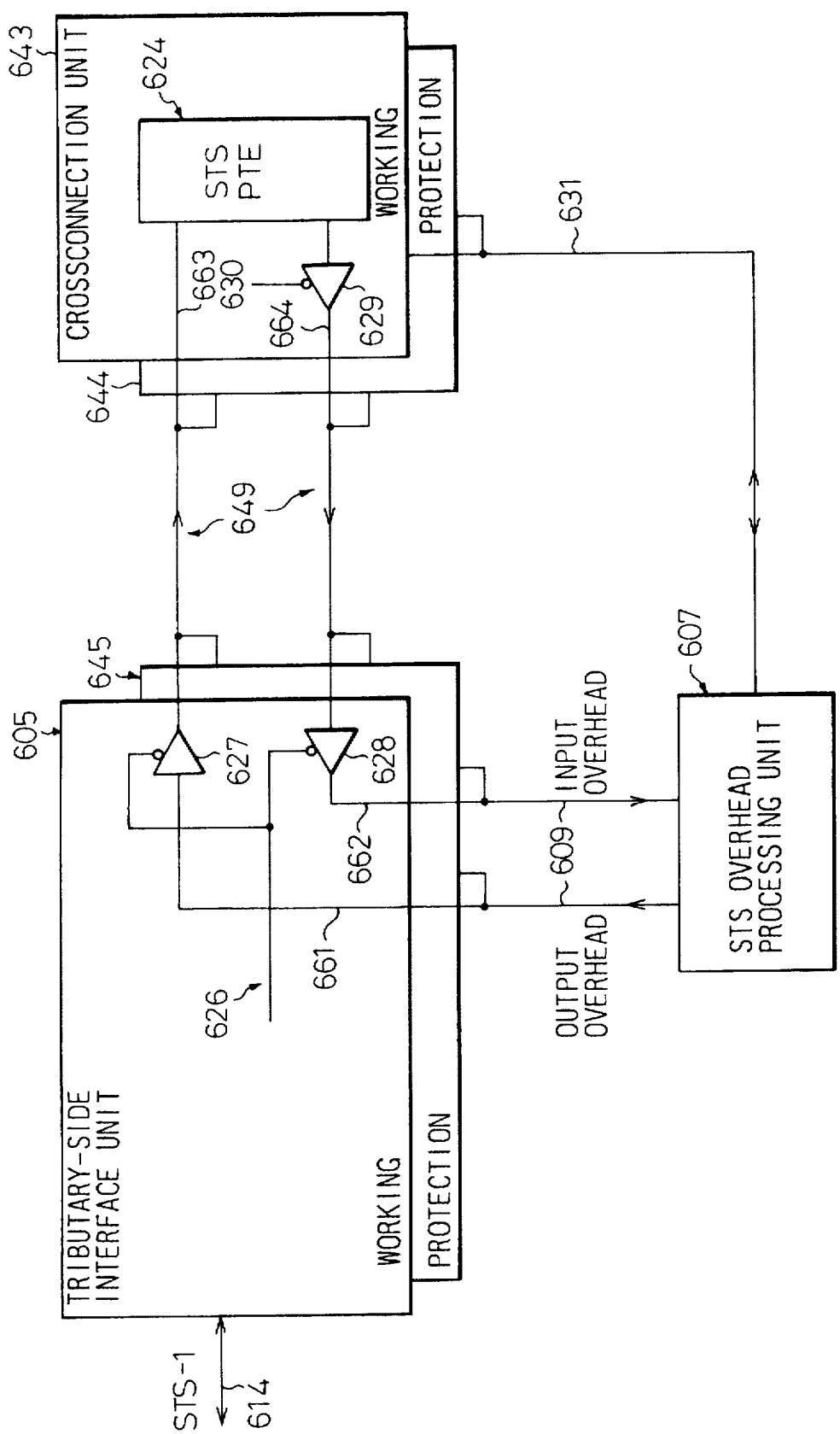
FIG. 56 is a diagram illustrating an example construction for signal line connection in the construction of FIG. 55.

EMBODIMENT OF THE SIXTEENTH INVENTION (FIGS. 54 to 56)

FIG. 54 shows a conventional construction corresponding to the construction of the eighteenth invention. In FIG. 54, 601 and 602 each denote an optical interface unit, 603 denotes an STS-1 level crossconnection unit, 604 to 606 denotes a tributary interface unit, and 607 denotes an STS overhead processing unit. Each of these units can be constructed in one circuit package, and is connected to another circuit package with a cable or the like. The optical interface units 601 and 602 receive an OC-3 or OC-12 signal and perform a photoelectric conversion and a demultiplexing operation on the received signal to obtain three STS-1 signals, which are then supplied to the STS-1 level crossconnection unit 603. In addition, the optical interface units 601 and 602 receive three STS-1 signals from the STS-1 level crossconnection unit 603, perform a multiplexing operation and photoelectric conversion to generate and transmit an OC-3 or OC-12 signal. The STS-1 level crossconnection unit 603 exchanges channels of the three STS-1 signals input thereto, at the STS signal level, and outputs the channel exchanged STS-1 signals to the three tributary units 604 to 606. The tributary units 604 to 606 are a DS3 interface unit, an STS-1 interface unit, and an OC-3 interface unit, which are respectively connected to the DS3, STS-1, and OC-3 signal transmission lines 613, 614, and 615. The three tributary units 604 to 606 each contain line termination equipment (LTE) for terminating the DS3, STS-1, and OC-3 signal transmission lines 613, 614, and 615, respectively. In the STS-1 interface unit 605 and the OC-3 interface unit 606, the STS-1 signals supplied from the crossconnection unit 603 are transmitted onto the tributary-side transmission lines 614 and 615, as the STS-1 signal per se, or contained in an OC-3 signal, while in the DS3 interface unit 604, the STS-1 signals supplied from the crossconnection unit 603 are terminated by the STS-1 termination circuit 616, so that overhead information in the STS-1 signals is removed therefrom, and a DS3 signal contained in the payload of the STS-1 signal is transmitted onto the DS3 transmission line 613.

In the construction of FIG. 54, the STS-1 termination circuit is mounted on each circuit package for each of the tributary interface units 604 to 606 when it is used as a DS3 interface unit. Therefore, signal lines 608, 609, and 610 are provided between the STS-1 termination circuit and the STS overhead information processing unit 607 for transferring overhead information therebetween, where the STS overhead information processing unit 607 performs processing of the overhead information which is inserted into or extracted from the STS-1 signal by the STS-1 termination circuit.

In addition, for the case wherein a DS1 interface unit is connected as the tributary interface unit, the construction of FIG. 54 is designed so that signal lines indicated in FIG. 54 by dashed lines can be provided between the STS overhead information processing unit 607 and the crossconnection unit 603, and between the STS overhead information processing unit 607 and each of the tributary interface units 604 to 606. Further, signal lines as indicated in FIG. 54 by the dashed lines 648 to 650 are provided between the crossconnection unit 603 and each of the tributary interface units 604 to 606. These signal lines 648, 649, and 650 are used only when each tributary interface unit is used as a DS1 interface unit. When a DS1 signal is dropped, an STS-1 termination circuit is provided on the sides of the optical interface unit 601 and 602 in the crossconnection unit 603, an STS-1 SPE signal is transferred between the crossconnection unit 603 and the DS1 interface unit. In the DS1 interface unit, the STS-1 SPE signal input from the crossconnection unit 603 is demultiplexed to a plurality of VT signals, and each VT signal is terminated to obtain a DS1 signal. In addition, a plurality of DS1 signals are input from a DS1 transmission line to form VT signals, and the VT signals are multiplexed to from an STS-1 SPE signal, which is supplied to the crossconnection unit 603.

When performing crossconnection at the VT signal level in addition to the STS level in the construction of FIG. 54, the crossconnection unit 603 must be replaced with a crossconnection unit 643 which can perform crossconnection at the VT level, as indicated in FIG. 55. As indicated in FIG. 55 also, STS-1 termination circuits are provided on the side of the optical interface units 601 and 602 in the crossconnection unit 643. Further, when an interface unit (for example, such as the above STS-1 interface unit 605 or the OC-3 interface unit 606) which transfers STS-1 signals to the crossconnection unit 643 and receives STS-1 signals from the crossconnection unit 643, is provided on the tributary side of the crossconnection unit 643, it is necessary to provide an STS-1 termination circuit (as the elements 624 and 625 in FIG. 55) on the tributary-side of the crossconnection unit 643. In this case, another signal line for transferring overhead information is necessary between the above STS-1 termination circuits 624 and 625, and the STS overhead information processing unit 607. Namely, in order to change the level of the crossconnecting operation of the crossconnection unit, new connection lines are necessary between the crossconnection unit and the STS overhead information processing unit for the STS path overhead processing. However, the increase in wiring leads an increase in cost.

FIG. 55 shows the construction of an embodiment of the eighteenth invention, and FIG. 56 shows an example construction for signal line connection in the construction of FIG. 55.

In the embodiment of FIG. 55, the above signal lines 648 to 650, which are provided between the crossconnection unit and the tributary interface unit, for connection of a DS1 interface unit, are used as signal lines for transferring overhead information. FIG. 56 indicates an example construction for realizing the above use for the portion relating to the STS-1 interface unit 605 in FIG. 55. In the example of FIG. 56, each of the crossconnection unit and the tributary interface unit has a working-system and a protection-system unit.

In FIG. 56, reference numeral 605 denotes a working-system tributary interface unit, 645 denotes a protection-system tributary interface unit, 643 denotes a working-system crossconnection unit, and 644 denotes a protection-system crossconnection unit. In addition, 607 denotes the STS overhead information processing unit in FIG. 55, 609 denotes the signal line for transferring overhead information in FIG. 55, and 649 denotes the signal line in FIG. 55, which is provided for the case wherein a DS1 interface unit is connected, between the crossconnection unit and the DS1 interface unit. Each of the signal lines 609 and 649 are each comprised of a pair of signal lines for transmission and reception.

The first circuit package 501 in FIG. 34 corresponds to the crossconnection unit 643 or 644 in FIG. 56, the second circuit package 505 in FIG. 34 corresponds to the tributary interface unit 605 or 645 in FIG. 56, the first signal line 504 in FIG. 34 corresponds to the pair of signal lines 649 in FIG. 56, the second signal line 508 in FIG. 34 corresponds to the pair of signal line 609 in FIG. 56, the first overhead extraction circuit 502 in FIG. 34 corresponds to the STS-1 termination circuit 624 in FIG. 56, the first connection unit 503 in FIG. 34 is provided in the crossconnection unit 643 or 644 in FIG. 56, and corresponds to the pair of signal lines 663 and 664 which connect the pair of signal lines 649 and the overhead information input terminals of the STS-1 termination circuits 624 (and connectors on the backboard, which are not shown) in FIG. 56, the second connection unit 507 in FIG. 34 is provided in the tributary interface unit 605 or 645, and corresponds to the pair of signal lines 661 and 662 which connect the pair of signal lines 609 and the pair of signal lines 649 (and connectors which are not shown) in FIG. 56. In the construction of FIG. 56, the tri-state buffers 627 and 628 are made ON in the one of the working-system and protection-system tributary interface units 605 and 645 which is used, and are in the high-impedance condition in the other one of the working-system and protection-system tributary interface units 605 and 645, which is not used. The tri-state buffers 629 are also controlled in the same way as the tri-state buffers 627 and 628.

As explained above, according to the eighteenth invention, conventional connection lines can be skillfully utilized to avoid of an increase in the wiring.

EMBODIMENT OF THE NINETEENTH TO TWENTY-SECOND INVENTIONS (FIGS. 57 to 60)

In order to realize with one device functions necessary to access a DS1 signal contained in an OC-12 signal, it is necessary to efficiently divide the functions into a plurality of circuit packages. As explained below, the division of the functions of the crossconnection unit (for crossconnecting channels at the STS signal level and the VT signal level) is important.

The constructions of the embodiments of the nineteenth to twenty-second inventions, as indicated in FIG. 57 to FIG. 60, each realize an add-drop multiplexer located on a bidirectional optical transmission line through which OC-N (for example, OC-12) signals are transmitted in two directions. The add-drop multiplexer drops n channels (for example, three channels) among N channels of the OC-N signals, adds n channels to the OC-N signals, and makes the other (N-n) channels of the OC-N signals pass through the add-drop multiplexer, and the add-drop multiplexer allows access from the tributary side to VT signals contained in the STS-1 signals of the n channels.

As explained below, in the embodiments of the nineteenth to twenty-second inventions, the functions of the crossconnection unit are divided into a plurality of circuit packages in various ways to obtain corresponding advantages, respectively. In FIG. 57 to FIG. 60, each area enclosed by dashed lines corresponds to a circuit package.

EMBODIMENT OF THE NINETEENTH INVENTION (FIG. 57)

Figure 57:
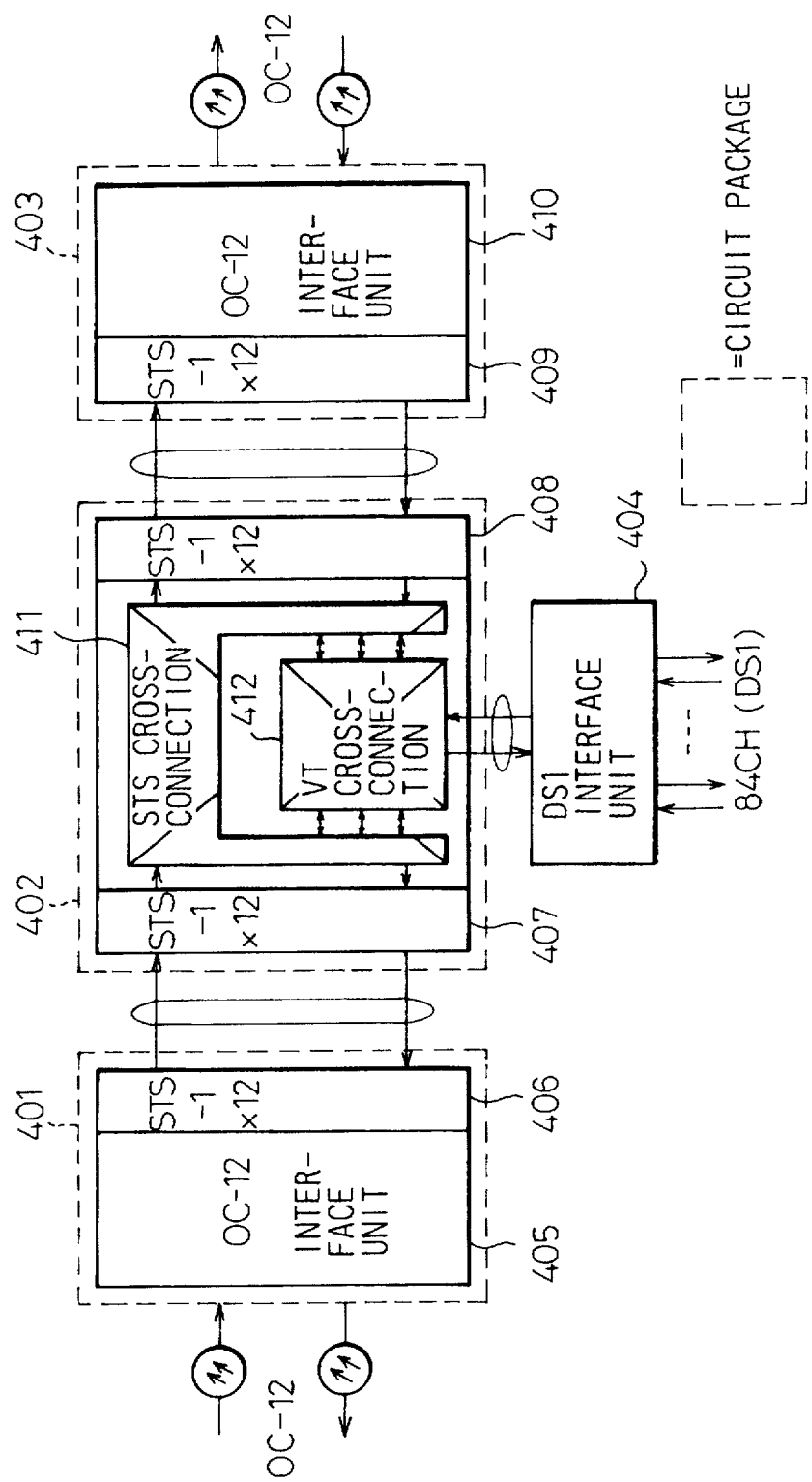
FIG. 57 is a diagram illustrating the construction of an embodiment of the nineteenth invention.

FIG. 57 is a diagram illustrating the construction of an embodiment of the nineteenth invention.

In the embodiment of the nineteenth invention, as indicated in FIG. 57, the functions of the crossconnection at the STS level and the VT level (the STS level crossconnection unit 411 and the VT level crossconnection unit 412) are concentrated in one circuit package 402.

According to the above construction, the loads on the circuit packages 401 and 403, for an optical interface, can be reduced. Further, the operations of crossconnection can be controlled at one location. For example, when the operations of crossconnection are controlled by software, the software can monitor and control only one circuit package. Therefore, the efficiency in the control of the operations of crossconnection is increased.

In FIG. 57, in each of the optical interface units 405 and 410, conversion from an electric signal to an optical signal, and conversion from an electric signal to an optical signal, are performed, and multiplex and demultiplex operations are performed to the level of the STS-1 signal. Each of the optical interface units 405 and 410 transfers to and receives from crossconnection unit 411 STS-1 signals through the twelve STS-1 interface units for each side 407 and 408. Among the twelve STS-1 signals input into the circuit package 402 for the crossconnection units, three STS-1 signals are selected to be dropped and added, and the other nine STS-1 signals are made pass through, by the crossconnection unit 411 at the STS level. The selected three STS-1 signals are further crossconnected by the crossconnection unit 412 at the VT1.5 level. The control of the crossconnecting operations by the two crossconnection units 411 and 412 is concentrated in one circuit package 402.

EMBODIMENT OF THE TWENTIETH INVENTION (FIG. 58)

Figure 58:
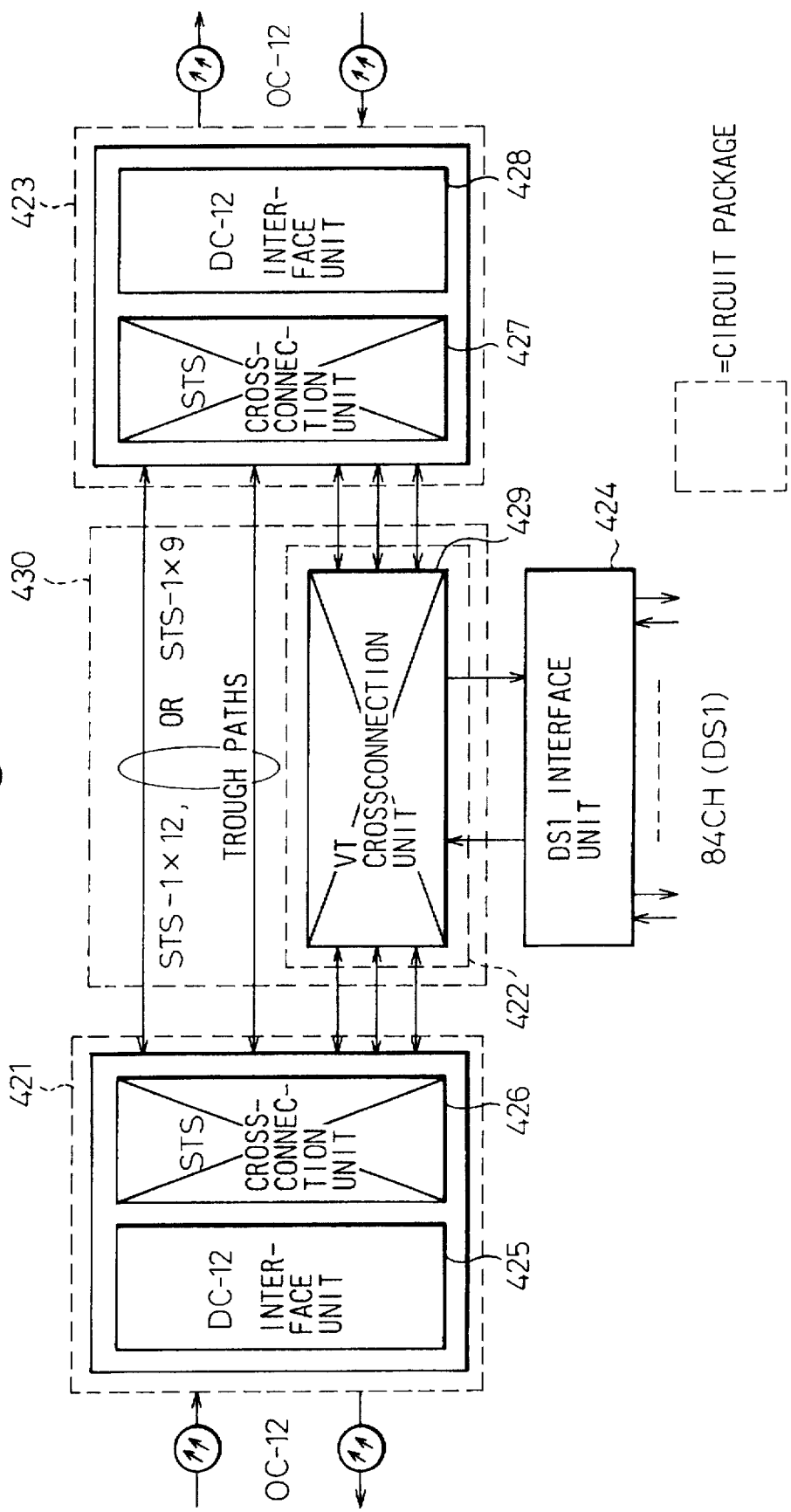
FIG. 58 is a diagram illustrating the construction of an embodiment of the twentieth invention.

FIG. 58 is a diagram illustrating the construction of an embodiment of the twentieth invention.

In the embodiment of the twentieth invention, as indicated in FIG. 58, the function of crossconnection at the STS level is divided into two units 426 and 427, these units are contained in the circuit packages 421 and 423 for the optical interface, and the crossconnection unit 429 for the VT level is arranged separately in the circuit package 430. In the circuit package 430, nine through paths are provided for the above nine STS-1 signals. Thus, the functions of crossconnection is divided into three circuit packages 421, 423, and 430. The division into the two STS-1 level crossconnection units 426 and 427 may be performed, for example, by containing the selectors $102_1$ to $102_3$, in the construction of FIG. 35, in the circuit package 421, and containing the other selectors $105_1$ to $105_3$ and $108_1$ to $108_{12}$ in the circuit package 423. The construction of FIG. 35 for the opposite direction of the OC-12 signal, can also be divided into the two circuit packages 423 and 421. The STS-1 crossconnection units 426 and 427 in the circuit packages 421 and 423 selects three STS-1 signals which are to be connected to the VT crossconnection unit 429, and the other nine STS-1 signals are directly transferred to the opposite optical interface circuit packages 423 and 421. Alternatively, the above nine STS-1 signals may also connected to the VT crossconnection unit 429, and the VT crossconnection unit 429 may provide through paths for the nine STS-1 signals. Further, all of the twelve STS-1 signals may be transferred to the other optical interface circuit package, and in the STS crossconnection unit in the opposite side circuit package, the STS-1 signals to be transmitted may be selected from the twelve passed-through STS-1 signals and three added STS-1 signals.

According to the above construction, loads on the circuit package 422 can be reduced. Namely, hardware loads on the plurality of circuit packages are made uniform, i.e., physical sizes of the hardware mounted on the respective circuit packages are made uniform, and therefore, circuit packages can be efficiently contained in a shelf.

EMBODIMENT OF THE TWENTY-FIRST INVENTION (FIG. 59)

FIG. 59 is a diagram illustrating the construction of an embodiment of the twenty-first invention.

In the embodiment of the twenty-first invention, as indicated in FIG. 59, crossconnection units at the STS level and the VT level are divided, based on the directions of the signals, into two circuit packages 441 and 442. Thus, the number of wirings between circuit packages can be reduced. The processing relating to signals in each direction can be performed in one circuit package due to the above division. Therefore, physical wiring between the circuit packages can be reduced. The amount of wiring on a shelf is reduced, and the size of the connectors for connection between circuit packages may be reduced.

EMBODIMENT OF THE TWENTY-SECOND INVENTION (FIG. 60)

FIG. 60 is a diagram illustrating the construction of an embodiment of the twenty-second invention.

In the embodiment of the twenty-the second invention, as indicated in FIG. 60, a VT crossconnection unit 471 is independently contained in one circuit package 463 and the functions of crossconnection are divided into packages 461, 462, and 463. The first circuit package 461 contains the optical interface 465, the STS level crossconnection unit 466, and the optical interface 467, and the second circuit package contains the optical interface 470, the STS level crossconnection unit 469, and the optical interface 468. When compared with the construction of FIG. 59, hardware loads on the respective circuit packages are reduced. In addition, the hardware loads on the respective circuit packages are made uniform.

STORAGE MEDIUM STORING PROGRAM OF PROCESS EXECUTION

Any of the processes, as explained above, can be executed by a programmable machine such as a computer, the program which instructs the programmable machine to execute the process can be stored in a computer-readable storage medium such as a floppy disc, a CD-ROM, or a ROM.

We claim:

1. An add-drop multiplexer comprising:

a partial drop unit for selecting a number n of first signal(s) of n channel(s) among a number N of first signals of N channels, which are received from a first transmission line, and transmitting the n first signal(s) of n channel(s) on at least one second transmission line, where N and n are integers satisfying N>n>0; and a partial add unit for receiving n second signal(s) of n channel(s) from at least one third transmission line, and a number (N-n) of first signal(s) of (N-n) channel(s) among the N first signals of the N channels, which are not selected by the partial drop unit, and for transmitting on the first transmission line the n second signal(s) of n channel(s) and the (N-n) first signal(s) of (N-n) channel(s) as N third signals of N channels, wherein said first and third signals are contained in transmission frames of a predetermined form when being transmitted on the first transmission line, and each transmission frame can contain information to be transmitted and pointer information which indicates a phase of the information to be transmitted, in the transmission frame, said partial add unit inserts information contained in the n second signal(s) of n channel(s) and the (N-n) first signal(s) of (N-n) channel(s), into the transmission frames to be transmitted, in sychronization with timing of the add-drop multiplexer, and the add-drop multiplexer further comprises a phase and frequency control unit which obtains information on phases of the information contained in the n second signal(s) of n channel(s) and the (N-n) first signal(s) of (N-n) channel(s), in the transmission frames to be transmitted, and inserts the information on the phases into the transmission frames as the pointer information.

2. An add-drop multiplexer according to claim 1, wherein said phase and frequency control comprises a unit for obtaining the phases in the transmission frames based on reference phases of the transmission frames to be transmitted, at least one phase of the information contained in the n second signal(s) of n channel(s), and at least one phase of the information contained in the (N-n) received first signal(s) of (N-n) channel(s).

3. An add-drop multiplexer according to claim 1, wherein said phase and frequency control comprises a unit for performing stuff and destuff control in the transmission frames containing the third signals, based on frequencies of the third signals to be transmitted, and at least one frequency of the (N-n) first signal(s) when the (N-n) first signal(s) is received.

4. An add-drop multiplexer comprising: a partial drop unit for selecting a number n of first signal(s) of n channel(s) among a number N of first signals of N channels, which are received from a first transmission line, and transmitting the n first signal(s) of n channel(s) on at least one second transmission line, where N and n are integers satisfying N>n>0; and a partial add unit for receiving n second signal(s) of n channel(s) from at least one third transmission line, and a number (N-n) of first signal(s) of (N-n) channel(s) among the N first signals of the N channels, which are not selected by the partial drop unit, and for transmitting on the first transmission line the n second signal(s) of n channel(s) and the (N-n) first signal(s) of (N-n) channel(s) as N third signals of N channels, wherein said n first signal(s) of the n channel(s) is contained in at least one transmission frame of a predetermined form when being transmitted on the at least one second transmission line, and each transmission frame can contain information to be transmitted and pointer information which indicates a phase of the information to be transmitted, in the transmission frame, and the add-drop multiplexer further comprises a phase and frequency control unit which inserts first information contained in the n first signal(s) of n channel(s) when the n first signal(s) of n channel(s) is received, into the at least one transmission frame which contains the n first signal(s) and is to be transmitted on the at least one second transmission line, in synchronization with timing of the add-drop multiplexer, obtains second information on at least one phase of the first information inserted in the at least one transmission frame of the n first signal(s), and inserts the second information on the at least one phase into the at least one transmission frame as the pointer information.

5. An add-drop multiplexer according to claim 4, wherein said phase and frequency control comprises a unit for obtaining the at least one phase in the at least one transmission frame based on at least one reference phase of the at least one transmission frame to be transmitted, and at least one reception phase at which the first information is received.

6. An add-drop multiplexer according to claim 4, wherein said phase and frequency control comprises a unit for performing stuff and destuff control in the transmission frames containing the n first signal(s) of n channel(s), based on at least one frequency of the n first signal(s) to be transmitted, and at least one frequency of the n first signal(s) when the n first signal(s) of n channel(s) is received.

7. An add-drop multiplexer comprising:
a partial drop unit for selecting a number n of first signal(s) of n channel(s) among a number N of first signals of N channels, which are received from a first transmission line, and transmitting the n first signal(s) of n channel(s) on at least one second transmission line, where N and n are integers satisfying N>n>0;
a partial add unit for receiving n second signal(s) of n channel(s) from at least one third transmission line, and a number (N-n) of first signal(s) of (N-n) channel(s) among the N first signals of the N channels, which are not selected by the partial drop unit, and for transmitting on the first transmission line the n second signal(s) of n channel(s) and the (N-n) first signal(s) of (N-n) channel(s) as N third signals of N channels;
a first crossconnecting unit for establishing at least one circuit through which each of the n first signal(s) of n channel(s) can be transmitted to one of the at least one second transmission line, in accordance with a correspondence relationship between the n first signal(s) of n channel(s) and the at least one second transmission line, and
a second crossconnecting unit for establishing at least one circuit through which each of the n second signal(s) of n channel(s) can be supplied as one of the N third signals, in accordance with a correspondence relationship between the n second signal(s) of n channel(s) and the N third signals.

8. An add-drop multiplexer according to claim 7, wherein the N first signals of N channels are transmitted through the first transmission line in a form of a first multiplexed signal in which the N first signals are multiplexed, and the N third signals of N channels are transmitted through the first transmission line in a form of a second multiplexed signal in which the N third signals are multiplexed;
said add-drop multiplexer further comprises,
a demultiplexing unit for demultiplexing the first multiplexed signal into the N first signals, and
a multiplexing unit for multiplexing the N third signals into the second multiplexed signal.

9. An add-drop multiplexer according to claim 8, wherein the n first signal(s) of the n channel(s) is contained in at least one transmission frame of a predetermined form when being transmitted on the at least one second transmission line, and each transmission frame can contain information to be transmitted and pointer information which indicates a phase of the information to be transmitted, in the transmission frame, and the add-drop multiplexer further comprises a phase and frequency control unit which inserts first information contained in the n first signal(s) of n channel(s) when the n first signal(s) of n channel(s) is received, into the at least one transmission frame to be transmitted on the at least one second transmission line, in synchronization with timing of the add-drop multiplexer, obtains second information on at least one phase of the first information inserted in the at least one transmission frame of the n first signal(s), and inserts the second information on the at least one phase into the at least one transmission frame as the pointer information.

10. An add-drop multiplexer comprising:
a partial drop unit for selecting a number n of first signal(s) of n channel(s) among a number N of first signals of N channels, which are received from a first transmission line, and transmitting the n first signal(s) of n channel(s) on at least one second transmission line, where N and n are integers satisfying N>n>0;
a partial add unit for receiving n second signal(s) of n channel(s) from at least one third transmission line, and a number (N-n) of first signal(s) of (N-n) channel(s) among the N first signals of the N channels, which are not selected by the partial drop unit, and for transmitting on the first transmission line the n second signal(s) of n channel(s) and the (N-n) first signal(s) of (N-n) channel(s) as N third signals of N channels;
a demultiplexing unit for demultiplexing at least one of the n first signal(s) of the n channel(s) to a number m of fourth signals of m channels to be output to at least one fourth transmission line, where m is an integer satisfying m>1, and
a multiplexing unit for receiving m fifth signals of m channels from at least one fifth transmission line to generate at least one of the n second signal(s) of n channel(s) and supply the at least one of the n second signal(s) of n channel(s) to the partial add unit.

11. An add-drop multiplexer according to claim 10, wherein the N first signals of N channels are transmitted through the first transmission line in a form of a first multiplexed signal in which the N first signals are multiplexed, and the N third signals of N channels are transmitted through the first transmission line in a form of a second multiplexed signal in which the N third signals are multiplexed;
said add-drop multiplexer further comprises,
a second demultiplexing unit for demultiplexing the first multiplexed signal into the N first signals, and
a second multiplexing unit for multiplexing the N third signals into the second multiplexed signal.

12. An add-drop multiplexer according to claim 10, wherein the integers N and n are assumed to satisfy N≧n>0, and said add-drop multiplexer further comprising,
a first crossconnecting unit for establishing at least one circuit through which each of the m fourth signal(s) of m channel(s) can be transmitted to one of the at least one fourth transmission line, in accordance with a correspondence relationship between the m fourth signal(s) of m channel(s) and the at least one fourth transmission line, and
a second crossconnecting unit for establishing at least one circuit so that each of the m fifth signal(s) of m channel(s) can be supplied to one input port of the multiplexing unit, in accordance with a correspondence relationship between the m fifth signal(s) and the input ports of the multiplexing unit.

13. An add-drop multiplexer according to claim 10, wherein the integers N and n are assumed to satisfy $N \geq n > 0$, the m fourth signal(s) and the m fifth signal(s) are each contained in at least one transmission frame of a predetermined form when they are transmitted, and each transmission frame can contain information to be transmitted and pointer information which indicates a phase of the information to be transmitted, in the transmission frame, and the add-drop multiplexer further comprises, a first phase and frequency control unit which inserts first information contained in the m fourth signal(s) of m channel(s) when the m fourth signal(s) is received, into the at least one transmission frame to be transmitted, in synchronization with timing of the add-drop multiplexer, obtains second information on at least one phase of the first information inserted in the at least one transmission frame, and inserts the second information on the at least one phase into the at least one transmission frame as the pointer information, and a second phase and frequency control unit which inserts third information contained in the m fifth signal(s) of m channel(s) when the m fifth signal(s) is received, into the at least one transmission frame to be transmitted, in synchronization with timing of the add-drop multiplexer, obtains fourth information on at least one phase of the third information in the at least one transmission frame, and inserts the fourth information on the at least one phase into the at least one transmission frame as the pointer information.

14. An add-drop multiplexer according to claim 10, further comprising a through connection unit for supplying at least one of the m fourth signal(s) to the multiplexing unit, instead of the at least one of the m fifth signal(s), where the integers N and n are assumed to satisfy $N \geq n > 0$.

15. An add-drop multiplexer according to claim 14, wherein the N first signals of N channels are transmitted through the first transmission line in a form of a first multiplexed signal in which the N first signals are multiplexed, and the N third signals of N channels are transmitted through the first transmission line in a form of a second multiplexed signal in which the N third signals are multiplexed;

said add-drop multiplexer further comprises, a demultiplexing unit for demultiplexing the first multiplexed signal into the N first signals, and a multiplexing unit for multiplexing the N third signals into the second multiplexed signal.

16. An add-drop multiplexer according to claim 14, wherein the m fourth signal(s) and the m fifth signal(s) are each contained in at least one transmission frame of a predetermined form when they are transmitted, and each transmission frame can contain information to be transmitted and pointer information which indicates a phase of the information to be transmitted, in the transmission frame, and the add-drop multiplexer further comprises, a first phase and frequency control unit which inserts first information contained in the m fourth signal(s) of m channel(s) when the m fourth signal(s) is received, into the at least one transmission frame to be transmitted, in synchronization with timing of the add-drop multiplexer, obtains second information on at least one phase of the first information inserted in the at least one transmission frame, and inserts the second information on the at least one phase into the at least one transmission frame as the pointer information, and a second phase and frequency control unit which inserts third information contained in the m fifth signal(s) of m channel(s) when the m fifth signal(s) is received, into the at least one transmission frame to be transmitted, in synchronization with timing of the add-drop multiplexer, obtains fourth information on at least one phase of the third information in the at least one transmission frame, and inserts the fourth information on the at least one phase into the at least one transmission frame as the pointer information.

17. An add-drop multiplexer comprising:

a first partial drop unit for selecting a number n of first signal(s) of n channel(s) among a number N of first signals of N channels, which are received from a first transmission line, and supplying the n first signal(s) of n channel(s) to a drop signal selection unit where N and n are integers satisfying $N > n > 0$;

a second partial drop unit for selecting n second signal(s) of n channel(s) among N second signals of N channels, which are received from a second transmission line and correspond to the n first signal(s), and supplying the n second signal(s) of n channel(s) to the drop signal selection unit;

the drop signal selection unit for receiving the n first signal(s) and the n second signal(s) corresponding to the n first signal(s) as n pair(s) of corresponding signals, selecting one signal from each pair of the n pair(s) of corresponding signals to obtain n selected signal(s) and transmit the n selected signal(s) on at least one third transmission line;

a first partial add unit for receiving n third signal(s) of n channel(s) from at least one fourth transmission line, and a number (N-n) of first signal(s) of (N-n) channel (s) among the N first signals of the N channels, which are not selected by the first partial drop unit, and for transmitting on the first transmission line the n third signal(s) and the (N-n) first signal(s) as N fourth signals of N channels;

a second partial add unit for receiving the n third signal(s) of n channel(s) from at least one fourth transmission line, and (N-n) second signal(s) of (N-n) channel(s) among the N second signals of the N channels, which are not selected by the second partial drop unit, and for transmitting on the second transmission line the n third signal(s) and the (N-n) second signal(s) as N fifth signals of N channels; and an add signal supplying unit for receiving the n third signal(s) of n channel(s) from the at least one fourth transmission line, and supplying the n third signal(s) to the first and second partial add units;

wherein the n selected signal(s) of the n channel(s) is contained in at least one transmission frame of a predetermined form when being transmitted on the at least one third transmission line, and each transmission frame can contain information to be transmitted and pointer information which indicates a phase of the information to be transmitted, in the transmission frame, and the add-drop multiplexer further comprises a phase and frequency control unit which inserts first information contained in the n selected signal(s) of n channel(s) when the n selected signal(s) of n channel(s) is received, into the at least one transmission frame to be transmitted on the at least one third transmission line, in synchronization with timing of the add-drop multiplexer, obtains second information on at least one phase of the first information inserted in the at least one transmission frame, and inserts the second information on the at least one phase into the at least one transmission frame as the pointer information.

18. An add-drop multiplexer comprising:

a first partial drop unit for selecting a number n of first signal(s) of n channel(s) among a number N of first signals of N channels, which are received from a first transmission line, and supplying the n first signal(s) of n channel(s) to a drop signal selection unit, where N and n are integers satisfying N>n>;

a second partial drop unit for selecting n second signal(s) of n channel(s) among N second signals of N channels, which are received from a second transmission line and correspond to the n first signal(s), and supplying the n second signal(s) of n channel(s) to the drop signal selection unit;

the drop signal selection unit for receiving the n first signal(s) and the n second signal(s) corresponding to the n first signal(s) as n pair(s) of corresponding signals, selecting one signal from each pair of the n pair(s) of corresponding signals to obtain n selected signal(s) and transmit the n selected signal(s) on at least one third transmission line;

a first partial add unit for receiving n third signal(s) of n channel(s) from at least one fourth transmission line, and a number (N-n) of first signal(s) of (N-n) channel (s) among the N first signals of the N channels, which are not selected by the first partial drop unit, and for transmitting on the first transmission line the n third signal(s) and the (N-n) first signal(s) as N fourth signals of N channels;

a second partial add unit for receiving the n third signal(s) of n channel(s) from at least one fourth transmission line, and (N-n) second signal(s) of (N-n) channel(s) among the N second signals of the N channels, which are not selected by the second partial drop unit, and for transmitting on the second transmission line the n third signal(s) and the (N-n) second signal(s) as N fifth signals of N channels; and an add signal supplying unit for receiving the n third signal(s) of n channel(s) from the at least one fourth transmission line, and supplying the n third signal(s) to the first and second partial add units;

a first crossconnecting unit for establishing at least one circuit through which each of the n first signal(s) of n channel(s) can be transferred to one of the at least one third transmission line, in accordance with a correspondence relationship between the n first signal(s) of n channel(s) and the at least one second transmission line, a second crossconnecting unit for establishing at least on circuit through which each of the n second signal(s) of n channel(s) can be transferred to one of the at least one third transmission line, in accordance with a correspondence relationship between the n second signal(s) of n channel(s) and the at least one second transmission line, a third crossconnecting unit for establishing at least one circuit through which each of the n third signal(s) of n channel(s) can be transferred to one of the at least one first transmission line, in accordance with a correspondence relationship between the n third signal(s) of n channel(s) and the at least one first transmission line, and a fourth crossconnecting unit for establishing at least one circuit through which each of the n third signal(s) of n channel(s) can be transferred to one of the at least one second transmission line, in accordance with a correspondence relationship between the n third signal(s) of n channel(s) and the at least one second transmission line.

19. An add-drop multiplexer comprising:

a first partial drop unit for selecting a number n of first signal(s) of n channel(s) among a number N of first signals of N channels, which are received from a first transmission line, and outputting the n first signal(s), where N and n are integers satisfying N>n>0;

a second partial drop unit for selecting n second signal(s) of n channel(s) among N second signals of N channels, which are received from a second transmission line and correspond to the n first signal(s), and supplying the n second signal(s) of n channel(s) to the drop signal selection unit;

a first drop signal selection unit for receiving a number (n-p) of first signal(s) among the n first signal(s) and (n-p) second signal(s) among the n second signal(s) corresponding to the (n-p) first signal(s) as (n-p) pair(s) of corresponding signals, selecting one signal from each pair of the (n-p) pair(s) of corresponding signals to obtain (n-p) selected signal(s) and transmit the (n-p) selected signal(s) on at least one third transmission line, where p is an integer satisfying n>p>0;

a first partial add unit for receiving (n-p) third signal(s) of (n-p) channel(s) from at least one fourth transmission line, first p multiplexed signal(s) of p channels supplied from a first multiplexing unit, and a number (N-n) of first signal(s) of (N-n) channel(s) among the N first signals of the N channels, which are not selected by the first partial drop unit, and for transmitting on the first transmission line the (n-p) third signal(s), the first p multiplexed signal(s), and the (N-n) first signal(s), as N fourth signals of N channels;

a second partial add unit for receiving the (n-p) third signal(s) of (n-p) channel(s) from the at least one fourth transmission line, second p multiplexed signal(s) of p channels supplied from a second multiplexing unit, and a number (N-n) of second signal(s) of (N-n) channel(s) among the N second signals of the N channels, which are not selected by the second partial drop unit, and for transmitting on the second transmission line the (n-p) third signal(s), the second p multiplexed signal(s), and the (N-n) second signal(s), as N fifth signals of N channels;

a first add signal supplying unit for receiving the (n-p) third signal(s) of (n-p) channel(s) from the at least one fourth transmission line, and supplying the (n-p) third signal(s) to the first and second partial add units;

a set of at least one first demultiplexing unit for receiving p first signal(s) other than the (n-p) first signals among the n first signal(s), and demultiplexing each of the p first signal(s) to m sixth signals of m channels to output p set(s) of m sixth signals;

a set of at least one second demultiplexing unit for receiving p second signal(s) corresponding to the p first signal(s), other than the (n-p) second signals among the n second signal(s), and demultiplexing each of the p second signal(s) to m seventh signals of m channels for each of the p second signal(s), corresponding to the m sixth signals of m channels for each of the p first signal(s) to output p set(s) of m seventh signals;

a set of at least one second drop signal selection unit for receiving the m sixth signals for each of the p first signal(s) and the m seventh signals for each of the p second signal(s) corresponding to the m sixth signals for each of the p first signal(s), as p×m pairs of corresponding signals, selecting one signal from each pair of the p×m pairs of corresponding signals to obtain m selected signals for each of the p first or second signal(s), and transmitting the selected signals for each of the p first or second signal(s), on at least one third transmission line;

a set of at least one first multiplexing unit for receiving and multiplexing p set(s) of m eighth signals of m channels from at least one sixth transmission line to generate the p first multiplexed signal(s) of p channels and supply the p first multiplexed signal(s) of p channels to the first partial add unit;

a set of at least one second multiplexing unit for receiving and multiplexing the p set(s) of m eighth signals of m channels from the at least one sixth transmission line to generate the p second multiplexed signal(s) of p channels and supply the p second multiplexed signal(s) of p channels to the second partial add unit; and a set of at least one second add signal supplying unit for receiving the p set(s) of m eighth signals of m channels, and supplying the p set(s) of m eighth signals to the first and second multiplexing units.

20. An add-drop multiplexer according to claim 19, wherein the N first signals of N channels are transmitted through the first transmission line in a form of a first multiplexed signal in which the N first signals are multiplexed, the N fourth signals of N channels are transmitted through the first transmission line in a form of a second multiplexed signal in which the N third signals are multiplexed, the N second signals of N channels are transmitted through the second transmission line in a form of a third multiplexed signal in which the N second signals are multiplexed, and the N fifth signals of N channels are transmitted through the second transmission line in a form of a fourth multiplexed signal in which the N fifth signals are multiplexed;

said add-drop multiplexer further comprises,
a third demultiplexing unit for demultiplexing the first multiplexed signal into the N first signals,
a third multiplexing unit for multiplexing the N fourth signals into the second multiplexed signal,
a fourth demultiplexing unit for demultiplexing the third multiplexed signal into the N second signals, and
a fourth multiplexing unit for multiplexing the N fifth signals into the fourth multiplexed signal.

21. An add-drop multiplexer according to claim 19, further comprising,
a set of at least one first crossconnecting unit each for establishing at least one circuit through which a respective one of the p set(s) of m sixth signals can be transferred to one of the at least one fifth transmission line, in accordance with a correspondence relationship between the p set(s) of m sixth signals and the at least one fifth transmission line,
a set of at least one second crossconnecting unit each for establishing at least one circuit through which a respective one of the p set(s) of m seventh signals can be inserted into one of m time slots of the p multiplexed the at least one sixth transmission line, in accordance with a correspondence relationship between the p set(s) of m seventh signals and the at least one sixth transmission line, a set of at least one third crossconnecting unit each for establishing at least one circuit through which a respective one of the m seventh signals in each of the p set(s) can be transferred to one input port of one of at least one second multiplexing unit corresponding to said each of the p set(s), and a set of at least one fourth crossconnecting unit each for establishing at least one circuit through which a respective one of the m seventh signals in each of the p set(s) can be transferred to one input port of one of at least one first multiplexing unit corresponding to said each of the p set(s).

22. An add-drop multiplexer according to claim 19, wherein the p set(s) of m sixth signals, the p set(s) of m seventh signals, and the p set(s) of m eighth signals are each contained in a plurality of transmission frames of a predetermined form when being transmitted, and each transmission frame can contain information to be transmitted and pointer information which indicates a phase of the information to be transmitted, in the transmission frame, and the add-drop multiplexer further comprises,
a set of at least one first phase and frequency control unit which inserts first information contained in the p set(s) of m sixth signals when the p set(s) of m sixth signals are received, into the plurality of transmission frames to be transmitted, in synchronization with timing of the add-drop multiplexer, obtains second information on a plurality of phases of the first information inserted in the plurality of transmission frames, and inserts the second information on the plurality of phases into the plurality of transmission frames as the pointer information, a set of at least one second phase and frequency control unit which inserts third information contained in the p set(s) of m seventh signals when the p set(s) of m seventh signals are received, into the plurality of transmission frames to be transmitted, in synchronization with timing of the add-drop multiplexer, obtains fourth information on a plurality of phases of the third information inserted in the plurality of transmission frames, and inserts the fourth information on the plurality of phases into the plurality of transmission frames as the pointer information, and a set of at least one third phase and frequency control unit which inserts fifth information contained in the p set(s) of m eighth signals when the p set(s) of m eighth signals are received, into the plurality of transmission frames to be transmitted, in synchronization with timing of the add-drop multiplexer, obtains sixth information on a plurality of phases of the fifth information inserted in the plurality of transmission frames, and inserts the sixth information on the plurality of phases into the plurality of transmission frames as the pointer information.

23. An add-drop multiplexer comprising:
a higher multiplicity level circuit switching unit for receiving a plurality of first signals, and exchanging channels at a level of the plurality of first signals of a plurality of channels, where each of the plurality of first signals contains a plurality of second signals, a demultiplexing unit for receiving at least one of the plurality of first signals, and for demultiplexing each of the at least one of the plurality of first signals to obtain the plurality of second signals contained in each first signal;

a lower multiplicity level circuit switching unit for receiving the plurality of second signals which are obtained by the demultiplexing unit for each of the at least one of the plurality of first signals, and exchanging channels at a level of the plurality of second signals of a plurality of channels;

a multiplexing unit for multiplexing the plurality of second signals for each of the at least one of the plurality of first signals, after the channels of the plurality of second signals are exchanged by the lower multiplicity level circuit switching unit, to obtain at least one third signal each of which contains the multiplexed plurality of second signals, where the at least one third signal corresponds to the at least one of the plurality of first signals, respectively; and a circuit switching level selecting unit for selecting one of the at least one of the plurality of first signals after the channels thereof are changed by the higher multiplicity level circuit switching unit, and the at least one third signal obtained by the multiplexing unit.

24. An add-drop multiplexer according to claim 23, wherein the N first signals of N channels are transmitted through the first transmission line in a form of a first multiplexed signal in which the N first signals are multiplexed, the N fourth signals of N channels are transmitted through the first transmission line in a form of a second multiplexed signal in which the N third signals are multiplexed, the N second signals of N channels are transmitted through the second transmission line in a form of a third multiplexed signal in which the N second signals are multiplexed, and the N fifth signals of N channels are transmitted through the second transmission line in a form of a fourth multiplexed signal in which the N fifth signals are multiplexed;

said add-drop multiplexer further comprises,
a second demultiplexing unit for demultiplexing the first multiplexed signal into the N first signals,
a second multiplexing unit for multiplexing the N fourth signals into the second multiplexed signal,
a third demultiplexing unit for demultiplexing the third multiplexed signal into the N second signals, and
a third multiplexing unit for multiplexing the N fifth signals into the fourth multiplexed signal.

25. A method of changing a level at which circuit switching is performed, from a higher multiplicity level to a lower multiplicity level, in an add-drop multiplexer comprising, a higher multiplicity level circuit switching unit for receiving a plurality of first signals, and exchanging channels at a level of the plurality of first signals of a plurality of channels, where each of the plurality of first signals contains a plurality of second signals, a demultiplexing unit for receiving at least one of the plurality of first signals, and for demultiplexing each of the at least one of the plurality of first signals to obtain the plurality of second signals contained in each first signal, a lower multiplicity level circuit switching unit for receiving the plurality of second signals which are obtained by the demultiplexing unit for each of the at least one of the plurality of first signals, and exchanging channels at a level of the plurality of second signals of a plurality of channels, a multiplexing unit for multiplexing the plurality of second signals for each of the at least one of the plurality of first signals, after the channels of the plurality of second signals are exchanged by the lower multiplicity level circuit switching unit, to obtain at least one third signal each of which contains the multiplexed plurality of second signals, where the at least one third signal corresponds to the at least one of the plurality of first signals, respectively, and a circuit switching level selecting unit for selecting one of the at least one of the plurality of first signals after the channels thereof are changed by the higher multiplicity level circuit switching unit, and the at least one third signal obtained by the multiplexing unit;

said method comprising the steps of:
(T1) establishing at least one circuit in said higher multiplicity level circuit switching unit;
(T2) exchanging channels at the level of the plurality of second signals for the at least one of the plurality of first signals, by the lower multiplicity level circuit switching unit, so that an order of the plurality of second signals output from the multiplexing unit is the same as an order of the plurality of second signals contained in the at least one of the plurality of first signals when the plurality of second signals contained in the at least one of the plurality of first signals are output from the higher multiplicity level circuit switching unit; and
(T3) selecting the output of the multiplexing unit in the circuit switching level selecting unit.

26. An add-drop multiplexer comprising:
a first demultiplexing unit for receiving at least one of a plurality of first signals, and demultiplexing each of the at least one of the plurality of first signals into a plurality of second signals which are contained in each of the at least one of the plurality of first signals;

a second demultiplexing unit for receiving at least one of a plurality of third signals corresponding to the at least one of the plurality of first signals, and demultiplexing each of the at least one of the plurality of third signals into a plurality of fourth signals which are contained in each of the at least one of the plurality of third signals;

a lower multiplicity level signal selecting unit for selecting one of the outputs of the first and second demultiplexing units;

a multiplexing unit for receiving the selected one of the outputs of the first and second demultiplexing units, and multiplexing the plurality of second signals in the selected one, to generate at least one fifth signal corresponding to the at least one of the plurality of first signals; and a selecting unit for selecting one of the at least one of the plurality of first signals, the at least one of the plurality of third signals, and the at least one fifth signal.

27. An add-drop multiplexer according to claim 26, wherein the selecting unit comprises,
a higher/lower multiplicity level selecting unit for selecting one of the at least one of the plurality of first signals and the at least one fifth signal, and
a higher multiplicity level signal selecting unit for selecting one of the at least one of the plurality of third signals and the signal selected by the higher/lower multiplicity level selecting unit.

28. An add-drop multiplexer according to claim 27, further comprising,
a lower multiplicity level signal selection control unit for monitoring the outputs of the first and second demultiplexing units, and controlling the lower multiplicity level signal selecting unit so that the lower multiplicity level signal selecting unit selects the output of a specific one of the first and second demultiplexing units according to the monitored outputs, and a higher multiplicity level signal selection control unit for monitoring the at least one third signal and the output of the higher/lower multiplicity level selecting unit, and controlling the higher multiplicity level signal selecting unit so that the higher multiplicity level signal selecting unit selects a specific one of the at least one third signal and the output of the higher/lower multiplicity level selecting unit, according to the monitored outputs.

29. A method of increasing a transmission capacity of a network element by gradually replacing respective portions of the network element, from a first state to a second state, said network element, when the network element is in the first state, contains a first add-drop multiplexer and two first bidirectional transmission lines connected to the first add-drop multiplexer on first and second sides thereof, respectively, and said network element, when the communication network is in the second state, contains a second add-drop multiplexer and two second bidirectional transmission lines connected to the second add-drop multiplexer on first and second sides thereof, respectively;

n signal(s) of n channels is transmitted in two directions in each of the first bidirectional transmission lines, and N signal(s) of N channels is transmitted in two directions in each of the second bidirectional transmission lines, where the integers N and n are assumed to satisfy $N \geq n > 0$;

in either of the first and second states, a bidirectional tributary transmission line is connected to each of the first and second add-drop multiplexer on the tributary side thereof, and n signal(s) of n channels is transmitted in two directions in each the bidirectional tributary transmission line;

said first add-drop multiplexer, in the first state, comprises,
 a first signal input unit for inputting a number n of first signal(s) of n channel(s) from a first one of the first bidirectional transmission lines connected on the first side of the first add-drop multiplexer, where n is an integer satisfying n>0,
 a first signal output unit for outputting n second signal (s) of n channel(s) onto the first one of the first bidirectional transmission lines,
 a second signal input unit for inputting a number n of third signal(s) of n channel(s) corresponding to the n first signal(s), from the second one of the first bidirectional transmission lines connected on the second side of the first add-drop multiplexer,
 a second signal output unit for outputting n fourth signal(s) of n channel(s) corresponding to the n second signal(s), onto the second one of the first bidirectional transmission lines,
 a drop signal selection unit for receiving the n first signal(s) and the n third signal(s) as n pair(s) of corresponding signals, and selecting one signal from each pair of the n pair(s) of corresponding signals to obtain n selected signal(s) and transmit the n selected signal(s) on the bidirectional tributary transmission line,
 an add signal supplying unit for receiving the n fifth signal(s) of n channel(s) from the bidirectional tributary transmission line, and supplying the n fifth signal(s) to the first and second signal output units as the n second signal(s) of n channel(s) and the fourth signal(s) of n channel(s), respectively;

said second add-drop multiplexer, in the second state, comprises,
 a first partial drop unit for receiving the N sixth signals of N channels which are transmitted on a first one of the second bidirectional transmission lines connected on the first side of the second add-drop multiplexer, and selecting n sixth signal(s) of n channel(s) among the N sixth signals of N channels, and supplying the n sixth signal(s) of n channel(s) to the drop signal selection unit,
 a second partial drop unit for receiving the N eighth signals of N channels which are transmitted on a second one of the second bidirectional transmission lines connected on the second side of the second add-drop multiplexer, and selecting n eighth signal (s) of n channel(s) corresponding to the n sixth signal(s) of n channel(s), among the N eighth signals of N channels, and supplying the n eighth signal(s) of n channel(s) to the drop signal selection unit,
 the drop signal selection unit for receiving the n sixth signal(s) and the n eighth signal(s) corresponding to the n sixth signal(s) as n pair(s) of corresponding signals, and selecting one signal from each pair of the n pair(s) of corresponding signals to obtain n selected signal(s) and transmit the n selected signal (s) on the bidirectional tributary transmission line,
 a first partial add unit for receiving the n fifth signal(s) of n channel(s) from the bidirectional tributary transmission line, and a number (N-n) of sixth signal(s) of (N-n) channel(s) among the N sixth signals of the N channels, which are not selected by the first partial drop unit, and for transmitting on the second one of the second bidirectional transmission lines, the n fifth signal(s) and the (N-n) sixth signal(s) as N seventh signals of N channels,
 a second partial add unit for receiving the n fifth signal(s) of n channel(s) from the bidirectional tributary transmission line, and (N-n) eighth signal(s) of (N-n) channel(s) among the N seventh signals of the N channels, which are not selected by the second partial drop unit, and for transmitting on the first one of the second bidirectional transmission lines, the n fifth signal(s) and the (N-n) eighth signal(s) as N ninth signals of N channels, and
 an add signal supplying unit for receiving the n fifth signal(s) of n channel(s) from the bidirectional tributary transmission line, and supplying the n fifth signal(s) to the first and second partial add units;

said method comprising steps of:
 (S1) controlling the drop signal selection unit in the first state, so that the drop signal selection unit selects the n third signal(s) from the second signal input unit, and controlling the add signal supply unit supplies the n fifth signal(s) to the first signal output unit;
 (S2) replacing the first signal input unit with the first partial drop unit, replacing the second signal input unit with the second partial drop unit, and replacing the first one of the bidirectional transmission lines with the first one of the second bidirectional transmission lines;
 (S3) controlling the drop signal selection unit, so that the drop signal selection unit selects the n sixth signal(s) which is supplied by the first partial drop unit, and controlling the add signal supply unit so that the add signal supply unit supplies the n fifth signal(s) to the second partial add unit; and
 (S4) replacing the second signal input unit with the second partial drop unit, replacing the first signal input unit with the first partial drop unit, and replacing the second one of the bidirectional transmission lines with the second one of the second bidirectional transmission lines.

30. A method of increasing a transmission capacity of a communication network by gradually replacing respective portions of the communication network, from a first state to a second state, said communication network contains a plurality of add-drop multiplexers and a plurality of bidirectional transmission lines connecting between each pair of two adjacent add-drop multiplexers among the plurality of add-drop multiplexers;

in the first state, n signal(s) of n channels is transmitted in two directions in each of the bidirectional transmission lines, and in the second state, N signal(s) of N channels is transmitted in two directions in each of the bidirectional transmission lines, where the integers N and n are assumed to satisfy $N>n>0$;

in either of the first and second states, a bidirectional tributary transmission line is connected to each of the add-drop multiplexers on the tributary side thereof, and n signal(s) of n channels is transmitted in two directions in each of the bidirectional tributary transmission lines;

said add-drop multiplexer, in the first state, comprises, a first signal input unit, provided as an input element of a first side group in the first state, for inputting a number n of first signal(s) of n channel(s) from a first one of the bidirectional transmission lines in the first state connected on the first side of the add-drop multiplexer in the first state, where n is an integer satisfying $n>0$, a first signal output unit, provided as an output element of a second side group in the first state, for outputting n second signal(s) of n channel(s) onto the first one of the bidirectional transmission lines in the first state, a second signal input unit, provided as an input element of the second side group in the first state, for inputting a number n of third signal(s) of n channel(s) corresponding to the n first signal(s), from the second one of the bidirectional transmission lines in the first state connected on the second side of the add-drop multiplexer in the first state, a second signal output unit, provided as an output element of the first side group in the first state, for outputting n fourth signal(s) of n channel(s) corresponding to the n second signal(s), onto the second one of the bidirectional transmission lines in the first state, a drop signal selection unit for receiving the n first signal(s) and the n third signal(s) as n pair(s) of corresponding signals, and selecting one signal from each pair of the n pair(s) of corresponding signals to obtain n selected signal(s) and transmit the n selected signal(s) on the bidirectional tributary transmission line, and an add signal supplying unit for receiving the n fifth signal(s) of n channel(s) from the bidirectional tributary transmission line, and supplying the n fifth signal(s) to the first and second signal output units as the n second signal(s) of n channel(s) and the fourth signal(s) of n channel(s), respectively;

said add-drop multiplexer, in the second state, comprises, a first partial drop unit, provided as an input element of a first side group in the second state, for receiving the N sixth signals of N channels which are transmitted on a first one of the bidirectional transmission lines in the second state connected to the first side of the add-drop multiplexer in the second state, and selecting n sixth signal(s) of n channel(s) among the N sixth signals of N channels, and supplying the n sixth signal(s) of n channel(s) to the drop signal selection unit, a second partial drop unit, provided as an input element of a second side group in the second state, for receiving the N eighth signals of N channels which are transmitted on a second one of the bidirectional transmission lines in the second state connected on the second side of the add-drop multiplexer in the second state, and selecting n eighth signal(s) of n channel(s) corresponding to the n sixth signal(s) of n channel(s), among the N eighth signals of N channels, and supplying the n eighth signal(s) of n channel(s) to the drop signal selection unit, the drop signal selection unit for receiving the n sixth signal(s) and the n eighth signal(s) corresponding to the n sixth signal(s) as n pair(s) of corresponding signals, and selecting one signal from each pair of the n pair(s) of corresponding signals to obtain n selected signal(s) and transmit the n selected signal(s) on the bidirectional tributary transmission line, a first partial add unit provided as an output element of the second side group in the second state, for receiving the n fifth signal(s) of n channel(s) from the bidirectional tributary transmission line, and a number (N-n) of sixth signal(s) of (N-n) channel(s) among the N sixth signals of the N channels, which are not selected by the first partial drop unit, and for transmitting on the second one of the bidirectional transmission line in the second states, the n fifth signal(s) and the (N-n) sixth signal(s) as N seventh signals of N channels, a second partial add unit, provided as an output element of the first side group in the second state, for receiving the n fifth signal(s) of n channel(s) from the bidirectional tributary transmission line, and (N-n) eighth signal(s) of (N-n) channel(s) among the N seventh signals of the N channels, which are not selected by the second partial drop unit, and for transmitting on the first one of the bidirectional transmission line in the second states, the n fifth signal(s) and the (N-n) eighth signal(s) as N ninth signals of N channels, and an add signal supplying unit for receiving the n fifth signal(s) of n channel(s) from the bidirectional tributary transmission line, and supplying the n fifth signal(s) to the first and second partial add units;

said method comprising steps of:

(S1) in each of two of the add-drop multiplexers located in both ends of one of the plurality of bidirectional transmission lines which is in the first state, controlling the input and output elements of one of the first and second side groups which are located on the opposite side to the side connected to the one of the plurality of bidirectional transmission lines, to be connected with the bidirectional tributary transmission line;

(S2) in said each of two of the add-drop multiplexers, replacing the input and output elements of one of the first and second side groups, with corresponding elements in the second state, and changing said one of the plurality of bidirectional transmission lines from the first state to the second state; and (S3) in said each of two of the add-drop multiplexers, when the input and output elements of said one of the first and second side groups, are in the second state, connecting the first partial drop unit with the first partial add unit for said (N-n) sixth signal(s) of (N-n) channels, and connecting the second partial drop unit with the second partial add unit for said (N-n) eighth signal(s) of (N-n) channels.

31. An add-drop multiplexer comprising:

a first transmission frame transforming unit for transforming each of a plurality of first signals contained in a transmission frame of a first form, to obtain a plurality of second signals each being contained in a transmission frame of a second form, where each transmission frame of the first form contains a plurality of transmission frames of the second form;

a crossconnecting unit, having a plurality of first input ports for inputting the plurality of second signals obtained for the plurality of first signals by the first transmission frame transforming unit, a plurality of second input ports for inputting a plurality of third signals each being contained in a transmission frame of the second form, a plurality of first output ports for outputting a plurality of fourth signals corresponding to the plurality of first signals, where each of the plurality of fourth signals is contained in a transmission frame of the first form, and a plurality of second output ports for outputting a plurality of fifth signals each being contained in a transmission frame of the second form, said crossconnecting unit can perform circuit switching between the plurality of second and third signals to obtain the plurality of fourth and fifth signals, which are to be output from the first and second output ports, respectively; and a second transmission frame transforming unit for transforming each of the plurality of fourth signals which are output from the plurality of second output ports, to obtain a plurality of sixth signals each being contained in a transmission frame of the first form.

32. An add-drop multiplexer comprising:

a path protection switch which simultaneously inputs through first and second input ports thereof a plurality of first signals and a plurality of second signals corresponding to the plurality of first signals, respectively, and selects one of signal inputs from the first and second input ports to output the selected one of the signal inputs, where each of the plurality of first signals is formed by multiplexing a plurality of third signals, each of the plurality of second signals is formed by multiplexing a plurality of fourth signals, each of the first and second signals is contained in a transmission frame of a first form, each of the third and fourth signals is contained in a transmission frame of a second form, each transmission frame of the first form contains a plurality of transmission frames of the second form, and the operation of selecting one of the signal inputs can be switched at a level of each transmission frame of the first form, or at a level of each transmission frame of the second form;

a switch level setting unit for setting the level at which the switching in the path protection switch is performed; and a tributary-side interface unit which transforms the signal which is output from the path protection switch into a tributary signal;

said tributary-side interface unit comprises a unit type indication unit which indicates a type of the tributary-side interface unit;

said add-drop multiplexer further comprising:

a unit type recognizing unit for recognizing the indication of the type of the tributary-side interface unit;

a switch level determining unit for determining based on the indication, whether the operation of selecting one of the signal inputs should be exchanged at a level of each transmission frame of the first form, or at a level of each transmission frame of the second form; and a level setting control unit for controlling the switch level setting unit based on the determination by the switch level determining unit.

33. An add-drop multiplexer comprising:

a first crossconnecting unit which inputs a plurality of first signals, each of which is formed by multiplexing a plurality of second signals, and exchanges channels at a level of the plurality of first signals, or at a level of the plurality of second signals, where each of the first signals is contained in a transmission frame of a first form, each of the second signals is contained in a transmission frame of a second form, each transmission frame of the first form contains a plurality of transmission frames of the second form, and the level at which the operation of exchanging channels is performed can be set therein;

a second crossconnecting unit which inputs a plurality of third signals, each of which is formed by multiplexing a plurality of fourth signals, and exchanges channels at a level of the plurality of third signals, or at a level of the plurality of fourth signals, where each of the third signals is contained in a transmission frame of the first form, each of the fourth signals is contained in a transmission frame of the second form, and the level at which the operation of exchanging channels is performed can be set therein;

a first crossconnecting level setting unit for setting in the first crossconnecting unit, the level at which the operation of exchanging channels is performed in the first crossconnecting unit;

a second crossconnecting level setting unit for setting in the second crossconnecting unit, the level at which the operation of exchanging channels is performed in the second crossconnecting unit;

a path protection switch which simultaneously inputs through first and second input ports thereof the outputs of the first and second crossconnecting units, respectively, and selects one of the outputs of the first and second crossconnecting units to output the selected one of the outputs of the first and second crossconnecting units, where the operation of selecting one of the outputs of the first and second crossconnecting units can be exchanged at a level of each transmission frame of the first form, or at a level of each transmission frame of the second form, and the level at which the operation of selecting one of the outputs of the first and second crossconnecting units is switched can be set therein;

a switch level setting unit for setting the level at which the switching in the path protection switch is performed; and a tributary-side interface unit which transforms the signal which is output from the path protection switch into a tributary signal;

a crossconnecting level input unit for inputting information which designates the levels at which the operations of exchanging channels are performed in the first and second crossconnecting units, respectively;

a crossconnecting level control unit for controlling the first and second crossconnecting units based on the information which designates the levels at which the operations of exchanging channels are performed in the first and second crossconnecting units, respectively;

a switch level determining unit for determining the level at which the switching in the path protection switch is performed, based on the information which designates the levels at which the operations of exchanging channels are performed in the first and second crossconnecting units, respectively; and a switch level setting control unit for controlling the switch level setting unit, based on the determination by the switch level determining unit.

34. An add-drop multiplexer comprising:

a first partial drop unit for selecting a number n of first signal(s) of n channel(s) among a number N of first signals of N channels, which are received from a first transmission line, and outputting the n first signal(s) of n channel(s), where N and n are integers satisfying N≧n>0, and each of the N first signals contains a signal formed by multiplexing a plurality of lower multiplicity level signals of a plurality of channels;

a second partial drop unit for selecting n second signal(s) of n channel(s) among N second signals of N channels, which are received from a second transmission line and correspond to the n first signal(s), and outputting the n second signal(s) of n channel(s), where each of the N second signals contains a signal formed by multiplexing a plurality of lower multiplicity level signals of a plurality of channels;

a first crossconnecting unit for exchanging time slots in each of the n first signal(s), in which time slots the plurality of lower multiplicity level signals in each of the n first signal(s) are contained;

a second crossconnecting unit for exchanging time slots in each of the n second signal(s), in which time slots the plurality of lower multiplicity level signals in each of the n second signal(s) are contained;

a drop signal selection unit for receiving outputs of the first and second crossconnecting units, selecting one of the outputs of the first and second crossconnecting units to output the selected one;

a demultiplexing unit for demultiplexing the selected one output from the drop signal selection unit to obtain and output n sets of a plurality of lower multiplicity level signals;

a multiplexing unit for inputting n sets of a plurality of lower multiplicity level signals, and multiplexing the plurality of lower multiplicity level signals in each set to obtain and output n third signal(s) of n channels;

third and fourth crossconnecting units each for exchanging time slots in each of the n third signal(s), in which time slots the plurality of lower multiplicity level signals in each of the n third signal(s) are contained;

a first partial add unit for receiving the output of the third crossconnecting unit, and a number (N-n) of first signal (s) of (N-n) channel(s) among the N first signals of the N channels, which are not selected by the first partial drop unit, and for transmitting on the first transmission line the n third signal(s) and the (N-n) first signal(s) as N fourth signals of N channels;

a second partial add unit for receiving the output of the fourth crossconnecting unit, and (N-n) second signal(s) of (N-n) channel(s) among the N second signals of the N channels, which are not selected by the second partial drop unit, and for transmitting on the second transmission line the n third signal(s) and the (N-n) second signal(s) as N fifth signals of N channels.

35. A transmission apparatus comprising:

a first circuit package which can hold thereon at least one first overhead insertion/extraction circuit for inputting a first signal contained in a transmission frame of a first form, extracting overhead information contained in the first signal, and inserting overhead information into a signal to be output, to generate a second signal contained in a transmission frame of the first form;

a second circuit package which can hold thereon at least one second overhead insertion/extraction circuit for inputting a third signal contained in a transmission frame of the first form, extracting overhead information contained in the first signal, and inserting overhead information into a signal to be output, to generate a second signal contained in a transmission frame of the first form;

a first signal line connecting the first and second circuit packages;

an overhead information processing unit for processing the overhead information which is extracted from or inserted into the first or third signal in the first and second overhead insertion/extraction circuit;

a second signal line connecting the overhead information processing unit and the second circuit package;

a first connection unit for connecting the first signal line with the first overhead insertion/extraction circuit when the first overhead insertion/extraction circuit is mounted on the first circuit package; and a second connection unit for connecting the first signal line with the second signal line, in the second circuit package when the first overhead insertion/extraction circuit is mounted on the first circuit package.

36. An add-drop multiplexer provided between first and second optical transmission lines and comprising first, second, and third circuit packages, where the first and second optical transmission lines each transmit an optical signal in first and second directions, a plurality of higher multiplicity level signals are respectively contained in transmission frames of a first form, and are multiplexed in the optical signal, and a plurality of lower multiplicity level signals are respectively contained in transmission frames of a second form, and are multiplexed in each of the plurality of higher multiplicity level signals;

the first circuit package contains a first optical interface unit which receives a first optical signal transmitted through the first optical transmission line in the first direction, and converts the first optical signal into a plurality of first higher multiplicity level signals to be transmitted in the first direction, and the first optical interface unit converts a plurality of second higher multiplicity level signals to be transmitted in the second direction, into a second optical signal to be transmitted in the second direction, and transmits the second optical signal on the first optical transmission line;

the second circuit package contains a second optical interface unit which receives a third optical signal transmitted through the second optical transmission line in the second direction, and converts the third optical signal into a plurality of third higher multiplicity level signals to be transmitted in the second direction, and the second optical interface unit converts a plurality of fourth higher multiplicity level signals to be transmitted in the first direction, into a fourth optical signal to be transmitted in the first direction, and transmits the fourth optical signal on the second optical transmission line; and the third circuit package contains,
- a first crossconnecting unit for exchanging channels of the plurality of first higher multiplicity level signals, and exchanging channels of the plurality of third higher multiplicity level signals, and
- a second crossconnecting unit for exchanging channels of the plurality of lower multiplicity level signals in the plurality of first higher multiplicity level signals, and exchanging channels of the plurality of lower multiplicity level signals in the plurality of third higher multiplicity level signals.

37. An add-drop multiplexer provided between first and second optical transmission lines and comprising first, second, and third circuit packages, where the first and second optical transmission lines each transmit an optical signal in first and second directions, a plurality of higher multiplicity level signals are respectively contained in transmission frames of a first form, and are multiplexed in the optical signal, and a plurality of lower multiplicity level signals are respectively contained in transmission frames of a second form, and are multiplexed in each of the plurality of higher multiplicity level signals;

the first circuit package contains a first optical interface unit which receives a first optical signal transmitted through the first optical transmission line in the first direction, and converts the first optical signal into a plurality of first higher multiplicity level signals to be transmitted in the first direction, and the first optical interface unit converts a plurality of second higher multiplicity level signals to be transmitted in the second direction, into a second optical signal to be transmitted in the second direction, and transmits the second optical signal on the first optical transmission line;

the second circuit package contains a second optical interface unit which receives a third optical signal transmitted through the second optical transmission line in the second direction, and converts the third optical signal into a plurality of third higher multiplicity level signals to be transmitted in the second direction, and the second optical interface unit converts a plurality of fourth higher multiplicity level signals to be transmitted in the first direction, into a fourth optical signal to be transmitted in the first direction, and transmits the fourth optical signal on the second optical transmission line; and a first crossconnecting unit for exchanging channels of the plurality of first higher multiplicity level signals, and exchanging channels of the plurality of third higher multiplicity level signals, is divided into two portions, and the two portions are separately mounted in the first and second circuit packages, respectively, and the third circuit package contains a second crossconnecting unit for exchanging channels of the plurality of lower multiplicity level signals in the plurality of first higher multiplicity level signals, and exchanging channels of the plurality of lower multiplicity level signals in the plurality of third higher multiplicity level signals.

38. An add-drop multiplexer provided between first and second optical transmission lines and comprising first and second circuit packages, where the first and second optical transmission lines each transmit an optical signal in first and second directions, a plurality of higher multiplicity level signals are respectively contained in transmission frames of a first form, and are multiplexed in the optical signal, and a plurality of lower multiplicity level signals are respectively contained in transmission frames of a second form, and are multiplexed in each of the plurality of higher multiplicity level signals;

the first circuit package contains,
- a first optical interface unit which receives a first optical signal transmitted through the first optical transmission line in the first direction, and converts the first optical signal into a plurality of first higher multiplicity level signals to be transmitted in the first direction,
- a first crossconnecting unit for exchanging channels of the plurality of first higher multiplicity level signals,
- a second crossconnecting unit for exchanging channels of the plurality of lower multiplicity level signals in the plurality of first higher multiplicity level signals, and
- a second optical interface unit converts a plurality of second higher multiplicity level signals to be transmitted in the first direction, into a second optical signal to be transmitted in the first direction, and transmits the second optical signal on the second optical transmission line; and the second circuit package contains,
- a third optical interface unit which receives a third optical signal transmitted through the second optical transmission line in the second direction, and converts the third optical signal into a plurality of third higher multiplicity level signals to be transmitted in the second direction,
- a third crossconnecting unit for exchanging channels of the plurality of third higher multiplicity level signals,
- a fourth crossconnecting unit for exchanging channels of the plurality of lower multiplicity level signals in the plurality of third higher multiplicity level signals, and
- a fourth optical interface unit converts a plurality of fourth higher multiplicity level signals to be transmitted in the second direction, into a fourth optical signal to be transmitted in the second direction, and transmits the fourth optical signal on the first optical transmission line.

39. An add-drop multiplexer provided between first and second optical transmission lines and comprising first, second, and third circuit packages, where the first and second optical transmission lines each transmit an optical signal in first and second directions, a plurality of higher multiplicity level signals are respectively contained in transmission frames of a first form, and are multiplexed in the optical signal, and a plurality of lower multiplicity level signals are respectively contained in transmission frames of a second form, and are multiplexed in each of the plurality of higher multiplicity level signals;

the first circuit package contains,
- a first optical interface unit which receives a first optical signal transmitted through the first optical transmission line in the first direction, and converts the first optical signal into a plurality of first higher multiplicity level signals to be transmitted in the first direction,
- a first crossconnecting unit for exchanging channels of the plurality of first higher multiplicity level signals, and
- a second optical interface unit converts a plurality of second higher multiplicity level signals to be transmitted in the first direction, into a second optical signal to be transmitted in the first direction, and transmits the second optical signal on the second optical transmission line;

the second circuit package contains,
- a third optical interface unit which receives a third optical signal transmitted through the second optical transmission line in the second direction, and converts the third optical signal into a plurality of third higher multiplicity level signals to be transmitted in the second direction,
- a second crossconnecting unit for exchanging channels of the plurality of third higher multiplicity level signals, and a fourth optical interface unit converts a plurality of fourth higher multiplicity level signals to be transmitted in the second direction, into a fourth optical signal to be transmitted in the second direction, and transmits the fourth optical signal on the first optical transmission line; and the third circuit package contains a third crossconnecting unit for exchanging channels of the plurality of lower multiplicity level signals in the plurality of first higher multiplicity level signals, and exchanging channels of the plurality of lower multiplicity level signals in the plurality of third higher multiplicity level signals.

* * * * *